United States Patent [19]
Bruce et al.

[11] 4,234,919
[45] Nov. 18, 1980

[54] INTERSYSTEM COMMUNICATION LINK

[75] Inventors: Kenneth E. Bruce, Nashua, N.H.; George J. Barlow, Tewksbury, Mass.; John W. Conway, Waltham, Mass.; Ralph M. Lombardo, Jr., Lowell, Mass.; John J. Bradley, Framingham, Mass.; David B. O'Keefe, Westford, Mass.

[73] Assignee: Honeywell Information Systems Inc., Waltham, Mass.

[21] Appl. No.: 956,385

[22] Filed: Oct. 31, 1978

[51] Int. Cl.³ ............................................. G06F 3/04
[52] U.S. Cl. ............................................. 364/200
[58] Field of Search ............................. 364/200, 900

[56] References Cited
U.S. PATENT DOCUMENTS

| | | | |
|---|---|---|---|
| 3,940,743 | 2/1976 | Fitzgerald | 364/200 |
| 4,038,644 | 7/1977 | Duke et al. | 364/900 |
| 4,047,162 | 9/1977 | Dorey et al. | 364/200 |

*Primary Examiner*—Jerry Smith
*Attorney, Agent, or Firm*—Gerald E. Lester; Nicholas Prasinos; Ronald T. Reiling

[57] ABSTRACT

A logic system referred to as an intersystem link unit (ISL) is provided for accommodating the transfer of binary coded information between two or more communication busses in a data processing system, wherein information including memory and non-memory read and write requests, CPU to CPU interrupts, peripheral control units to CPU interrupts may be transferred between plural communication busses each supporting plural data processing units including plural CPUs without substantially affecting the bus rate of the individual communication busses. Binary coded information from a communication bus is acquired asynchronously, and plural bus communications of different types are accommodated in parallel. The ISL units further may be dynamically reconfigured to provide for a reallocation of communication bus resources between communication busses.

10 Claims, 42 Drawing Figures

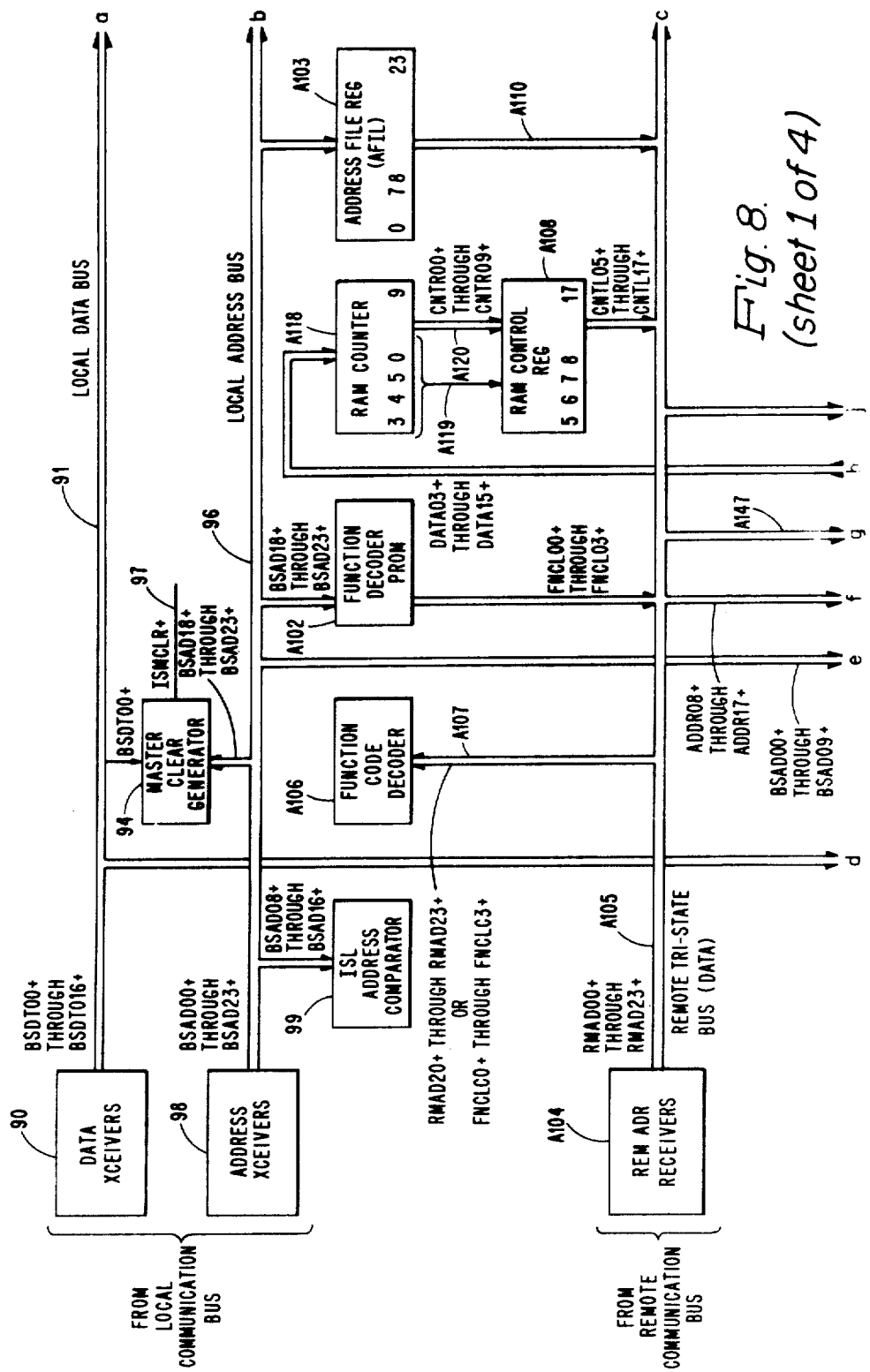
Fig. 8. (sheet 1 of 4)

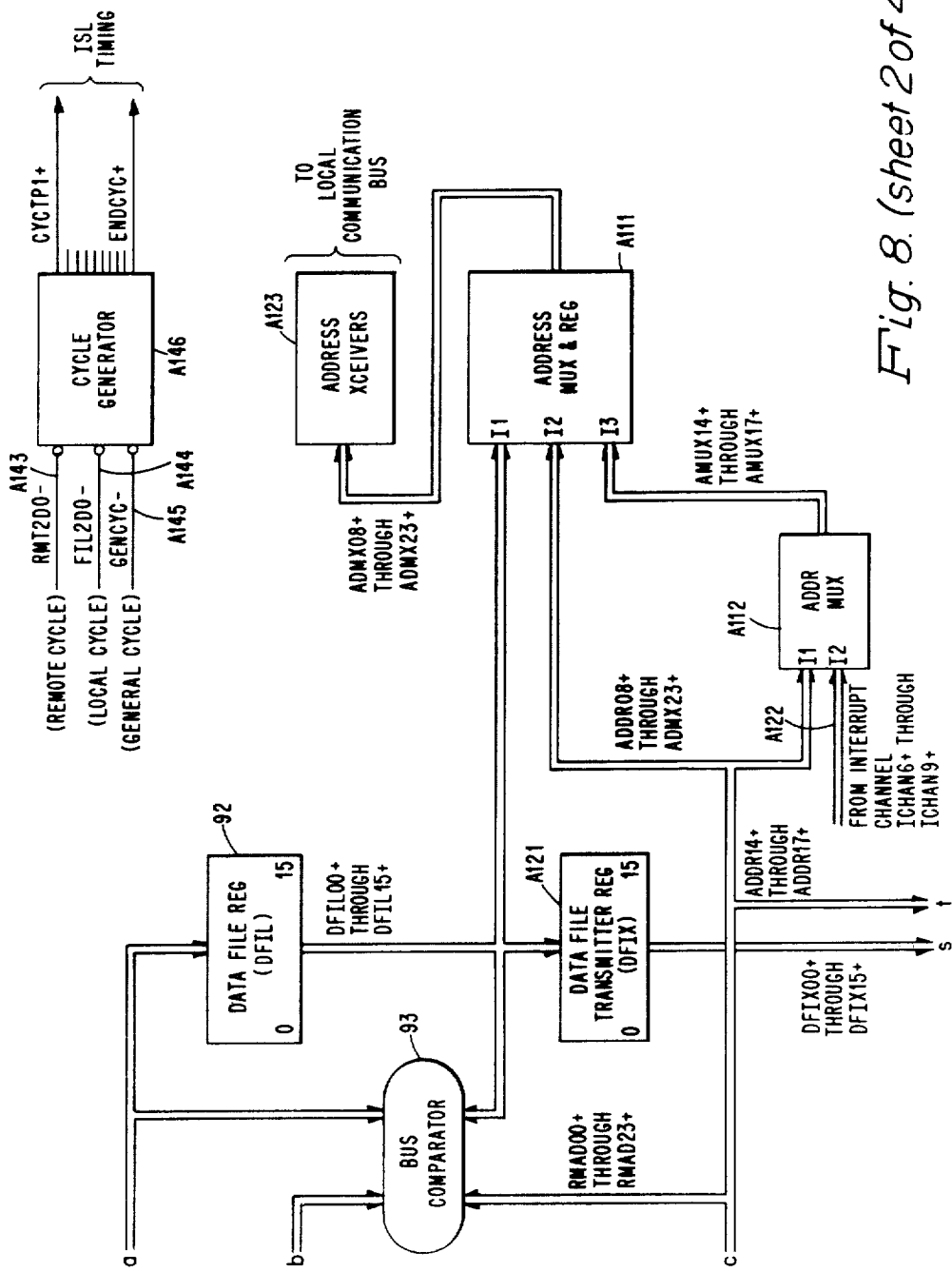
Fig. 8. (sheet 2 of 4)

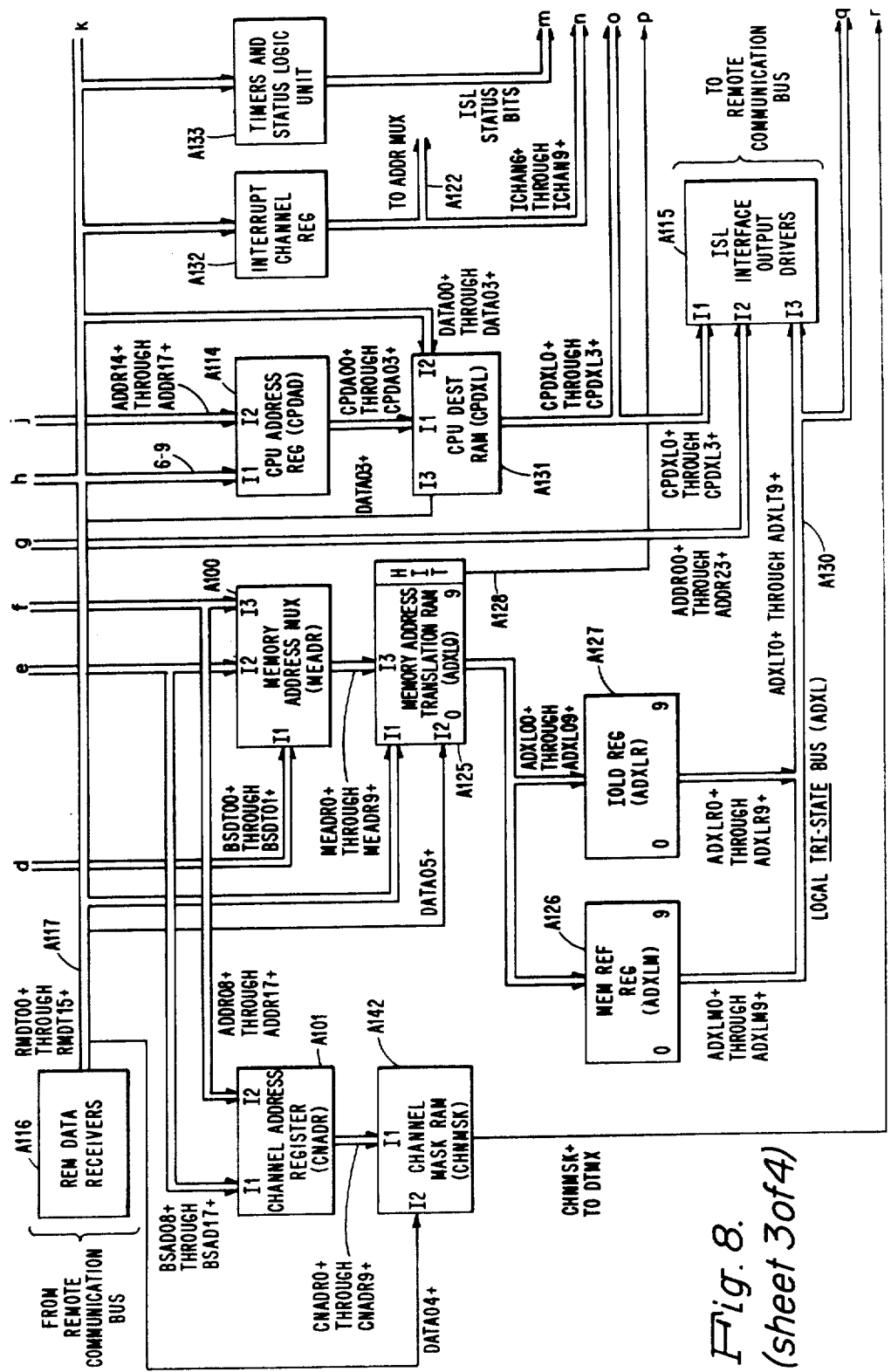
Fig. 8. (sheet 3 of 4)

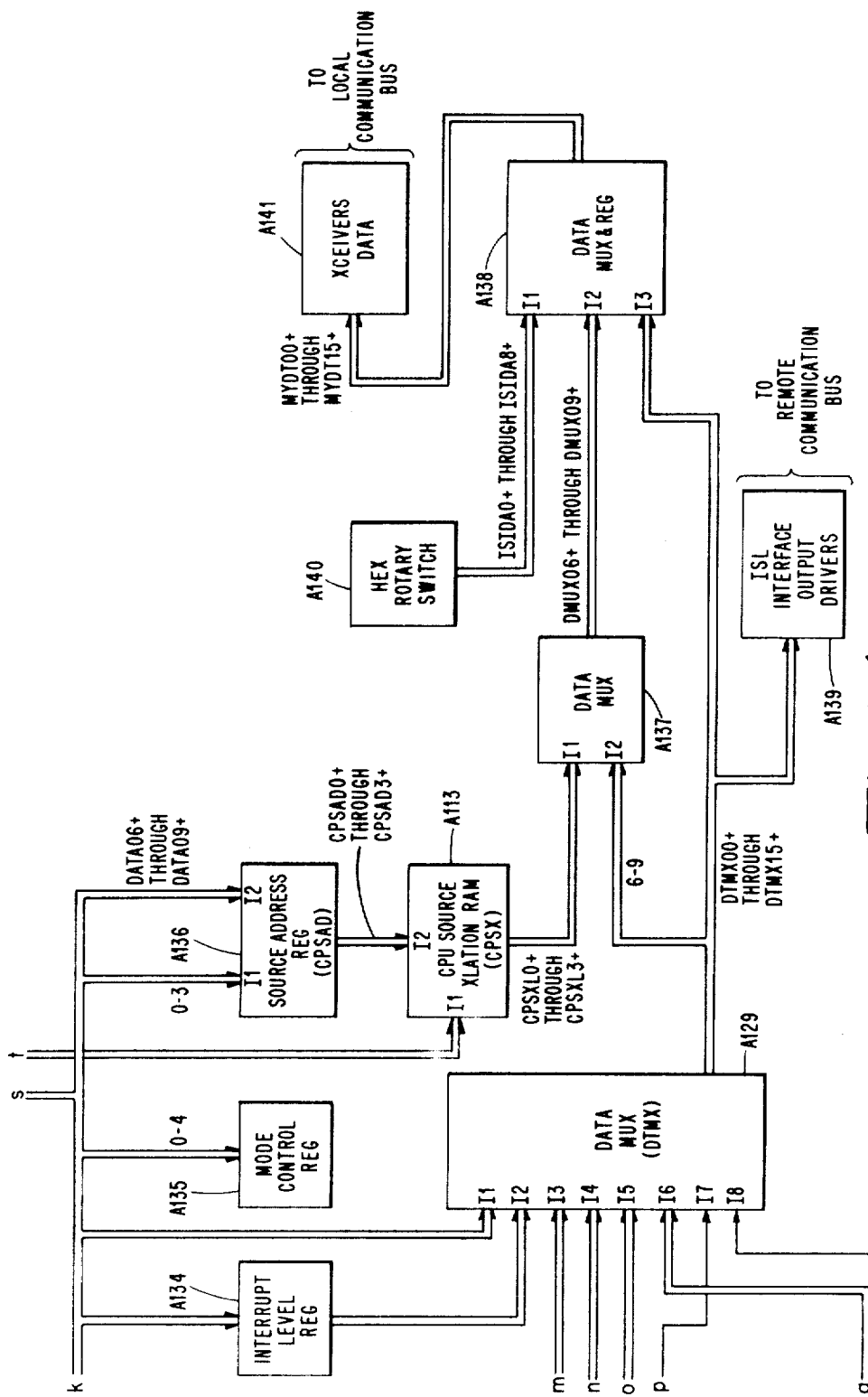

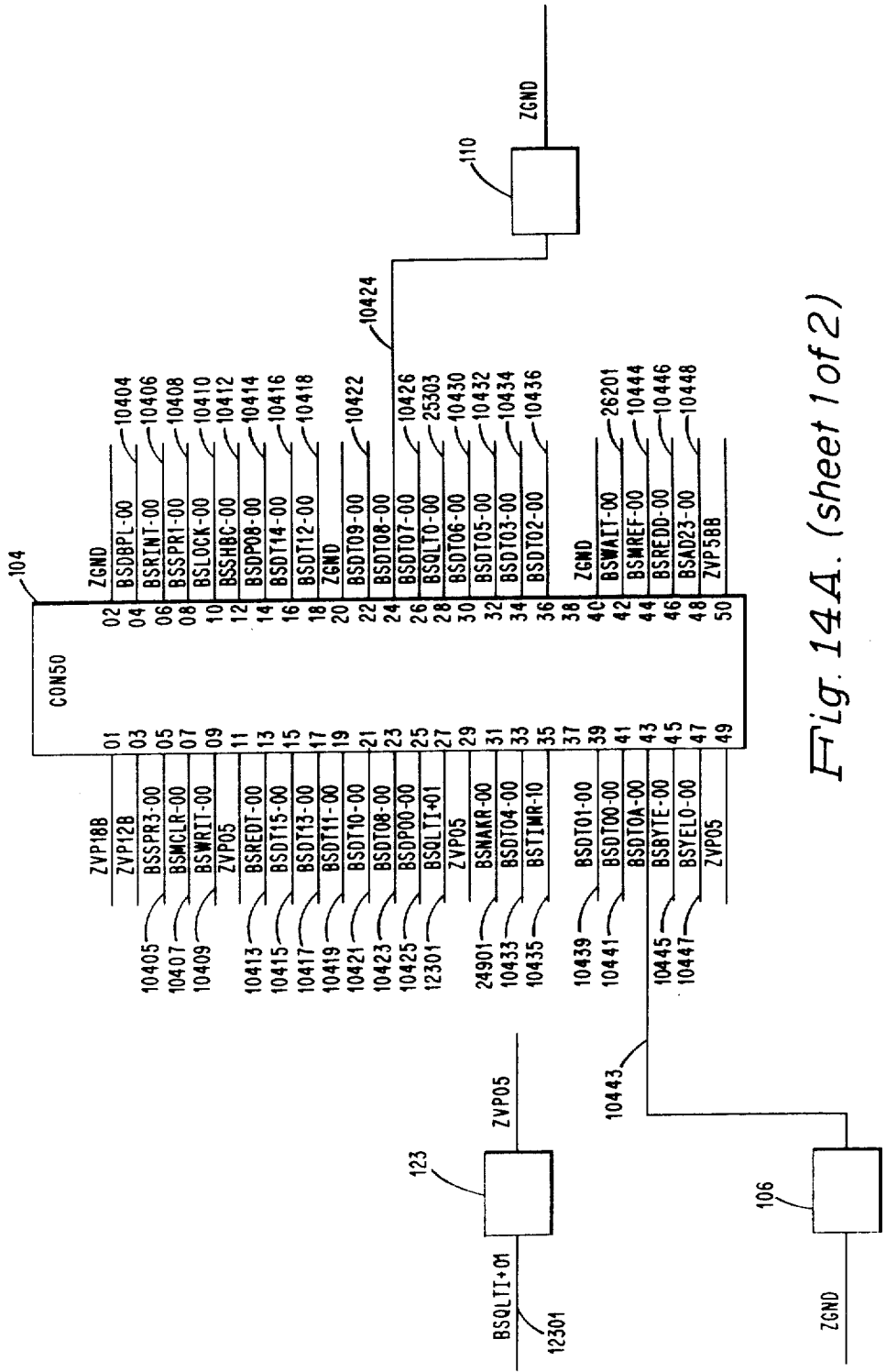
Fig. 14A. (sheet 1 of 2)

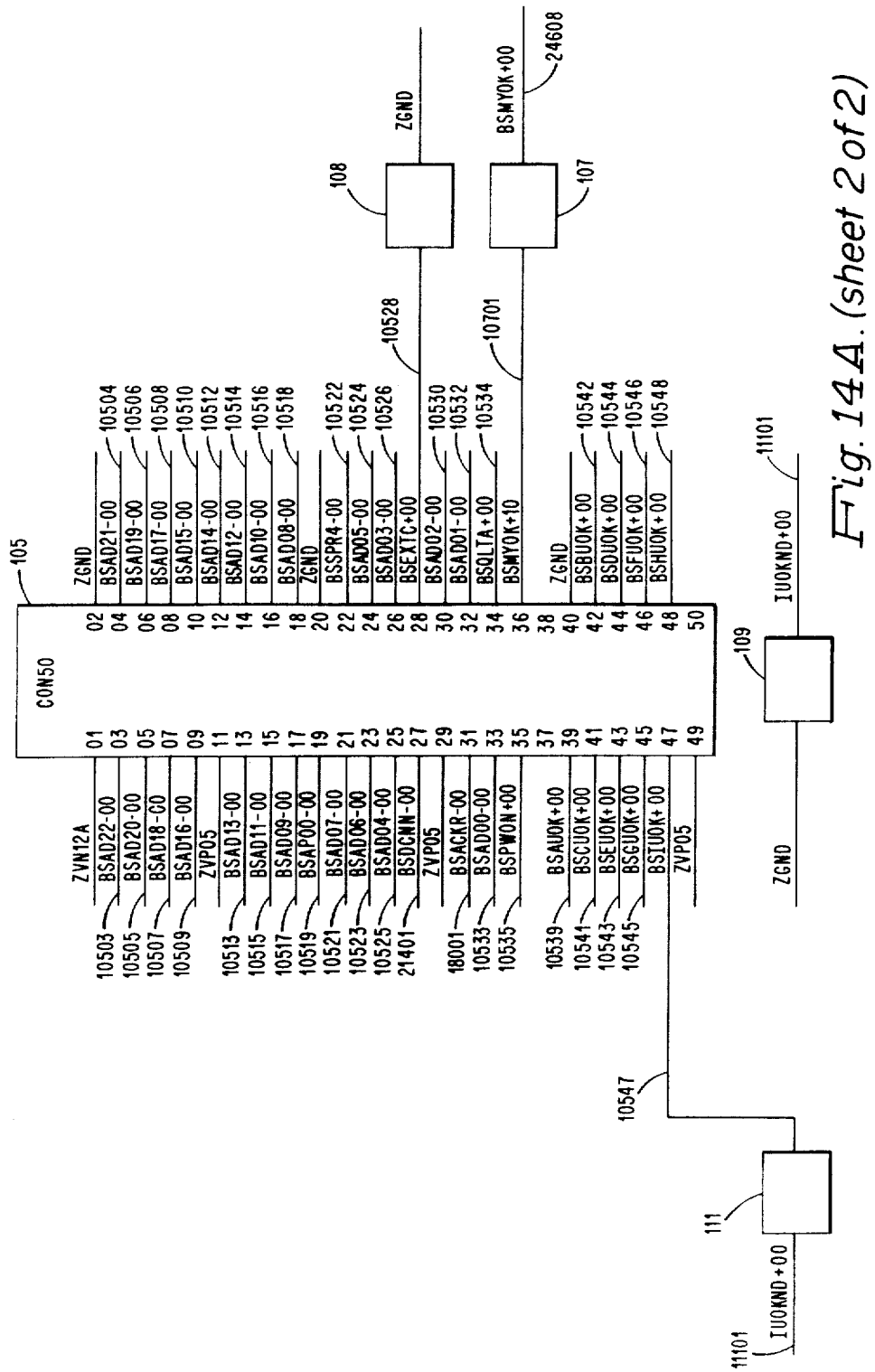

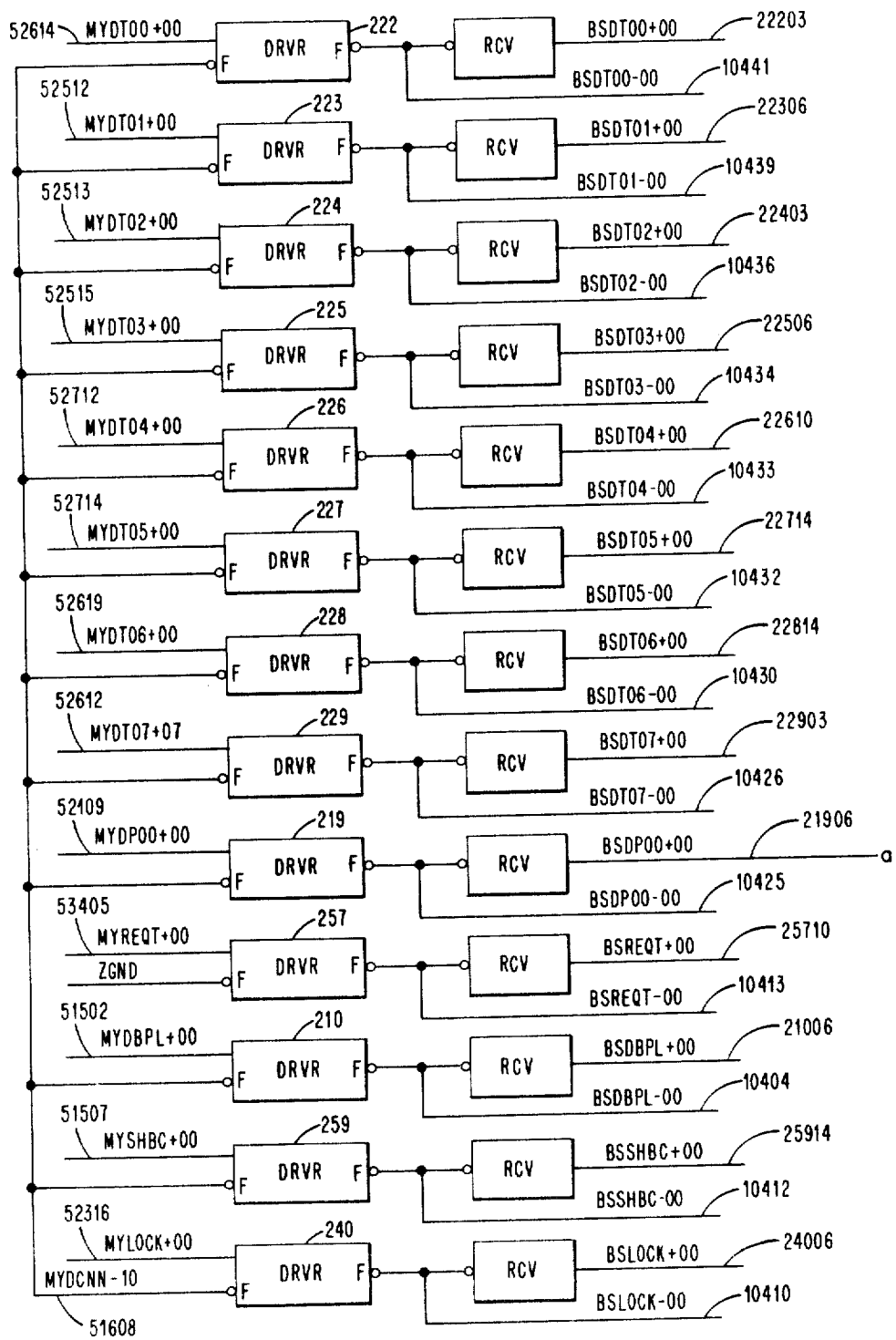
Fig. 14B. (sheet 1 of 3)

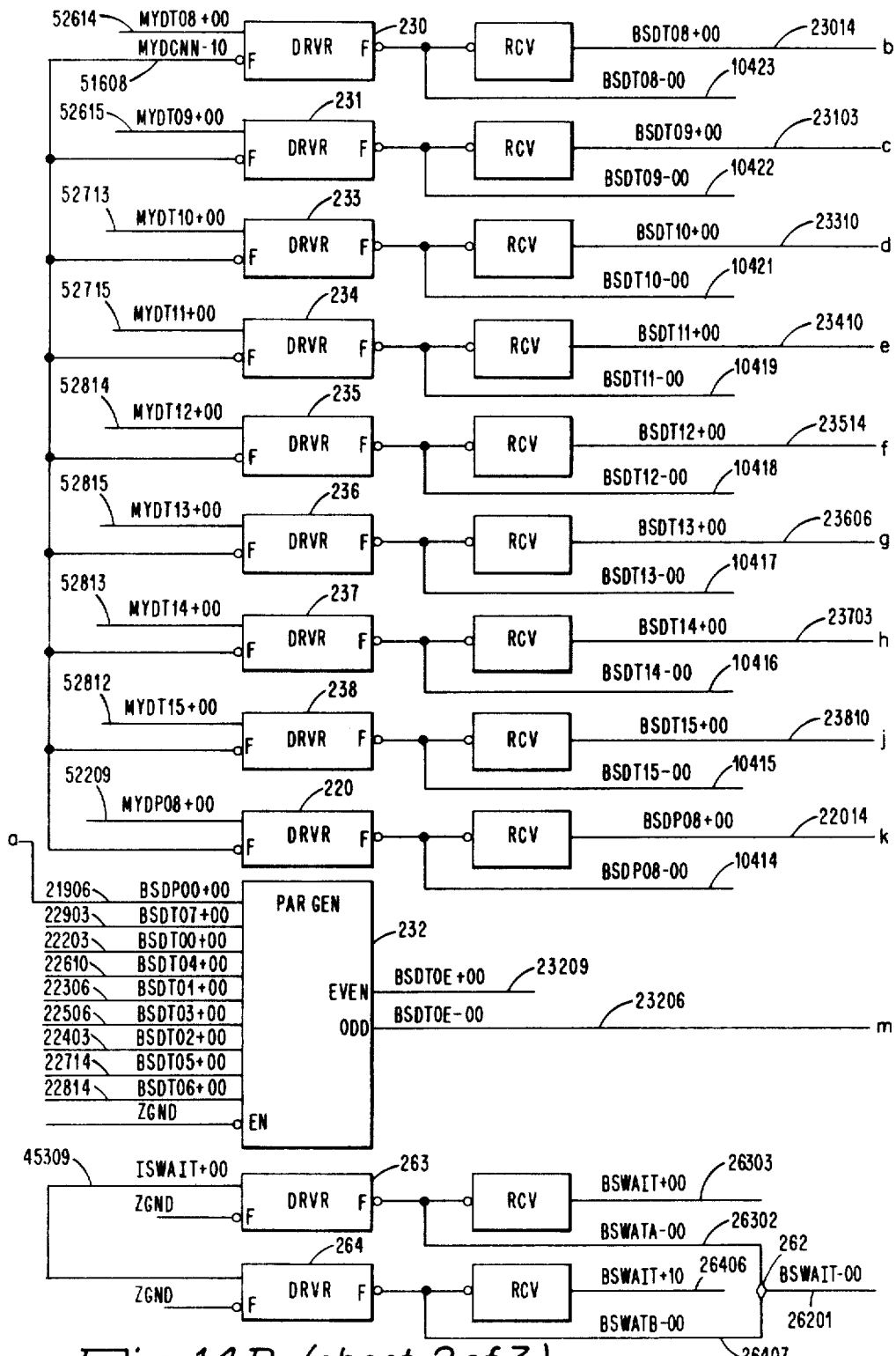
Fig. 14B. (sheet 2 of 3)

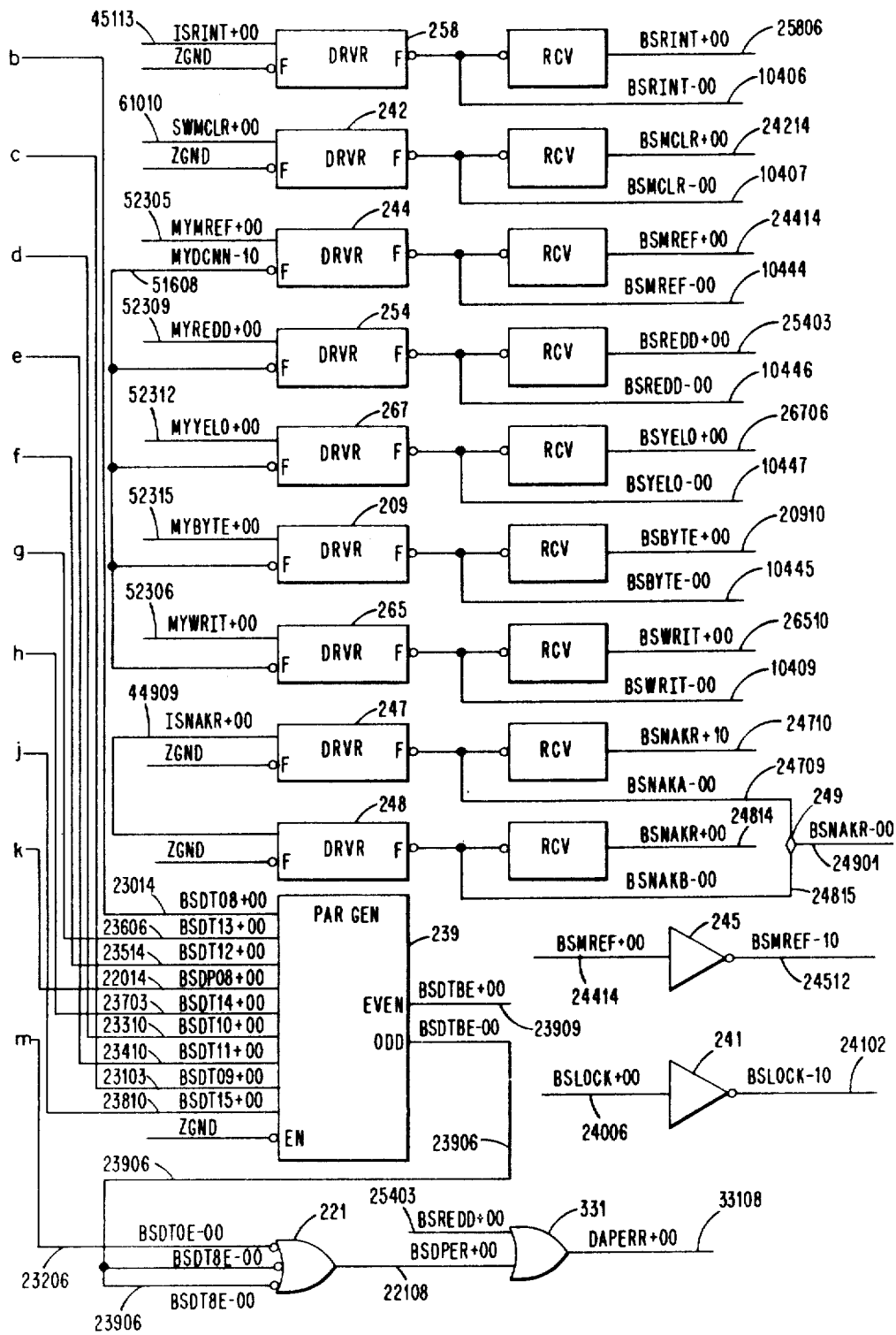
Fig. 14B. (sheet 3 of 3)

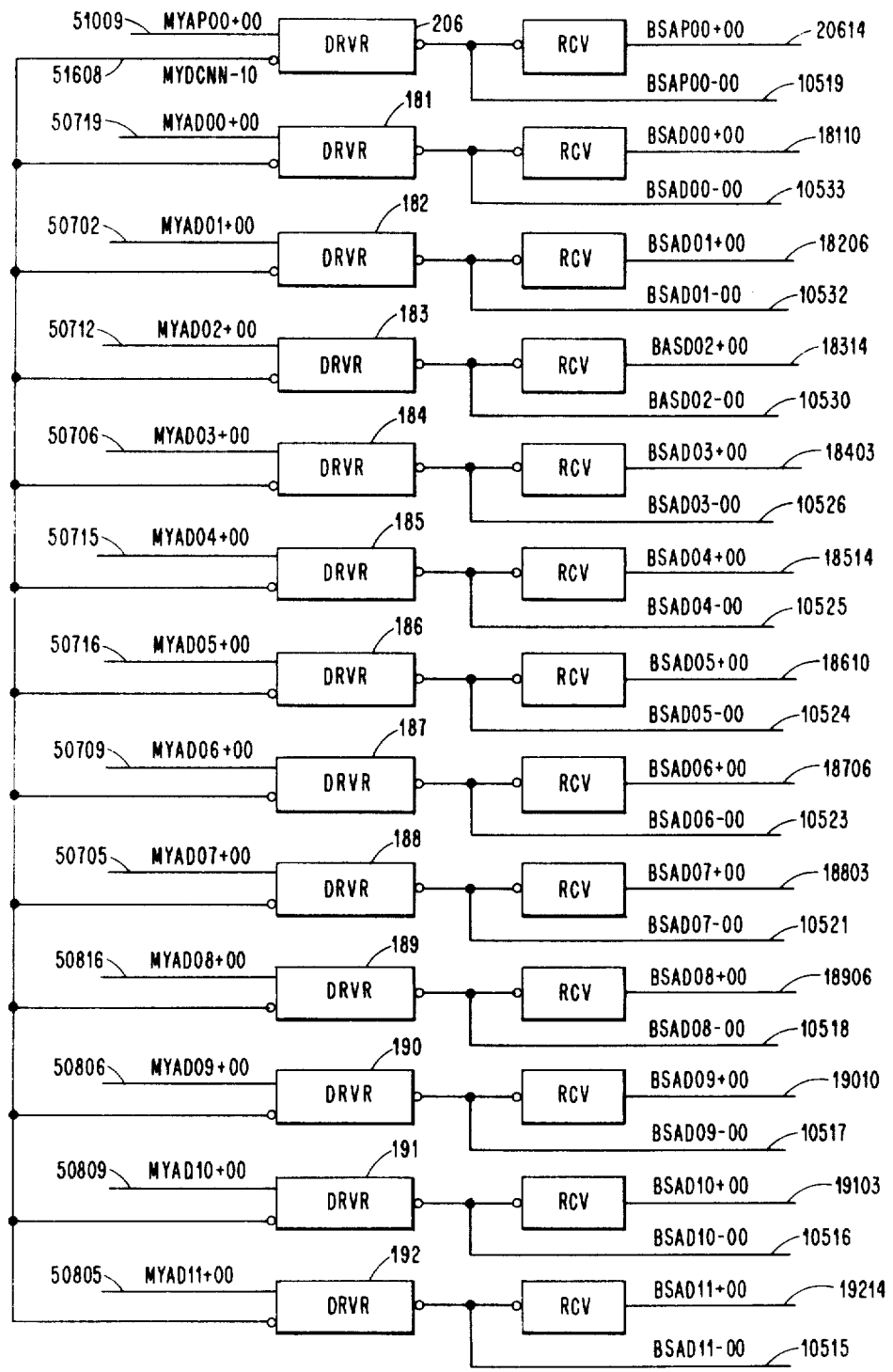
Fig. 14C. (sheet 1 of 3)

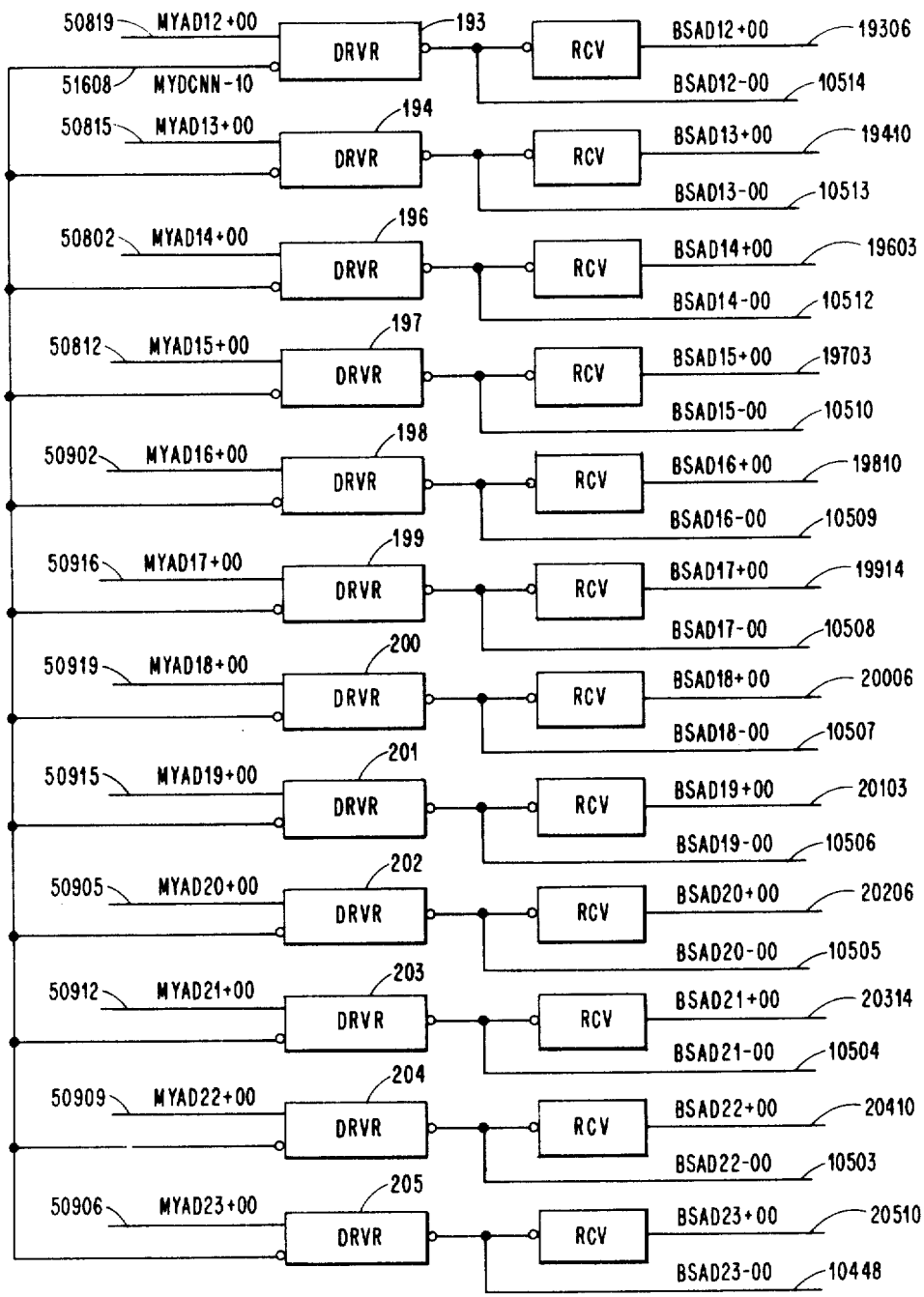
Fig. 14C. (sheet 2 of 3)

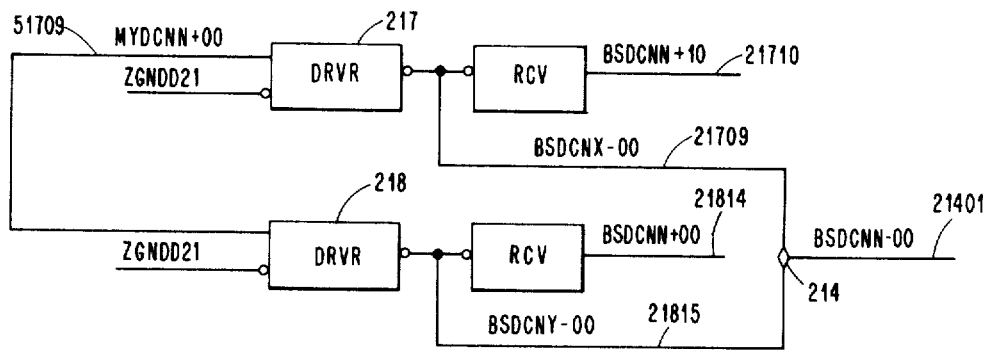
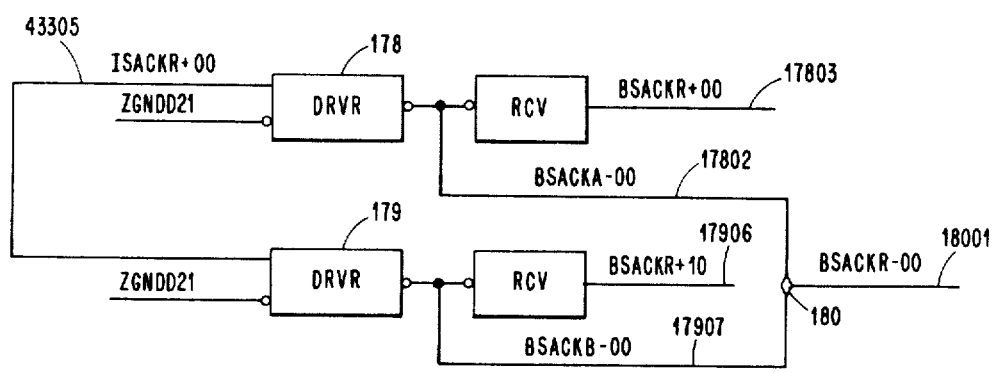
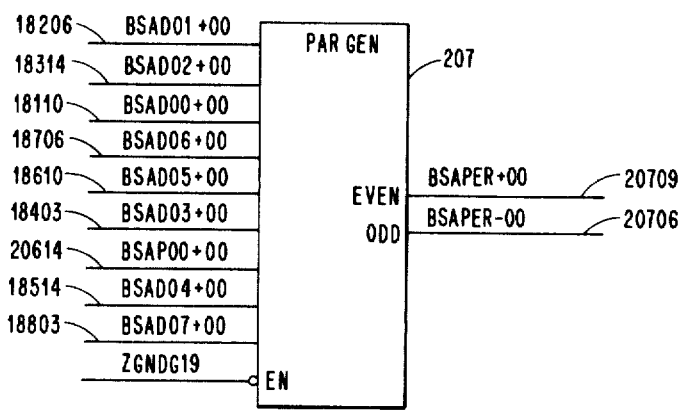
Fig. 14C. (sheet 3 of 3)

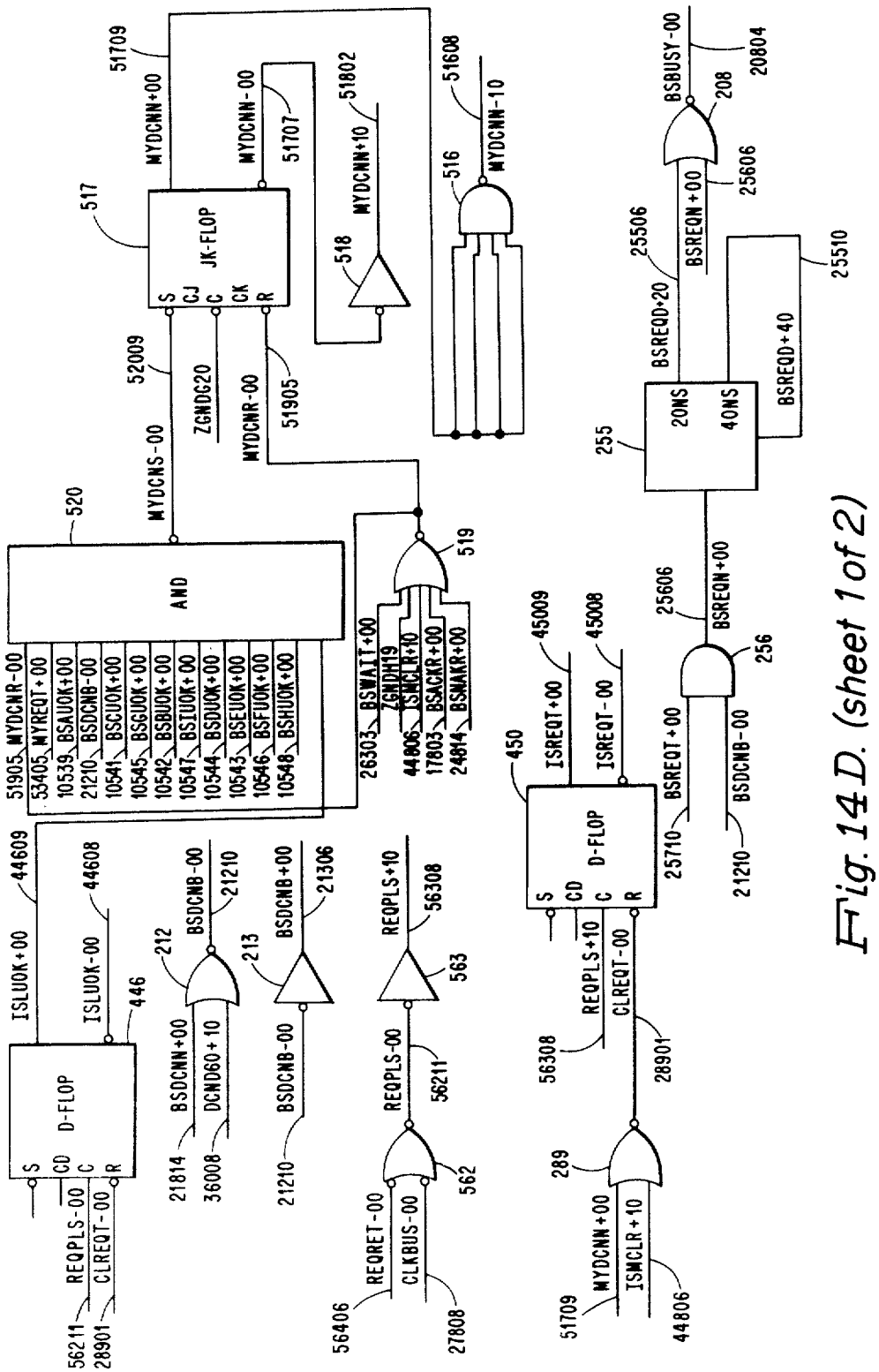
Fig. 14D. (sheet 1 of 2)

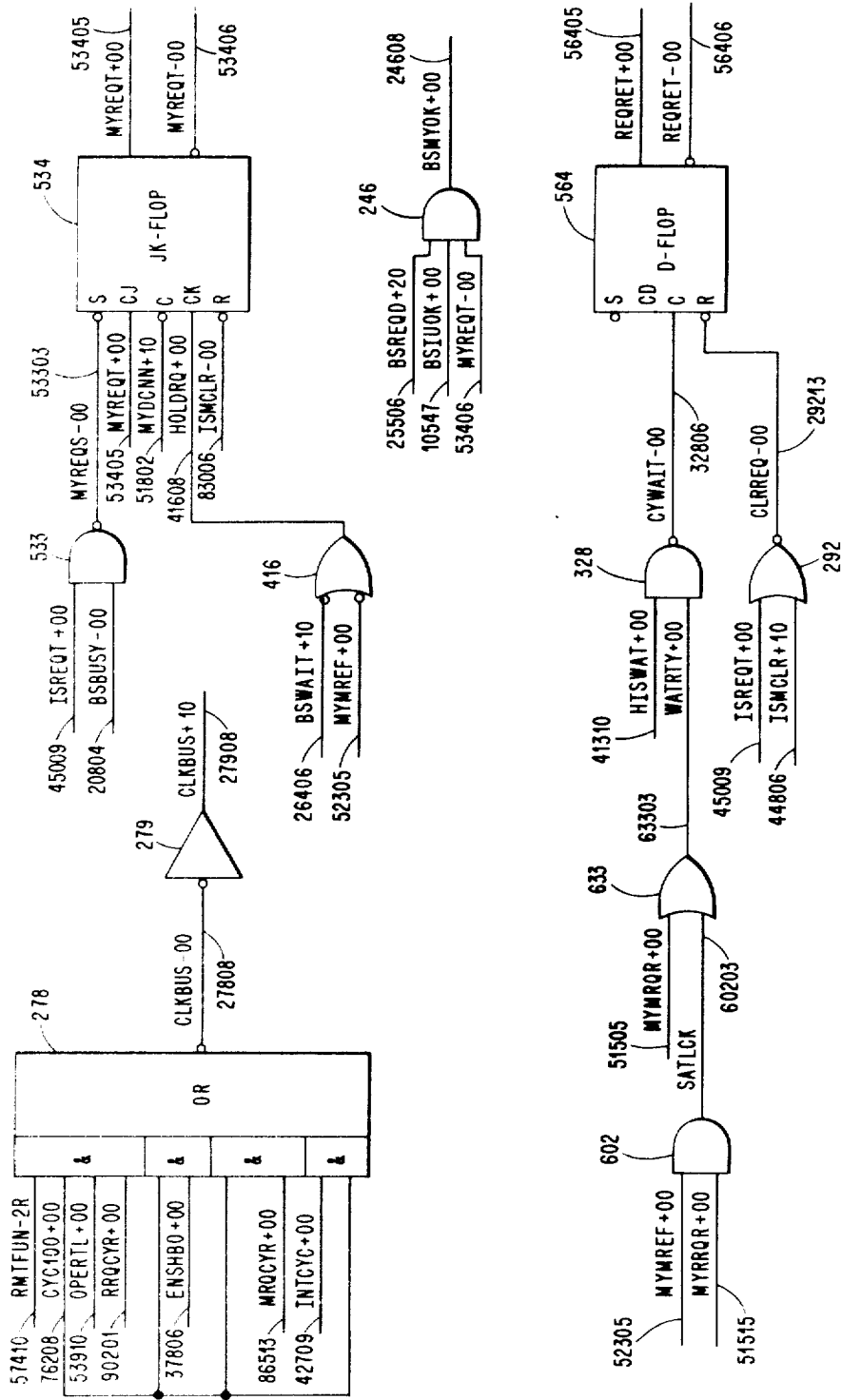
Fig. 14D. (sheet 2 of 2)

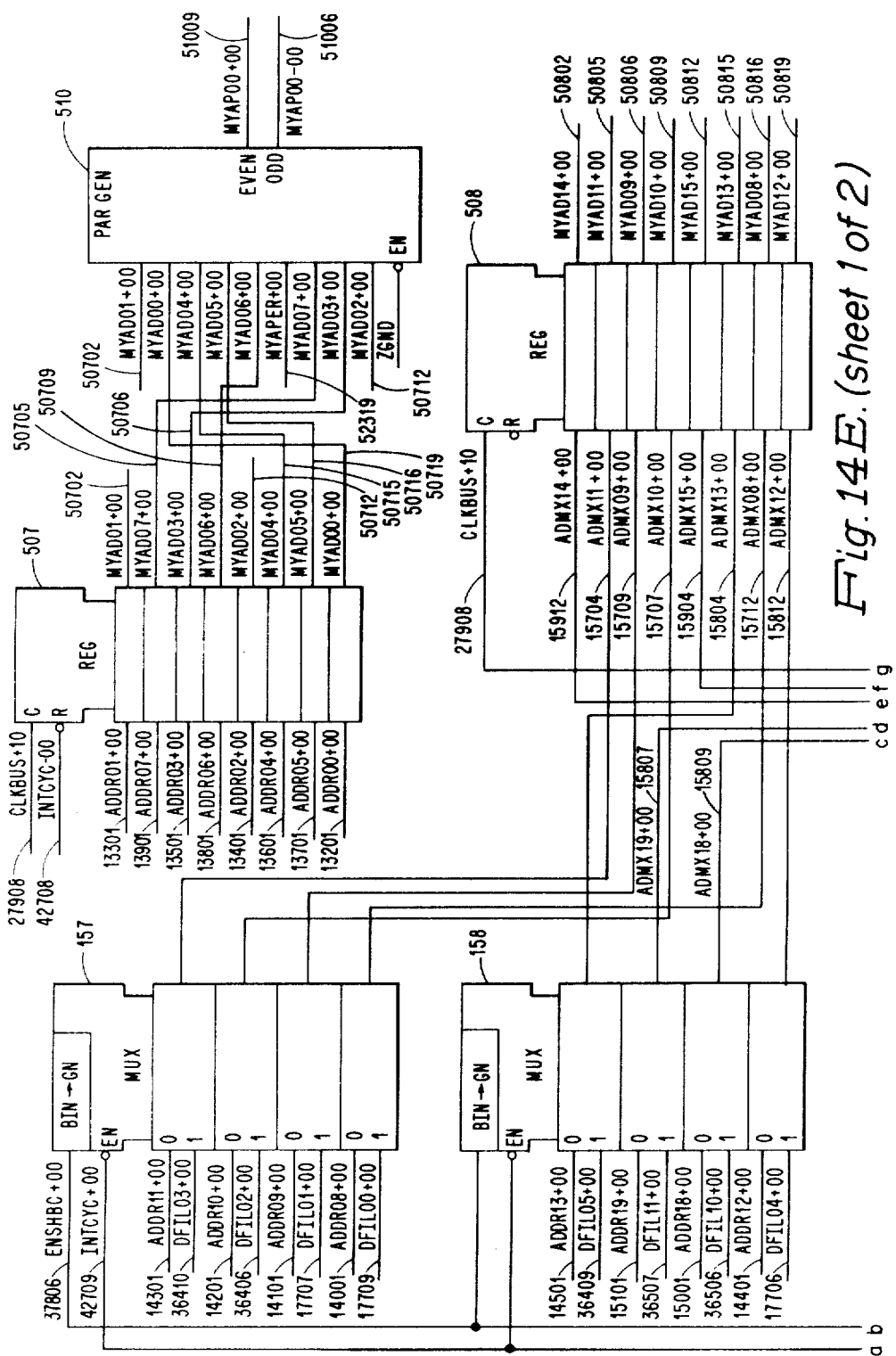
Fig.14E. (sheet 1 of 2)

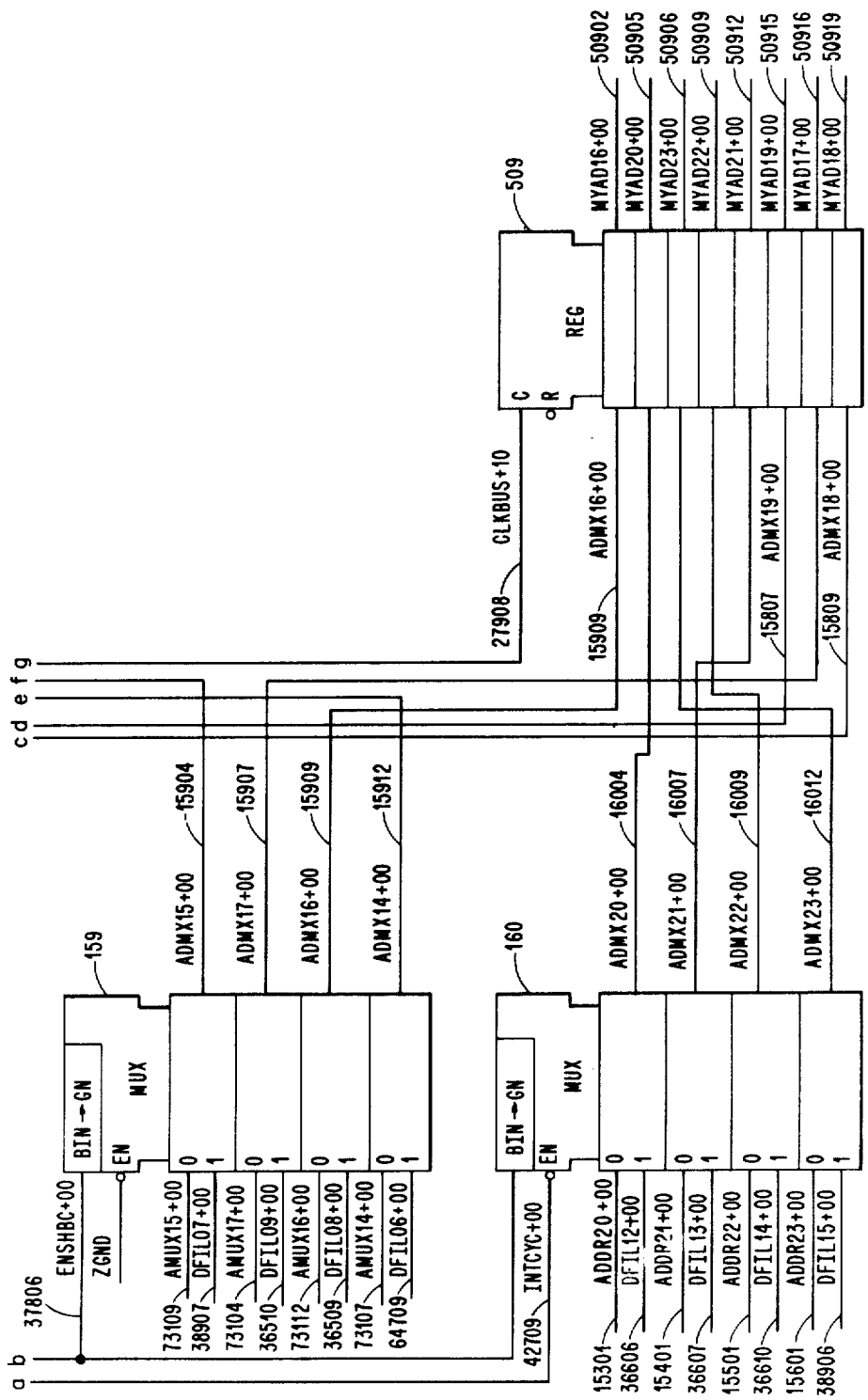
Fig. 14E. (sheet 2 of 2)

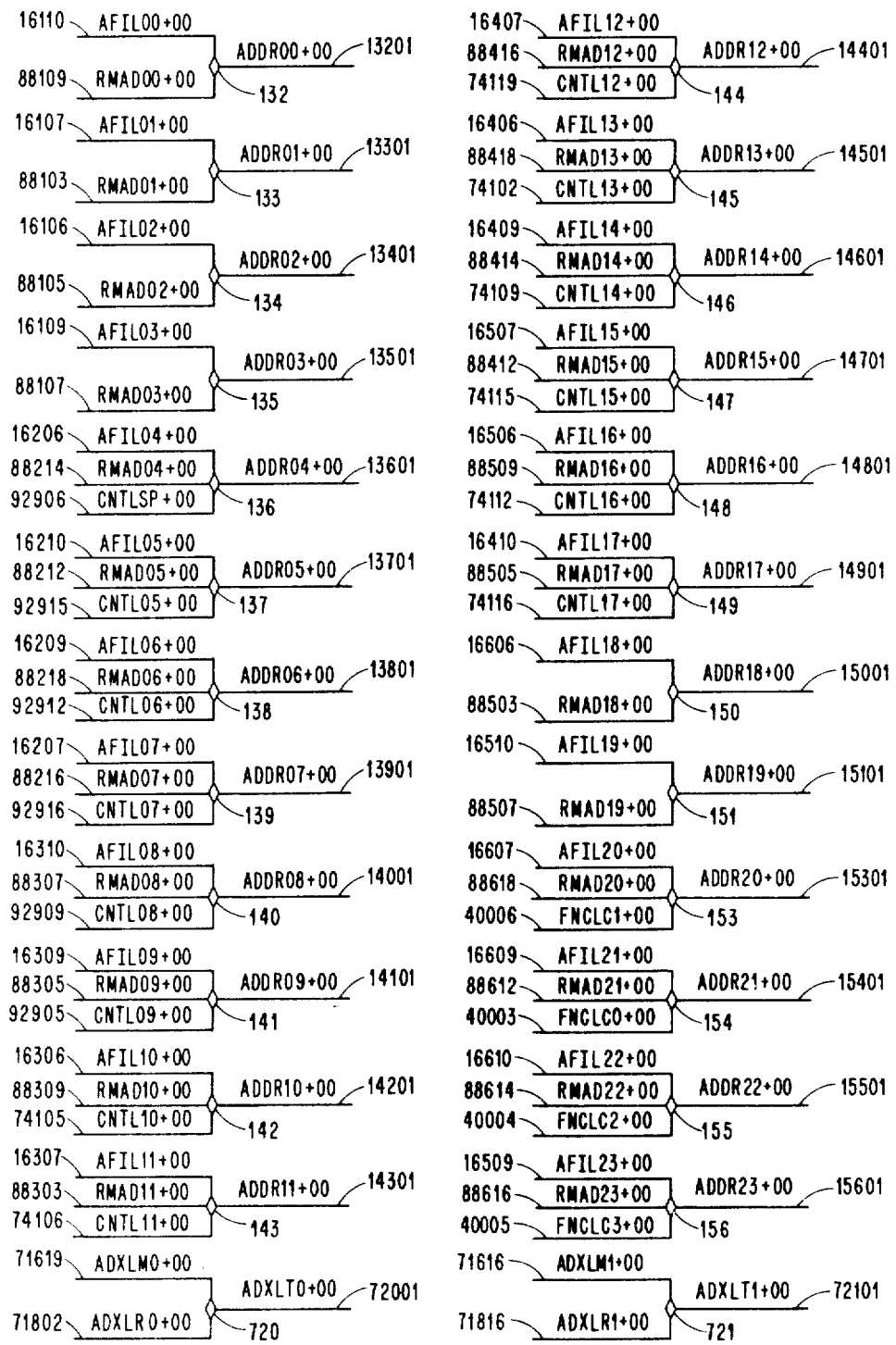
Fig. 14F. (sheet 1 of 2)

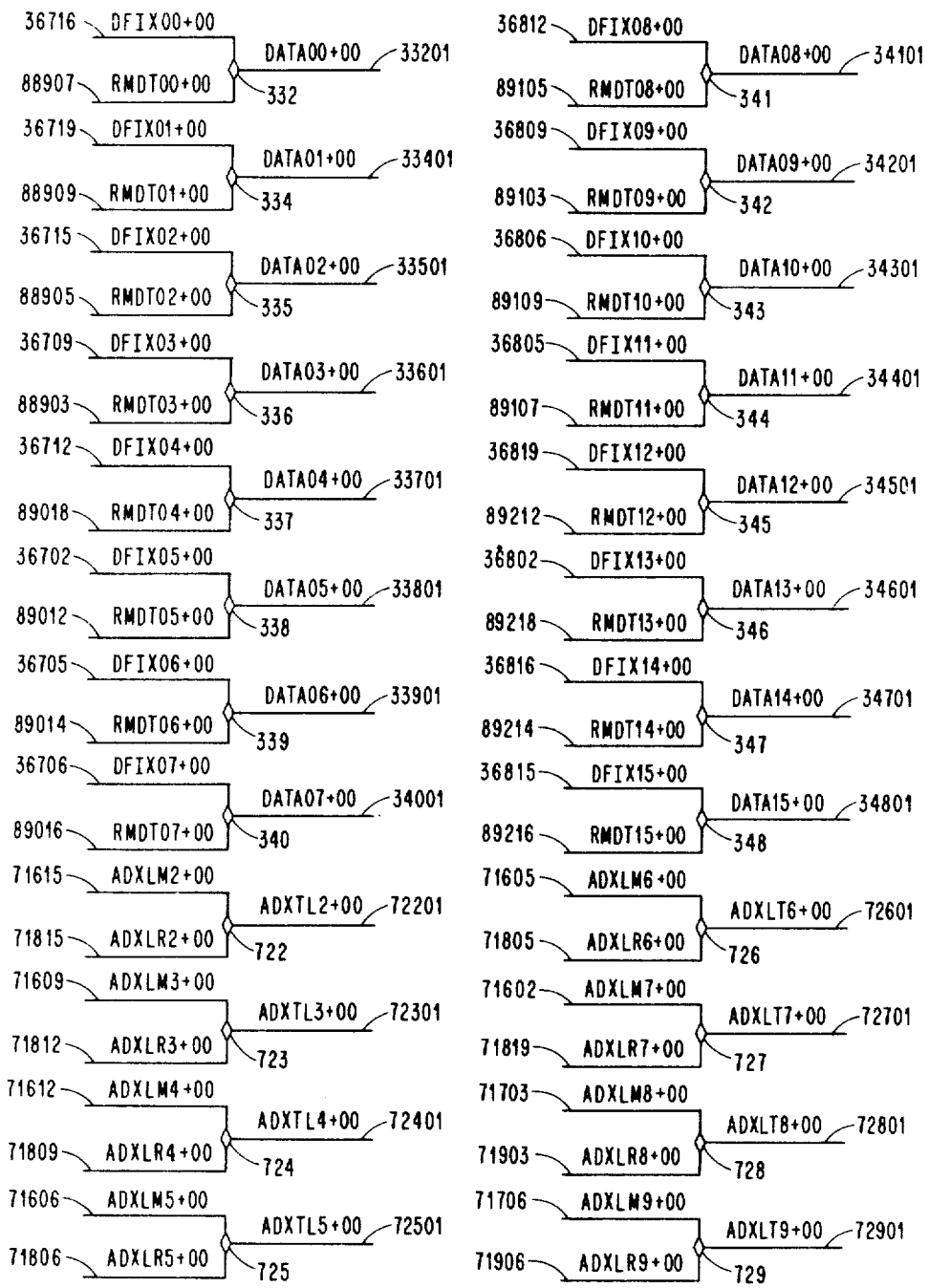
Fig. 14F. (sheet 2 of 2)

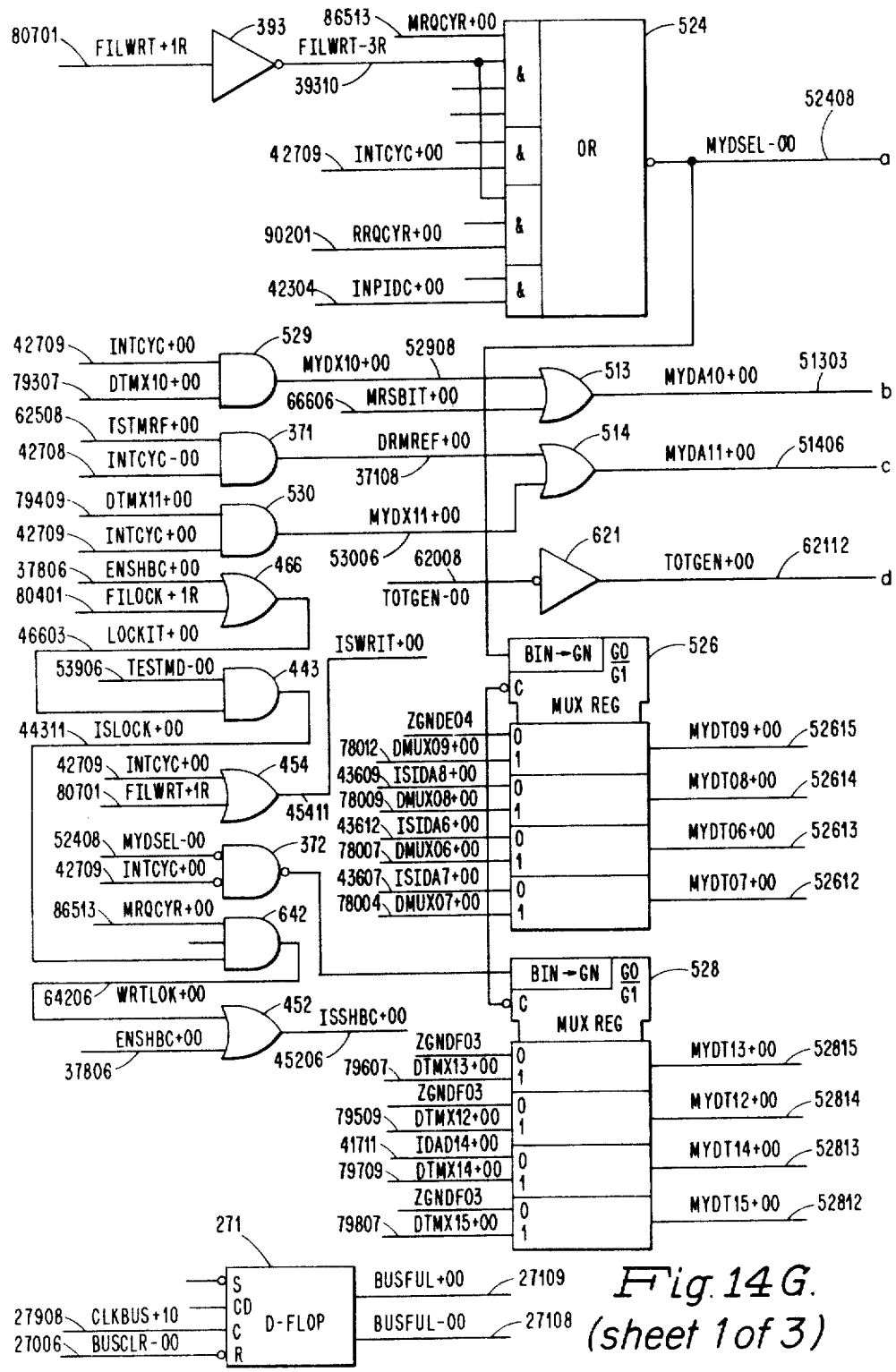
Fig. 14G. (sheet 1 of 3)

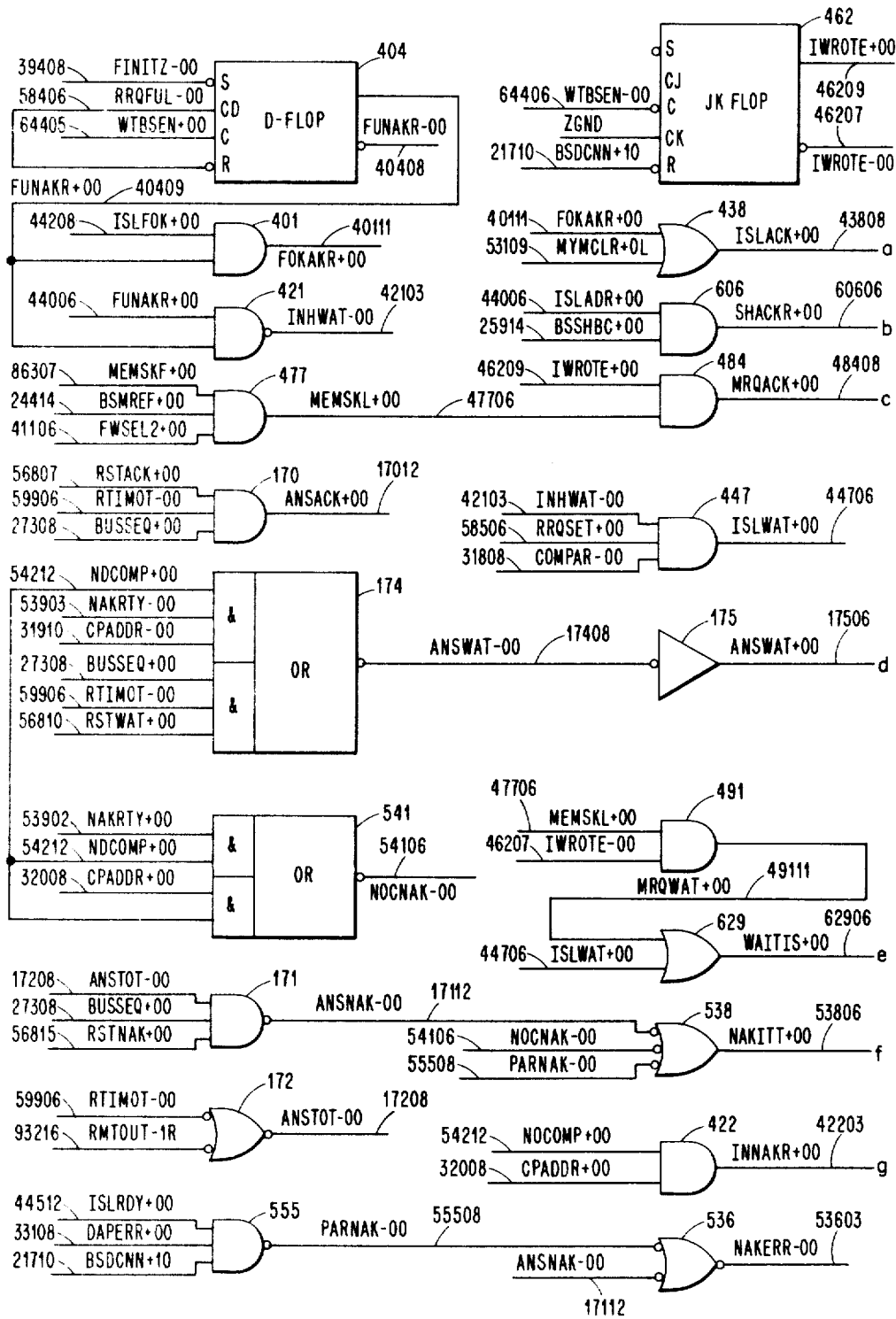
Fig. 14H. (sheet 1 of 2)

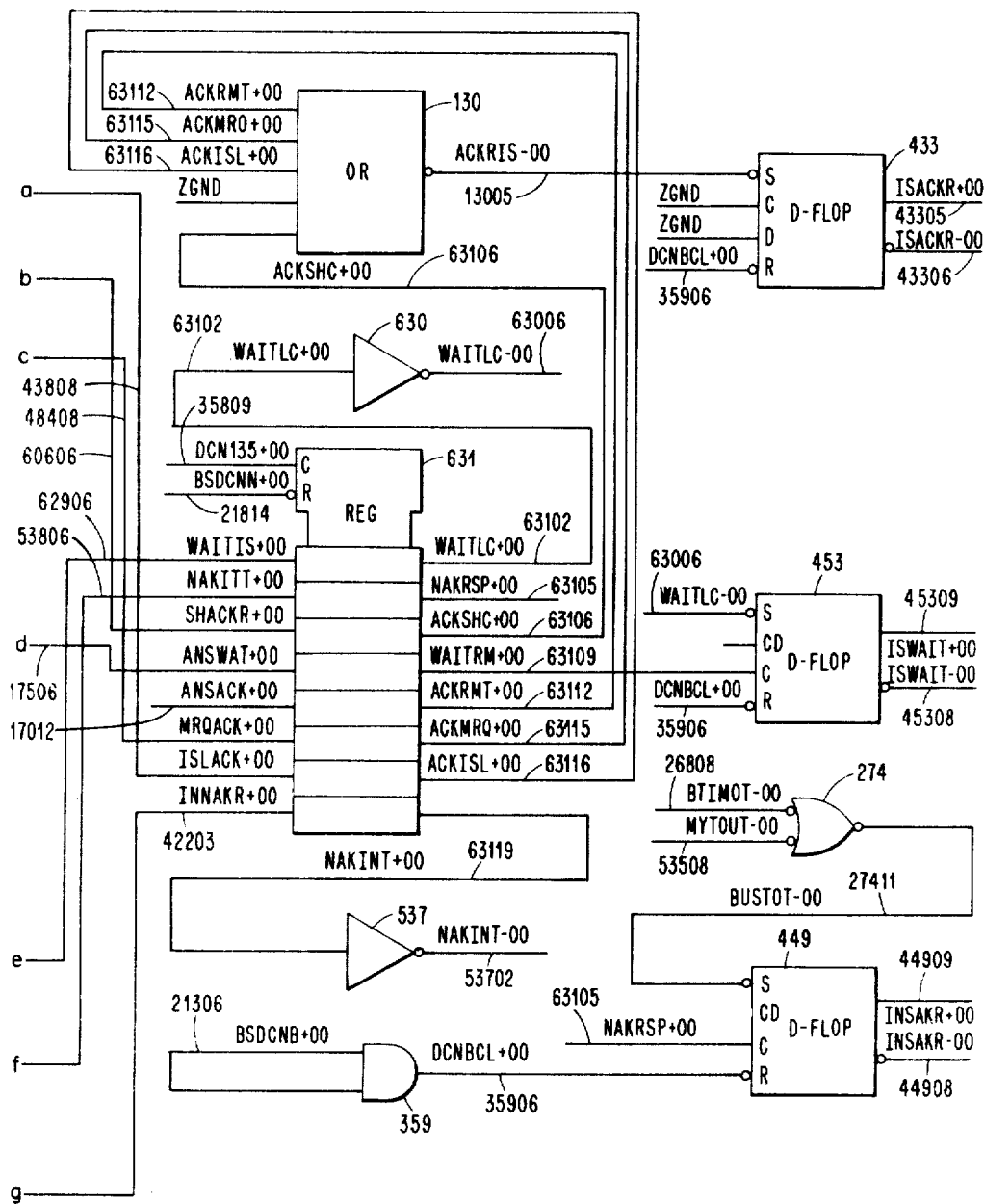
Fig. 14H. (sheet 2 of 2)

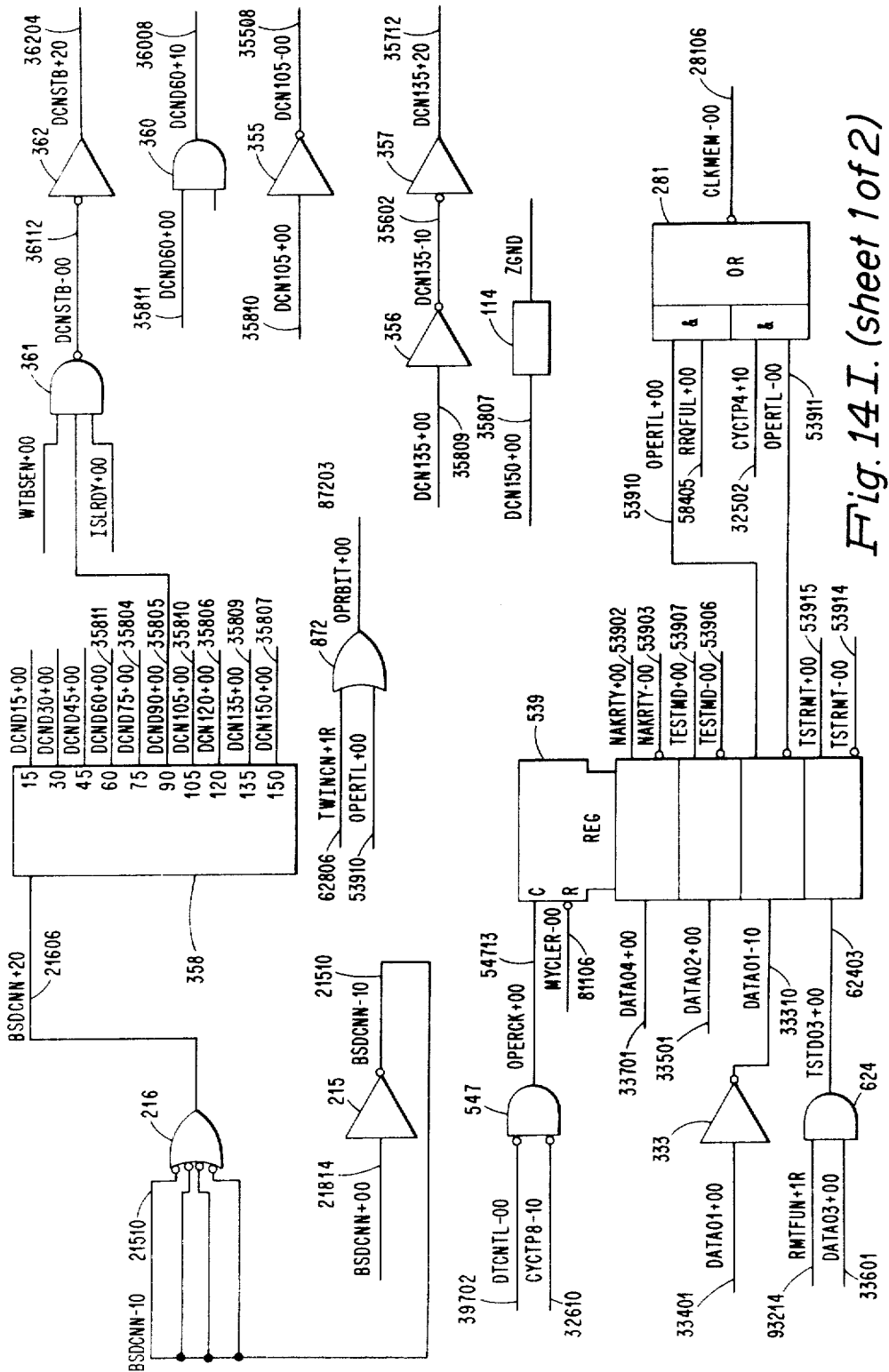
Fig. 14I. (sheet 1 of 2)

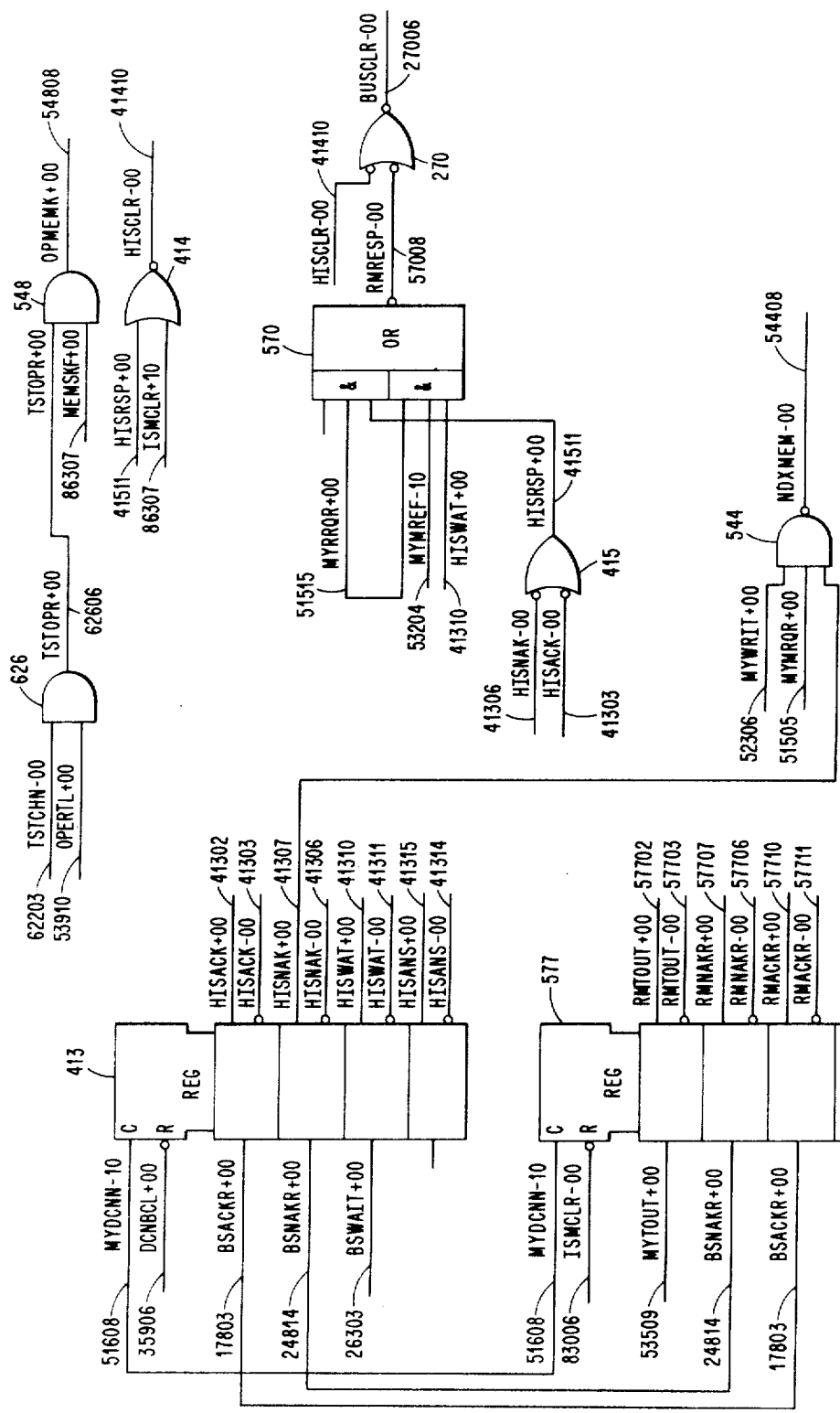
Fig. 14I. (sheet 2 of 2)

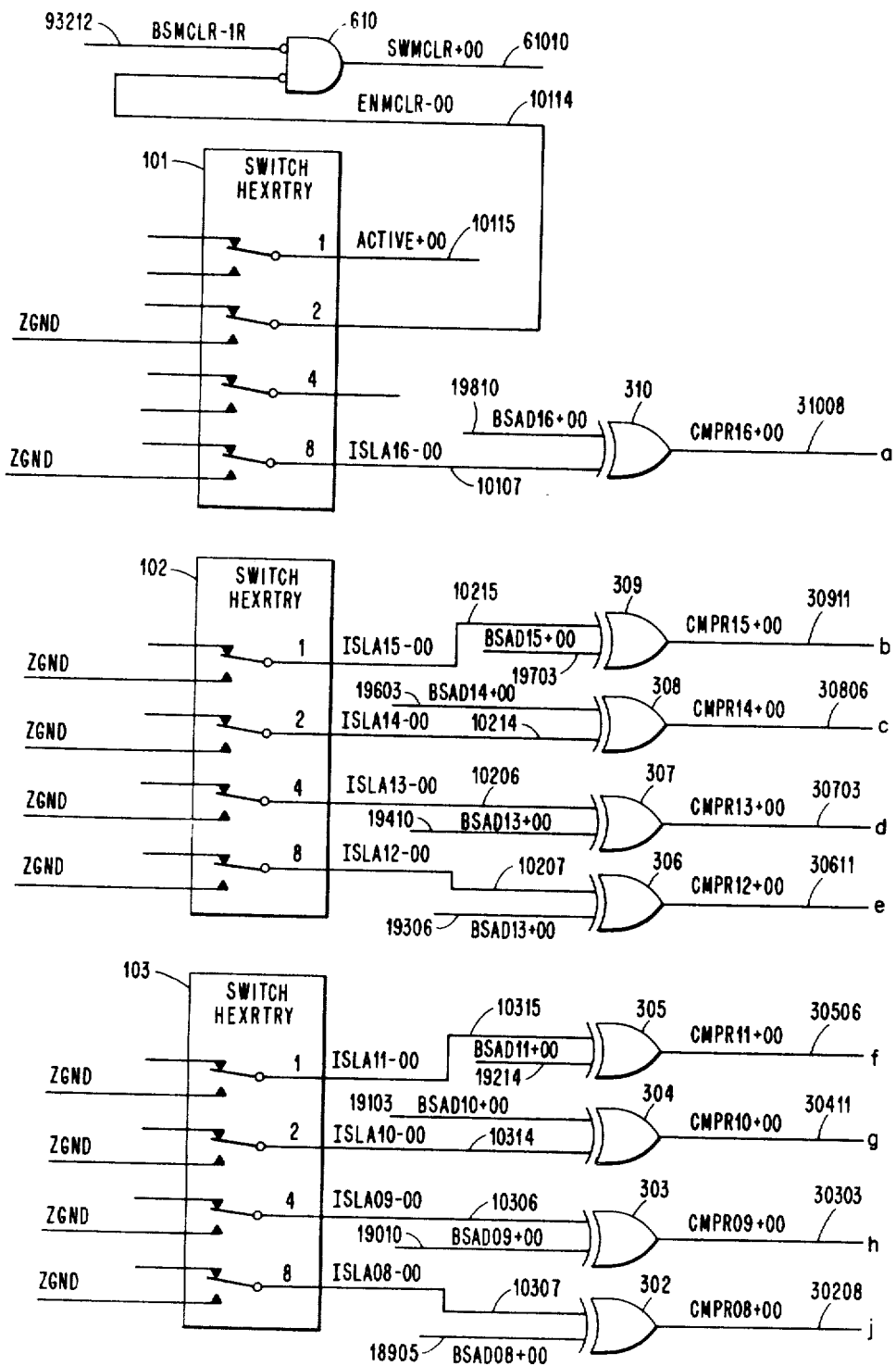
Fig. 14J. (sheet 1 of 2)

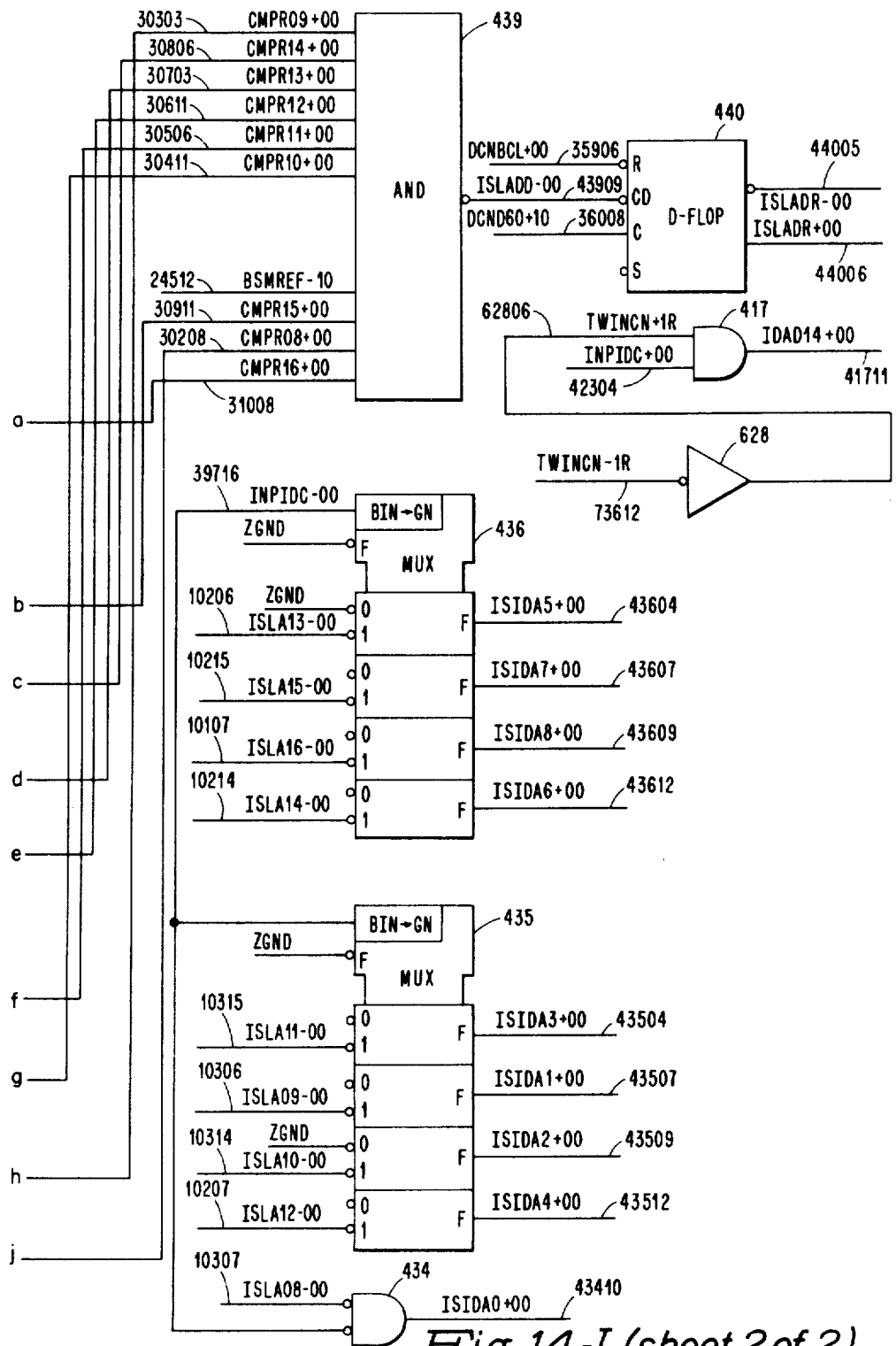
Fig. 14 J. (sheet 2 of 2)

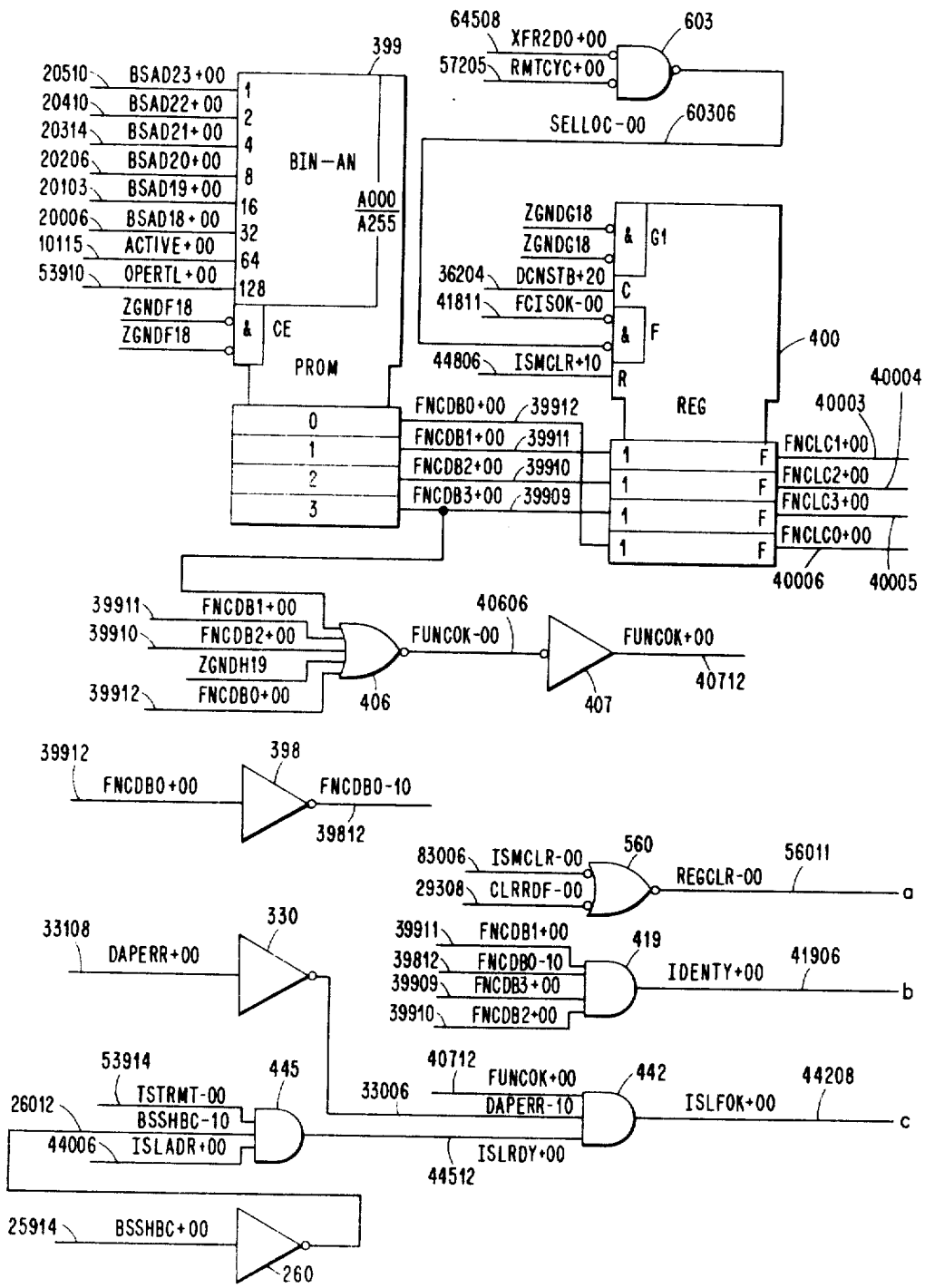
Fig. 14K. (sheet 1 of 2)

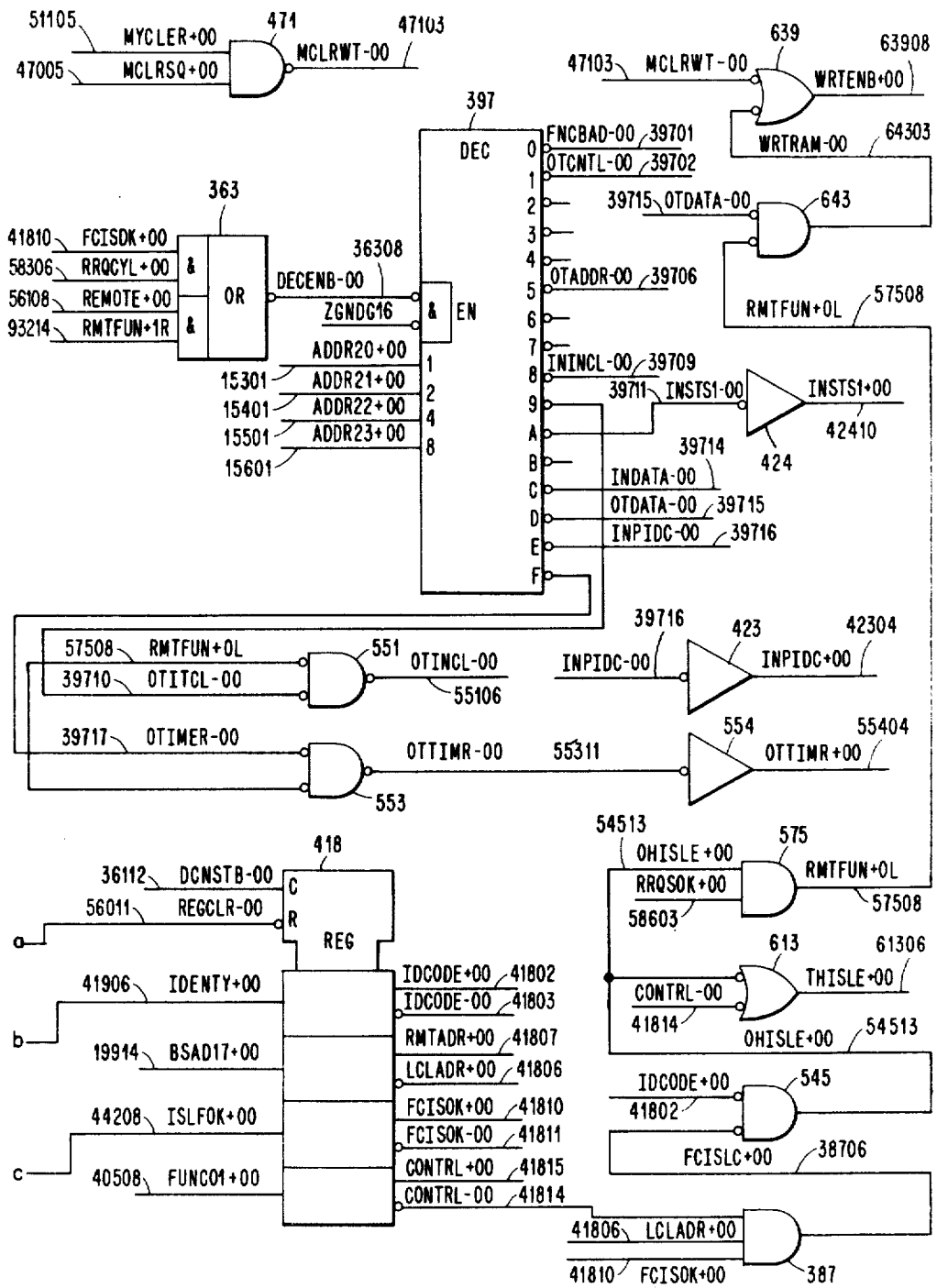
Fig. 14 K. (sheet 2 of 2)

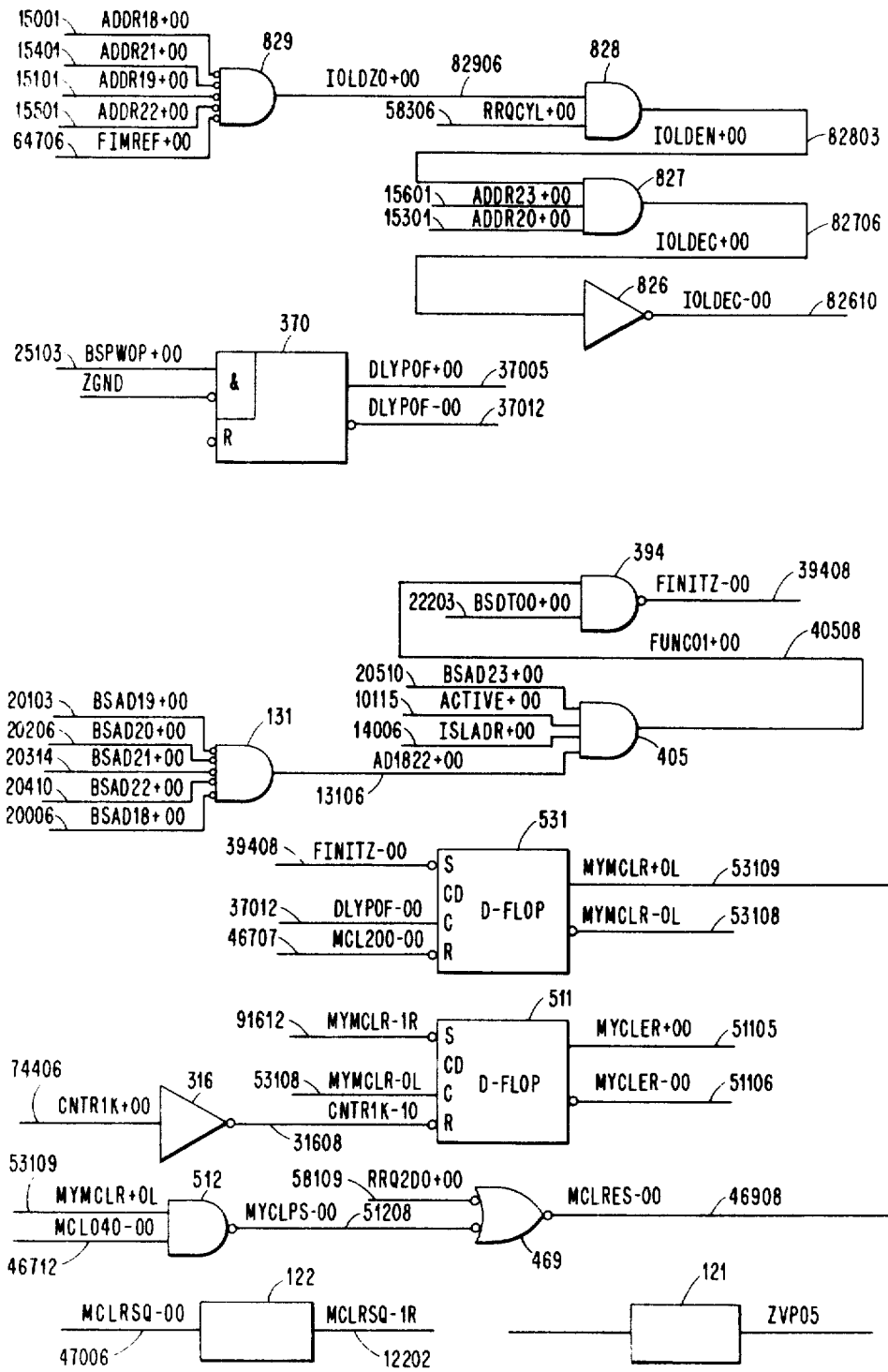
Fig. 14L. (sheet 1 of 2)

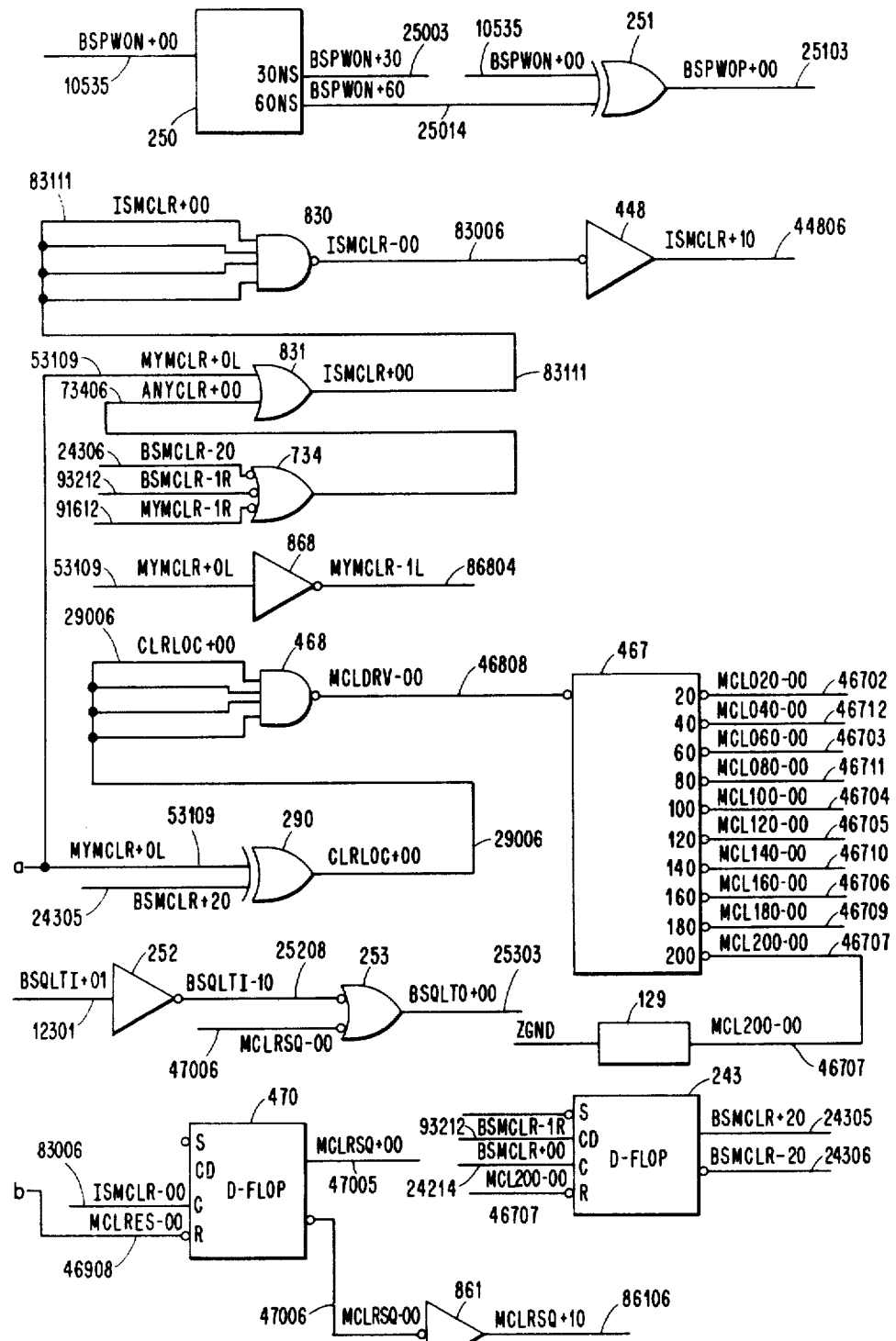
Fig. 14L. (sheet 2 of 2)

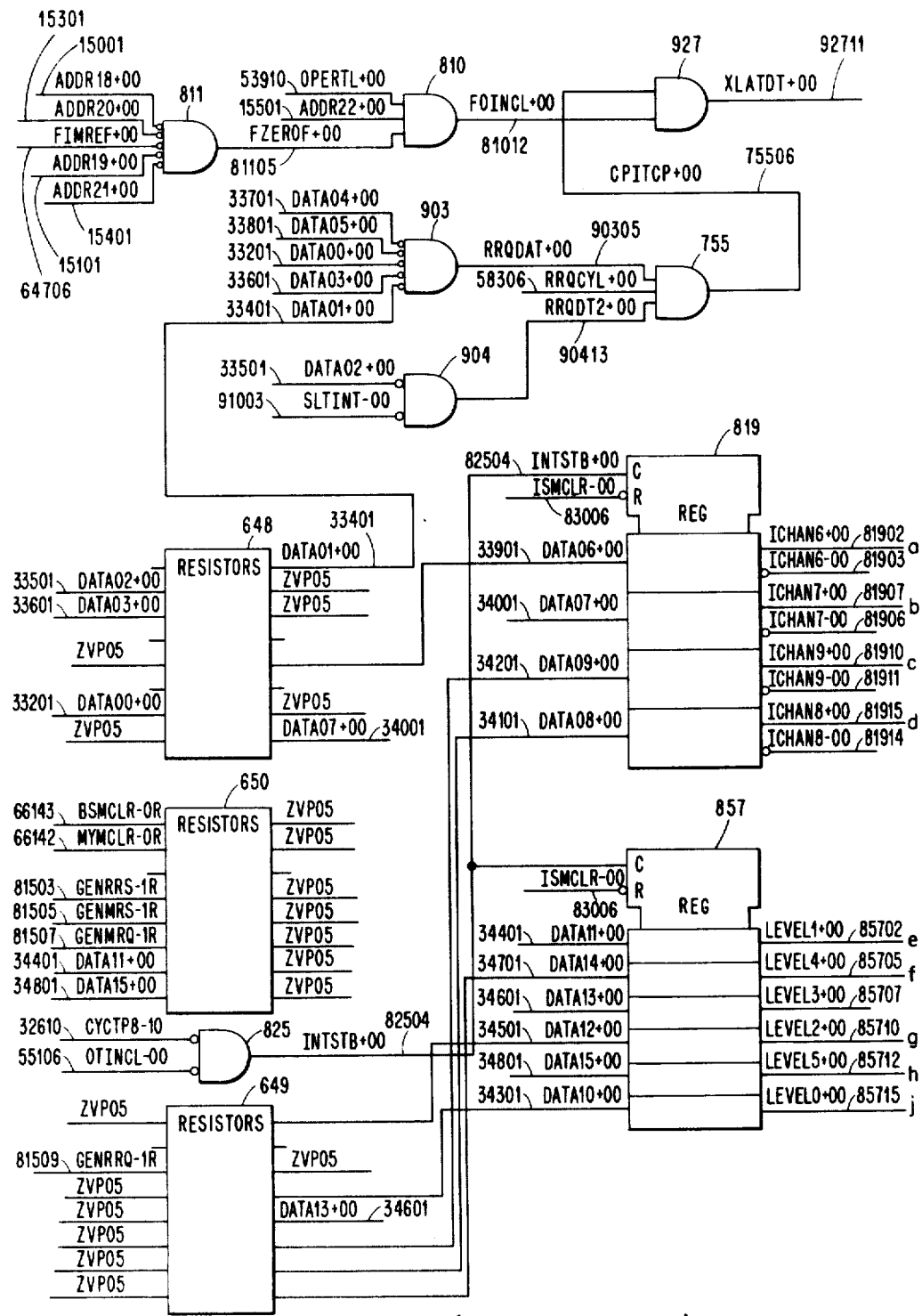
Fig.14M.(sheet 1 of 2)

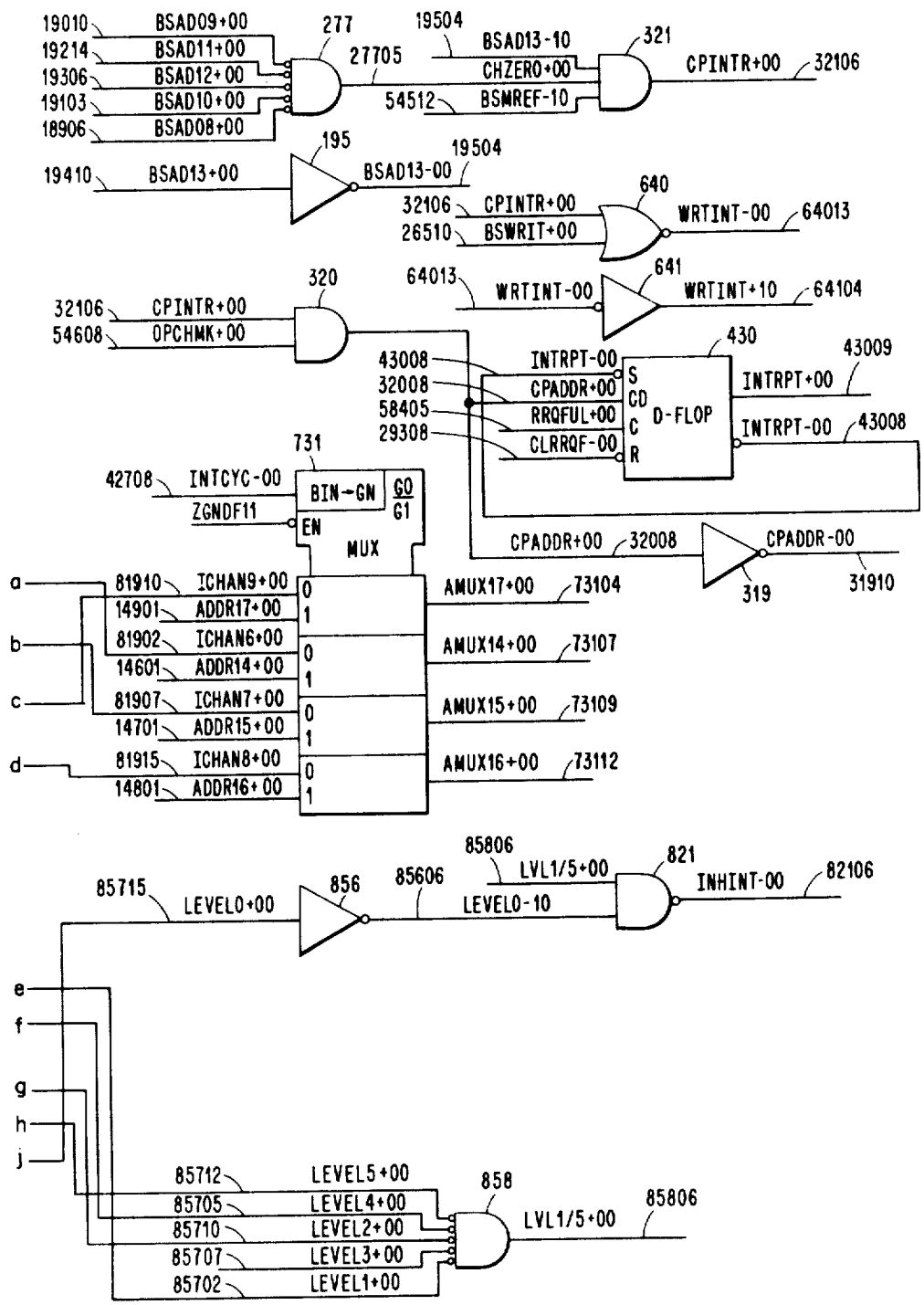
Fig. 14M. (sheet 2 of 2)

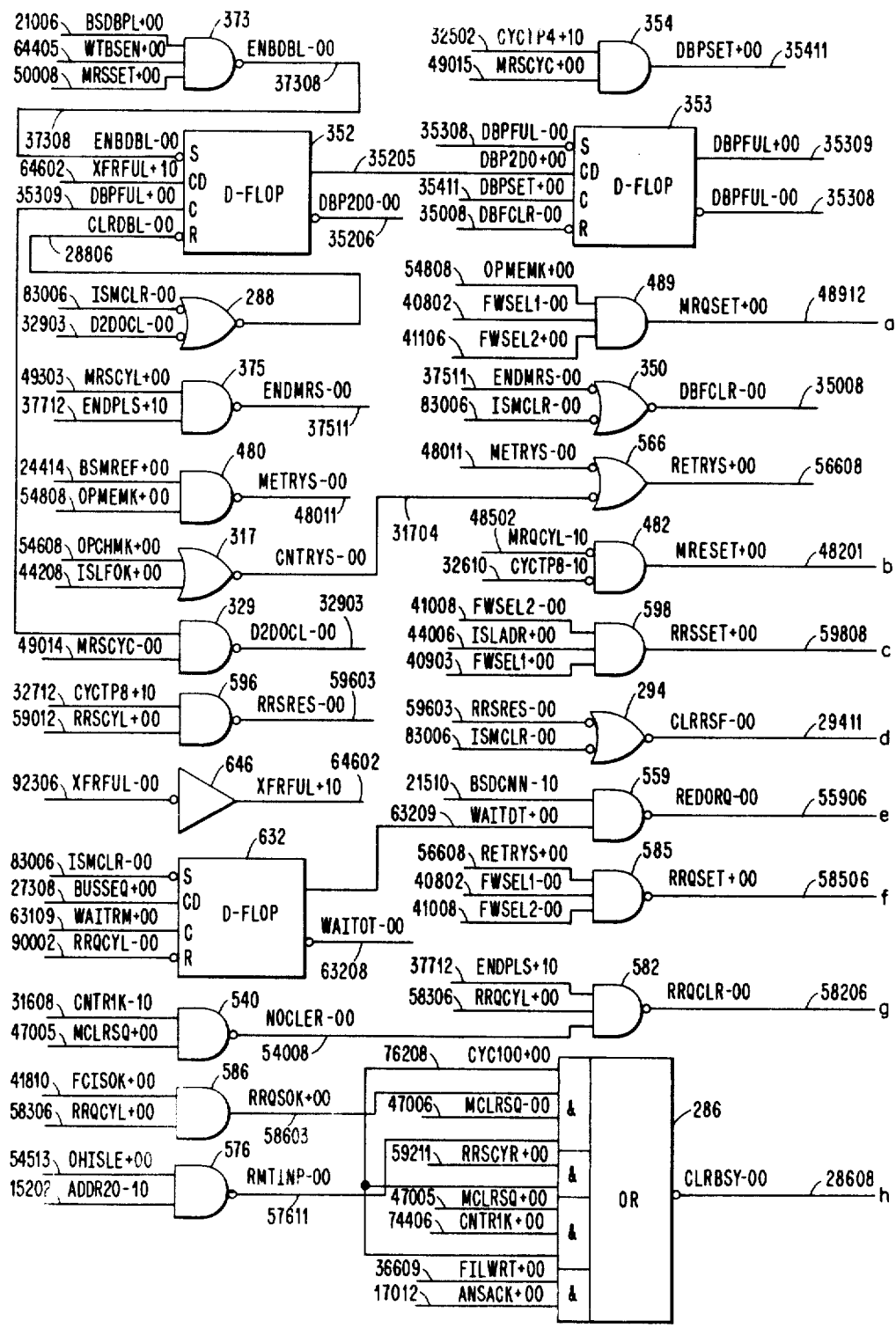
Fig. 14N. (sheet 1 of 3)

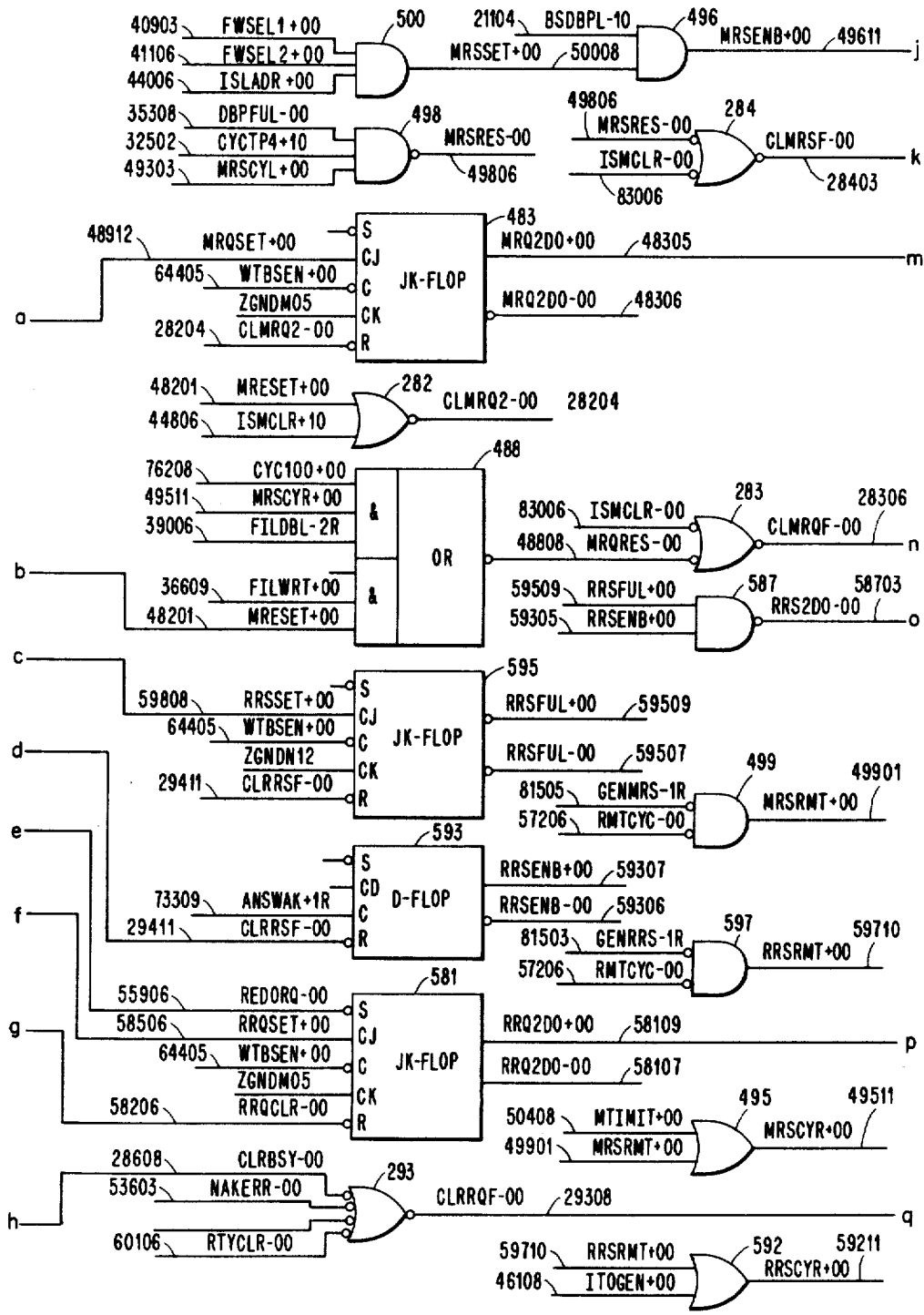
Fig. 14N. (sheet 2 of 3)

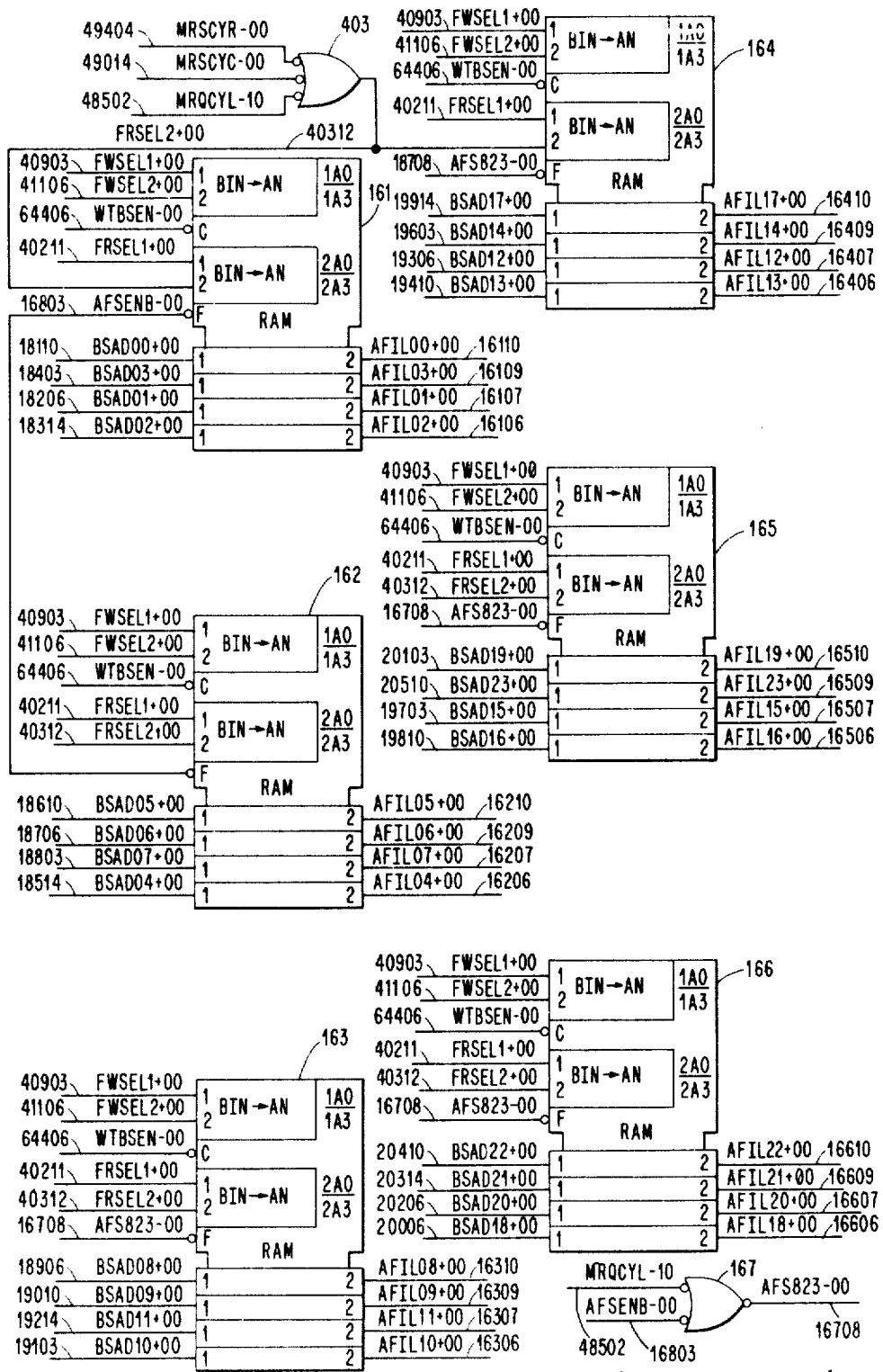
Fig. 140 (sheet 1 of 3)

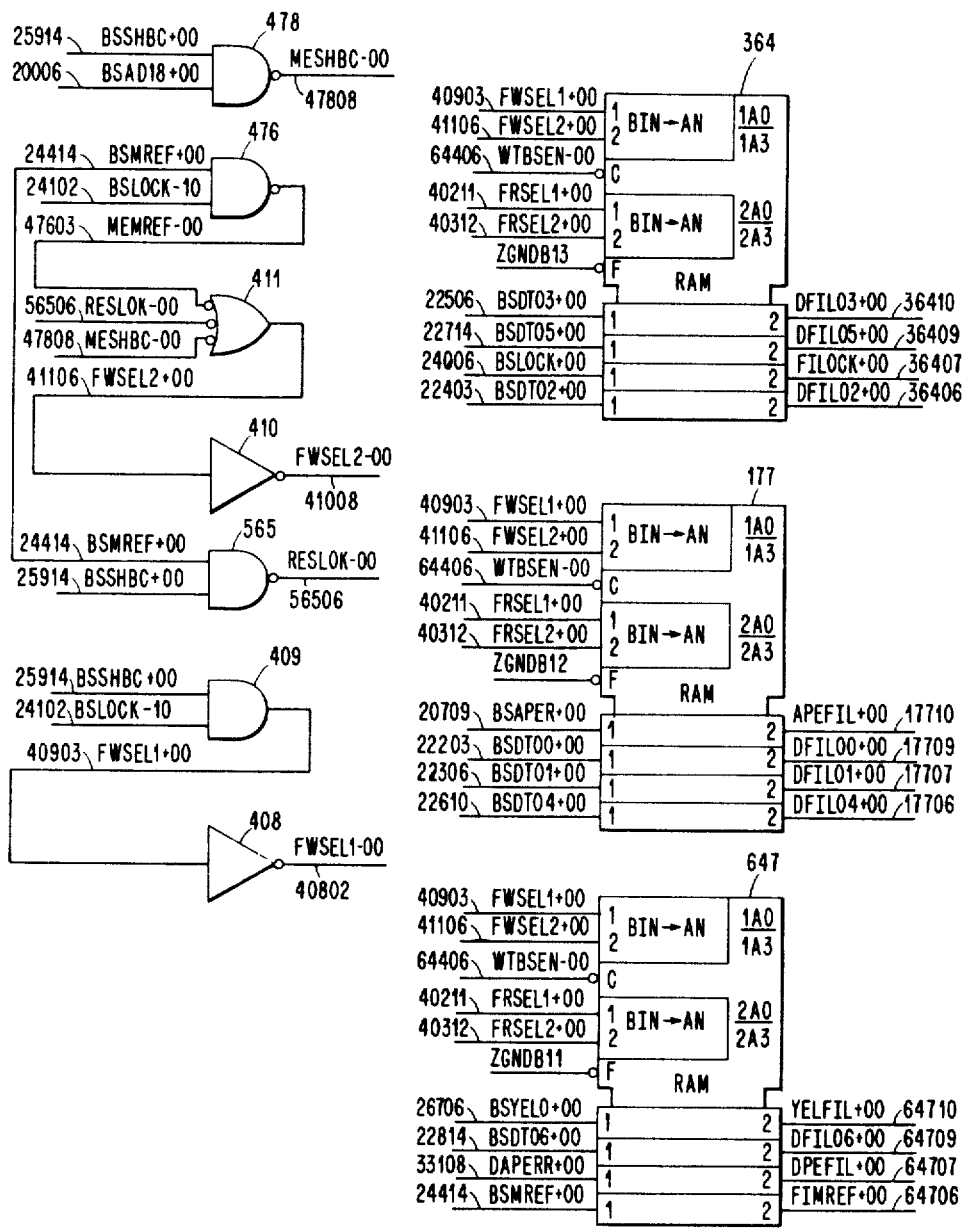
Fig. 140 (sheet 2 of 3)

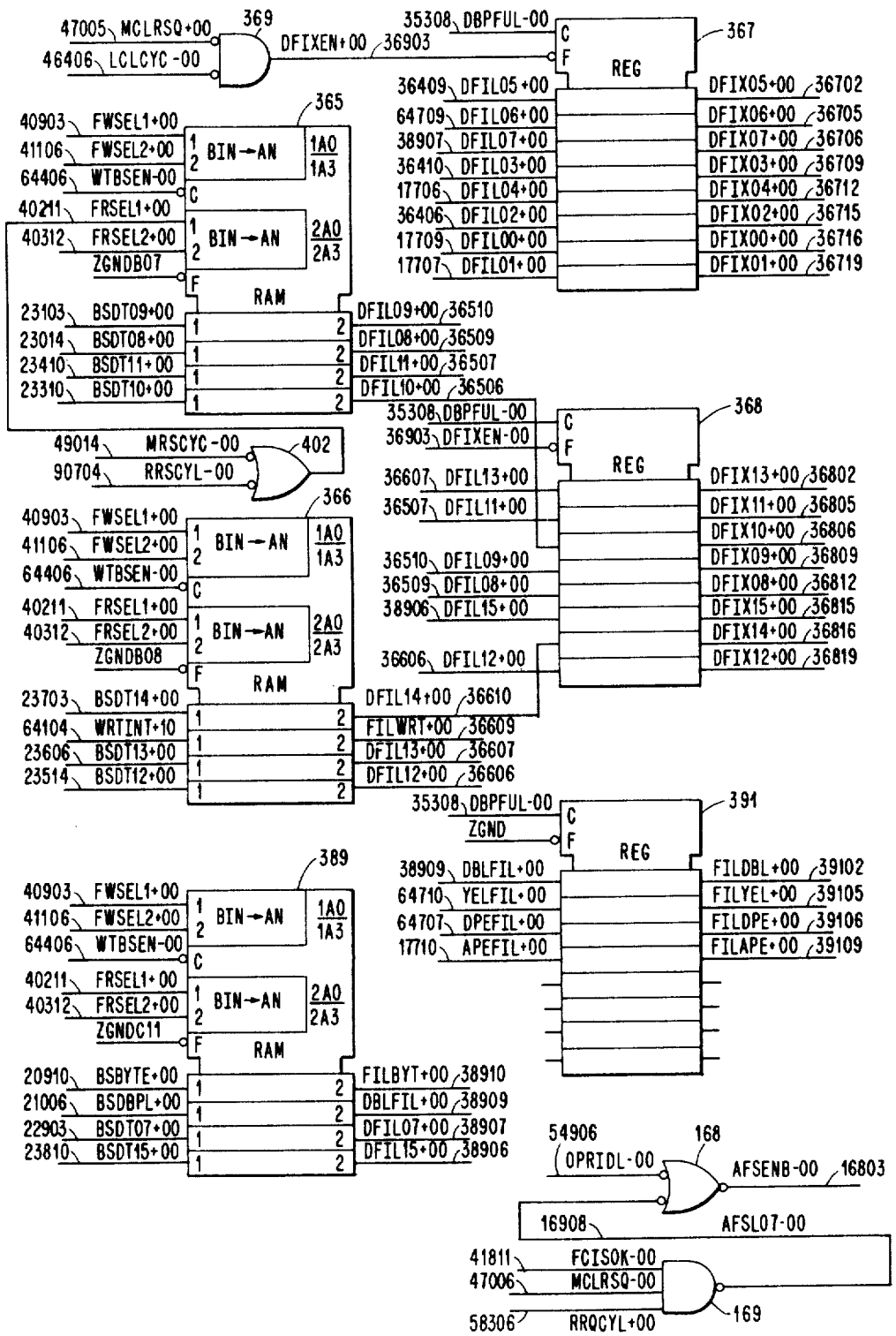
Fig. 140 (sheet 3 of 3)

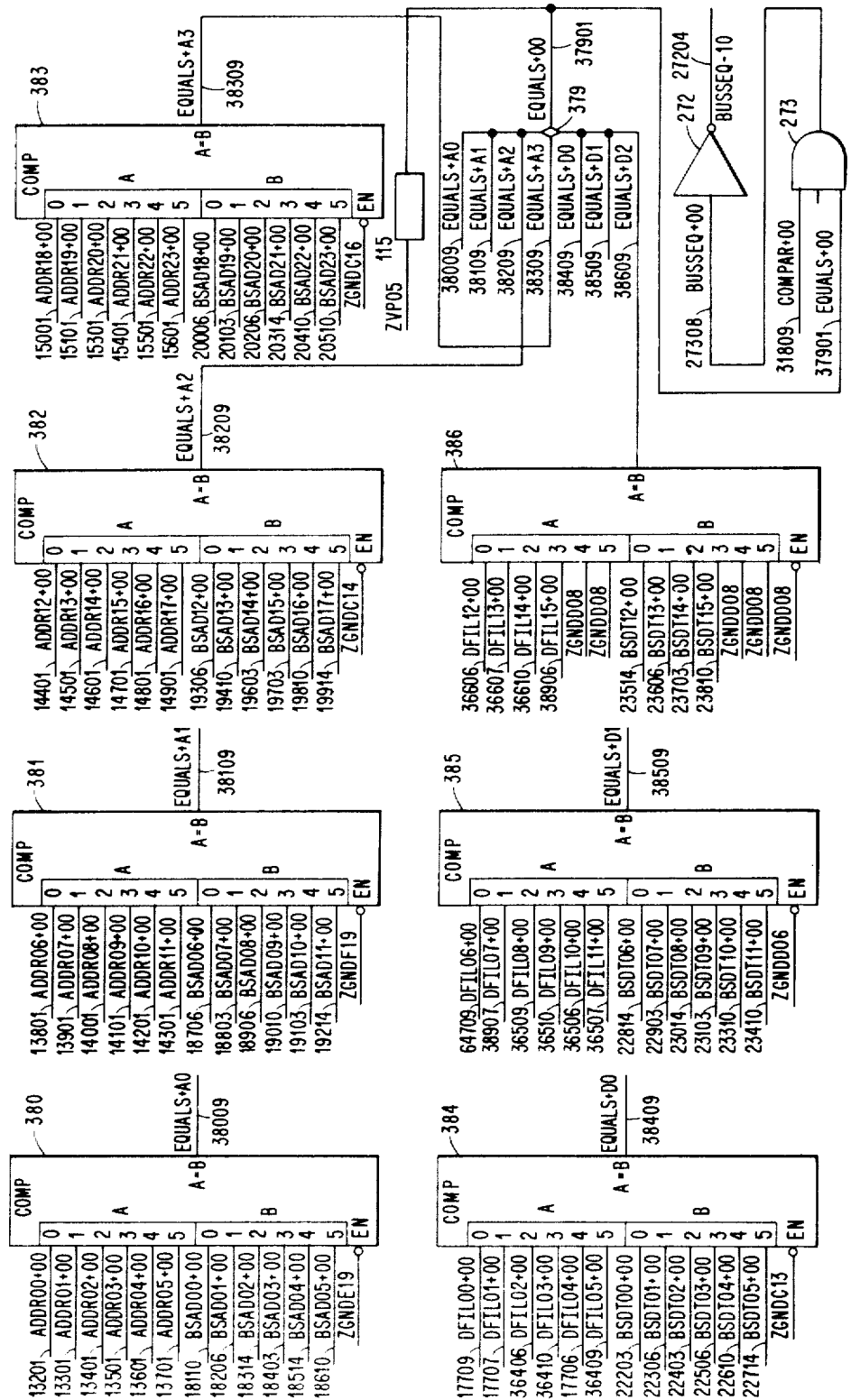
Fig. 14P. (sheet 1 of 2)

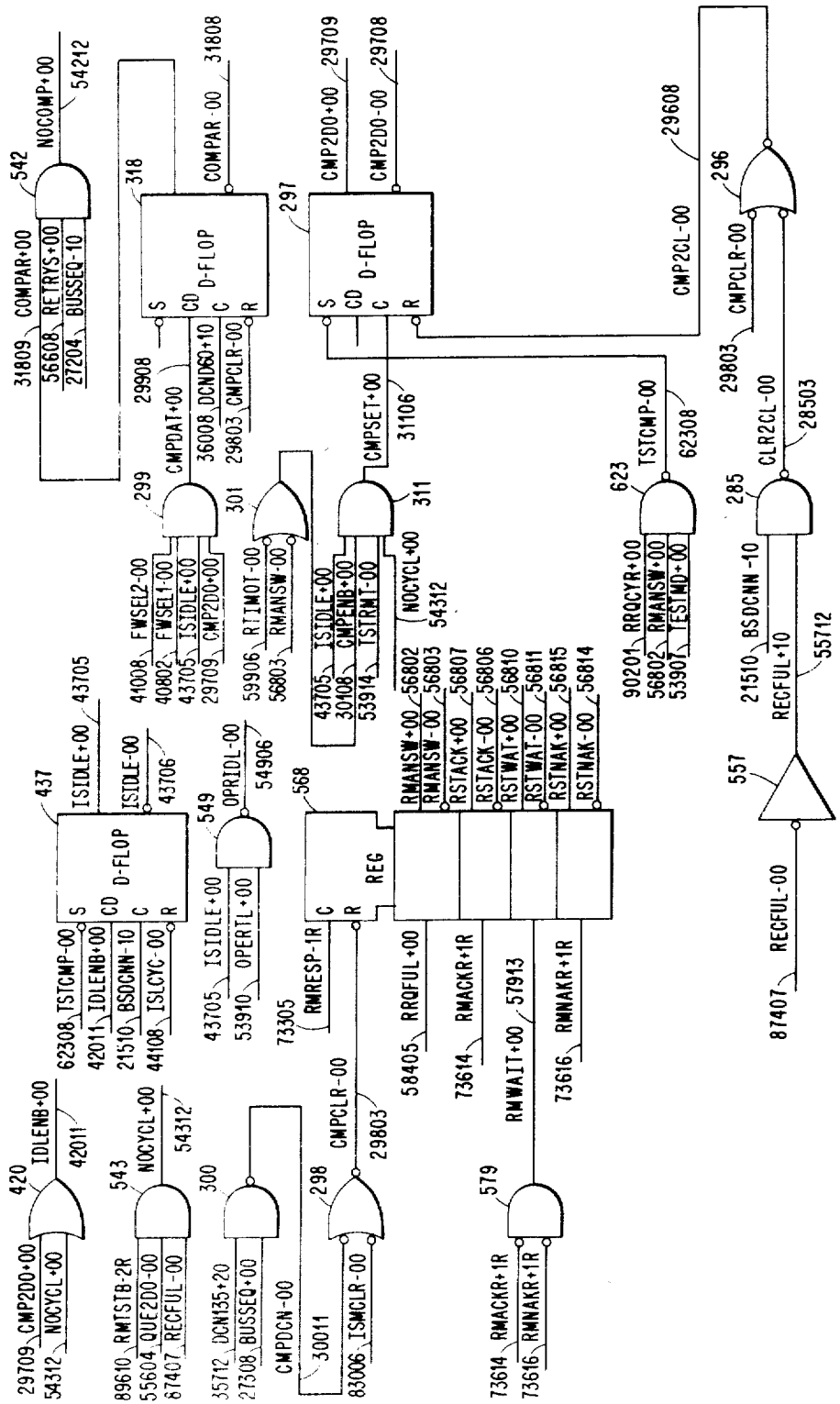
Fig. 14P.(sheet 2 of 2)

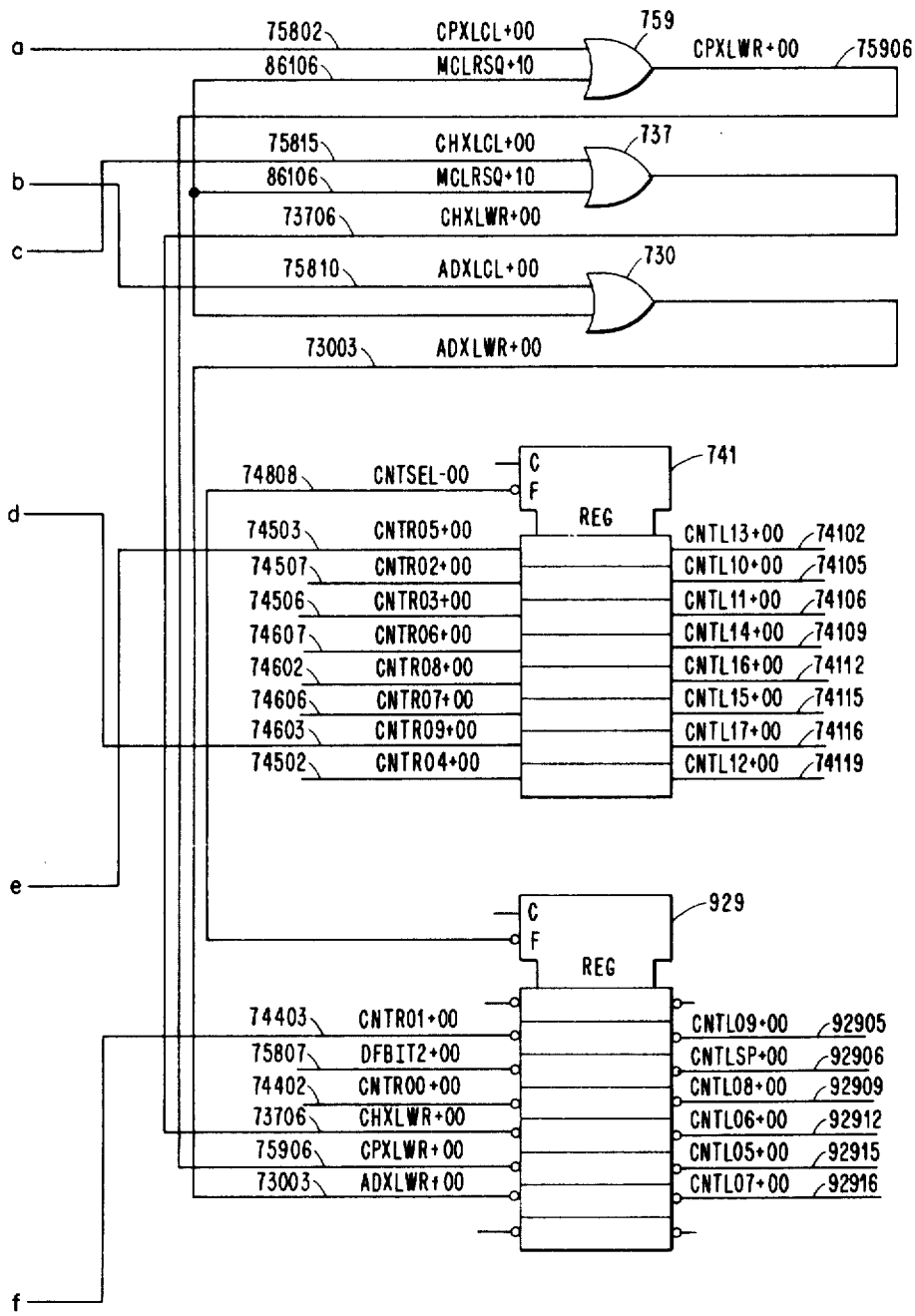
Fig. 14Q. (sheet 2 of 2)

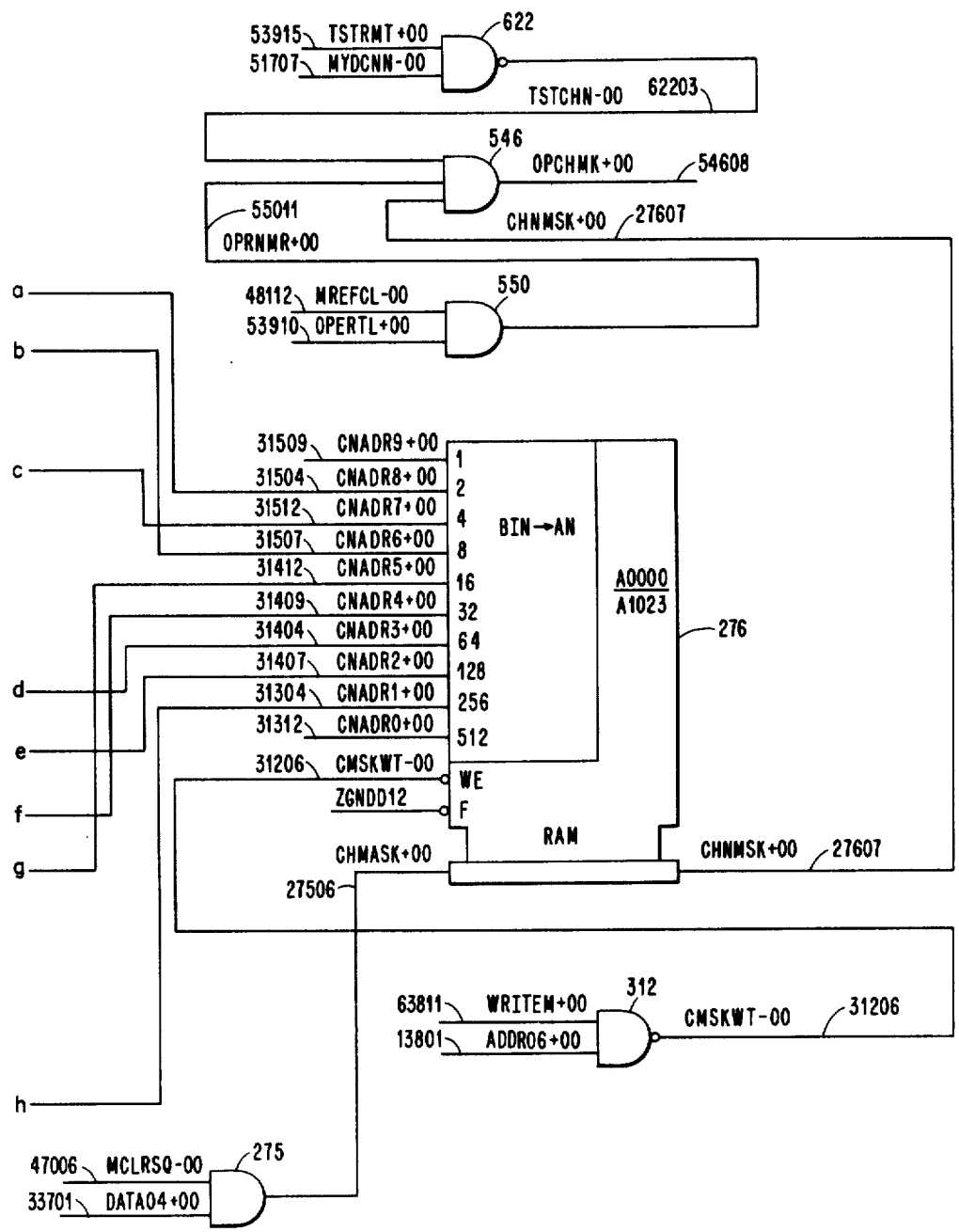
Fig. 14R. (sheet 2 of 2)

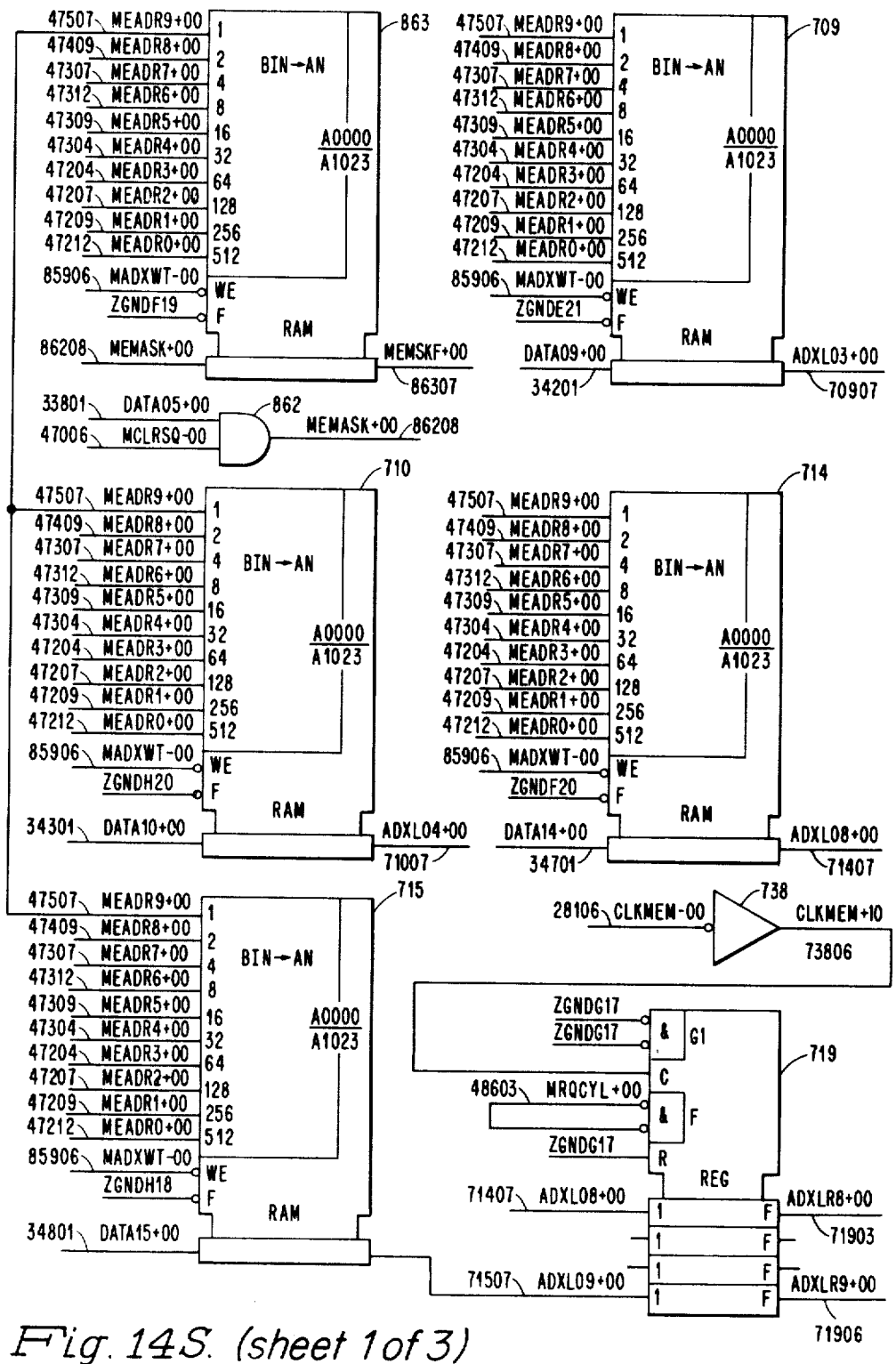
Fig. 14S. (sheet 1 of 3)

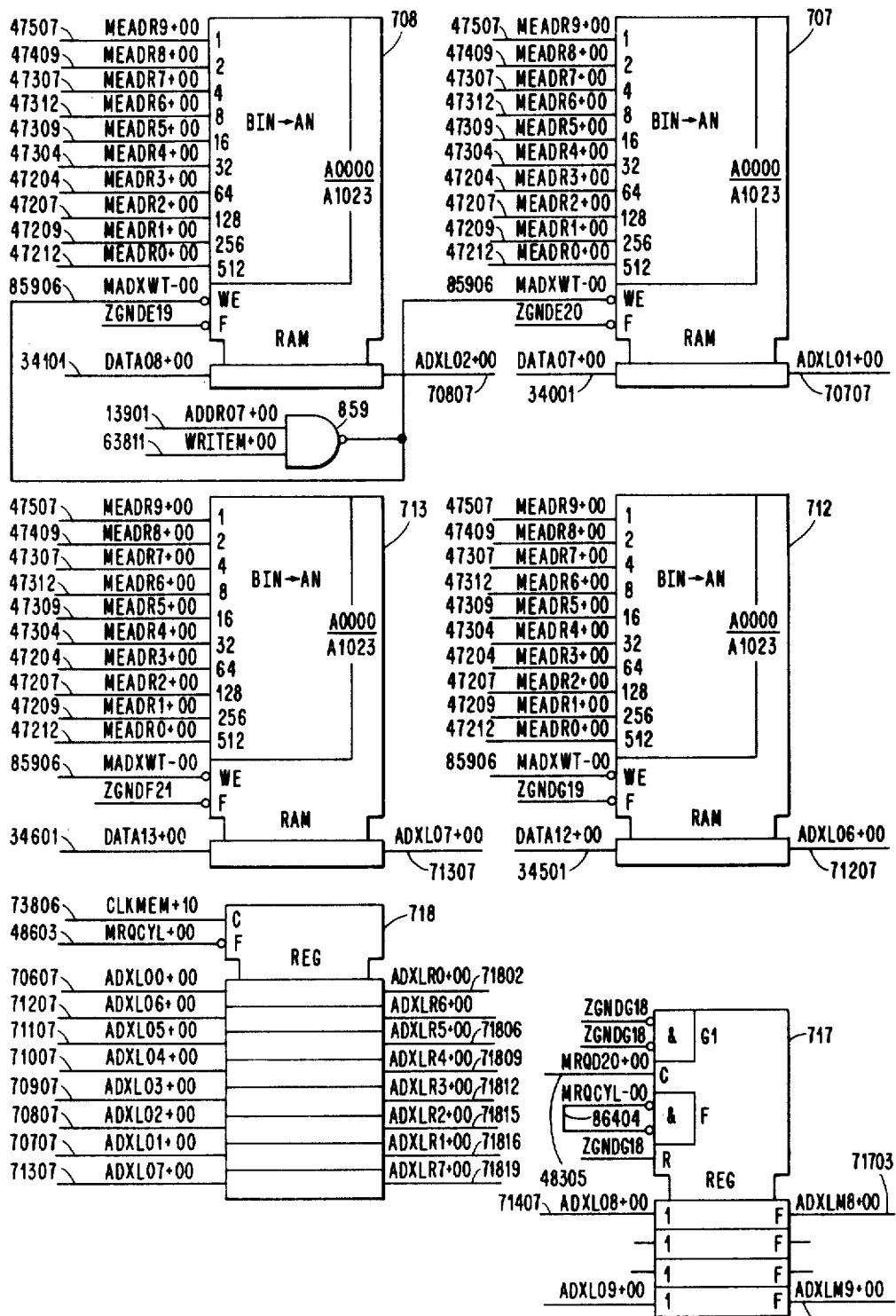
Fig. 14S. (sheet 2 of 3)

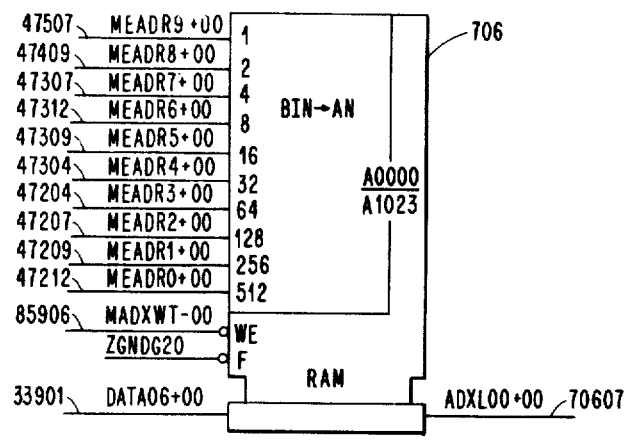
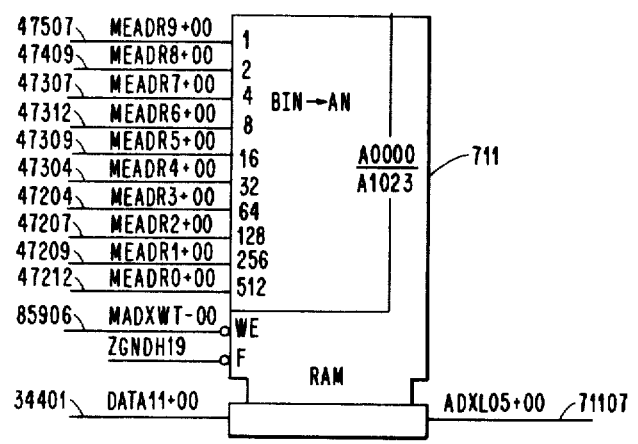
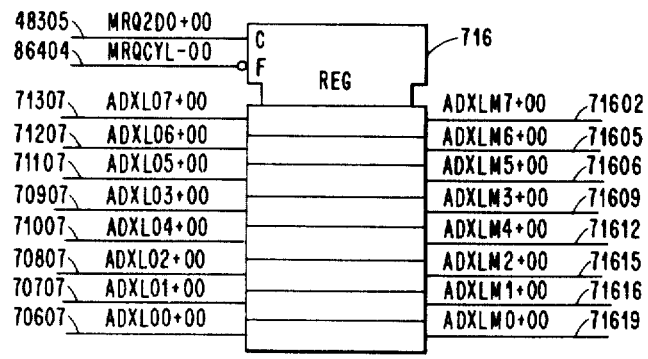
Fig. 14S. (sheet 3 of 3)

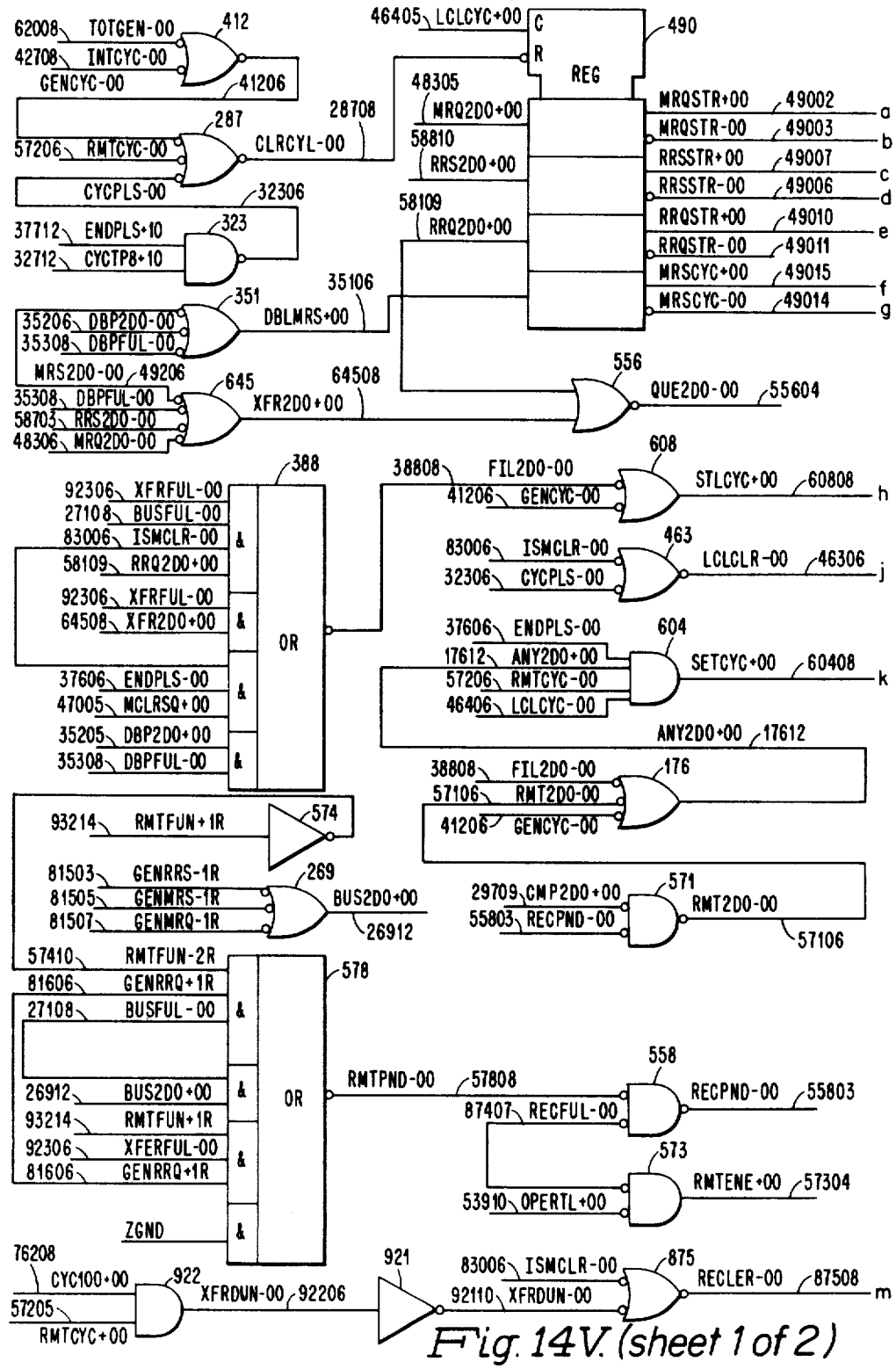
Fig. 14V. (sheet 1 of 2)

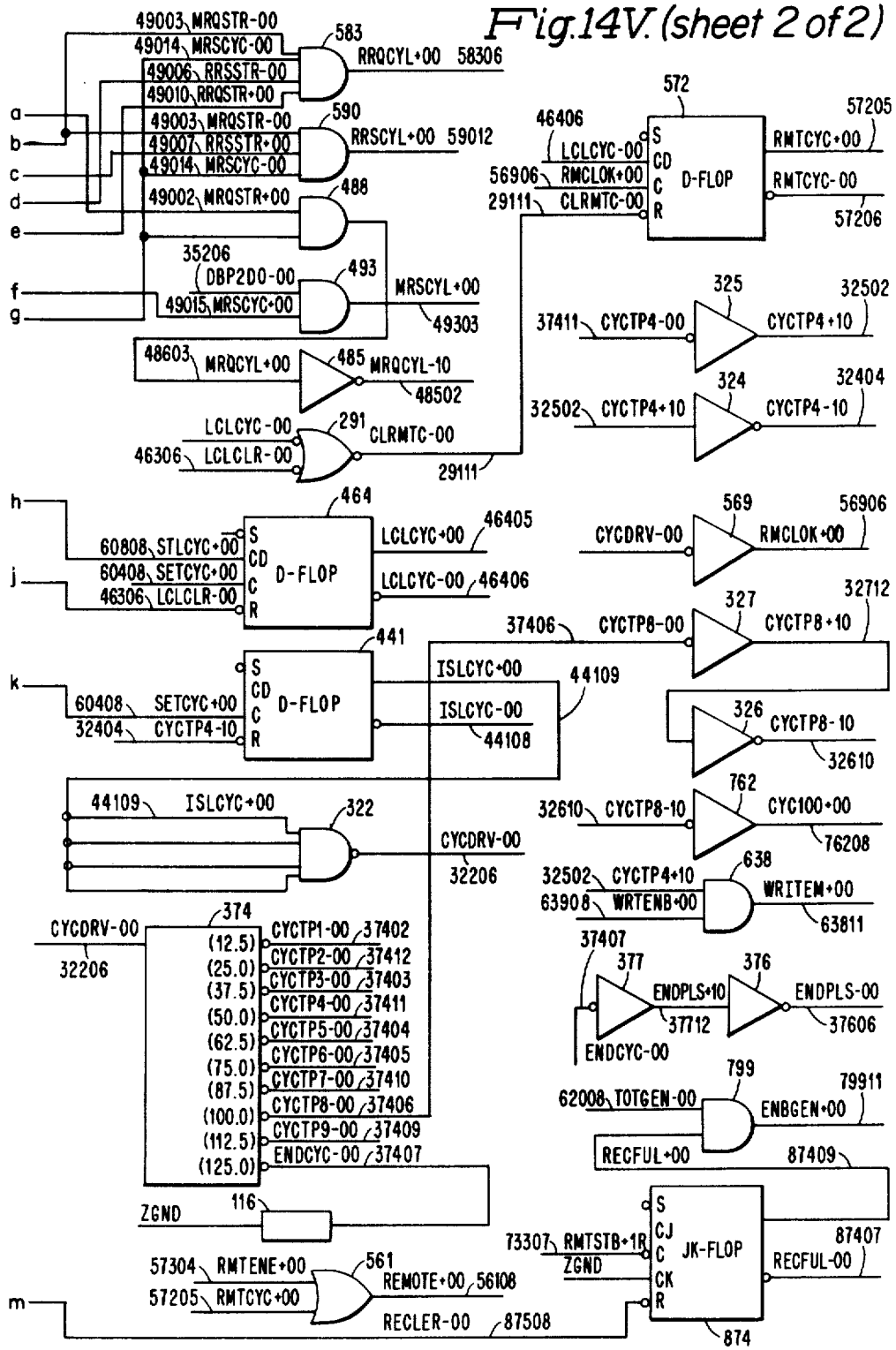
Fig.14V.(sheet 2 of 2)

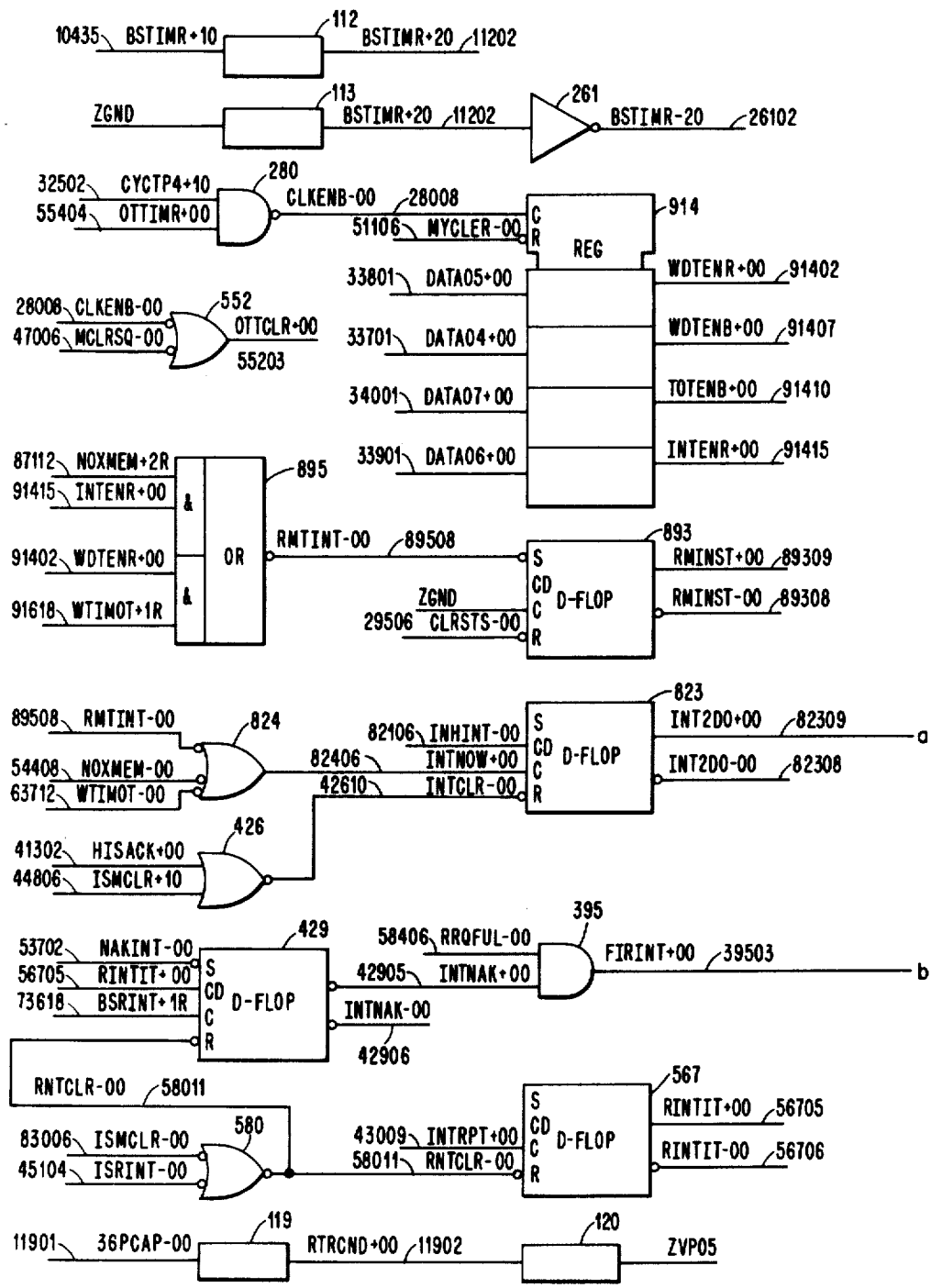
Fig. 14X. (sheet 1 of 2)

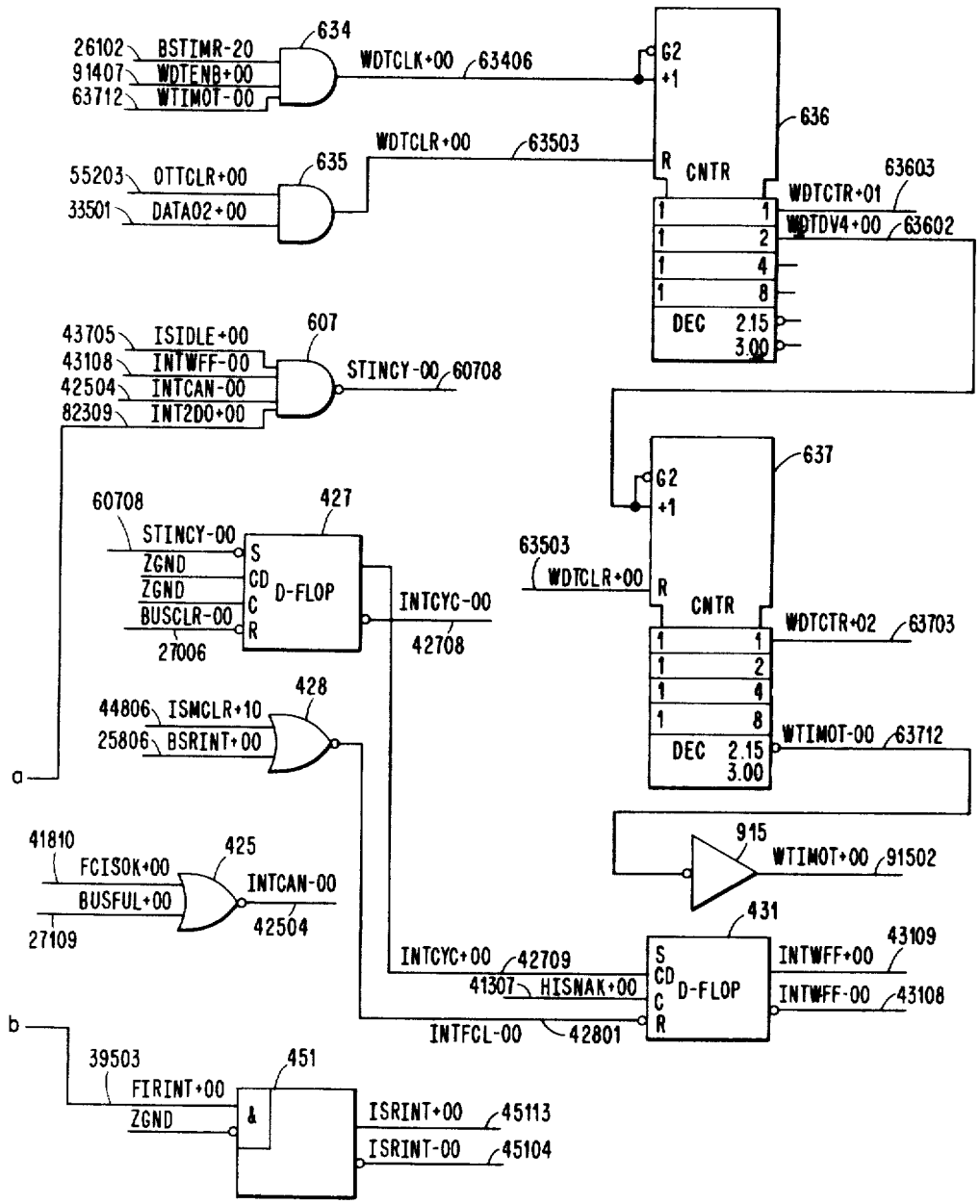
Fig. 14X. (sheet 2 of 2)

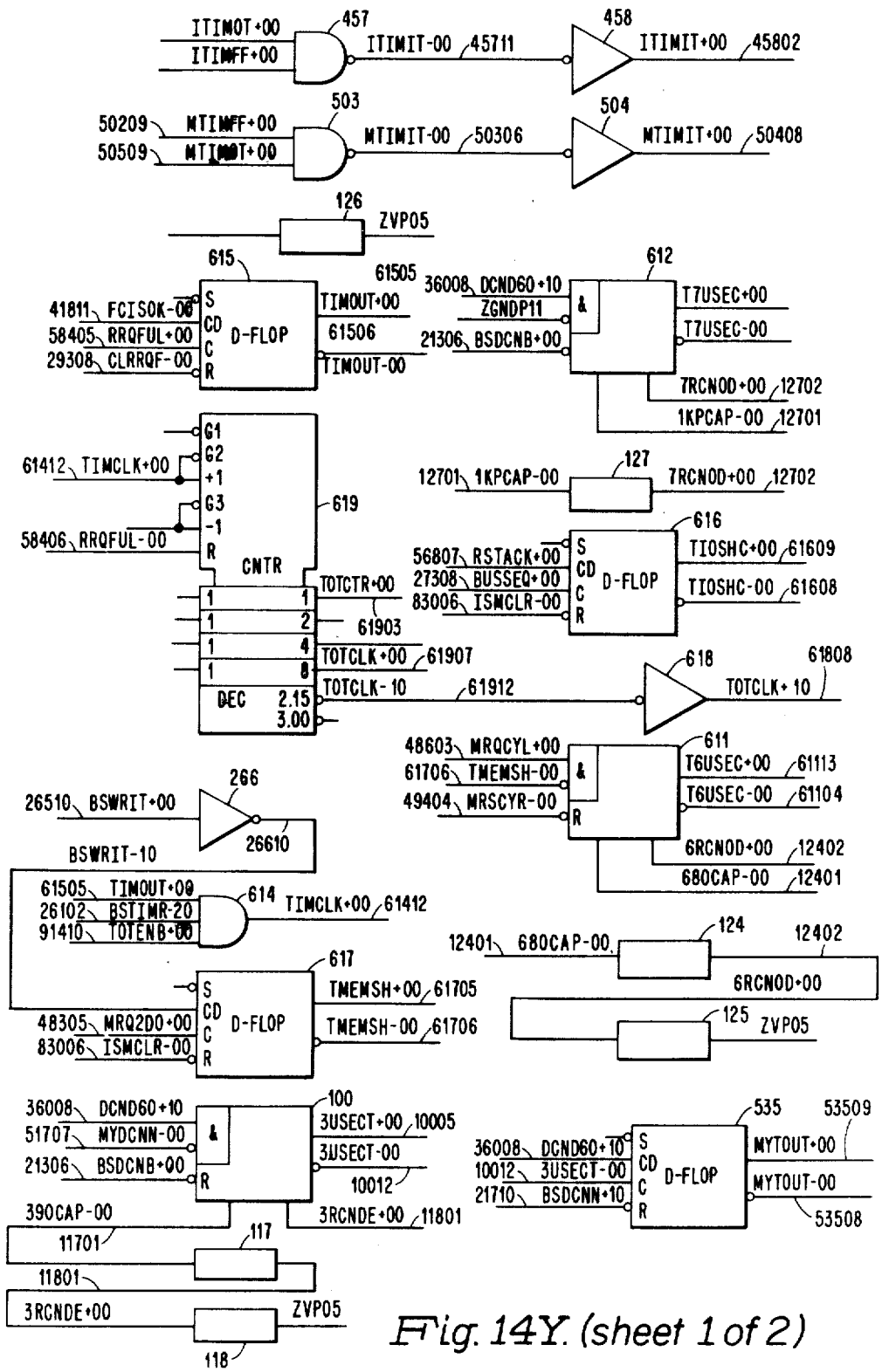
Fig. 14Y. (sheet 1 of 2)

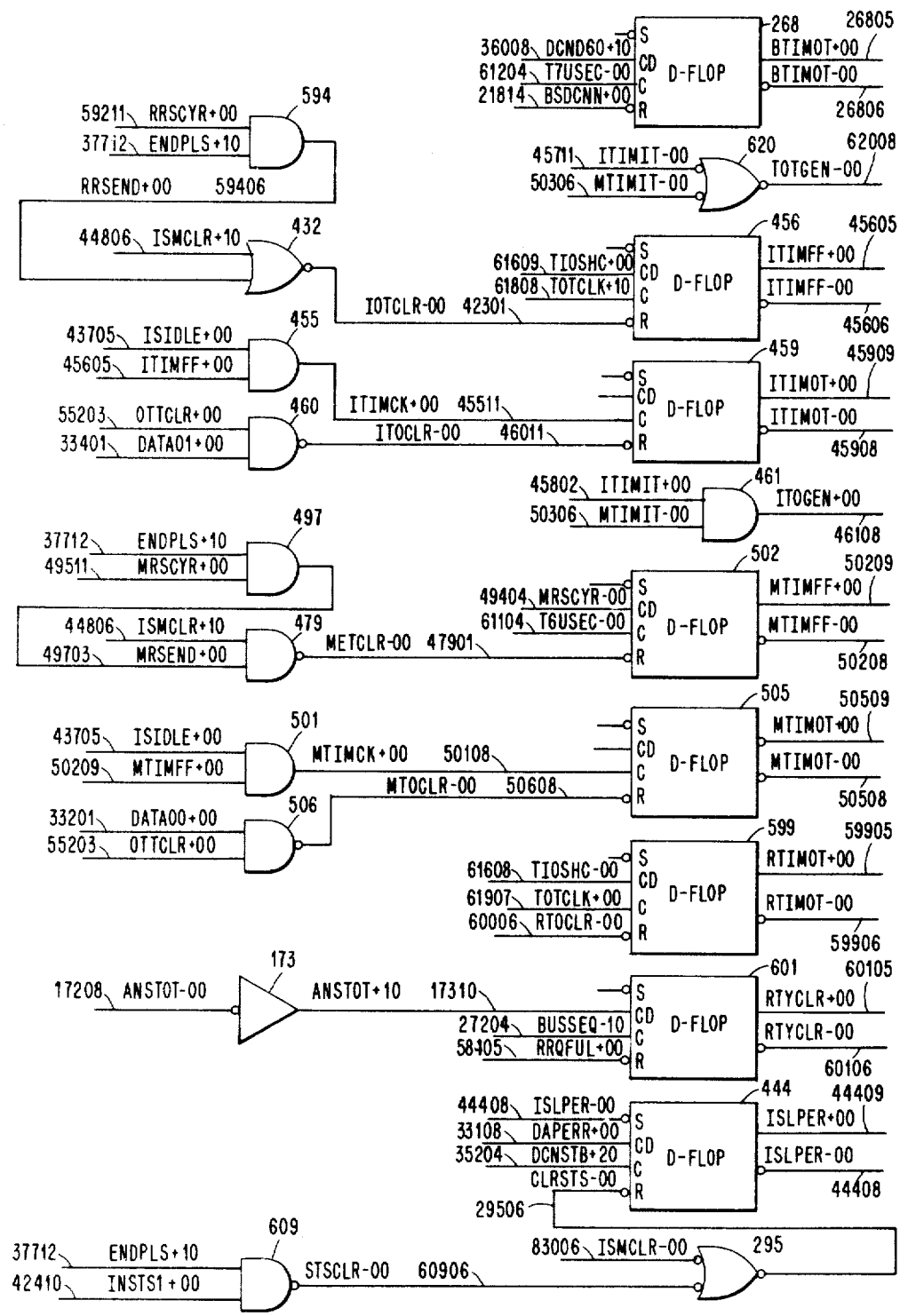
Fig. 14Y. (sheet 2 of 2)

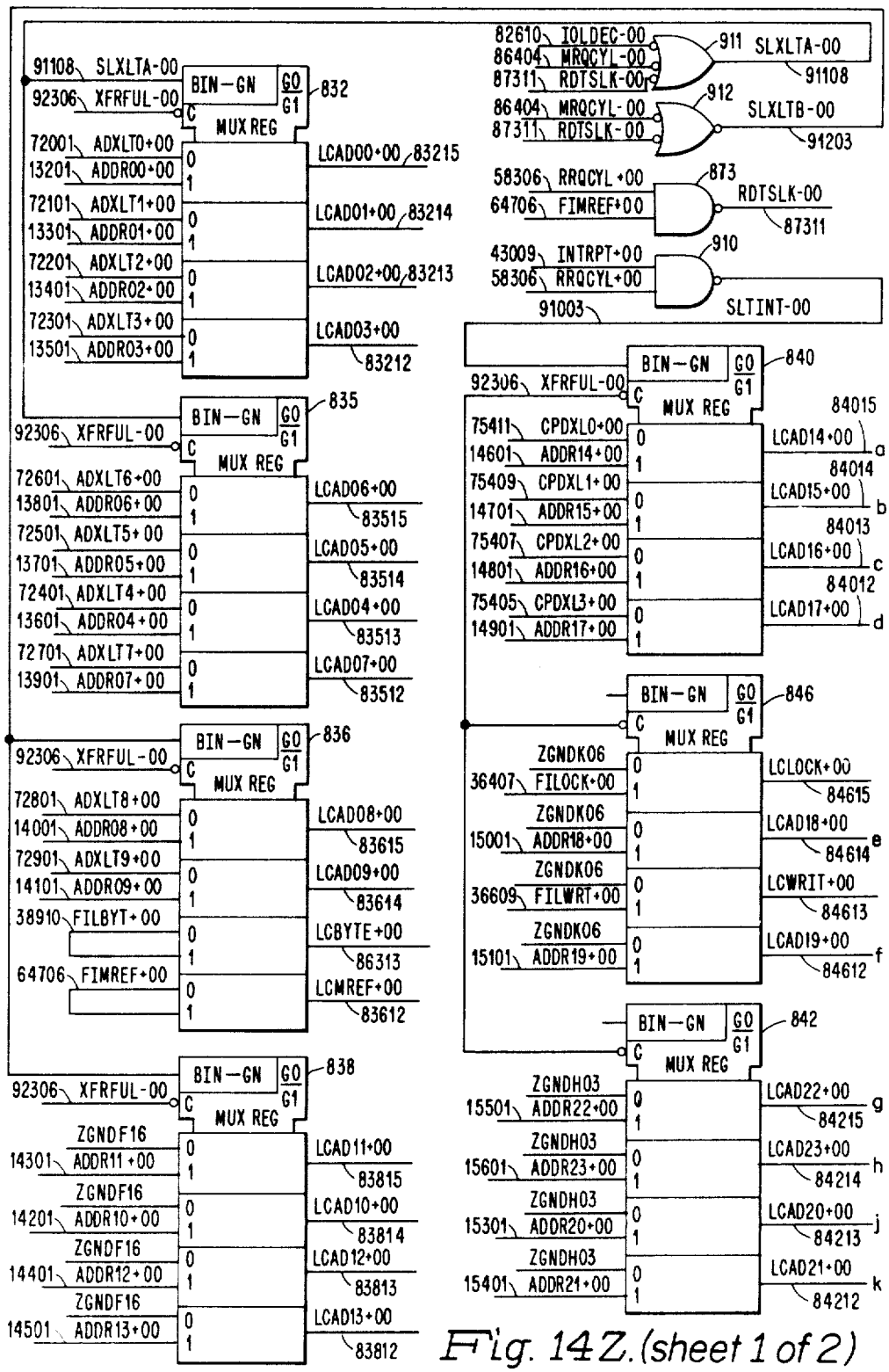
Fig. 14Z. (sheet 1 of 2)

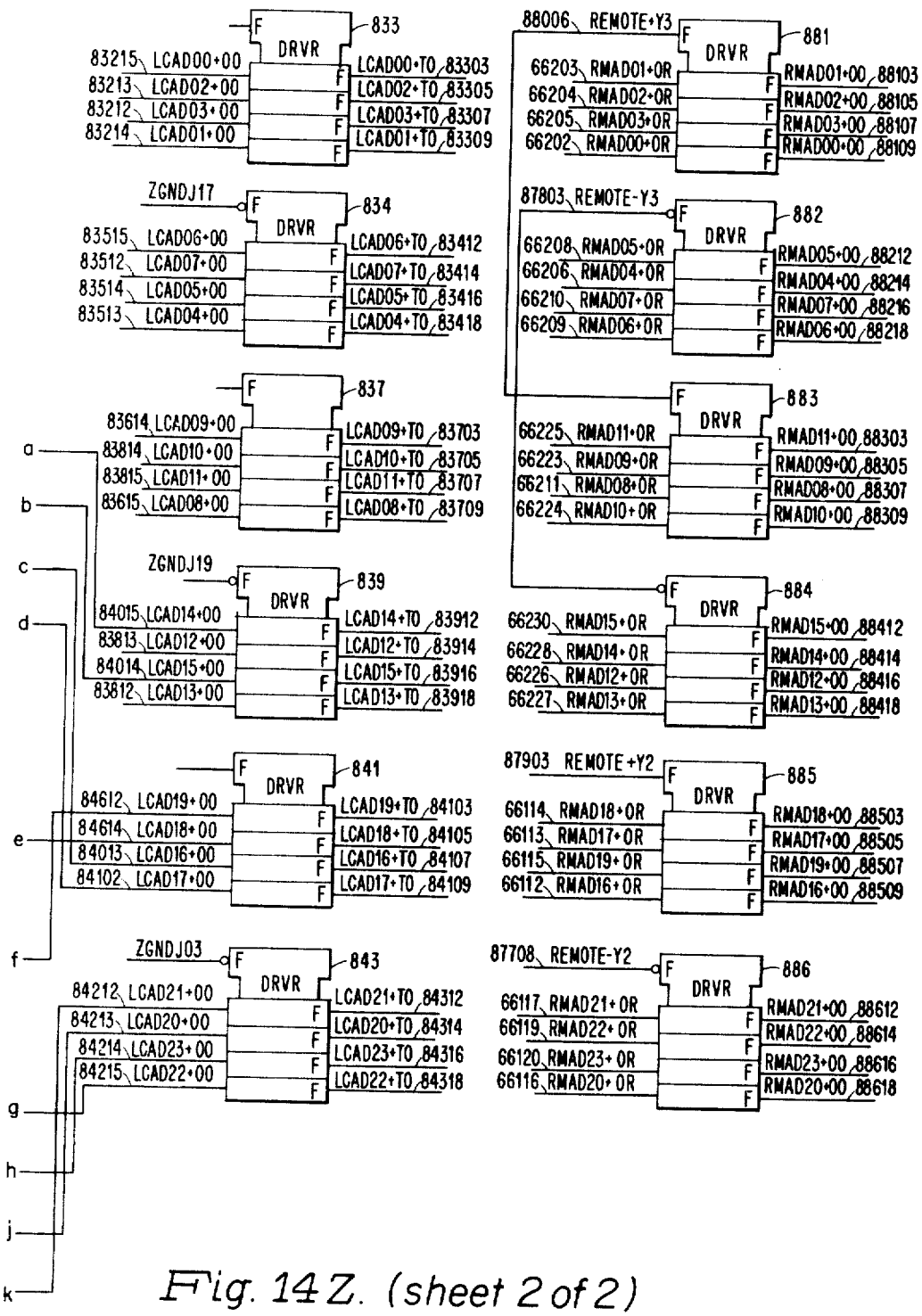
Fig. 14Z. (sheet 2 of 2)

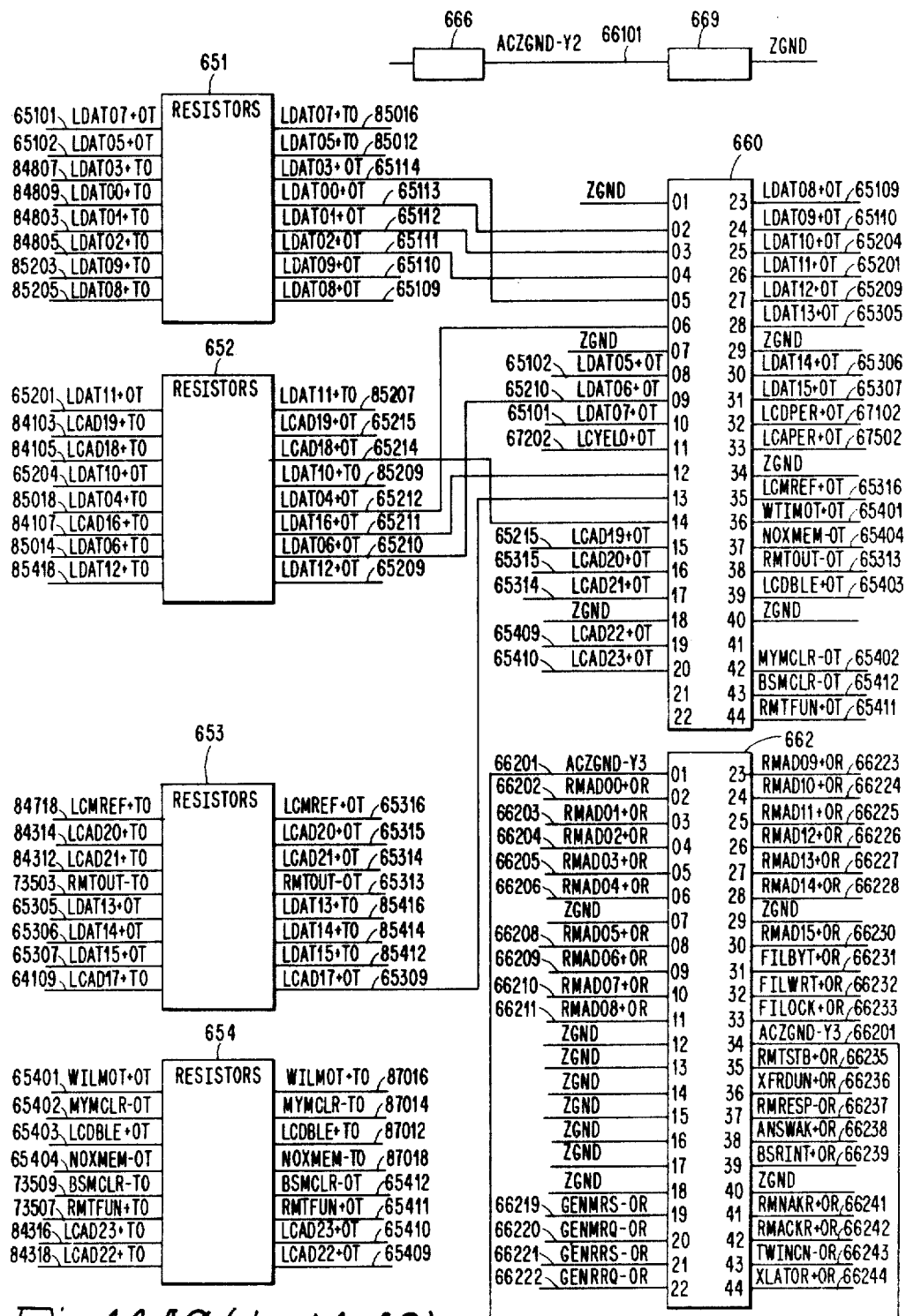
Fig. 14AC. (sheet 1 of 2)

INTERSYSTEM COMMUNICATION LINK

FIELD OF THE INVENTION

The invention relates to automated data processing systems, and more particularly to a logic control system for controlling the transfer of information between two or more communication busses of a data processing system.

PRIOR ART

A long-standing problem in the data processing arts has been the development of data processing architecture for accommodating the transfer of information between two or more independent data processing systems. In the past, information exchanges between data processing systems has been accomplished by means of recording information from one system on a medium which may be accessed by a second data processing system. In the commercial world where high information flow rates are required, delays incurred by such recording techniques are unacceptable. The need for a logic system architecture providing a dynamic exchange of information between independent data processing systems is required. Previous attempts at accomplishing a dynamic exchange of information between independent data processing systems have been unable to contend with deadlock conditions which may occur when data processing units on different communication busses attempt to communicate with remote communication busses in close time proximity through a same information path. Further problems have been incurred because the interlinking logic control system substantially affects the bus rates on those communication busses requiring an exchange of information. Further problems have been incurred in requiring special software developments to accommodate the intersystem logic.

In the present invention, an intersystem link logic system is provided wherein deadlock conditions are overcome by providing parallel bidirectional transfers paths, dynamic assignment of priorities and a bus cycle handling capability for continuing the information flow on communication busses between which the information shall be exchanged. Still further, no special software is required to allow any data processing unit on one communication bus to communicate with a remote communication bus by way of the ISL unit. The ISL unit thus is software transparent in that interlinked busses appear as one bus to any data processing unit communicating with a remote communication bus through an ISL unit.

SUMMARY OF THE INVENTION

An intersystem link (ISL) logic unit is provided for use in a data processing system having plural intersystem communication links for accommodating the transfer of information between two or more communication busses each providing a common information path for plural data processing devices including plural CPUs electrically interfacing therewith.

More particularly, an asynchronous information acquisition logic system captures binary information occurring on a contiguous local bus at the bus rate, and is stored in a separate one of plural dedicated file locations to accommodate the transfer of plural bus communications of different types in parallel. An information decoding logic system in electrical communication with the acquisition logic system identifies substantially at the bus rate that binary information to be further processed by the ISL unit. An information translation logic system in electrical communication with the acquisition logic system selectively converts local address information to remote address information, and remote address information to local address information substantially at said bus rate. A logic control system in electrical communication with the decoding and the translation logic system, and responsive to the acquisition logic system effects a selective reconfiguration of the ISL unit to control the bidirectional transfer of information including memory and non-memory read and write requests, CPU to CPU interrupts, and peripheral control unit to CPU interrupts through the ISL unit.

DESCRIPTION OF THE DRAWINGS

For a more complete understanding of the present invention and for further objects and advantages thereof, reference may now be had to the following description taken in conjunction with the accompanying drawings in which:

FIG. 8 is a detailed functional block diagram of an ISL unit embodying the invention;

DESCRIPTION OF THE PREFERRED EMBODIMENTS

FIGS. 1-3

Figure 1:
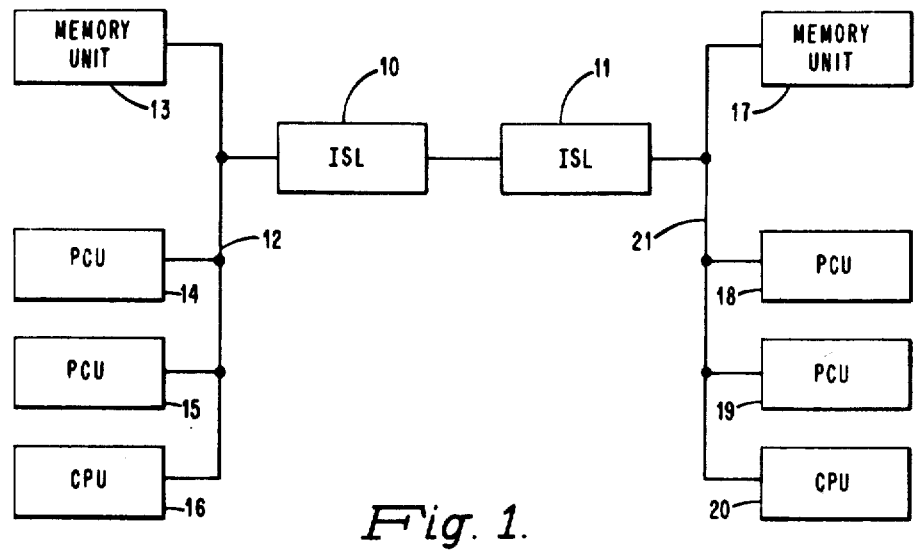
FIGS. 1-3 are functional block diagrams of four data processing system architectures embodying the invention.
Figure 2:
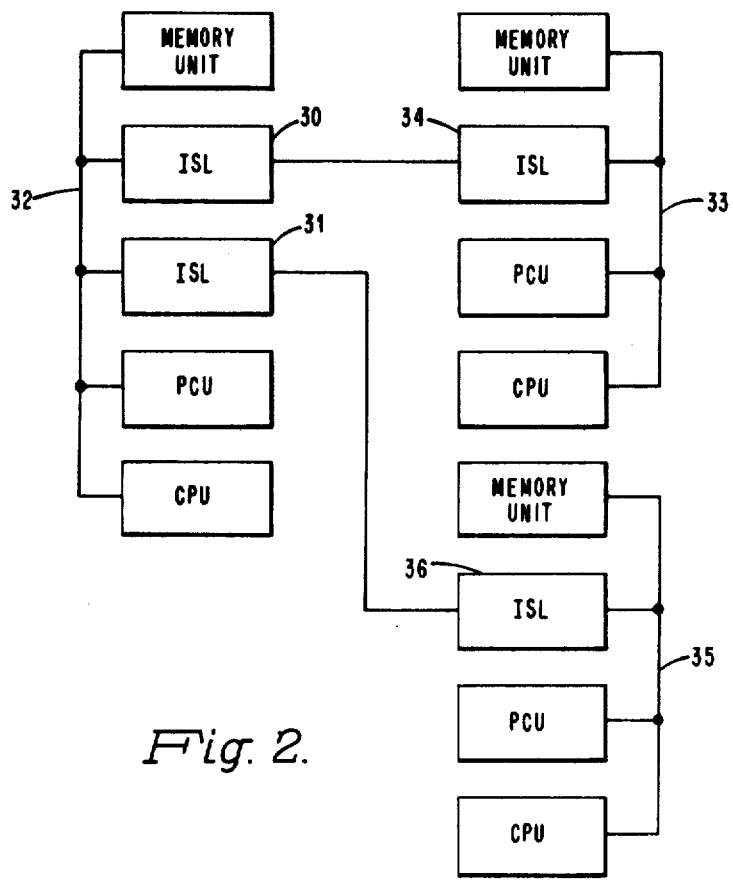
Figure 3:
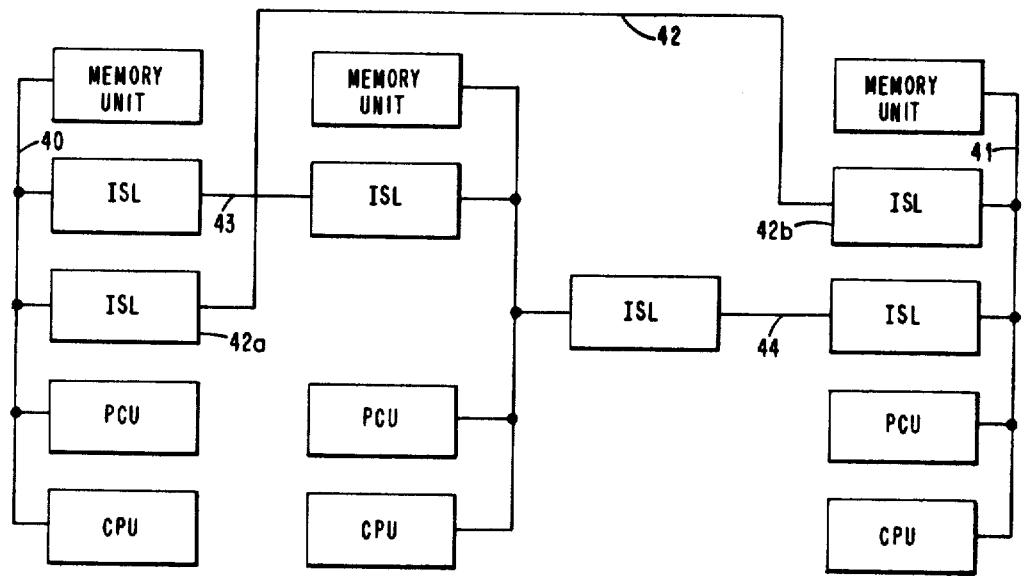

FIGS. 1-3 illustrate in functional block diagram form four system architectures embodying the invention.

Referring to FIG. 1, two intersystem link (ISL) units 10 and 11 are shown providing an interface between two data processing systems each having a communication bus. Each communication bus interfaces in order of priority with a memory unit, peripheral control units (PCU) and a central processing unit (CPU). More particularly, ISL unit 10 is in electrical communication with memory unit 13, PCUs 14 and 15 and CPU 16 by way of communication bus 12. ISL unit 11 is in electrical communication with memory unit 17, PCUs 18 and 19, and a CPU 20 by way of a communication bus 21. A detailed disclosure of the communication bus system may be found in U.S. Pat. No. 3,993,981 assigned to the assignee of the present invention, which is incorporated by reference herein.

The system architecture illustrated in FIG. 1 accommodates communication with either communication bus by the devices on each communication bus. For example, CPU 16 may communicate with the devices on communication bus 12 or may communicate by means of the ISL units 10 and 11 with the devices on communication bus 21. An essential characteristic of the system is the ISL translatable memory function to be later explained. The memory units 13 and 17, and the CPUs 16 and 20 thereby may have same addresses. The peripheral control units also may have same addresses provided that they are not to be shared.

FIG. 2 illustrates a slightly different system architecture, wherein plural ISL units may interface with a same communication bus. Plural communication paths thereby may be provided from one communication bus to another. In addition, all PCUs may be connected to one communication bus, and access to those PCUs may be obtained by means of ISL units interfacing with that communication bus.

ISL units 30 and 31 each are in electrical communication with a communication bus 32. ISL unit 30 further may communicate with a communication bus 33 by way of an ISL unit 34. In addition, ISL unit 31 may communicate with a communication bus 35 by way of an ISL unit 36. The ISL unit 36 further may communicate with communication bus 35, and with communication busses 32 and 33 through interfaces with ISL units 30, 31 and 34. In like manner, the ISL unit 34 may communicate with communication bus 33, and with communication busses 32 and 35 through interfaces with ISL units 30, 31 and 36. Any device on any of the three communication busses, therefore, may communicate with any other device of the system of FIG. 2. The CPUs and memory units may have same addresses as before described, and may be time-shared. The PCUs, however, may have same addresses only if they are not to be time-shared.

Referring to FIG. 3, a system architecture having redundant communication paths is illustrated. For example, a communication bus 40 may communicate with a communication bus 41 by way of a communication link 42 having twin ISL units 42a and 42b, or by way of communication links 43 and 44 with their respective ISL twin units. In the event that link 42 is inoperative, communication still may be carried out by means of links 43 and 44. This multipath capability is provided by means of a time-out logic system to be later explained which is resident in each ISL unit, wherein an alternate communication path is sought when a current communication path is blocked.

FIG. 4

Figure 4:
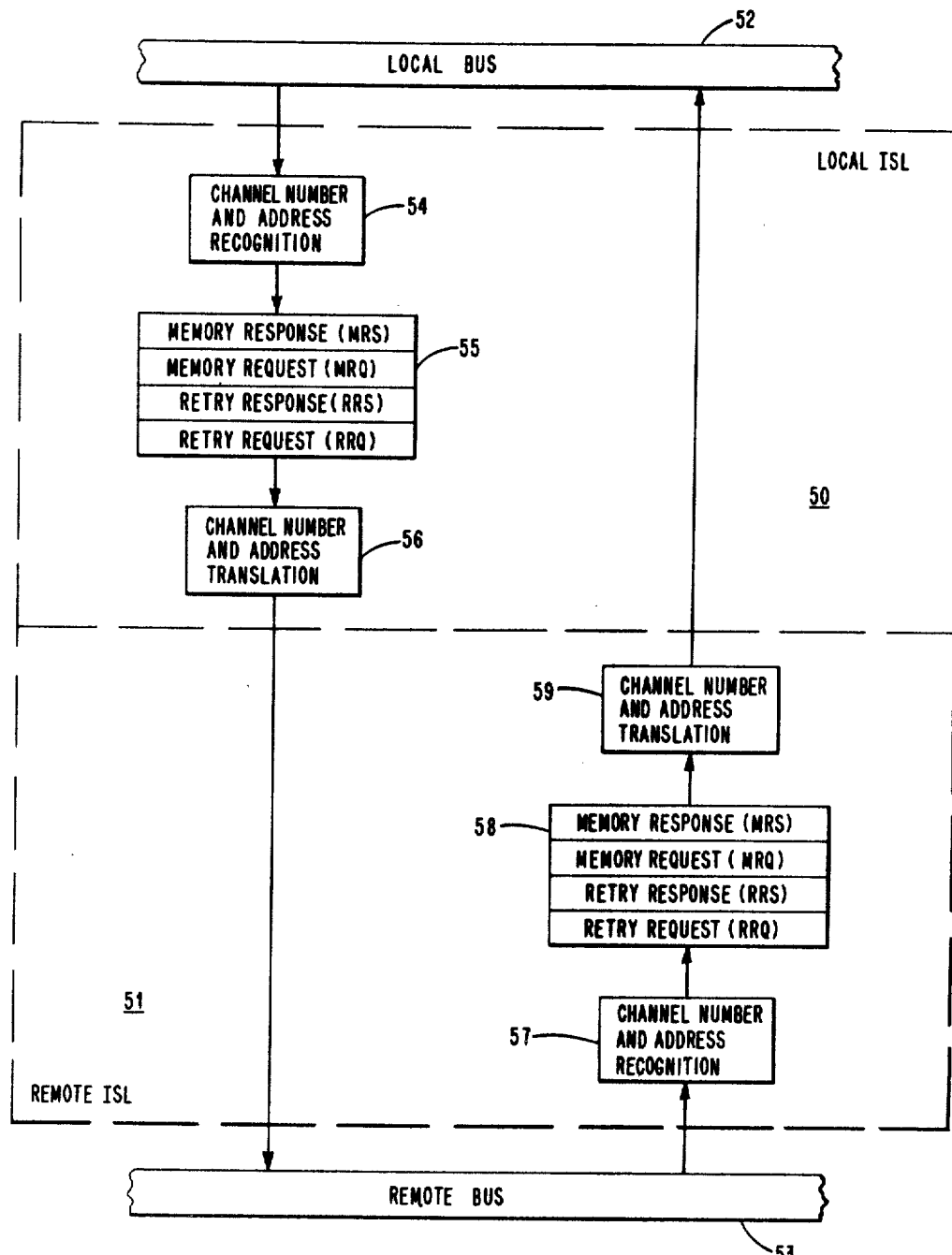
FIG. 4 is a functional block diagram illustrating twin ISL units providing a communication path between a pair of communication busses.

FIG. 4 illustrates in simplified functional block diagram form twin ISL units providing a communication path between a pair of communication busses.

Referring to FIG. 4, each of the ISL units 50 and 51 provide a path for data and control information between system components attached to communication busses 52 and 53. The ISL units are identical, and each contains a register file of sufficient width to store an entire communication bus transfer including integrity and control information. More particularly, channel number and address information from a local communication bus 52 is sensed by a logic recognition unit 54 of local ISL unit 50. If the information includes a channel number or address that is recognized by the recognition unit, the address and data bus information are stored in a register file 55 having four locations. If communication between the local bus 52 and the remote bus 53 is required, the channel number and address information received by the local ISL unit 50 undergoes a translation by a translation logic unit 56 before being transferred through the remote ISL unit 51 to the remote bus 53.

In the event a communication request is initiated by the remote bus 53, a channel number and address information is sensed by a logic recognition unit 57 of the remote ISL unit 51. If such information is recognized, data and address information from the remote bus are stored in a remote register file 58 having four locations. If communication with the local bus 52 is required, the channel and address information is applied through a translation logic unit 59 before being transferred through the local ISL unit 50 to the local bus 52. For convenience, the two busses are designated as either the local or the remote bus. This local/remote relationship normally depends on which bus initiated a cycle. The ISL unit which receives bus information from an adjacent bus, therefore, is designated a local ISL unit.

The logic names of the four file locations of register files 55 and 58 indicate the ISL logic operations executed to control ISL traffic. The register files are used for temporary storage of bus information. In this way, an ISL does not tie up a local bus if delays are encountered while gaining access to a remote bus. With the use of the register files, all local bus traffic operates at normal bus speeds and each of the register file locations have dedicated functions for a specific type of bus transfer. Table 1 indicates the types of bus cycles that may occur during which bus information is stored in the file registers. Memory write bus cycles require that the specific register to which they are assigned be empty. This condition is tested via file full flip-flops that are located in each ISL unit. A read cycle requires that a specific response be preserved in a remote ISL unit. This requirement relates to a general bus characteristic requiring that second half (response) cycles always be accepted, and is accomplished through the resetting of the file full flip-flop. Once a write request passes from a local ISL unit to a remote ISL unit, a file full flip-flop is reset to complete an operation. Conversely, a file full flip-flop is not reset during a read request until a response is received from an addressed device on the remote bus. No request can be accepted by the local ISL unit, therefore, until the previous response is completed by the remote ISL unit.

TABLE 1

| BUS CYCLE TYPE | ENTERS REGISTER MNEMONIC | RESERVES REGISTER MNEMONIC |
|---|---|---|
| Memory Read Request | MRQ | MRS |
| Memory Write Request | MRQ | — |
| Memory Read Response | MRS | — |
| I/O Output Request | RRQ | — |
| I/O Input Request | RRQ | RRS |
| Interrupt | RRQ | — |
| I/O Input Response | RRS | — |
| Memory Read, Test & Set | RRQ | RRS |
| Memory Read, Reset Lock | MRQ | MRS |

TABLE 1-continued

| BUS CYCLE TYPES AND FILE USAGE | | |
|---|---|---|
| BUS CYCLE TYPE | ENTERS REGISTER MNEMONIC | RESERVES REGISTER MNEMONIC |
| Memory Write, Reset Lock | MRQ | — |

There are two distinctly different transfer paths through which an ISL unit responds to bus requests. In response to Memory Request (MRQ) requests passing through an MRQ location of a register file, an ISL unit issues a response on a local bus without first interrogating a remote bus. It is important that the ISL unit respond to such requests and free the local bus as fast as a conventional memory unit. For those requests passing through a Retry Request (RRQ) location, the ISL unit seeks the response of the destination unit on the remote bus. Since the destination unit may respond with either an Acknowledge (ACK), a Negative Acknowledge (NAK), or a Wait (WAIT) signal, the ISL unit cannot give a meaningful response to the requesting unit until an actual response is available.

When a local ISL unit receives an RRQ request, it responds with a WAIT response. The requesting unit on the local bus then proceeds to reinitiate the request cycle until it receives a non-WAIT response. While the requesting unit is occupied, the remote ISL twin addresses the destination unit and obtains a response (ACK, NAK or WAIT). Each time the requesting unit issues a request cycle, the local ISL unit responds with a WAIT response until an ACK or NAK is received from the destination unit. The local ISL unit then compares the information received during the request bus cycle with the contents of the RRQ register location. If the requesting unit is the same unit that made the original request, the local ISL unit shall forward the response received from the remote ISL unit to the local bus. If the remote ISL unit received an ACK, NAK, or WAIT signal from the destination unit, the local ISL unit issues a like response to the local communication bus.

Each ISL unit may assume the bus visibility of a memory, an I/O controller, or a processor at different times as it intercepts a bus transfer on one bus and reinitiates it on a different bus. Each ISL unit is configured through the storage of data in mask and translation RAMs to respond to certain memory addresses, CPU addresses, and channel numbers. During system operation, each ISL unit monitors all bus traffic, and responds to individual bus request cycles within a range of identification numbers in behalf of a destination device on a remote bus to which the cycle was directed. When a local ISL unit responds to a bus request cycle (BSDCNN), it passes local bus information to the remote ISL unit. The remote ISL unit thereupon reinitiates the bus request cycle on the remote bus. The response cycle from the destination unit follows a similar route in the reverse direction, and is finally routed to the originating unit.

Except for the ISL configuration mode to be described, an ISL unit has minimal software visibility. The object is to provide ISL units that are transparent, thereby permitting the same functions occurring between two devices residing on the same bus to occur between two devices on different busses.

Since an ISL unit interconnects two communication busses, it may be used as a component in the building of multibus configurations. The ISL unit can support any system configuration that ranges from a simple bus extension to configurations that require shared memory capability, central processor to central processor interrupts, and dual access to I/O controllers. Further, linked systems may contain multiple busses that are linked by multiple ISL units.

FIGS. 5 AND 6

Figure 5:
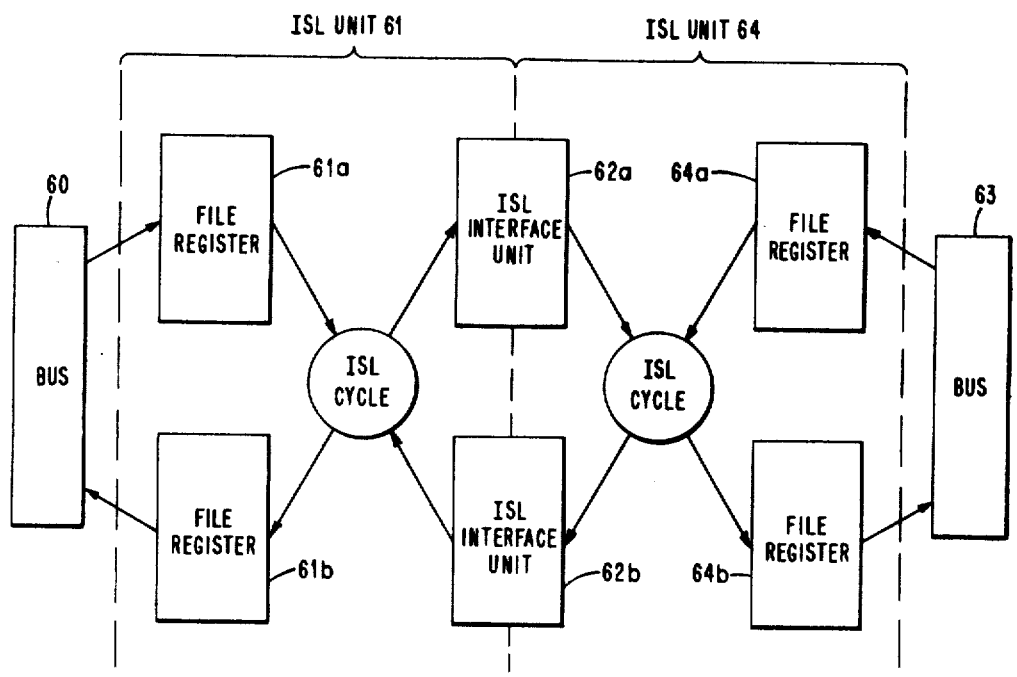
FIG. 5 is a partial functional block diagram and flow diagram illustrating alternate logic paths through twin ISL units providing a communication path between a pair of communication busses.
Figure 6:
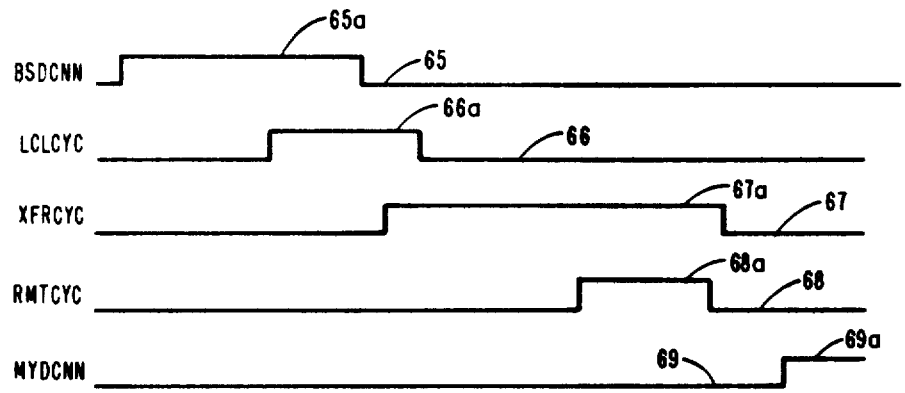
FIG. 6 is a timing diagram of the operation of an ISL unit.

FIG. 5 illustrates in simplified functional block diagram form the order of actions performed during a transfer of information between communication busses. FIG. 6 illustrates the same order of actions by way of a timing diagram.

Referring to FIG. 5, a request cycle (BSDCNN) is generated by a device interfacing with a communication bus 60. During the request cycle, the file register 61a location corresponding to the type of cycle being requested is scanned to determine if another request presently resides in the register file. In the event that the file register location is empty, the data associated with the BSDCNN signal is stored in the local file register 61a. Further, it is determined whether or not the associated ISL interface unit 62a may act as an agent for the communication bus 60 request. If not, the BSDCNN signal is ignored. In the event that the ISL interface unit may accept the signal, an ACK, NAK or WAIT response may be transmitted to the communication bus 60. More particularly, if the device to which a communication is to be transmitted is a memory unit interfacing with a communication bus 63, an ACK is normally sent as a response. If the device is a PCU, however, a WAIT is generated until it is determined whether or not the peripheral unit shall generate an ACK, NAK or WAIT. The communication bus 60 then is freed to continue processing additional cycle requests. In the event the ISL interface unit 62a becomes temporarily busy after it is determined that the unit may act as agent for the local bus request, the unit responds with a WAIT response.

Upon determining that a device to which information is to be transferred is available, a local ISL cycle is scheduled within the ISL unit 61. The scheduling is required to avoid conflicts with a response or request initiated by communication bus 63. When a first local cycle in the ISL unit is completed, the ISL interface unit 62a is loaded with address, control and data signals from the communication bus 60. A second local cycle is not initiated until a remote cycle in ISL unit 64 is completed to empty the ISL interface unit. In conjunction with the scheduling, the ISL units also follow a priority scheme wherein memory requests supersede those to other devices, and local cycles supersede remote cycles. When the ISL unit 64 enters into a remote cycle, the information stored in the ISL interface unit 62a is transferred to a file register 64b. At this time, the ISL unit 64 attempts to issue a MYDCNN signal to the communication bus 63. When a bus cycle is provided to the ISL unit 64, the information stored in the file register 64b is forwarded to an addressed device interfacing with the communication bus 63. The information supplied by the communication bus 60 thereby is transferred substantially in its original form to the communication bus 63.

In the event a device interfacing with the communication bus 63 initiates a cycle request to communicate with a device interfacing with the communication bus 60, the abovedescribed operation is repeated with the local cycle operation occurring in the ISL unit 64 and the remote cycle operation occurring in the ISL unit 61.

More particularly, the communication bus 63 issues a BSDCNN signal which is stored in a file register 64a. A local ISL cycle then is initiated to store address, control and data signals from communication bus 63 into an ISL interface unit 62b. Upon the occurrence of a remote ISL cycle in ISL unit 61, the information stored in the ISL interface unit 62b is supplied to the communication bus 60 by way of a file register 61b.

Referring to FIG. 6, a waveform 65 illustrates a BSDCNN signal issued by a communication bus in response to a cycle request, and a waveform 66 illustrates the occurrence of local ISL cycles. A waveform 67 illustrates the time period during which information is transferred from a local file register, through an ISL interface unit to a remote register file. A waveform 68 illustrates the occurrence of remote ISL cycles, and a waveform 69 illustrates a time period during which communication between a remote register file and a device interfacing with a remote communication bus is established.

It is to be understood that the waveforms of FIG. 6 illustrate representative and not precise time periods. It is the order of occurrence which is essential, not the duration.

A first local communication bus generates a BSDCNN signal represented by pulse 65a, which is received by a local ISL unit interfacing with the communication bus. If the interface unit is available, information supplied by the local communication bus is stored in the interface unit. The local ISL unit thereupon enters into a local ISL cycle represented by pulse 66a during which a response to the BSDCNN signal may be generated to indicate the availability of an ISL interface unit. Upon the occurrence of a transfer cycle pulse as illustrated at 67a, a remote ISL cycle request is scheduled. During a remote cycle as illustrated by pulse 68a, information stored in the ISL interface unit is forwarded to a remote file register interfacing with a remote communication bus. A bus cycle request thereupon is made by the remote ISL unit, and a bus cycle is made available to the ISL unit on a priority basis. During this time period as illustrated by pulse 69a, a MYDCNN cycle is generated on the remote communication bus in response to pulse 69a to establish a communication channel between a device interfacing with the communication bus and the remote file register. Information supplied by the local communication bus thereupon is placed upon the remote communication bus. The device addressed by a channel number comprising the information then may receive the information and issue an ACK signal, or in the alternative issue either a NAK or WAIT signal as before described.

FIG. 7

Figure 7:
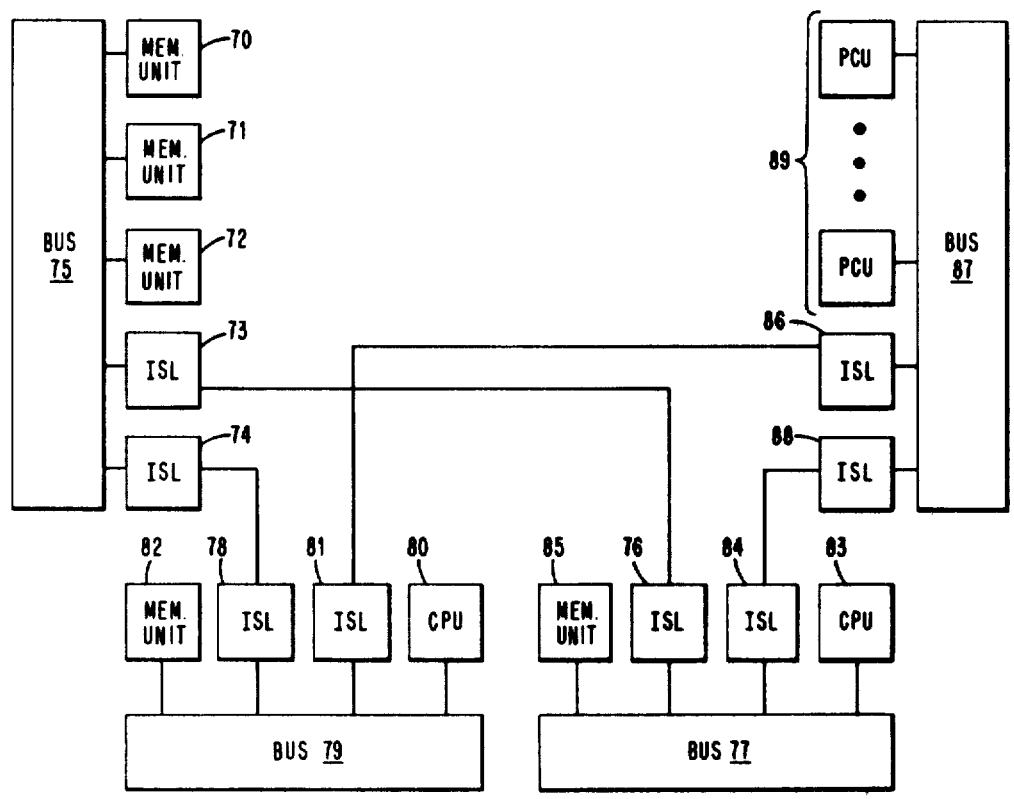
FIG. 7 is a functional block diagram of a further data processing system architecture embodying the invention.

FIG. 7 illustrates in functional block diagram form a further system architecture embodying the invention, wherein plural communication busses may interface with a single communication bus to which all PCUs of a data processing system may be interfaced. Further, if a virtual memory concept is adopted, remote system memory units may be interfaced with one communication bus, while local system memory units may be interfaced with those communication busses directly communicating with CPUs.

Referring to FIG. 7, remote memory units 70-72 and ISL units 73 and 74 are in electrical communication with a communication bus 75. ISL unit 73 further is in electrical communication with an ISL unit 76 connected to a communication bus 77. In addition, ISL unit 74 is in electrical communication with an ISL unit 78 connected to a communication bus 79. A CPU 80, an ISL unit 81 and a local memory unit 82 also are connected to the communication bus 79. In addition, a CPU 83, an ISL unit 84 and a local memory unit 85 are connected to a communication bus 77.

The system architecture thus far described accommodates the use of virtual memory concepts wherein CPU 83 may access not only local memory unit 85, but also remote memory units 70-72. In like manner, CPU 80 may access local memory unit 82 and remote memory units 70-72.

ISL unit 81 further is in electrical communication with an ISL unit 86 connected to a communication bus 87. ISL unit 84 is in electrical communication with an ISL unit 88 connected to communication bus 87. A plurality of PCUs 89 also are connected to the communication bus 87 to provide CPUs 80 and 83 access to common information sources.

FIG. 8

FIG. 8 illustrates the data flow through a single ISL unit in a more detailed functional block diagram form. The control logic for the ISL unit shall be described in connection with the description of FIGS. 14.

A data transceiver 90 receives data from a local communication bus, and supplies such data to a 16-bit data bus 91 connected to the input of a 4×16 bit data file register 92 for storage. The bus 91 also is connected to one input of a bus comparator 93 for comparison with data stored in the data file register 92. The data bit zero line of bus 91 is connected to an input of a master clear generator 94. The master clear generator further receives a 6-bit initialization instruction by way of bit lines 8 through 16 of a 24-bit local address bus 96. In response to the abovedescribed input signals, the generator issues a master clear signal on a conducting line 97 to reset the ISL unit as shall be further explained in connection with the description of FIGS. 14.

The bus 96 is connected to the output of an address transceiver 98 receiving address information from the local communication bus. Bit lines 8-16 of the bus 96 are applied to the input of an ISL address comparator 99 for address detection, and bit lines 0-9 are applied to the I2 input of a 10-bit memory address multiplexer 100. Data bit lines 0-1 are applied to the I1 input of multiplexer 100 during the period of response to I/0 output load commands. Bit lines 8-17 of the bus 96 are applied to the I2 input of a 10-bit channel address register 101, and bit lines 18-23 are applied to the input of a function decoder PROM 102. The bus 96 further is applied to a 4×24 bit address file register 103 for storage, and to a second input of the bus comparator 93 for comparison with the contents of the data file register 92.

An address receiver 104 receives address information from a remote communication bus, and applies such information to a 24-bit tri-state address bus 105 which is connected to an input of a function code decoder 106 by way of a 4-bit bus 107 comprising bit lines 20 through 23. The bit lines 20 through 23 of address bus 105 are connected to the 4-bit output of PROM 102. Bit lines 5 through 17 of bus 105 are connected to the output of a 13-bit RAM control register 108, and bit lines 0-23 are connected to the 23-bit output of address file register 103 by way of a bus 110. In addition, the bus 105 is connected to a 24-bit input of bus comparator 93, and bit lines 8-23 of the bus are connected to the I2 input of an address multiplexer register 111. Bit lines 14–17 of the bus are connected to the I1 input of an address multiplexer 112. The bit lines 14–17 of bus 105 are connected to a 4-bit input I1 of a 16×4 bit CPU source translation RAM 113, bit lines 14–17 to a 4-bit input I2 of a CPU address register 114, bit lines 0–23 are connected to a 24-bit input of ISL interface output drivers 115, and bit lines 8–17 to a 10-bit input I2 of register 101.

Data from a remote communication bus (transmitted via a remote ISL unit) is applied through data receivers 116 to a 16-bit tri-state data bus 117, bit lines 2–15 of which are applied to the input of a 10-bit RAM upcounter 118. The counter 118 applies a 3-bit write enable control signal to a conducting line 119 and a 10-bit count by way of a bus 120 to inputs of the RAM control register 108. The data bus 117 further is connected to the output of a 16-bit data file transmitter register 121 which applies information from the data file register 92 to the tri-state bus. The input of register 121 is connected to a 16-bit input of bus comparator 93, to the output of data file register 92, and to a 16-bit input I1 of multiplexer 111. A third input I3 to multiplexer 111 is connected to the output of address multiplexer 112, a second input I2 of which is connected to a 4-bit bus 122. The 16-bit output of multiplexer 111 is applied to the input of address transceivers 123. The output of the address transceivers 123 is applied to the local communication bus.

The data file register 92 supplies data to the bus comparator 93 during local communication bus cycles, to the address multiplexer 111 during response cycles, and to the data file transmitter register 121 during internal ISL cycles.

The bit lines 6–15 of data bus 117 are applied to the I1 input of a 1.0K by 11-bit memory address translation RAM 125, a write enable input I2 of which is connected to the bit 5 data line of the data bus 117. A third input I3 to the RAM 125 is connected to the 10-bit output of multiplexer 100. The RAM provides 10 bits of translated memory address data to either the input of a 10-bit memory reference register 126, or to the input of a 10-bit IOLD (input/output load) register 127. The RAM 125 also applies a hit bit control signal by way of a conducting line 128 leading to an input of an internal data multiplexer 129. The output of register 126 is applied by way of a 10-bit tristate bus 130 to a second input of multiplexer 129 and through drivers 115 to the remote communication bus. The output of register 127 also is applied by way of the bus 130 to the drivers 115 and to a third input of the multiplexer 129.

Bit lines 6–9 of the data bus 117 are applied to the I1 input of the register 114, the output of which is applied to the I1 input of a 16×4 bit CPU definition RAM 131. The I2 input to RAM 131 is connected to bit lines 0–3 of the data bus 117, and the I3 input to the RAM is connected to the data bit 3 line of the data bus 117. The output of the RAM is applied to a 4-bit input I5 of the multiplexer 129, and to a 4-bit input of I1 of the drivers 115.

The bit lines 6–9 of data bus 117 are connected to a 4-bit interrupt channel register 132, bit lines 0–15 to the input of a timer and status logic unit 133, bit lines 10–15 to the input of a 6-bit interrupt lever register 134, and bit lines 0–15 to a 16-bit input I1 of data multiplexer 129. The bit lines 0–4 of the data bus 117 are connected to the input of a 5-bit mode control register 135, bit lines 0–3 to the I1 input of a 4-bit CPU source address register 136 and to the I1 input of the register 136, and bit lines 6–9 to the I2 input of register 136. Bit line 3 of data bus 117 is applied to the write enable input of the CPU destination RAM 131.

The 4-bit output of register 132 is applied by way of bus 122 to the I2 input of address multiplexer 112 as before described, and to a 4-bit input I4 of the data multiplexer 129. The logic unit 133 applies ISL status bits to the I3 input of data multiplexer 129, and the output of register 134 is applied to the I2 input of the data multiplexer. The output of the mode control register 135 is applied to control logic to be further explained in connection with the description of FIGS. 14. The 4-bit output of the register 136 is applied to the I2 input of the RAM 113, the output of which is applied to the I1 input of a data multiplexer 137.

The I2 input to the data multiplexer 137 is connected to the output of data multiplexer 129, to the I3 input of a data multiplexer register 138, and through Is1 output drivers 139 to the remote communication bus. The output of the data multiplexer 138 is applied to the I2 input of the data multiplexer 138. The I1 input to the data multiplexer 138 is connected to the ISL address output of a hex rotary switch 140, and the output of the multiplexer is applied through data transceivers 141 to the local communication bus.

The multiplexer 138 provides a 16-bit output to the transceivers 141. Bits 6–9 of the output are supplied by multiplexer 137, and bits 0–5 and 10–15 are supplied by multiplexer 129. Bits 0–15 of the multiplexer 129 output are applied to the drivers 139.

One input of a 1024×1-bit RAM 142 is connected to the output of the register 101. A write enable input I2 to the RAM 142 is connected to the bit 4 line of data bus 117, and the output of the RAM is applied to the I8 input of the data multiplexer 129.

Control logic to be further explained in connected with the description of FIGS. 14 applies control signals on conducting lines 143–145 leading to inputs of a cycle generator 146. In response thereto, the generator 146 issues timing signals as shall be further explained.

A brief description of the operation of the communication busses shall be made to provide an understanding of the types and formats of commands and other information received by an ISL unit from a communication bus. The description of the ISL/bus interface then shall be followed by a description of an ISL-to-ISL interface, and a description of the operation of the ISL unit of FIG. 8 in response to specific bus requests.

A communication bus provides a common communication path for all devices interfacing with the bus. The bus is asynchronous in design, thereby permitting devices of varying speeds to operate efficiently in the same system. The bi-directional characteristic of the bus permits any two devices to communicate at a given time. The transfer of information between the devices forms a master/slave relationship, with the device requesting and receiving access to the bus becoming the master and the device being addressed by the master becoming the slave.

All information transfers are from master to slave, and each transfer is referred to as a bus cycle. The bus cycle is the period of time in which the requester (master) asks for use of the bus. If no other device of a higher priority has made a bus request, use of the bus is granted to the requester (master). The master then transmits its information to the slave, and the slave acknowledges the communication.

If the master's request requires a response, the responding slave unit assumes the role of master, and the requesting unit (previous master) becomes the slave. Communication between a master and slave requires a response from the slave when the slave is transferring data. In this case, the request for information requires one cycle, and the transfer of information back to the requester requires an additional bus cycle to complete the task.

A master unit may address any other device on the bus as a slave unit by placing the slave unit address on the address lines of the bus. There are twenty-four address lines, which can have either of two interpretations depending on the state of a memory reference (BSMREF) signal. If the BSMREF signal is at a logic one level, the following format applies to the address lines:

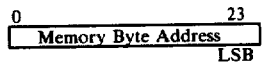

If the BSMREF signal is false, the following format applies to the address lines:

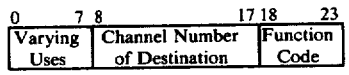

Three types of communications are permitted over a bus: memory transfers, I/O transfers and interrupts. When devices on a bus are transferring control information, data or interrupts, they address each other by channel number. Along with the channel number, a 6-bit function code is transferred to specify the functions to be performed.

When a master unit requires a response from a slave unit, the master unit transitions the bus write (BSWRIT−) signal to a logic zero level. In addition, the master unit provides its own identity to the slave unit by means of a channel number. This is coded on the data lines of the bus as follows:

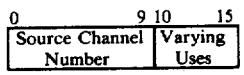

A channel number exists for every device in a system except for memory, which is identified only by a memory address. The channel number of a slave unit appears on the address bus for all non-memory transfers. Each device compares that channel number with its own internally stored channel number. The device which detects an equivalence is the slave unit, and must respond to that cycle. The response cycle is directed to the master unit by a nonmemory reference transfer. A second-half bus cycle (BSSHBC-) signal accompanies a transfer to identify the bus cycle as the one awaited by the master unit.

CPU channel numbers are restricted to the range of $000_{16}$ through $00F_{16}$. The six most significant bits of the channel number are fixed as zeros by the CPU logic, and only the least significant four bits are variable. CPU channel numbers are not used by any other devices.

Tables 2A and B list the common types of bus operations, each requiring either one or two bus cycles. Information transfers that are considered write operations require one bus cycle, while transfers that are considered read operations require an additional bus cycle for the response.

TABLE 2A

| KEY CONTROL SIGNALS | | | | NO. OF | | | ADDRESS LINES | | | Data Lines | | |
|---|---|---|---|---|---|---|---|---|---|---|---|---|
| BSWRIT− | BSSHBC− | BSMREF− | OPERATION | CYCLES | MASTER | SLAVE | 0 | 7 8 | 17 18 23 | 0 | 7 8 | 9 10 15 |
| T | F | T | Memory Write | 1 | CPU+CU | MEM | Address | | | Data | | |
| F | F | T | Memory Read and Response | 1 | CPU+CU | MEM | Address | | | Data | | |
| T | T | F | | 1 | MEM | CPU+CU | | Slave Channel Number | Variable Usage | | | Data |
| T | F | T | Memory Write | 1 | CPU+CU | MEM | Byte Address | | | Data | | |
| F | F | F | I/O Read and Response | 1 | CPU | CU | | Slave Channel Number | Function Code | Data | | |
| T | T | F | | 1 | CU | CPU | | Slave Channel Number | Variable Usage | | | Data |
| T | F | F | I/O Address Output | 1 | CPU | CU | Module Address | Slave Channel Number | Function Code | Address | | |
| T | F | F | IOLD Data Output | 1 | CPU | CU | | Slave Channel Number | Function Code | Data | | |
| T | F | F | Interrupt | 1 | CU | CPU | | Slave Channel Number | MBZ | Master Channel Number | | Level of Source |

TABLE 2B

Communication Bus Operations

| Type of Operation | Source | Destination | Number of Bus Cycles |
|---|---|---|---|
| Instruction Fetch | CPU | Memory | 2 |
| Operand Fetch | CPU | Memory | 2 |
| Operand Store | CPU | Memory | 1 |
| Memory Read | Controller | Memory | 2 |
| Memory Write | Controller | Memory | 1 |
| I/O Output Command | CPU | Controller | 1 |
| I/O Input Command | CPU | Controller | 2 |
| Interrupt | Controller | CPU | 1 |

Figure 9:
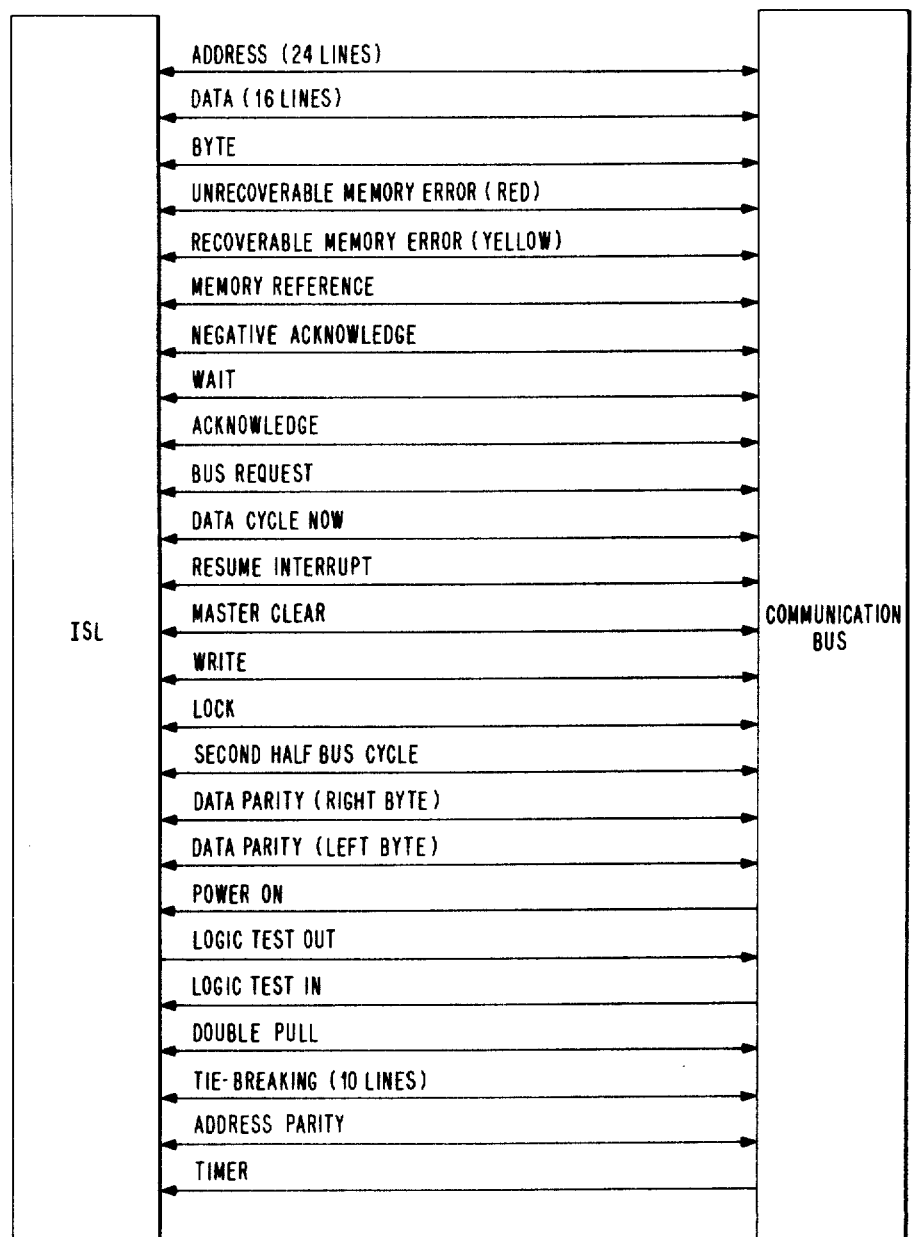
FIG. 9 is a graphic illustration of the information flow between an ISL unit and a communication bus.

Table 3 provides a complete list of the signals used to interface the ISL logic with the bus. The signals further are illustrated in FIG. 9. The following interface signals provide the handshake functions required by a device on a communication bus to either initiate, accept, or deny a request for a bus cycle from another device. It is to be understood that in describing the signals, the terms true and false must be interpreted in conjunction with the plus and minus signs associated with the signal mnemonic. For example, a BSREQT— is at a logic zero when true and at a logic one level when false. A BSAUOK+ signal, however, is at a logic one level when true and at a logic zero level when false.

The bus request (BSREQT—) signal when true indicates that one or more of the devices connected to the bus requested a bus cycle. When this signal is false, no requests are pending. The data cycle now (BSDCNN—) signal when true indicates that a specific master unit (i.e., CPU, memory or control unit) has been granted a requested bus cycle and has placed information on the bus for use by a specific slave unit. When this signal is false, the bus is not busy and may be between bus cycles. The acknowledge (BSACKR—) signale when true indicates to the master unit that the slave unit has received and accepted a specific transfer from the master unit. The negative acknowledge signal (BSNAKR—) indicates to a master unit that a slave unit is refusing a specific transfer. For example, a slave unit may refuse to accept a transfer when a control unit that is busy is addressed for a data transfer. The wait (BSWAIT—) signal when true indicates to a master unit that a slave unit cannot accept a specific transfer at this time. The slave unit may be temporarily busy, and the master unit must initiate successive retries until the transfer is acknowledged.

The following signals effect the transfer of information during a bus cycle. The bus data bit lines (BSDT00— through BSDT15) can be formatted for a single data word, for channel number coding, for low-order address bits, or for a level of priority decoding depending upon the operation being performed. Thus, data, address, control, register, or status information can be reflected by the 16 data lines of a communication bus. The 24 address lines (BSAD00— through BSAD23—) of a bus can be formatted for a single 23-bit main memory address to select one of eight million words. The address lines can also be formatted for a channel number code, for an I/O function code on lines 18 through 23, or for a combination of all three for an IOLD operation to be further explained.

TABLE 3

Communication Bus Interface Signals

| SIGNAL TYPE | LINES | FUNCTION | MNEMONIC |
|---|---|---|---|
| Timing | 1 | Bus Request | BSREQT— |
|  | 1 | Data Cycle Now | BSDCNN— |
|  | 1 | Acknowledge | BSACKR— |
|  | 1 | Negative Acknowledge | BSNAKR— |
|  | 1 | Wait | BSWAIT— |
| Information | 16 | Data | BSDT00— through BSDT15— |
|  | 24 | Address | BSAD00— through BSAD23— |
| Information Control | 1 | Memory Reference | BSMREF— |
|  | 1 | Byte | BSBYTE— |
|  | 1 | Bus Write | BSWRIT— |
|  | 1 | Second Half Bus Cycle | BSSHBC— |
|  | 1 | Lock | BSLOCK— |
|  | 1 | Double Pull | BSDBPL— |
| Status/Error | 1 | Memory Error (Red) | BSREDD— |
|  | 1 | Memory Error (Yellow) | BSYELO— |
|  | 1 | Data Parity Left | BSDP00— |
|  | 1 | Data Parity Right | BSDP08— |
|  | 1 | Address Parity (Bits 0-7) | BSAP00— |
|  | 1 | Logic Test Out | BSQLTO— |
|  | 1 | Logic Test In | BSQLTI— |
| Tie-Breaking | 1 | Tie-Breaking Network | BSAUOK+ |
|  | 1 |  | BSBUOK+ |
|  | 1 |  | BSCUOK+ |
|  | 1 |  | BSDUOK+ |
|  | 1 |  | BSEUOK+ |
|  | 1 |  | BSFUOK+ |
|  | 1 |  | BSGUOK+ |
|  | 1 |  | BSHUOK+ |
|  | 1 |  | BSIUOK+ |
|  | 1 | Tie-Breaking Network | BSMYOK+ |
| Miscellaneous | 1 | Master Clear | BSMCLR— |
|  | 1 | Power On | BSPWON+ |
|  | 1 | Resume Interrupt | BSRINT— |
|  | 1 | 50 to 60 Hz Clock | BSTIMR— |

The following signals serve as data, address, and information control signals that effect the transfer and control of information during a bus cycle. The memory reference (BSMREF—) signal when true indicates that bus address lines 0 through 23 contain a complete main memory address from a master unit. When false, the BSMREF— signal indicates that the bus address lines contain a channel number on lines 8 through 17 with or without a function code on lines 18 through 23, or that the bus address lines contain a main memory module address code on lines 0 through 7. The write (BSWRIT—) signal when true indicates that a master unit is transferring data to a slave unit. When the signal is false, the initial bus cycle signals a read request, and the data lines of the bus contain the channel number of the requesting unit. If the slave unit accepts the request, it is expected to reply with a read response in a second-half bus cycle (BSSHBC). The BSWRIT— signal is true for all operations except a control unit or a CPU memory read request, and a CPU I/O read command. These operations require a response request to supply information to the master unit by way of a separate bus transfer. The second-half bus cycle (BSSHBC—) signal when true indicates to a master unit that the current information generated by a slave unit is the information previously requested during an initial bus cycle.

The byte (BSBYTE—) signal when true indicates that a current transfer is a byte rather than word transfer. This signal is used during memory write operations only. The lock (BSLOCK—) signal when true indicates that a master unit requested a change in the status of the memory unit lock flip-flop. The BSLOCK— signal also enables a three-cycle, read-modify-write operation which allows the three cycles to be executed for a requesting unit without interruption. The first cycle is a read cycle during which the address lines of the bus contain the memory address, and the data lines of the bus contain the channel number of the requesting device. The second cycle is a response cycle during which the address lines of the bus contain the channel number of the requesting device, and the data lines of the bus contain data read from main memory. The third cycle is a write cycle during which the address lines of the bus contain the memory address, while the data lines of the bus contain data to be written into memory. A device thus can read and modify a specific memory location while preventing any read-modify-write interruption by another device on a bus. Memory can be accessed by other memory requests, however, following the second of the three cycles above described.

The double pull (BSDBPL—) signal when true indicates that a master unit is requesting a double-word operand from a slave unit. During a first second half bus cycle, the BSDBPL— signal is returned to the requesting unit to indicate that another word follows.

The following signal lines provide main memory error reporting signals for the available devices, and two-way bus parity lines for odd parity signals used with the address and/or information bits that are placed on a communication bus. Two lines provide for a bus continuity check, and test the integrity of the resident logic test in each device. The bus red error signal (BSREDD—) is generated only by a main memory unit that contains EDAC logic. When true, the signal indicates that memory detected an error during a second half bus cycle of a read operation. The bus yellow error signal (BSYELO—) is generated only by a main memory unit that contains EDAC logic. When true, this signal indicates that memory detected and corrected an error during a second half cycle of a read operation. The logic level of a bus address parity signal (PSAPOO—) provides odd parity for address bits 0 through 7 (i.e. module address bits). The logic level of a bus data parity left byte signal (BSDP00—) provides odd parity for bits 0 through 7 of a sixteen-bit data word. The logic level of a bus data parity right byte signal (BSDP08—) provides odd parity for the bits 8 through 15 of the sixteen bit data word. The bus quality logic test out-and-in signals (BSQLTO— and BSQLTI—) are static integrity signals which, if continuously true, indicate that each test has been completed successfully. The signals are relayed from device to device from one end of the bus to the other and back. This action effectively provides a continuity check for all available devices.

There are nine signals referred to as tie-breaking signals (BSAUOK+ through BSIUOK+), all of which must be true to provide an enable for any device that requests a bus cycle. If more than one device simultaneously requests a bus cycle, the cycle is granted to only one device on a positional priority basis as before described. Memory has the highest positional priority, and the CPUs have the lowest priority. Under simultaneous request conditions, therefore, the highest priority requesting device receives true enables from all nine tie-breaking signals. The remaining requesting devices receive eight or less, depending on the relative position of their decreasing priority.

A signal (BSMYOK+) indicates to a next lower priority device that a generating device, and certain other devices of a higher positional priority have not requested a bus cycle within a predetermined time period. A bus cycle may be granted if requested, therefore, to a lower priority unit.

The following control signals are asynchronous in relation to the functions they perform in the normal initiation and control of bus cycles. The resume interrupt (BSRINT—) signal when true allows all control units to reissue an interrupt that was previously refused by a CPU via a negative acknowledge signal. The master clear (BSMCLR—) signal indicates that the master clear (CLR) pushbutton, located on the CPU control panel, is depressed or a power-on sequence is in effect. If either of these conditions exists, an initialize operation is effectively performed in and for all of the available devices. When the bus power on (BSPWON+) signal is true, it indicates that all system power supplies are functioning correctly. This signal transitions to a true state when the power stabilizes, and transitions to a false state several milliseconds before the power fails.

The communication busses interface with the ISL units by way of a group of transceivers providing the equivalent electrical characteristics required of all bus connections, thereby allowing data, address, and most control signals to be routed to and from the ISL units.

Figure 10:
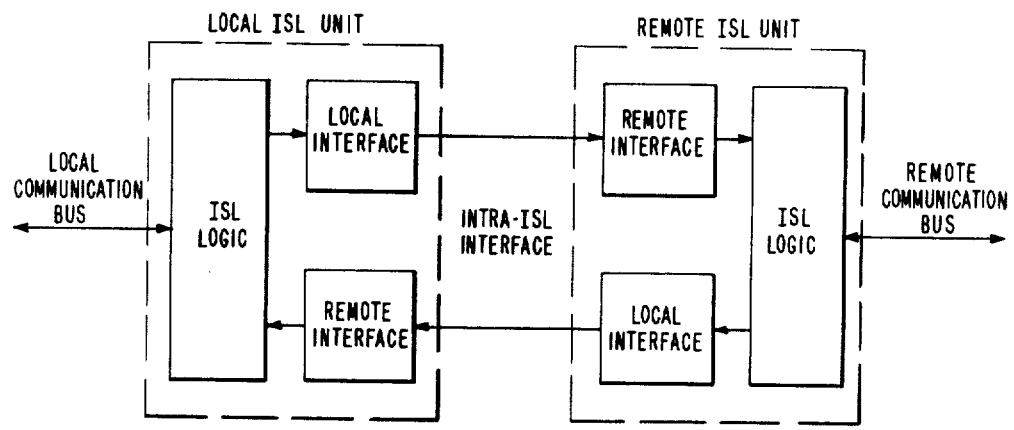
FIG. 10 is a broad functional block diagram of twin ISL units interfacing by way of twin interface busses.

The interface between ISL units is illustrated in broad functional block diagram form in FIG. 10. The interface signals exchanged between ISL units is illustrated for convenience in FIG. 11 and listed in Table 4.

TABLE 4

ISL Interface Signals

| TYPE | FUNCTION | NUMBER OF LINES | LOCAL NAME | REMOTE NAME |
|---|---|---|---|---|
| | Address | 24 | LCAD00+ through LCAD23+ | RMAD00+ through RMAD23+ |
| | Data | 16 | LDAT00+ through LDAT15+ | RMDT00+ through RMDT15+ |
| | Recoverable Memory Error (Yellow) | 1 | LCYELO+ | RMYELO+ |
| | Byte Transfer | 1 | LCBYTE+ | FILBYT+ |
| | Bus Write | 1 | LCWRIT+ | FILWRT+ |
| | Memory Reference | 1 | LCMREF+ | FIMREF+ |
| | Lock | 1 | LCLOCK+ | FILOCK+ |
| | Double Pull | 1 | LCDBLE+ | FILDBL+ |
| | Master Clear | 1 | BSMCLR− | BSMCLR− |
| | Resume Interrupt | 1 | BSRINT+ | BSRINT+ |
| ISL | Remote Strobe | 1 | RMTSTB+ | RMTSTB+ |
| | Transfer Done | 1 | XFRDUN+ | XFRDUN+ |
| | Generate Memory Request | 1 | GENMRQ− | GENMRQ− |
| | Generate Memory Response | 1 | GENMRS− | GENMRS− |
| | Generate Retry Request | 1 | GENRRQ− | GENRRQ− |
| | Generate Retry Response | 1 | GENRRS− | GENRRS− |
| | Remote Bus Acknowledge | 1 | RMACKR+ | RMACKR+ |
| | Remote Bus Negative Acknowledge | 1 | RMNAKR+ | RMNAKR+ |
| | Retry Response | 1 | RMRESP+ | RMRESP+ |
| | Answer Acknowledged | 1 | ANSWAK+ | ANSWAK+ |
| | Translate Channel Number | 1 | XLATOR− | XLATOR− |
| | Remote Function | 1 | FMTFUN+ | RMTFUN+ |
| | ISL Clear | 1 | MYMCLR− | MYMCLR− |
| | Twin Connected | 1 | TWINCN− | TWINCN− |
| | Address Parity Error | 1 | LCAPER+ | LCAPER+ |
| | Data Parity Error | 1 | LCDPER+ | LCDPER+ |
| | Nonexistent Memory | 1 | NOXMEM− | NOXMEM− |
| | Remote Watchdog Time-Out | 1 | WTIMOT+ | WTIMDT+ |
| | Remote Dead Man Time-Out | 1 | RMTOUT− | RMTOUT− |

Figure 11:
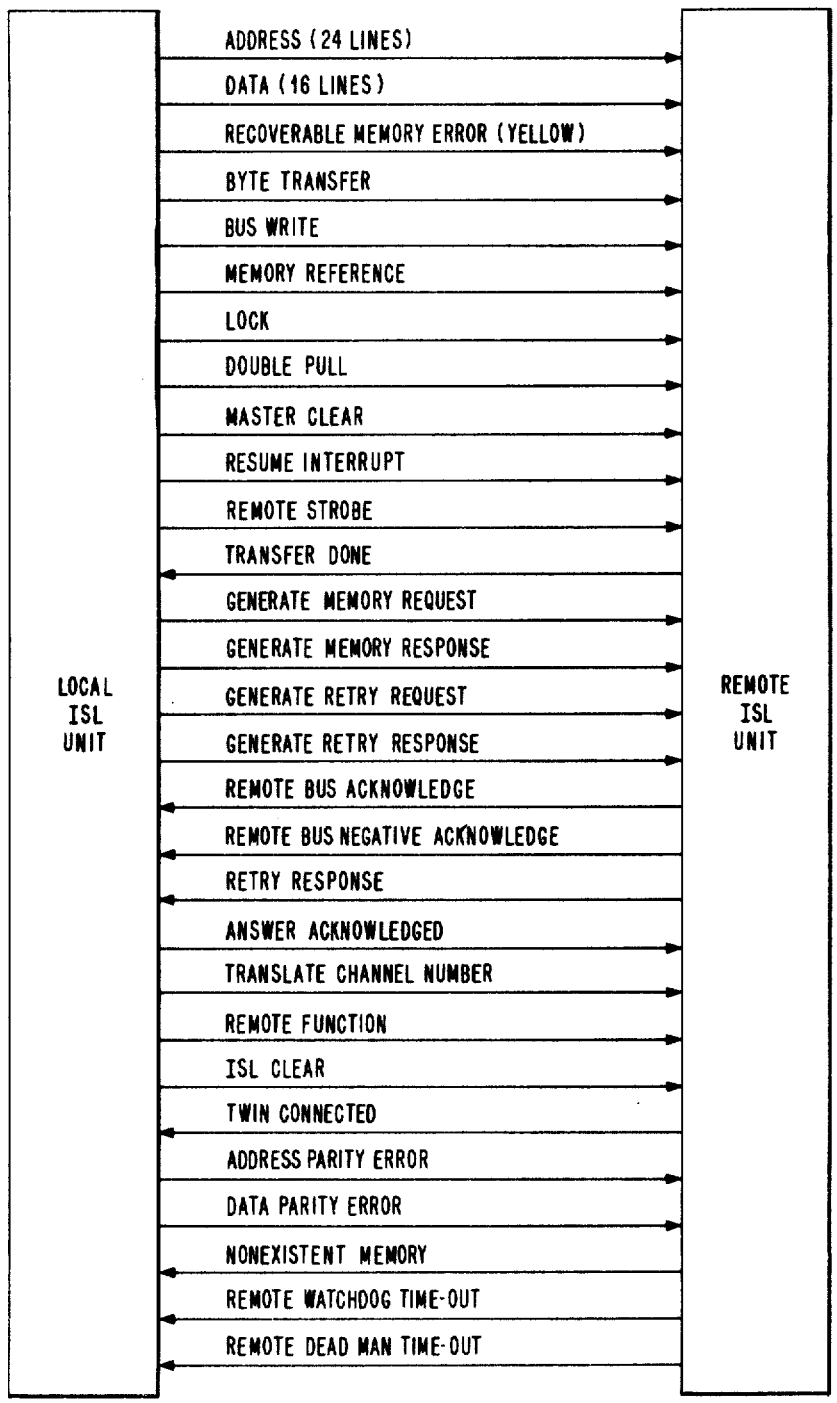
FIG. 11 is a graphic illustration of the information flow between twin ISL units.

The asynchronous intra-ISL interface is comprised of two identical unidirectional busses as illustrated in FIG. 10, thereby providing parallel bidirectional processing between ISL units. FIG. 11 illustrates the information transfer on one of the two busses. The following paragraphs provide a brief description of the ISL signals appearing on such a bus.

When a local ISL unit has information to transfer to a remote ISL unit, the local ISL unit issues a remote strobe (RMTSTB+) signal to the remote ISL unit. The remote ISL unit can identify the bus cycle type by the state of four control signals that accompany a RMTSTR+ signal. There is one control signal for each bus cycle type (i.e., memory request, memory response, retry request, and retry response). The remote ISL unit uses the RMTSTR+ signal to strobe the four control signals into the priority network of its control logic, and acknowledges the receipt of information by sending a transfer done bus signal (XFRDUN+) to the local ISL unit. When the local ISL unit receives the XFRDUN+ signal, the transfer cycle is completed.

The generate memory request (GENMRQ−) signal when true indicates that the local ISL unit has completed a local memory request cycle, and is requesting the remote ISL unit to perform a remote memory request cycle. The generate memory response (GENMRS−) signal when true indicates that the local ISL unit completed a local memory response cycle, and is requesting the remote ISL unit to perform a remote memory response cycle. The generate retry request (GENRRQ−) signal when true indicates that the local ISL unit completed a local retry request cycle, and is requesting the remote ISL unit to perform a remote retry request cycle. A generate retry response (GENRRS−) signal when true indicates that the local ISL unit completed a local retry response cycle, and is requesting the remote ISL unit to perform a remote retry response cycle. A retry response (RMRESP−) signal when true indicates that a remote ISL unit received a response during a remote retry request cycle. The RMRESP− signal is used by the local ISL unit to strobe two remote communication bus response lines, ACK and NAK, and to initiate a bus compare cycle. The remote bus acknowledge (RMACKR+) signal when true indicates that the remote twin received an acknowledge (ACK) response from the remote communication bus. This signal is used during retry request cycles, wherein the slave unit response must be obtained prior to issuing a response to a master unit. A remote bus negative acknowledge (RMNAKR+) signal when true indicates that the remote ISL unit received a negative acknowledge (NAK) response from the remote communication bus. The RMNAKR+ signal is used during retry request cycles, wherein a slave unit response must be obtained prior to issuing a response to a master unit. An answer acknowledged (ANSWAK+) signal when true indicates that a local ISL unit has transferred an acknowledge (ACK) response while completing a local retry request cycle. The ANSWAK+ signal is used by the remote ISL unit as a timing signal when handling the associated retry response cycle.

A translate channel number (XLATOR+) signal when true indicates that the local ISL unit detected a CPU channel number on the local communication bus. On receipt of the XLATOR+ signal, the remote ISL unit performs a CPU channel number translation on bits 6 through 9 of the communication bus. The XLATOR+ signal is used when an ISL unit is transferring CPU-to-CPU interrupts, or processing either an output interrupt control command or an input interrupt control command.

A remote function (RMTFUN+) signal when true indicates that a local ISL unit has received an ISL command that was addressed to a remote ISL unit.

An ISL clear (MYMCLR−) signal when true indicates that the local ISL unit is preforming a clear sequence. A twin connected (TWINCN−) signal when true indicates that the remote ISL unit is properly connected. An address parity error (LCAPER+) signal when true indicates that the local ISL unit has detected a communication bus address parity error. On receipt of this signal, the remote ISL unit generates incorrect address parity during a remote communication bus transfer. In this manner, the error may be passed onto the eventual destination before being reported.

A data parity error (LCDPER+) signal when true indicates that the local ISL unit detected a communication bus data parity error or a bus red error. On receipt of the LDCPER+ signal, the remote ISL unit generates incorrect data parity and a bus red error during a remote communication bus transfer. In this manner, an error is transferred to the eventual destination before the error is reported.

A non-existent memory (NOXMEM−) signal when true indicates that a remote ISL unit has received a negative acknowledge (NAK) response from memory on one of its nonlocked memory write requests. On receipt of the NOXMEM− signal, the local ISL unit shall attempt to generate a non-existent resource interrupt. A remote watchdog time-out (WTIMOT+) signal when true indicates that the remote watchdog timer has timed out. On receipt of the WTIMOT+ signal, the local ISL unit shall attempt to generate a watchdog time-out interrupt. A remote dead man time-out (RMTOUT−) signal when true indicates that the remote ISL unit has received no response, i.e. neither an ACK, NAK or WAIT response.

The transfer of information between ISL units forms a local/remote relationship. The ISL unit that is transmitting information is designated the local ISL unit, and the ISL unit that is receiving the information is designated the remote ISL unit. All information transfers between ISL units are from local to remote, and each transfer is referred to as a transfer cycle.

This local/remote relationship is similar to the master/slave relationship on the communication busses. When a master unit requests a bus cycle on a bus, the ISL unit which intercepts the cycle becomes a local ISL unit.

In other types of bus cycle requests, a slave unit must respond with either an ACK, a NAK, or a WAIT response, with a significant probability of that any one of the three responses may occur. In such cases, an ISL unit cannot give a meaningful response to a master unit until the destination slave unit responds. The following types of bus cycle requests apply: I/O output requests; I/O input requests; memory read request test and set lock signals; and interrupts.

In the case where one of these types of bus cycle requests is received at a local ISL unit, the ISL unit responds with a WAIT. The master unit on the local bus then may proceed to reinitiate the bus cycle request until a non-WAIT response is received. While the master unit is thus occupied, the remote ISL unit addresses a slave unit to obtain either an ACK or a NAK response. On the next bus cycle request from the master unit, the local ISL shall supply the slave unit response.

The ISL unit that addresses a slave unit on a remote bus becomes a remote ISL unit. When the communication reuires a response, however, a previous slave unit becomes a master unit. Further, a previous remote ISL unit becomes a local ISL unit.

There are three basic cycles that are generated in an ISL unit: local, remote, and transfer. A local cycle generally is entered to act upon information in address file register 103 and data file register 92. A local cycle may also be entered when no remote cycles or file information cycles are pending, but an ISL interrupt, a memory timeout or an I/O time-out are pending. Local cycles also occur during a master clear sequence to increment the RAM counter 118 from a count of zero to a count of 1024, and to initialize all RAM locations in the ISL unit. When an ISL unit enters a local cycle to process address file and data file information, no transfer cycle can be in progress.

A remote cycle is entered into by a remote ISL unit to receive information from a local ISL unit. If local and remote cycle requests are received simultaneously, the local cycle request is honored first. Remote cycles may occur in response to any of four remote ISL commands: generate memory request command, generate memory response command, generate retry request command, or generate retry response command. To enter a remote cycle, an ISL unit must not be in either a local cycle or a bus compare cycle.

A transfer cycle is entered to transfer information from a local ISL unit to a remote ISL unit. A local ISL unit transferring data to a remote ISL unit generates a transfer cycle, and causes a corresponding remote cycle to occur. The transfer cycle is terminated by the local ISL unit upon detection of a remote cycle in the remote ISL unit.

In generating the above-described cycles, an ISL unit may be in one of three major logic states. More particularly, a CPU command may load the mode control register 135 with bit patterns to place an ISL unit in one of three major logic states: clear, stop and on-line. Transitions between states occur in response to an I/O output control command or a power-on sequence. The I/O commands may be initiated from either the local or the remote communication busses.

The clear state is transitory. It is entered when an I/O output control requests an ISL unit initialization, or when a power-on sequence is initiated. In the clear state, a lower CPU may reset the local ISL unit by setting each translation memory cell of RAM 125 to a logic one level, and by clearing all other register and RAM locations. As a result, the ISL configuration information is removed from RAMs 113, 125, 131 and 142. The ISL unit, therefore, does not respond to any bus cycle except those directed to an ISL channel number.

An ISL unit enters a stop state either automatically from the clear state, or in response to an I/O output control command that requests the ISL unit to enter a stop state. When the stop state is entered from an on-line state, the ISL unit retains all configuration information in the RAMs 113, 125, 131 and 142 that existed prior to the stop state. While in the stop state, the ISL unit does not respond to any bus cycles except those that are directed to the ISL unit's channel number. It is only during a stop state that the ISL unit accepts I/O commands to change the configuration information.

The on-line state is entered in response to an I/O output control command specifically requesting the ISL unit to enter the data transfer mode. In the on-line state, the ISL unit responds to bus cycles directed to the ISL channel number provided that they are not configuration control commands, and to bus cycles directed to locations in RAM 142 having a logic one bit referred to as a channel hit bit, and to locations in RAM 125 having a logic one bit referred to as a memory hit bit. The ISL unit can be configured, however, to operate in a special test mode. The test mode relates to bus responses occurring during a test and verification to be further described.

An ISL unit further may be placed in one of five logic control modes indicated by an I/O output command word. The control modes include the clear mode, the stop mode, the resume mode, the wraparound mode, and the NAK retry mode.

The clear mode as indicated by the control mode register 135 occurs when any one of the following conditions exist: (1) a master clear function is activated during the application of power to the ISL unit; (2) a power failure occurs; (3) an initialize bit (data bit line zero of busses 90 or 116) is enabled in an output control command; or (4) a master clear function is activated when a master clear pushbutton is depressed on an operator control panel.

The occurrence of any of the first three conditions results in the initialization of all configuration data in the ISL unit.

When a bus master clear function is activated, the ISL unit remains in a current logic state, and the ISL configuration remains unchanged. A master clear sequence is initiated simultaneously in both the local and remote ISL units. The sequence continues until the ISL registers including interrupt channel register 132, the interrupt level register 134 and the mode control register 135 are cleared. The interrupt level of the ISL unit thereby is set to zero. Local retry cycles are generated during the master clear sequence, and the RAM counter 118 is incremented to a count of 1,024 (CNTR1K). When the CNTR1K signal is valid, it causes the master clear sequence to terminate. All RAM locations of the ISL unit thereupon are initialized, and the ISL unit thereafter responds only to bus traffic that is directed to its unique ISL channel number.

When in the stop mode, an ISL unit responds only to bus cycles that are directed to its own channel number. Any instruction that tries to communicate through the ISL unit is ignored, and results in a time-out as shall be further described. Any memory or I/O read cycles that are accepted before entering a stop mode are completed prior to entering the stop mode.

In the resume mode, the ISL unit returns to the on-line state. The ISL unit responds to bus cycles directed to its ISL channel number provided that they are not configuration control commands. In addition, the ISL unit is responsive to the occurrence of hit bits at the outputs of RAMs 125 and 142.

Figure 12:
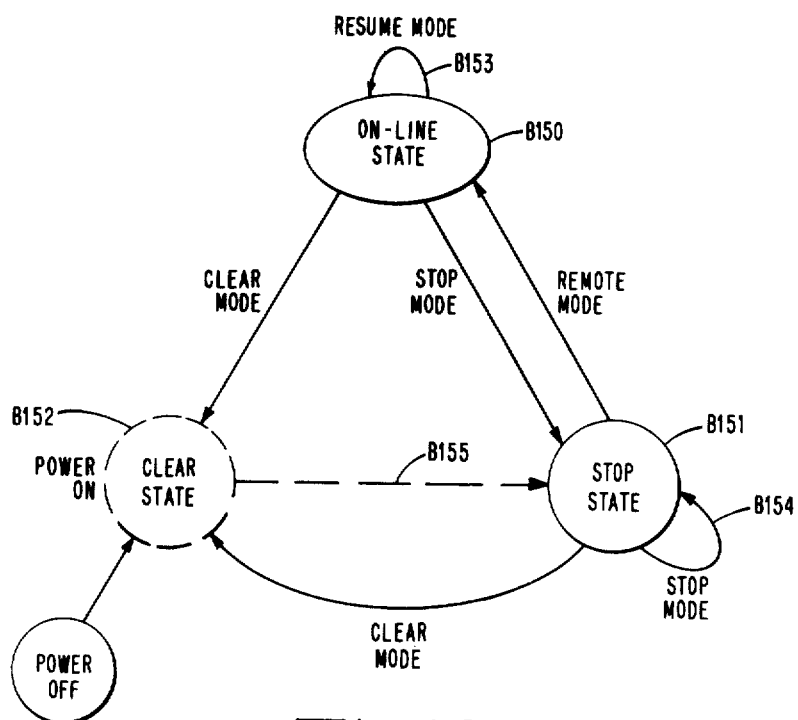
FIG. 12 is a logic state diagram of the operation of an ISL unit.

The relationship between the logic states and the logic control modes which an ISL unit may assume are illlustrated in FIG. 12. The three logic states which an ISL unit may assume are the on-line state 150, the stop state 151, and the clear state 152. If an ISL unit is in the on-line state, and receives an I/O output control word command to enter a resume logic control mode, the on-line state is re-entered as indicated by logic control loop 153. If the logic decision flow is to transition from the on-line state 150 to the stop state 151, the ISL unit must enter a stop logic control mode to effect such a transition.

Upon receiving an I/O output control word commanding the ISL unit to enter a stop logic control mode while in the stop state, the stop state is re-entered as illustrated by the logic control loop 154. If the ISL unit is to transition from the stop state 151 to the clear state 152, the ISL unit must enter the clear logic control mode to effect that transition. The clear state 152 is a temporary as indicated by dotted lines in FIG. 12. Upon entering the clear state, the ISL unit automatically transitions to the stop state 151 as indicated by the dotted logic path 155. The clear state also may be entered from the on-line state 150 by means of a clear logic control mode, and in response to a power-on or a power-off action. If a power-off condition occurs while the ISL unit is in the on-line logic state, the ISL unit shall remain in the on-line state for approximately 1.50 miliseconds to allow a notification of status between communication busses.

Whan an I/O output control word command is stored in the mode control register 135 of FIG. 8, the output of the register signals to the control logic the type of ISL response which is required. When bit zero is at a logic one level, a master clear control mode is entered. When bit one is at a logic one, however, a resume logic control mode is entered. A stop logic control mode is entered when bit one is at a logic zero level. Bits two and three of the register 135 control the wraparound logic control mode, and bit four controls the NAK retry logic control mode. More particularly, the ISL unit issues a NAK respose when bit four is at a logic one level, and a WAIT response when bit four is at a logic zero level.

It is to be understood that neither the wraparound nor the NAK retry logic control modes are shown in the state diagram as they have no effect on the ISL logic states. The wraparound logic control mode is a test condition during which the local and remote ISL units, and the intra-ISL interface logic is tested. The NAK retry logic control mode allows a NAK response to be sent to a device that has requested service during an ISL busy condition. This control mode is used to temporarily remove a device of higher priority from a communication bus while the ISL responds to a CPU.

The operation of the ISL unit of FIG. 8 shall now be described. In operation, information is received from the local communication bus by way of transceivers 90 and 98, and stored in registers 92 and 103. The registers 92 and 103 together provide four forty-bit storage locations (zero-three) for identifying the type of information transfer which shall occur. A memory response (MRS) is assigned the highest priority location, location three. The next highest priority is accorded to location two in which a memory request (MRQ) is stored. A retry response (RRS) is stored in location one and retry request (RRQ) is stored in location zero.

There are two distinctly different logic decision paths taken by an ISL unit in handling bus cycle requests. In one, the ISL unit responds to a bus cycle request without first interrogating a remote bus. In the second, the actual response of the destination unit must be obtained by an ISL unit before a response may be made to a bus cycle request. For each bus cycle request, there are three possible responses, an ACK, NAK or WAIT.

The ISL responds to the following types of bus cycle requests with an ACK response if the file location is not full, or with a WAIT response if the file location is full. The ISL unit never responds to such bus cycle requests with a NAK response: memory read request, memory write request; memory read response; memory read request and reset lock; memory write request and reset lock; and I/O input response.

It is important that the ISL unit respond to bus cycle requests, and free the bus to avoid an unnecessary decrease in bus cycle speeds. If an ISL unit accepts a memory request cycle and receives a NAK response on the remote bus, therefore, the ISL unit must initiate a non-existent resource interruption on the local bus for a write cycle, or generate a second-half bus cycle with bad parity for a read request using a memory hang-up timer as shall be further described.

A local MRQ cycle occurs in response to an activity bit being set in the file registers 92 and 103 at the time local bus information is stored. The memory request is generated to accommodate reads or writes in remote memory. In the case of a read, location two of registers 92 and 103 remain filled and are not reset until a response is received from remote memory. The response in the form of MRS data is loaded into the location three of remote ISL registers corresponding to registers 92 and 103 of FIG. 8. The remote ISL unit thereafter contends for an ISL cycle to transfer the MRS data to the receivers 104 and 116. The MRS data thereby is applied by way of busses 105 and 117 to transceivers 123 and 141 leading to the local communication bus. MRS address information is obtained from data file register 92 during a remote MRS cycle in the local ISL unit. Upon completing the transfer of data from the remote communication bus through the ISL unit of FIG. 8, a new request may be received from the local communication bus.

It is understood that there are four communication bus cycles involved in a read operation between communication busses linked by ISL unit pairs. By way of contrast, a read operation on a single communication bus would involve only two bus cycles. Each local bus cycle presented to an ISL unit must be duplicated on a remote bus. The number of cycles required for an information transfer between communication busses thus is doubled over that required for single bus information flow.

Two further information transfers, the RRQ and RRS shall be described. The RRQ (retry request) is never acknowledged with an ACK signal initially. A WAIT must initially be issued until a response is received from a device on the remote bus. An RRQ transaction occurs, for example, when a memory location must be sensed to determine if it is being used. If not, the data in the memory location may be modified or replaced. Once an RRQ request is made, a full bit is set in location zero of registers 92 and 103 to indicate a busy condition. A local ISL cycle thereupon is generated, and is followed by a remote ISL cycle and a remote communication bus cycle as before described. When a response such as an ACK, NAK or WAIT is received from the remote bus, the response and a remote response control signal (RMRESP) are forwarded to the local ISL unit. It is to be understood that a WAIT response is indicated by the absence of an ACK or NAK response.

As before described, when an ISL unit receives a bus cycle request, selective bus control signals are interrogated to define which of four locations in file registers 92 and 103 are used in capturing the binary coded information on the bus. Each of the four locations has associated therewith a location busy bit referred to as a full bit. The full bit is set true when an associated location is loaded and designated to be acted upon by the ISL unit. Such designation occurs in association with the generation of hit bits by RAMs 125 and 142 of FIG. 8. The full bit inhibits further information from being loaded only into the associated location. The other three locations of registers 92 and 103 may be loaded if an associated full bit is not set. A full bit is reset whenever the contents of the associated location are no longer needed for internal ISL use. By way of example, the memory request location full bit shall be reset when the ISL interface output devices 115 and 139 are loaded during a local MRQ memory request cycle of a memory write operation. In the case of a memory read operation, however, the full bit is not reset until the remote memory response cycle (MRSCYR) occurs.

Also associated with each location of registers 92 and 103 is a local activity bit referred to as a "2DO" bit which drives the cycle generator 146. More particularly, the cycle generator is driven by the activity bits of the local ISL unit (FIL2DO−), and a remote activity bit (RMT2DO−). When a local cycle is generated, the associated activity bit is reset.

Upon the occurrence of an idle state in the local ISL unit and bus cycle request on the local bus, a bus compare cycle is initiated in the local ISL unit. The bus comparator 93 compares the entire 40 bits of location zero of the file registers 92 and 103 with the information received from the local bus transceivers 90 and 98. If an equivalence occurs, the ACK, NAK or WAIT response received from the remote bus is forwarded to the requesting device on the local communication bus.

It is thus apparent that whenever a device on the local bus requests a bus cycle on the remote bus, that device is issued a WAIT by the local ISL unit until a response is received from the remote bus. If the response is an ACK or a NAK, the local device shall not continue to retry. As long as the response is a WAIT, however, the local device shall continue to cause RRQ signals to be generated. CPUs cause an RRQ signal to be generated in an ISL unit when I/O commands or a memory test and set instruction is issued. PCUs may cause RRQ signals to be generated when an interrupt command is issued to a CPU on a remote bus.

If a WRITE operation is requested, the full but in the registers 92 and 103 is reset when the information stored in file registers 92 and 103 is loaded into drivers 115 and 139. Further communication requests thereafter may be made from the local bus. If a read operation is requested, however, the CPU enters into a WAIT state until data is received from the remote bus. The full bit of registers 92 and 103, therefore, remains set until data is received from the remote bus.

In a multiple CPU environment, the bus comparator 93 may indicate a non-equivalence in the event a high priority CPU on a local bus attempts to access a local ISL unit that has previously stored information from a lower priority CPU into the file registers 92 and 103. In order to avoid a CPU deadlock, NAK retry logic to be further discussed is activated by the lower priority CPU to issue a NAK signal to the higher priority CPU.

It is to be understood that the structure of the ISL unit illustrated in FIG. 8 provides plural communication paths between the local and remote communication busses. More particularly, the local ISL unit may have four information transfer transactions queued in the registers 92 and 103—RRQ, RRS, MRQ and MRS. One of the transactions may be active during a local ISL cycle while the other three are pending. During this period, only selected control signals from the remote ISL unit are received. Other information supplied by the remote ISL unit to receivers 104 and 116 is inhibited. Upon completion of the local and other pending cycles, the local ISL unit shall enter into a remote cycle during which the information at receivers 104 and 116 is passed along tri-state busses 105 and 117 respectively to transceivers 123 and 141. A typical operation of the local ISL unit thus may proceed in the following manner. The local communication bus may generate a BSDCNN to the local ISL unit to load the file registers 92 and 103. The remote ISL unit thereafter may supply information to receivers 104 and 116. Since a local cycle takes priority over a remote cycle operation, the information in registers 92 and 103 first is applied along tri-state busses 105 and 117, respectively, to the remote ISL unit by way of interface output drivers 115 and 139. The logic level of the tri-state busses 105 and 117 thereafter is changed to apply the outputs of receivers 104 and 116 respectively to transceivers 123 and 141 leading to the local communication bus.

The four types of transactions, the priority levels assigned to the transactions and the Isl cycles, and the ISL architecture act in concert to provide ISL information transfers without substantially affecting the communication bus rate. In the preferred embodiment disclosed herein, a bus cycle period is approximately 175–300 nanoseconds. Within this approximated range, no adverse effect to the information flow on the communication busses has been detected.

A more detailed explanation of the data flow between the local and remote communication busses now shall be provided in light of the foregoing overview. The ISL units operate in two modes, an information transfer mode and an ISL configuration mode.

In the information transfer mode, an initial BSDCNN from the local communication bus is received by transceivers 90 and 98 of FIG. 8, and thereafter respectively loaded into registers 92 and 103 if the registers are found to be empty. If a memory request (MRQ) is to become active during a local ISL cycle, local bus information is written into location two of the registers 92 and 103. If the full bit of the registers is not at a logic one, the location two shall be unconditionally loaded with the information whether the local ISL unit is available as an agent for that cycle or not. During the time data information is written into the registers 92 and 103, the transceivers 90 and 98 address the memory address translation RAM 125 by way of multiplexer 100. If a hit bit, to be further explained, is present at the addressed location, an MRQ is initiated. In addition, the memory address data in the addressed location of RAM 125 is loaded into memory reference 126. When the local ISL unit undergoes a local cycle, therefore, a memory address is available.

Memory translation occurs at bits 0–9 of the RAM 125 output. The bits 0–9 represent up to 1,024 8.0 K modules of memory, while the bits 10–23 represent one 8.0 K module. There are, therefore, a total of 8.0 megabytes of memory that may be addressed by way of the communication busses. The RAM 125 provides a means for translating any one of the 1,024 8.0 K modules addressed during a memory request cycle. The translation accommodates communication between devices on separate communication busses, wherein like memory devices may have the same address assignments.

Each ISL unit contains a 1,024 bit channel number RAM such as channel mask RAM 142. Each bit of the RAM is called a hit bit, and represents one channel number. More particularly, the channel number hit bits represent those channels that do not actually exist on the local bus, but which require the ISL unit to respond. The ISL unit accepts any non-memory reference whose channel number corresponds to a channel number hit bit at a logic one level.

Upon completing the loading of location two of data file register 92 and address file register 103, a memory request full bit is set if each of three events occur: a memory hit bit is issued by the memory address translation RAM 125, the memory reference signal received from the local bus is true, and the bus lock signal from the local bus is false. The full bit in turn causes an activity "2DO" bit to be set, thereby driving a cycle generator 146 and initiating a local MRQ cycle.

During the time period the drivers 115 are being loaded from registers 103 and 126, a 16-bit data word in the data file register 92 is applied through the data file transmitter register 121 and along the bus 117 to the I1 input of data multiplexer 129. The output of multiplexer 129 is selected to the I1 input, and applied to the ISL output drivers 139. Drivers 115 and 139 comprise the local ISL half of the ISL interface unit 62a of FIG. 5 as suggested by the dotted lines. The remaining half of the interface unit 62a resides in the remote ISL unit 64.

Upon completion of the local cycle, the logic control system issues a strobe to enable the drivers 115 and 139, and thereby initiate a transfer cycle to forward the information from the local communication bus to the remote ISL unit.

In the event that the remote ISL unit initiates a memory request (MRQ), the local ISL unit of FIG. 8 enters into a remote cycle wherein address and data information from the remote communication bus are applied by way of receivers 104 and 116, respectively, to tri-state busses 105 and 117. When the local ISL unit enters the remote cycle, the local ISL logic control system signals the completion of the transfer cycle to the remote ISL unit. The interface between the ISL units thereafter is free to accommodate further information transfers.

Bits 0–23 of bus 105 are applied through the I2 input of multiplexer register 111 to the transceivers 123. The 16-bit data word on bus 117 is applied to the I1 input of the data multiplexer 129, the output of which is applied through the data multiplexer register 138 to the transceivers 141. When the logic control system issues a strobe to enable the transceivers 123 and 141, information from the remote communication bus is applied to the local communication bus to complete the remote cycle. The preceding explanation has described the operation of an ISL unit under both local and remote cycles in response to a memory request.

If an RRQ (retry request) is received by the local ISL unit from the local bus, information from the local communication bus is applied through the transceivers 90 and 98 respectively to busses 91 and 96. The information is loaded into registers 92 and 103 as before described. Bits 8–17 of the address information, which identify a slave device (a device being accessed) on the remote communication bus, are applied from bus 96 to the I1 input of channel address register 101. In response thereto, the register 101 addresses the channel mask RAM 142. If a logic one bit is present at the addressed location, the output of the RAM transitions to a logic one level thereby identifying the local ISL unit as the agent for the request issued by the master device. The control logic senses the RAM 142 output, and in response thereto sets the RRQ full bit in registers 92 and 103. No further information thereafter may be loaded into the registers until a response is received from the remote communication bus. The control logic further issues command strobes as before described to route the address information stored in the address file register 103 along busses 105 and 147 to the I2 input of drivers 115. The sixteen data bits from the data file register 92 are routed through the transmitter register 121 and along bus 117 to the I1 input of multiplexer 129. The register 92, however, may or may not contain valid data. If the master device issued an output or write command, data would be transferred to an addressed device on the remote communication bus. If a read command were issued, however, the only information which needs to be transferred to the remote ISL unit is the address of the master device. No data need be transferred.

If a read command were received from the local communication bus, the address of the master device on the local bus would be stored in the data file register 92. In addition, the read command would be transferred to the control logic of the remote ISL unit as shall be further explained in connection with the description of FIGS. 14. The control logic of the remote ISL unit would sense the read command, and in response thereto issue the address of the remote ISL unit by activating a hex rotary switch corresponding to switch 140. The ISL address thereupon would be applied through a data multiplexer analogous to multiplexer 138, and through remote transceivers analogous to transceivers 141 to the remote communication bus during the remote retry request cycle. Upon receipt of a response from the remote communication bus at remote transceivers analogous to transceivers 90 and 98 during a second-half bus cycle, the address information received by the remote transceivers would be compared to the remote ISL address code by an ISL address comparator such as comparator 99. If an equivalence occurred, the comparator would signal the remote control logic. Activity 2DO bits of location one of the remote address and data file registers thereupon would be set by the remote control logic to initiate a retry response (RRS) cycle in the remote ISL unit. Data from the remote file registers thereupon would be transferred to remote ISL interface output drivers. Upon the initiation of a transfer cycle in the remote ISL unit, the data would be forwarded from the drivers to the receivers 104 and 116 of the local ISL unit. In response to the transfer cycle, the local ISL unit enters into an RRS retry response cycle to forward data from receivers 116 to the transceivers 141 leading to the local bus. More particularly, data received from the remote IsL unit by way of receivers 116 is applied by way of bus 117 through the I1 input of multiplexer 129 to the I3 input of multiplexer 138. The output of multiplexer 138 in turn is applied through transceivers 141 to the local communication bus. To complete the read operation, the master device address stored in the data file register 92 is applied through the multiplexer 111 to the transceivers 123 leading to the local bus.

The transfer of information through the ISL units shall now be described in connection with specific I/O commands passed through the ISL units. The format of such commands are not significant to the ISL units since they are peculiar to a device on a remote communication bus. They merely appear as data to the ISL units, and are passed through the ISL units to a communication bus. If an output I/O command were transferred by the local ISL unit to the remote ISL unit, an ACK received from the remote ISL unit in response to the I/O command would cause the full bit in registers 92 and 103 to transition to a logic zero. Another information transfer from the local communication bus thereby is accommodated. In the case of a read command from the local ISL unit, however, the full bit would remain at a logic one level unit data was received from the remote ISL unit. Further, the data from the remote bus is not allowed to flow back to the local ISL unit until an ACK from the addressed device on the remote bus is transferred to the master device on the local bus.

Since the local ISL unit must enter an idle state before a bus compare cycle may be executed, it is conceivable that the requested data from the remote bus could be received before an idle cycle occurs. Since the remote control logic assures that data shall not be transferred from the remote ISL unit to the local ISL unit until an ACK response to a request has occurred, data from the remote bus is stored in the remote data file and address file register until after the appropriate acknowledgement response is made.

When the requested data from the remote ISL unit is forwarded to the local ISL unit, the full bit in the registers 92 and 103 transitions to a logic zero to free the RRQ path for further information traffic.

When an input I/O command is passed through the remote and local ISL units to the local communication bus, the local ISL unit applies the IsL channel address set in the hex rotary switch 140 through the multiplexer 138 and the transceivers 141 to the local communication bus. The local bus in response thereto generates a bus second-half bus cycle (BSSHBC) signal and a device address. The BSSHBC signal is received by transceiver 90 and the device address is received by transceiver 98. The device address is compared with the local ISL unit identification code by the comparator 99. If an equivalence occurs, the comparator 99 signals the local control logic. The control logic thereupon generates an ACK to the local communication bus. It is to be understood that all secondhalf bus cycles are ACKed and not WAITed or NAKed. Data from the local bus thereafter is immediately stored into the data file and address file registers 92 and 103. A local RRS cycle thereafter is queued by the local control logic, and upon the initiation of the cycle the information stored in the data file transmitter register 92 is routed through the data file transmitter register 121 and along tri-state bus 117 to the I1 inpput of the internal data multiplexer 129. The output of the multiplexer is applied to the ISL interface drivers 139. During a transfer cycle, the information at transceivers 115 and 139 is applied to receivers of the remote ISL unit. When information is received at receiver 116 from the remote ISL unit in response to a request from a device on the local communication bus, the address of the local bus device stored in data file registers 92 is applied through the I1 input of multiplexer 111 and the I2 input of transceivers 123 to the local bus. The data from the remote ISL unit is applied along tri-state bus 117 and through the I1 input of multiplexer 129 and the I3 input of multiplexer 138 to transceivers 141.

The memory test and set instructions of the information transfer mode are memory requests which use the internal ISL retry path to test a remote memory before responding to a local master. The associated data paths are identical to those of a local MRQ cycle, except that address information is retrieved from the memory reference register 126. The remaining bits 10-23 are received from the address file register 103 by way of bus 105 at the I2 input of transceivers 115. Bit 23 is the memory address translation bit for the test and set instruction. It is to be understood that the I2 and I3 inputs to the transceivers 115 are multiplexed. Thus, in the local ISL cycle, the address information is forwarded from memory reference register 126 and file register 103 to output drivers 115. Data from the data file register 92 is applied through data file transmitter 121, to data multiplexer 129 to the output drivers 139. No translation takes place in the remote ISL unit. The remaining ISL operations in a test and set instruction are the same as for a standard I/O cycle.

Before discussing the passing of communication bus interrupts through the ISL units, a more detailed discussion of CPU channel number translation is required. In addition to the channel number recognition function, an ISL unit performs a channel number translation of any CPU channel number within the range $000_{16}$ through $00F_{16}$. In the CPU architecture, the CPU channel number determines the location of the dedicated memory on a bus. Channel 0 uses locations 0 through 255, channel 1 uses locations 256 through 511, etc. Normally, the lowest priority CPU on a bus is assigned to channel 0, and the next highest priority CPU on a bus is assigned to channel 1. When like channel number assignments occur on more than one bus, the CPU channel numbers must be translated to avoid conflicts.

Figure 13:
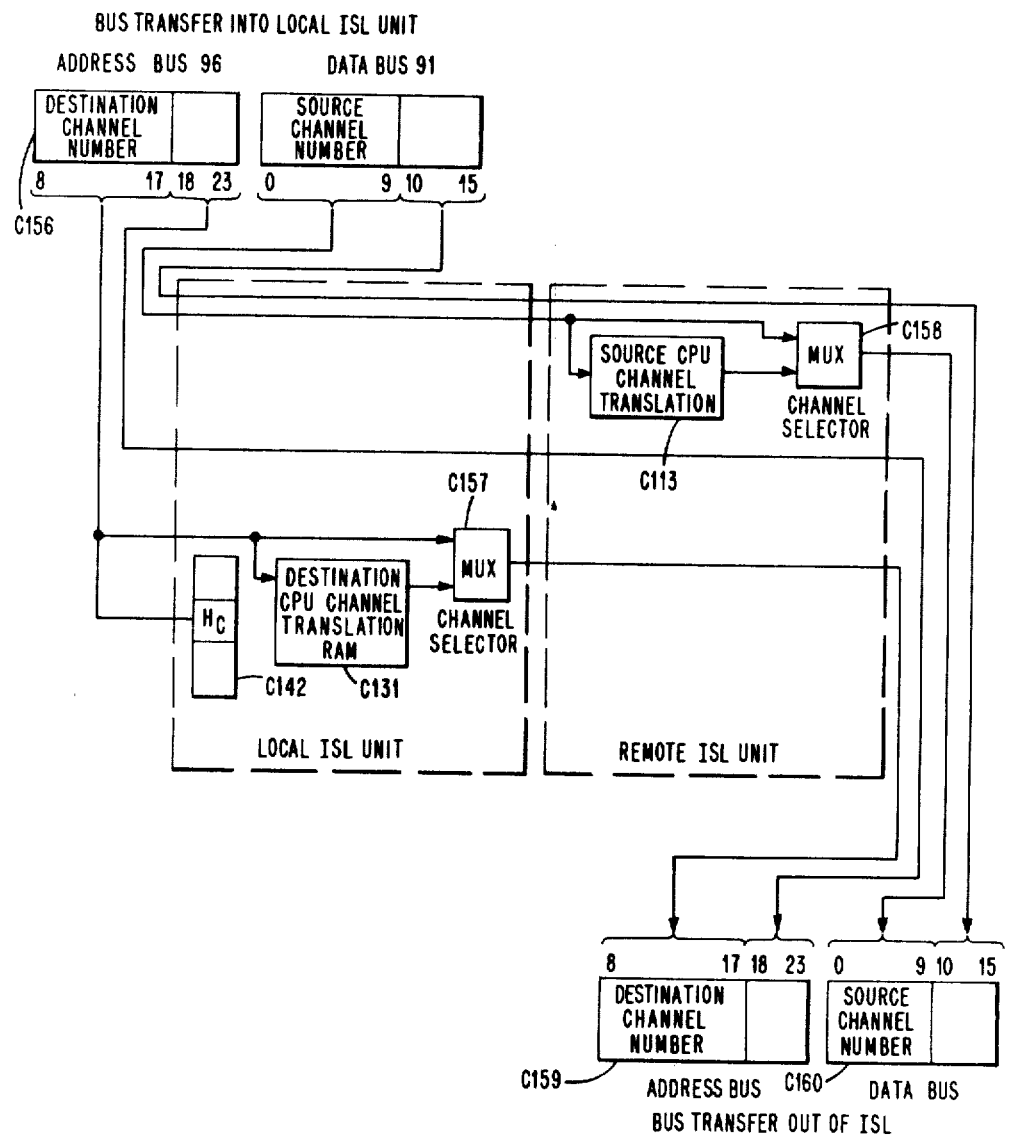
FIG. 13 is a partial functional block and partial graphic diagram of the information flow from a local communication bus through ISL twin units to a remote communication bus.

Referring to FIG. 13, the channel number recognition and translation information flow is illustrated for two cases. One wherein a bus cycle request is initiated by a local communication bus, and a second wherein a local response to a remote bus cycle request occurs. In the first case, a destination channel number is applied by way of the address bus 96 in accordance with the format indicated at 156 to the channel number mask RAM 142, and the CPU destination translation RAM 131. The channel mask RAM 142 contains hit bits for indicating whether a local ISL unit shall accept a particular channel number. A single channel number translation table is stored in two 16×4 bit RAMs, one in the local ISL unit and one in the remote ISL unit. The RAM located in the local ISL unit is referred to as the CPU destination channel number translation RAM, i.e. RAM 131. The RAM located in the remote ISL unit is referred to as the CPU source channel number translation RAM, i.e. RAM 113.

In the second case wherein a local response to a remote bus cycle request is made, a source channel number is applied by way of local data bus 91 and bus 117 of the remote ISL to the CPU source channel translation RAM 113 of the remote ISL unit.

Each ISL unit also includes a channel number selector. Referring to FIG. 13, the local ISL unit includes a channel selector 157 (corresponding to drivers 115 of FIG. 8) and the remote ISL unit includes a channel selector 158 (corresponding to multiplexer 137 of FIG. 8). Either the non-translated channel number for non-CPU channel numbers, or the translated channel number for CPU channel numbers is selected. The translated channel number is selected whenever one of the following three conditions occur: (1) The CPU channel numbers on the address bus are translated by the destination translation table; (2) the CPU channel numbers that are on the data bus during interrupts CPU to CPU are translated by the source translation table; and (3) the CPU channel numbers that are on the data bus as part of an Output Interrupt Control Command are translated by the source translation table, except when directed to the ISL. The formats of the destination and the source channel number information applied by the remote ISL unit to the remote communication bus are illustrated at 159 and 160, respectively.

There are four conditions under which a CPU translation occurs. In the first, a local communication bus device may attempt to interrupt a CPU on a remote communication bus. The local ISL unit thereupon shall initiate a local RRQ retry request cycle upon detecting a hit bit in the addressed cell of the channel mask RAM 142 if the location zero of file registers 92 and 103 is empty. The ISL interface output drivers 139 are loaded from the internal data multiplexer 129, the I1 input of which receives data from the data file transmitter register 121. Bits 0-13 and 18-23 of the ISL interface output drivers 115 are loaded from the address file register 103, while bits 14-17 are loaded from the CPU destination RAM 131. The RAM 131 in turn is addressed by the CPU address register 114 receiving the bits 14-17 output of file registers 103.

A second condition occurs when an I/O command to a remote communication bus device is comprised of a function code of 03. Such a function code identifies an output interrupt control instruction.

During a remote RRQ cycle, bits 6-9 of bus 117 are applied through register 136 to address RAM 113. The output of the RAM is applied through data multiplexer 137, multiplexer register 138 and transceivers 141 to the local bus. The RAM 113 output thus replaces the data bits representing a CPU channel address within the interrupt control information to be applied to a device on the remote communication bus.

In the third condition, the information flow is identical to that of condition two, except that the CPU source translation RAM 113 represents the source CPU channel address in the data field of a local CPU to remote CPU interrupt. The data field in the interrupt command contains the address of the source of the interrupt and interrupt level information.

The fourth condition occurs in the event an I/O command to a remote communication bus device is found to have a function code of 02, which identifies an input interrupt control command. During the local RRS retry response cycle in the remote ISL unit, which is generated in response to a second-half bus cycle from the addressed device on the remote communication bus, data bits 6-9 from data file transmitter register 121 are applied through the CPU address register 114 to the CPU destination RAM 131. The output of RAM 131 is loaded into bits 6-9 of the ISL interface drivers 139. Bits 6-9 represent the address of a remote CPU to be interrupted.

Referring again to the passing of I/O commands through the ISL units, it is to be understood that an interrupt is a cycle generated by a CPU or a PCU, and issued to a CPU. More particularly, during a BSDCNN cycle, the address information received from the local communication bus by way of transceivers 98 is presented to the channel address register 101 to address one of a 1024 locations in the channel mask RAM 142. If the output of RAM 142 transistions to a logic one level, local ISL unit of FIG. 8 becomes an agent for the BSDCNN cycle. More particularly, CPU address occur between hex 00 through 0F. When the output of RAM 142 transitions to a logic one level and the high order six bits 0 through 5 of the address information on bus 96 are zeros, the slave is a CPU. Since such an occurrence appears in a bus cycle other than a second-half bus cycle, the cycle is an interrupt cycle. Thus, if the local ISL unit receives the address of a CPU for which the ISL unit becomes an agent, the bus cycle must be an interrupt cycle. During an interrupt cycle, CPU addresses are translatable.

When it is determined that the local ISL unit shall become an agent for an interrupt cycle, the control logic of the local ISL unit awaits a next RRQ cycle. Upon the local ISL unit entering into an RRQ cycle, the remote ISL unit receives a translated address and data from the local ISL unit. The translated address is applied to the remote communication bus to interrupt the addressed CPU. The CPU thereupon shall ACK or NAK the interrupt. The ACK or NAK is sent directly back to the local ISL unit by way of the bus comparator 93 as before described. If the retry path of the local ISL unit is busy servicing a previous command, an interrupt cannot be processed. The ISL unit therefore shall NAK the interrupt request, and thereafter generate a resume interrupt command to the local bus when the previous command is fully serviced. The local bus thereupon may again issue an interrupt request to the adjacent ISL unit. If the interrupt were not NAKed then the interrupt would preclude a CPU from acquiring further communication bus cycles. In the case of multiple CPUs, an ISL control command called NAK RETRY is provided to accommodate the condition where a high priority CPU issues a request after a lower priority CPU acquired a bus cycle awaiting a response. The NAK RETRY response satisfies the higher priority CPU temporarily to allow the lower priority CPU to complete its task. A deadlock which may freeze-up the ISL communication path between communication buses thereby is prevented.

There are two CPU I/O intructions by which a command CPU identifies to a PCU the address of a CPU to be interrupted and the priority level of the interrupt. The two instructions are the output interrupt control instruction and the input interrupt control instruction. Such interrupt control information must be translated if the command CPU is on one communication bus and the PCU is on another communication bus. The CPU source translation RAM 113 and the CPU destination RAM 131 accommodates the translation of interrupt control information. The translation data flow paths are as previously described in connection with condition two and condition four CPU translations.

To conclude the information transfer mode description of the ISL unit of FIG. 3, the operation of the remaining functional devices used during the data transfer mode shall be described with the understanding that the same devices may have further functions during the ISL configuration mode. The function decoder PROM 102 decodes local communication bus commands to the Isl unit appearing at bits 18 through 23 of the address information on bus 96. Such commands may be received during the information transfer and ISL configuration modes. During the information transfer mode, however, the bus commands may include the input status, the input ID code, the reset timers/interrupt mask, and the output control word commands. All of the bus commands are responded to in the ISL configuration mode as shall be further described.

Table 5 is a decode table for the function decoder PROM 102.

The mode control register 135 is loaded during the execution of a control word command to be further described to indicate either an information transfer mode or an ISL configuration mode operation. The timer and status logic unit 133 includes a watchdog timer which is internal to the ISL unit, an I/O time-out unit, an ISL bus cycle time-out unit, and a communication bus cycle time-out unit which is encountered only when an ISL unit is attached to a communication bus having no CPUs. The timer units collectively enable the ISL unit to be transparent to the operation of the communication busses. The logic unit 133 further is comprised of status bit generators indicating the ISL operation mode, the clocks that are enabled, the presence of an interrupt, the type of interrupt, etc.

The interrupt channel register 132 and the interrupt level register 134 are loaded during an output interrupt control instruction to the ISL unit. The interrupt channel and level registers 132 and 134 are used by the ISL unit during an interrupt generation.

TABLE 5

| WORD NO. DEC | WORD NO. HEX | BIT POS. OUTPUT 3210 | WORD NO. DEC | WORD NO. HEX | BIT POS. OUTPUT 3210 | WORD NO. DEC | WORD NO. HEX | BIT POS. OUTPUT 3210 | WORD NO. DEC | WORD NO. HEX | BIT POS. OUTPUT 3210 | WORD NO. DEC | WORD NO. HEX | BIT POS. OUTPUT 3210 |
|---|---|---|---|---|---|---|---|---|---|---|---|---|---|---|
| 0 | 0 | | 52 | 34 | | 103 | 67 | 1111 | 154 | 9A | | 205 | CD | |
| 1 | 1 | | 53 | 35 | | 104 | 68 | | 155 | 9B | | 206 | CE | |
| 2 | 2 | | 54 | 36 | | 105 | 69 | | 156 | 9C | | 207 | CF | |
| 3 | 3 | | 55 | 37 | | 106 | 6A | | 157 | 9D | | 208 | D0 | |
| 4 | 4 | | 56 | 38 | | 107 | 6B | | 158 | 9E | | 209 | D1 | |
| 5 | 5 | | 57 | 39 | | 108 | 6C | | 159 | 9F | | 210 | D2 | |
| 6 | 6 | | 58 | 3A | | 109 | 6D | | 160 | A0 | | 211 | D3 | |
| 7 | 7 | | 59 | 3B | | 110 | 6E | | 161 | A1 | | 212 | D4 | |
| 8 | 8 | | 60 | 3C | | 111 | 6F | | 162 | A2 | | 213 | D5 | |
| 9 | 9 | | 61 | 3D | | 112 | 70 | | 163 | A3 | | 214 | D6 | |
| 10 | A | | 62 | 3E | | 113 | 71 | | 164 | A4 | | 215 | D7 | |
| 11 | B | | 63 | 3F | 0001 | 114 | 72 | | 165 | A5 | | 216 | D8 | 1010 |
| 12 | C | | 64 | 40 | 1000 | 115 | 73 | | 166 | A6 | 1110 | 217 | D9 | |
| 13 | D | | 65 | 41 | 1001 | 116 | 74 | | 167 | A7 | 1111 | 218 | DA | |
| 14 | E | | 66 | 42 | | 117 | 75 | | 168 | A8 | | 219 | DB | |
| 15 | F | | 67 | 43 | | 118 | 76 | | 169 | A9 | | 220 | DC | |
| 16 | 10 | | 68 | 44 | | 119 | 77 | | 170 | AA | | 221 | DD | |
| 17 | 11 | | 69 | 45 | | 120 | 78 | | 171 | AB | | 222 | DE | |
| 18 | 12 | | 70 | 46 | | 121 | 79 | | 172 | AC | | 223 | DF | |
| 19 | 13 | | 71 | 47 | | 122 | 7A | | 173 | AD | | 224 | E0 | |
| 20 | 14 | | 72 | 48 | | 123 | 7B | | 174 | AE | | 225 | E1 | |
| 21 | 15 | | 73 | 49 | | 124 | 7C | | 175 | AF | | 226 | E2 | |
| 22 | 16 | | 74 | 4A | | 125 | 7D | | 176 | B0 | | 227 | E3 | |
| 23 | 17 | 1010 | 75 | 4B | 0101 | 126 | 7E | | 177 | B1 | | 228 | E4 | |
| 24 | 18 | | 76 | 4C | | 127 | 7F | | 178 | B2 | | 229 | E5 | |
| 25 | 19 | | 77 | 4D | | 128 | 80 | | 179 | B3 | | 230 | E6 | 1110 |
| 26 | 1A | | 78 | 4E | | 129 | 81 | | 180 | B4 | | 231 | E7 | 1111 |
| 27 | 1B | | 79 | 4F | | 130 | 82 | | 181 | B5 | | 232 | E8 | |
| 28 | 1C | | 80 | 50 | | 131 | 83 | | 182 | B6 | | 233 | E9 | |
| 29 | 1D | | 81 | 51 | | 132 | 84 | | 183 | B7 | | 234 | EA | |
| 30 | 1E | | 82 | 52 | | 133 | 85 | | 184 | B8 | | 235 | EB | |
| 31 | 1F | | 83 | 53 | | 134 | 86 | | 185 | B9 | | 236 | EC | |
| 32 | 20 | | 84 | 54 | | 135 | 87 | | 186 | BA | | 237 | ED | |
| 33 | 21 | | 85 | 55 | | 136 | 88 | | 187 | BB | | 238 | EE | |
| 34 | 22 | | 86 | 56 | | 137 | 89 | | 188 | BC | | 239 | EF | |
| 35 | 23 | | 87 | 57 | | 138 | 8A | | 189 | BD | | 240 | F0 | |
| 36 | 24 | | 88 | 58 | 1100 | 139 | 8B | | 190 | BE | | 241 | F1 | |
| 37 | 25 | | 89 | 59 | 1101 | 140 | 8C | | 191 | BF | | 242 | F2 | |
| 38 | 26 | 1110 | 90 | 5A | | 141 | 8D | | 192 | C0 | | 243 | F3 | |
| 39 | 27 | 1111 | 91 | 5B | | 142 | 8E | | 193 | C1 | 0001 | 244 | F4 | |
| 40 | 28 | | 92 | 5C | | 143 | 8F | | 194 | C2 | | 245 | F5 | |
| 41 | 29 | | 93 | 5D | | 144 | 90 | | 195 | C3 | | 246 | F6 | |
| 42 | 2A | | 94 | 5E | | 145 | 91 | | 196 | C4 | | 247 | F7 | |
| 43 | 2B | | 95 | 5F | | 146 | 92 | | 197 | C5 | | 248 | F8 | |
| 44 | 2C | | 96 | 60 | 1010 | 147 | 93 | | 198 | C6 | | 249 | F9 | |
| 45 | 2D | | 97 | 61 | | 148 | 94 | | 199 | C7 | | 250 | FA | |
| 46 | 2E | | 98 | 62 | | 149 | 95 | | 200 | C8 | | 251 | FB | |
| 47 | 2F | | 99 | 63 | | 150 | 96 | | 201 | C9 | | 252 | FC | |
| 48 | 30 | | 100 | 64 | | 151 | 97 | | 202 | CA | | 253 | FD | |
| 49 | 31 | | 101 | 65 | | 152 | 98 | | 203 | CB | | 254 | FE | |
| 50 | 32 | | 102 | 66 | 1110 | 153 | 99 | 1010 | 204 | CC | | 255 | FF | |
| 51 | 33 | | | | | | | | | | | | | |

The interrupt channel register 132 is a four-bit register indicating the address of the CPU to be interrupted. The interrupt level register 134 is six bits wide, and indicates the priority level assigned to the interrupt. A CPU on a communication bus may sense the interrupt level to control software operations internal to the CPU.

When a CPU is to be interrupted, the output of the interrupt channel register 132 is applied to the I2 input of address multiplexer 112. The output of multiplexer 112 is applied through multiplexer 111 and transceivers 123 to provide the address of the CPU to be interrupted. To that end, bits 6 through 9 of the address bus are surplanted with four bits from the interrupt channel register 134. The output of register 134 is applied through the I2 input of data multiplexer 129 to bits 10-15 of data multiplexer/register 138. Bits 0-9 of multiplexer/register 138 are supplied by hex rotary switch 140 to signal to an interrupted CPU that the ISL unit is the interrupting unit.

In response to a mask address instruction to be further described, the RAM counter 118 and RAM control register 108 are loaded with address and write enable nformation for each of the hit bit and translation RAMs. An output mask data instruction loads translation data into translation RAM locations addressed by the output mask address instructions.

The cycle generator 146 is comprised of decision control logic for selecting the cycle of operation, and generating timing signals for controlling the operation of the ISL unit during the selected cycle. The cycle generator receives two inputs. The first is a remote cycle signal on line 143 leading from the remote ISL unit. The second input is the file register activity 2DO bits carried by line 144 to indicate a request for local ISL unit cycles. IN response to the two inputs, the cycle generator 146 provides timing signals for controlling the operation of the ISL unit.

The I/O load (IOLD) register 127 is loaded with a translated memory module address when an I/O load command is issued to a controller. The I/O load command is comprised of two subcommands, memory address and memory range. The memory address portion of the I/O command requires memory translation. Thus, the translation bits from RAM 125 are loaded into the IOLD register in response to an I/O command.

In further describing the operation of an ISL unit in response to an IOLD instruction, memory locations shall be described with reference to memory module addresses. Module addresses are the translated bits of a memory address. For example, a local memory unit has 32.0 K bits of memory comprised of four modules each consisting of 8.0 K memory locations. A local memory unit thus would be responsive to module addresses 0, 1, 2 and 3. In the preferred embodiment described herein, both the local and the remote communication busses have memory units with four memory modules each. In addition, both the local and the remote ISL units are configured to provide visibility to each communication bus. Thus, each bus would have access to eight memory modules of memory.

When a CPU on a local communication bus instructs a peripheral control unit (PCU) on a remote communication bus to communicate with a memory module on the remote bus, the local CPU shall issue an IOLD instruction to the remote PCU. The IOLD instruction shall designate a memory module address higher than that of any memory module available on the local bus. The local ISL unit thus shall respond to a RAM 142 channel hit bit corresponding to the remote PCU, and shall use the address bits on bit lines 0-7 of the address bus 96 and bit lines 0 and 1 of the data bus 91 to address the memory translation RAM 125. In the addressed location of RAM 125, the translated memory module address of the remote PCU shall be stored. The translated address is transferred to the IOLD register 127 for transfer during an RRQ cycle to the remote ISL unit. The remote PCU upon receiving the translated address shall directly access the remote memory module.

In the case where a local CPU instructs a remote PCU to communicate with a local memory module, the local CPU issues an IOLD instruction to the local ISL unit. The local ISL unit shall accept the instruction or command and shall use the twenty-four bit address on busses 91 and 96 to address the RAM 125. The output of the RAM is stored in the IOLD register 127, and later issued to the remote PCU as before described. The remote PCU in turn shall address a memory module having an address higher than that of any memory module on the remote bus. The remote ISL unit shall be configured to translate the memory module address supplied by the remote PCU to the memory module address on the local bus to which the remote PCU has been instructed to communicate. The only difference between an IOLD and a standard I/O command is the input path to tranceivers 115. In an IOLD instruction, bits 0 through 9 are provided by register 127 rather than register 126.

IOLD instruction are accepted by an ISL unit whenever they address a channel number which is recognized by the channel mask RAM 142. The ISL unit performs a translation on the address portion of IOLD instruction. The format of the IOLD instruction is shown in Table 6. The translation applies to the ten most significant bits of the address which are contained in the bits 0 through 7 of the address bus 91 and bits 0 and 1 of the data bus 96. The ten most signficant bits of the address portion of the IOLD instruction are replaced by the contents of the addressed location of the memory address translation RAM 125.

During the initialization of the ISL unit, the memory address translation RAM 125 is loaded with all logic ones. The CPU software on a communication bus need only load those specific RAM locations where IOLD instructions are expected to be addressed. If an IOLD address falls outside of the specified locations, it will be translated to an address between 8.0 million and 8.0 million minus 8.0 K words. As long as the addressed memory is not used on a system containing an ISL unit, any programming error will lead to a non-existent resource status from an I/O controller.

In configuring an ISL unit to handle IOLD instructions, two cases must be considered.

In the first case, a controller accesses a memory module on the remote bus in response to an IOLD instruction issued on the local bus which references a memory module of the local bus. The address translation location in RAM 125 corresponding to the local memory module must be loaded with the most significant bits of the memory module of the remote bus. The controller thereafter shall seek the IOLD memory address on the remote bus.

TABLE 6
IOLD INSTRUCTION FORMAT

1. ADDRESS BUS

| 0 | 7 | 8 | 17 | 18 | 23 |
|---|---|---|----|----|----|
| Address Bits 0 through 7 | | Destination Channel No. | | FC = 09 | |

2. DATA BUS

| 0 | 15 |
|---|----|
| Address Bits 8 through 23 | |

3. ADDRESS BUS

| 0 | 7 | 8 | 17 | 18 | 23 |
|---|---|---|----|----|----|
| MBZ | | Destination Channel No. | | FC = 0D | |

4. DATA BUS

| 0 | 15 |
|---|----|
| Range | |

It is to be understood that a hit bit for the remote memory module in RAM 125 has no effect on the IOLD address translation. If there is a logic zero hit bit at the addressed location, the memory exists physically on the local bus. If there is a logic one hit bit, the memory module is visible to a CPU on the local bus, but is physically located on the remote bus.

In the second case to be considered, a remote controller accesses a memory module on the local bus in response to an IOLD instruction on the local bus. Since the memory module is actually on the local bus, the RAM 125 shall issue a logic zero hit bit. It is seen that in this case two address translations are required. Once to transfer the IOLD instruction to the remote controller, and once to allow the remote controller to access local memory.

In the ISL configuration mode, the ISL unit responds to a total of nine I/O instructions or commands which transfer data to or from an ISL unit. The I/O commands are listed in Table 7. No data transfers between the communication busses occurs during the configuration mode. Rather, the ISL units are loaded during the configuration mode to accomodate communication between the busses during the ISL information transfer mode.

TABLE 7
BUS I/O COMMANDS TO ISL

| TYPE | FUNCTION CODE | COMMAND |
|------|---------------|---------|
| I/O Output | 01 | Control Word |
| | 03 | Interrupt Control |
| | 27 | Reset Timers/Interrupt Mask |
| | 0B | Output Mask Address |
| | 11 | Output Mask Data |
| I/O INPUT | 02 | Interrupt Control |
| | 10 | Input Mask Data |
| | 18 | Status Word |
| | 26 | Device ID |

Internal to the ISL unit is an active/passive state switch to be further described in connection with the description of FIGS. 14. The switch controls the visibility of the ISL unit to configuration commands. The effect of the switch upon the ISL units acceptance of local and remote bus commands is shown in Table 8 and described below. In the active state, the ISL unit responds to any configuration command received during the ISL configuration mode. If in the passive state, the ISL unit will respond to only selected configuration mode commands. Through the use of the active/passive state switch, the local and remote ISL units may be configurable from one bus or from independent busses.

It is to be understood that in the following discussion, cycles are referred to as being local when generated from a communication bus. When a cycle is generated from the intra-ISL interface, however, the cycle is referred to as being remote. When a bus command is issued to an ISL unit, the ISL unit detects its address at address comparator 99 and decodes a six-bit function code on bus 96 at PROM 102. The four-bit output of PROM 102 is held in an output register for internal use. The ISL address comparator 99 signal shall set the RRQ activity 2DO bit and full bit, thus initiating a local RRQ cycle which is used to control data flow for all ISL commands. The RRQ cycle will activate the function code decoder 106. When the PROM 102 output bits are applied by way of address bus 105 to decoder 106, one of the 16 possible outut control lines are activated to indicate the specific command to be executed.

TABLE 8
ACTIVE/PASSIVE STATE SWITCH

| COMMAND | ACTIVE | PASSIVE | STANDBY | ONLINE | STOP | TEST | NAME |
|---------|--------|---------|---------|--------|------|------|------|
| 01 | ✓ | | ✓ | ✓ | ✓ | ✓ | Control Word |
| 03 | ✓ | | ✓ | | ✓ | ✓ | Interrupt Control |
| 27 | ✓ | ✓ | ✓ | ✓ | ✓ | ✓ | Reset Timers/Interrupt Mask |
| 0B | ✓ | | ✓ | | ✓ | ✓ | Output Mask Address |
| 11 | ✓ | | ✓ | | ✓ | ✓ | Output Mask Data |
| 02 | ✓ | | ✓ | | ✓ | ✓ | Interrupt Control |
| 10 | ✓ | | ✓ | | ✓ | ✓ | Input Mask Data |
| 18 | ✓ | ✓ | ✓ | ✓ | ✓ | ✓ | Status Word |
| 26 | ✓ | ✓ | ✓ | ✓ | ✓ | ✓ | Device ID |

ISL commands cause either one, two or three internal ISL cycles to occur. Local input or output commands will initiate a single RRQ cycle in which data is loaded into a specific register or read from a specific register. Input commands will also result in a (BSSHBC) second-half bus cycle being generated by the local ISL unit to a master CPU which requested data. Remote ISL output commands will result in two cycles. The first cycle is a local RRQ cycle during which data from the data file register 92 is transferred to the remote ISL unit as in a standard RRQ cycle. In addition, information on bus 105 including function codes from PROM 102 and other function code specific information is presented to the Isl drivers 115 for transfer to the remote ISL unit. The second cycle occurs in the remote ISL unit as a remote RRQ cycle, during which data is stored in the same manner as information occurring on busses 105 and 117 of the local ISL unit.

Remote ISL input commands require three cycles. The first cycle is the same as with output commands. The second cycle is the same as that for output commands except that data is read from specific registers and presented to a data bus corresponding to bus 117 in the remote ISL unit, and transferred to the local ISL unit by way of interface drivers corresponding to drivers 139. In the local ISL unit, data is received by data receivers 116 during a remote RRS cycle. The RRS cycle is generated to transfer the data to the local bus through data multiplexer 129 and data multiplexer/register 138 to data transceivers 141. Address information is retrieved from the data file register 92, and applied through address multiplexer/register 111 to transceivers 123.

As before described, each ISL unit has a channel number which is used when a CPU addresses an ISL unit. When a command is to pass through an ISL unit, however, the CPU destination channel number is used. A CPU on a specific bus may address the local ISL unit on the local bus, or it may address the remote ISL unit through the local ISL unit. The channel numbers of each ISL unit are determined by DIP switches. In principle then, the ISL commands of Table 7 apply to either ISL units and may be issued from either bus. The ACTIVE/PASSIVE switch in each ISL twin enables or disables the ability of that ISL unit to be controlled from the local bus.

A first bus instruction to be described is an output control command having a 01 function code as shown in Table 7. The data field of the command word provides a mode control including data transfer/configuration, initialization, stop, resume, NAK/RETRY and test modes as shown in Table 9 wherein an X indicates either a logic zero or a logic one may occur. There are two test mode bits, bits 2 and 3. One bit indicates the memory reference mode, and the other controls the response of the ISL unit to local or remote bus cycles.

TABLE 9

| BIT 0 | BIT 1 | BIT 2 | BIT 3 | BIT 4 | |
|---|---|---|---|---|---|
| 1 | X | X | X | X | Initialize |
| 0 | 1 | X | X | X | Stop |
| 0 | 0 | X | X | X | Resume |
| 0 | X | X | X | 1 | NAK retry noncompares |
| 0 | X | 1 | X | X | Return nonmemory references as memory references |
| 0 | X | X | 1 | X | Remote ISL unit responds only to its own bus cycles |

System initialization is controlled by bit 0 of the control word command. The bit is sensed by the master clear generator 94 to clear the ISL RAMs. Bits 0 and 1 of the control word command causes the ISL unit to enter into a non-data transfer state upon servicing existing requests. Thus, if the ISL unit has acknowledged that it shall act as an agent for a communication bus cycle, the ISL unit shall continue to service that request until all communications required to satisfy that request are completed. Any other data transfer requests occurring after the configuration mode command is initiated will be ignored. The command places the ISL unit in a mode to allow the servicing of standard communication bus requests. In the case of a multiple CPU system, the NAK/RETRY logic may be initiated by bit 4 of the control word command to NAK a CPU of higher priority to allow an ISL data transfer to continue for a lower priority CPU.

The control word command is assigned the highest priority in the ISL system, since it controls the mode of operation. It can only be issued, however, when the ISL unit is in an active state. In a passive state, the ISL unit will not accept the output control command. The output control command requires two cycles as previously described which load the mode control register 135 in both the local and the remote ISL units.

The output interrupt control command having a 03 function code loads registers 132 and 134 with interrupt data during the configuration mode and in the active state only. If the ISL unit is in the passive state, this command will not be accepted. The output interrupt control command may be issued to either the local or remote ISL unit and requires one or two cycles as previously described.

This command is a 16-bit command which will identify the CP channel number and interrupt level which the ISL will use when interrupting a CPU. The command has the following format:

| 0 | 5 6 | 9 10 | 15 |
|---|---|---|---|
| DON'T CARE | CP CHANNEL NO | INTERRUPT LEVEL | |

Register 132 is loaded with the four-bit address of a CPU which the ISL unit is to interrupt when an interrupt condition is encountered. The most significant six bits of a CPU address are always logic zeros. Register 134 is loaded with a six-bit field designating an interrupt level which the interrupted CPU uses in defining interrupt priority.

The reset timer command, function code 27, controls the resetting of all timer status bits. The command further controls the enabling or disabling of the local or remote watchdog timer, the enabling or disabling of the I/O or retry timers, and the enabling or blocking of remote ISL interrupts. The memory timer is always enabled. When one of the timer errors is activated by the occurrence of an error, the timer must be reset by the reset timer command.

As before described, both the output timer data and status information are loaded into logic unit 133. The logic unit thereby may indicate the status of each timer's operation.

The reset timer command further may be used to turn the watchdog timer on and off while in the data transfer mode or the configuration mode, on in the active or passive states. If the timer is not strobed within a predetermined time period, a high priority interrupt is handled within the interrupt architecture of a CPU. In the event that the logic decision flow is unable to exit from a CPU control loop, the watchdog timer is enabled to provide an exit means. In the preferred embodiment described herein, there is a local watchdog timer and a remote watchdog timer. Each timer and the interrupts emanating therefrom may be CPU controlled. The reset timer may be assigned to either the local or remote ISL unit, and generate one or two cycles as previously described. The format of the reset timer command is defined in the following Table 10.

TABLE 10 bit 0 = 1   Reset Memory Hang Up Timer Status

TABLE 10-continued

| | |
|---|---|
| bit 1 = 1 | Reset I/O Hang Up Timer Status |
| bit 2 = 1 | Reset Watchdog Timer and Status Bit |
| bit 3 = 1 | Reset Retry Timer Status |
| bit 4 = 0 | Block Local Watchdog Timer & Interrupts |
| bit 4 = 1 | Enable Local Watchdog Timer & Interrupts |
| bit 5 = 0 | Block Remote Watchdog Timer Interrupts |
| bit 5 = 1 | Enable Remote Watchdog Timer Interrupts |
| bit 6 = 0 | Block Remote Interrupts |
| bit 6 = 1 | Enable Remote Interrupts |
| bit 7 = 0 | Disable I/O and Retry Hang Up Timers |
| bit 7 = 1 | Enable I/O and Retry Hang Up Timers |
| bit 8–15 | RFU |

The output mask address command, function code 0B, and the output mask data command, function code 11, intiate an ISL configuration by writing into the memory address translation RAM 125, the channel mask RAM 142, and the CPU translation RAMs 113 and 131.

The output mask address command can only be issued to an ISL unit when in the active state, and only to the local ISL unit. Thus, only one cycle is required as previously described. The output mask address instruction will load into RAM counter 118 the address and write enable information pertaining to specific translation RAMs into which data presented during an output mask data instruction is to be written. More particularly, the RAM counter 118 is used for addressing the memory address translation RAM 125, the channel mask RAM 142, the CPU destination RAM 131 and the CPU source RAM 113 during an ISL configuration time period. The address of the RAM location to be modified is stored in the RAM counter 118, and applied to the RAM control register 108. The register 108 is a tri-state device interfacing with the address bus 105. The contents of the register are used to address the memory address translation RAM 125, the channel address registers 101, source address register 114 and CPU address register 136. Data appearing on the data bus 117 thereby may be written into the addressed locations.

The output or input mask data commands increment counter 118. In using the counter, contiguous locations of the ISL RAMS may be addressed without having to reissue output mask address commands. The counter facilitates this operation by sequentially addressing from a start location.

When the output mask address instruction is issued to a local ISL unit, the data received from the local communication bus and stored in the data file register 92 is applied through the register 121 and along bus 117 to the input of RAM counter 118.

As before described, ten bits of a memory address are used to address 1024 locations of memory by way of a memory address multiplexer 100 and a channel address register 101. The thirteen bit input to the RAM counter 118 includes an address representing one of the 1024 locations in RAMs 142 or 125, and an enable for writing into any or all translation RAMs. The low order four bits are used to address RAMs 131 and 113. Bits 3, 4 and 5 of the bus 117 represent the write enable signals.

When the bits 3, 4 and 5 of bus 117 are applied through RAM counter 118 and RAM control register 108 to bus 105, they become address bits 5, 6 and 7, respectively. Address bit 5 will enable a writing into CPU RAMs 131 and 113. Address bit 6 enables channel mask RAM 142, and address bit 7 enables memory mask RAM 125. It is thus seen that in response to the output mask address instruction, the ISL unit shall store into counter 118 the RAM addresses in which data is to be written. To this end, bits 0 through 15 of the data file register 92 are stored into the counter 118. Of the sixteen bits, ten bits represent RAM addresses and three bits are write control bits.

The output mask data command, which may be issued only during the configuration mode and in the active state, presents data to be written into the location addressed by the output mask address command. The output mask data may be issued to either local or remote ISL units, and shall require one or two internal cycles as previously described. In response thereto, data stored in the data file register 92 is applied through register 121 to the data bus 117. Function code information is supplied by PROM 102 as before described, and decoded by the function code decoder 106. The output of the decoder 106 instructs the local control logic to route the data on bus 117 to one of the RAMs 142, 125, 113 or 131 for a write operation. The starting address of the location of the identified RAM into which data is to be written is identified by counter 118. The address is applied through the RAM control unit 108 and along bus 105 to address one of the memory cells of the identified RAM. Bits 5, 6 and 7 of the register output of counter 118 thus become write enable strobes for the RAMs 131, 113, 125 and 142.

The specific timing of the write operation is handled by the cycle generator 146. Write pulses are generated for each enabled RAM of the local ISL unit. Data thereby may be written into any or all of the RAMs.

Either the local or the remote ISL unit may be loaded by an output mask data instruction. The output mask address instruction, however, is applied only to a local ISL unit. Thus, if data were written into a local RAM from location zero, another output mask address instruction would not have to be issued to write into the remote RAMs from location zero. Only an output mask data instruction issued to the remote ISL unit would be required.

It is thus seen that the output mask address and output mask data commands operate in pairs to load the four configuration RAMs in the ISL. The format of the commands to load the memory address translation mask RAM 125 is:

Output Mask Address

| 0 | 4 | 5 | 6 | 15 |
|---|---|---|---|---|
| MBZ | | 1 | Mem Mask Address | |

Output Mask Data

| DONT CARE | H M | Mem Translate Adrs |
|---|---|---|

The output mask address command establishes the starting location of the RAM counter 118. The output mask data command loads a ten-bit quantity into a previously designated location, and increments the counter. To load the next consecutive location, only the output mask data command need be issued. The $H_m$ (memory hit) bits are all initialized to zero, and the memory mask data is initialized to all logic ones.

In loading the channel mask RAM 142. the commands have the following formats:

Output Mask Address

| 0 | 3 4 | 5 6 | 15 |
|---|---|---|---|
| MBZ | | 1 | Channel Mask Adrs |

Output Mask Data

| DONT CARE | H C | DONT CARE |
|---|---|---|

The output mask address command establishes the starting location of a RAM counter 118. The output mask data command loads the $H_C$ (channel hit) bit to cause the ISL to respond to that channel number. In addition, the output mask data command causes the counter 118 to increment. To load a hit bit into a next consecutive location, only the output mask data command need be issued.

In order to load a CPU translation RAM, RAM 131 or 113, the output mask address and mask data commands have the following formats:

| Output Mask Address | 0 2 3 4 11 12 15 |
| --- | --- |
| | MBZ \| 1 \| MBZ \| CP XLATE FROM |
| Output Mask Data | 0 3 4 15 |
| | CP XLATE TO \| DONT CARE |

The output mask address command identifies a CPU channel number. The output mask data command defines the value that the channel number will be translated to as it passes through the ISL unit. In addition, the output mask data command increments the counter 118 to the next consecutive value.

The input commands now shall be described. The input interrupt control command, function code 02, is similar to the output interrupt control command. The command requires one or three cycles as previously described for local or remote ISL commands, and the ISL unit must be in configuration mode and active state. Rather than load the interrupt channel register 132 and the interrupt level register 134, however, the command routes the data to the internal data multiplexer 129. The data thereafter is routed through multiplexer 129 and multiplex register 138 to the data transceivers 141. The contents of the data file register 92, which contains the address of the master device, will be routed through address multiplexer/register 111 and to address transceivers 123.

The input interrupt control command causes the ISL unit to apply the contents of the interrupt registers 132 and 134 to the data multiplexer 129. The interrupt channel register 132 provides four bits indicating a CPU channel number, and the interrupt level register 134 provides six bits of interrupt level information. The format of the command is the same as that for the output interrupt control command.

The input mask data command, function code 10, causes an ISL unit to read the contents of the memory cell which was previously addressed by an output mask address command. More particularly, the local control logic senses the address loaded in the counter 118, and initiates a reading of each of RAMs 113, 125 and 142. A single channel mask bit is read from RAM 142, ten memory translation bits and a hit bit are read from RAM 125, and four CPU definition bits are read from RAM 131. A total of sixteen bits, therefore, are applied through transceivers to either the local or remote communication busses. The input mask data may be issued to both local and remote ISL units, thus resulting in one or three cycles as previously described.

The input mask data command further provides a post increment capability when the RAM counter 118 has been loaded with an initial count. Location zero of a RAM may first be read, followed by 1024 input mask data commands read out of all 1024 locations. Since the RAM data should be a hexadecimal 03FF when initialized, any other data indicates that a translation or hit bit resides in the addressed memory location. The ISL must be in the configuration mode and in an active state.

The format of the input mask data command as compared to the output mask address command is:

| Output Mask Address Command | 0 5 6 15 |
| --- | --- |
| | Don't Care \| Mask Address |
| Input Mask Data Command | 0 3 4 5 6 15 |
| | CP Xlate Chnl NO \| $H_C$ \| $H_M$ \| Mem Xlate Adrs |

The output mask address command sets a starting location in counter 118. The input mask data command provides the contents of the addressed location, and increments the counter. To read the next location, only the input mask data command need be issued. The input mask data command returns the contents of all of the ISL configuration RAMs at the same time. For a specific address, the corresponding memory translate address, the $H_m$ (memory hit) bit, the Hc (channel hit) bit and the CPU translate channel number are returned. Because the CPU channel number translation memory has only sixteen locations, an output address of 0 will return the identical location as would $010_{16}$, $020_{16}$, etc.

The input status word command, function code 18, causes the status bits stored in logic unit 133 to be read. The state of the timers, the occurrence of pending interrupts and the logic state of the ISL unit thereby may be determined. A status word command may be issued in either the data transfer or the configuration modes, and in either the active or passive states. The status bits are defined in Table 11.

A further input command is the input device ID command which may be issued in either the information transfer or the ISL configuration modes, and in either the active or the passive states. The ISL ID is a fixed number that is identical for every ISL unit regardless of address. The command is unique in that only the local ID is read, no matter whether the local or the remote ISL unit is addressed. If the remote ISL unit is not electrically connected to the local ISL unit, however, the ID number that will be read onto the local bus shall, for example, be a hexadecimal 2400.

TABLE 11

| | ISL STATUS BITS | |
| --- | --- | --- |
| BIT | IDENTIFICATION | DEFINITION |
| 0 | On Line | Both ISL units are operational with power on. |
| 1 | Remote Interrupt | This bit is a composite status bit representing three remote status bits and subject to two mask bits. It will be true if: Remote WDT Mask Enabled (Bit 5 of FC=27) AND |

TABLE 11-continued
ISL STATUS BITS

| BIT | IDENTIFICATION | DEFINITION |
|---|---|---|
| | | Remote WDT Timeout (Bit 6 of Remote Status) OR Remote Error Mask Enabled (Bit 6 of FC=27) AND Remote Non-Existant Resource (Bit 13 of Remote Status) |
| 3 | Active Switch | The local twin is in the active state. |
| 6 | Local WDT Timeout | This condition is subject to the Local WDT Mask (bit 4 of FC=27) |
| 8 | Retry Hangup | The retry hangup timer has expired. |
| 9 | IO Hangup | The IO hangup timer expired. |
| 10 | Memory Read Hangup | The memory read hangup timer expired. |
| 13 | Non-Existant Resource | The ISL received a NAK from memory on one of its non-locked memory operations. |
| 14 | Bus Parity | The ISL detected bad parity on a transfer directed to it. |
| 2, 4, 5, 7, 11, 12, 15 | RFU | |

If each of the ISL units are electrically connected and powered, the ID number may be, by way of example, a hexadecimal 2402. The input device ID command thus may be used by a diagnostic programmer to determine whether a local and/or a remote ISL unit is connected.

A more detailed discussion of the test mode operation of an ISL unit shall now be made. In an output control word instruction, there are two test or wraparound mode bits as before described. Bit 2 is referred to as a total test mode bit, and bit 3 is referred to as a remote test mode bit. When a total test mode bit is set, each of the ISL units enter a test mode. When the remote test mode bit is set, however, only the remote ISL unit is affected.

In a test mode, one of two logic paths shall be used. When the total test mode bit is set, a memory loop-back logic path is used. An I/O loop-back logic path requires both the total test mode and the remote test mode bits to be set.

In the memory loop-back logic path, the local and remote ISL unit must be configured to act upon addresses issued by the local communication bus. More particularly, when a CPU issues a memory reference instruction to a local communication bus wherein an address other than a local memory address is indicated, the local ISL unit shall transfer a translation of that information to the remote ISL unit. If the indicated address is configured in the remote ISL unit, the remote ISL unit returns the information to the local ISL unit. A loop-back thereby is initiated to again translate the information in the local ISL unit for application to the local bus. It is to be understood that even though a memory address does not exist on either the local or the remote memory bus, the local and remote ISL units may be configured to recognize the memory address and act as an agent for the associated memory cycle. The ISL units, therefore, issue ACKs in response to the memory address as before described.

A significant characteristic of the test mode is that the local and remote ISL units may be dynamically tested without interrupting system operations on a remote communication bus. No devices on the remote bus are used, and no more than a single bus cycle is lost. Another feature is that no task in operation is interrupted before completion.

When an I/O loop-back test is to be conducted, the same logic paths are used as for data. The ISL cycles which are generated in the ISL units, however, are different. Further, the channel address register 101 and the channel mask RAM 142 are exercised, rather than the memory address register 100 and the memory address translation RAM 125 which were used in the memory loop-back test. In operation, an I/O command to a channel number is issued. Since the channel number is carried by an I/O request and not a memory request, the channel number is not translatable. Rather, the channel number which must not refer to channel numbers on the local or remote bus is converted to a memory address on the loop-back to the local communication bus. In reading or writing into local memory, the memory request is transferred through the local to the remote ISL unit, and back through the local ISL unit. It is to be understood that if the selected channel number occurred on either the remote bus or the local bus, an ACK would be generated outside the ISL units. Thus, a channel number which is not recognized by either the local or the remote bus must be applied to the channel mask RAM 142. Since the RAMs may be configured to recognize the channel number, the channel is transferred from the local to the remote ISL unit, and thence back to the local ISL unit. The channel number with the remainder of the address bus information must convert to an actual memory address on the local bus for a successful test to be detected.

The test mode bits set to initiate an I/O loop-back test also transition a memory reference line in the local control logic to a logic one state. When the loop-back information is received from the remote ISL unit at receivers 104 and 115, and loaded into the multiplexers 111 and 138, therefore, the address information including the channel number becomes a memory address. A memory location on the local bus thereby may be read or written into to provide a logic test. A distinction between the memory loop-back test and the I/O loop-back test is that during the memory loop-back only MRQ and MRS inter-memory cycles are used. During the I/O loop-back test, however, RRQ and RRS internal cycles are used. The memory cycles are always acknowledged while the I/O cycles are not initially acknowledged. Rather, a WAIT Is issued before a local RRQ cycle takes place in the remote unit. As a result of an RRQ local cycle in the remote ISL unit, there is generated a remote RRQ cycle in the local ISL unit. Upon the occurrence of the remote RRQ cycle in the local ISL unit, the I/O command is converted to a memory address from local memory, and transferred from the local ISL unit to the remote ISL unit. Upon an equivalence occurring at the remote ISL unit's bus comparator corresponding to comparator 99, the remote ISL unit shall transfer an ACK from the remote bus to the local ISL unit. Upon an equivalence occurring at the bus comparator 93 of the local ISL unit, the ACK shall be transferred to the local bus. The CPU on the local bus initiating the RRQ request thereupon shall be satisfied, and shall cease generating RRQ requests. It is thus apparent that two loop-back tests may be conducted to test the local and remote ISL logic. One test in response to an RRQ request, and one test in response to an MRQ.

Referring again to the ISL configuration mode, it is to be understood that an ISL unit is configured through the use of the I/O output commands. More particularly, the control word command effects the loading of the mode control register 135, the interrupt control word effects the loading of the interrupt channel register 132 and the interrupt level register 135, and the reset timer command effects the loading of the timer and status logic unit 133. In addition, the output mask address command effects the loading of the RAM counter 118 and the RAM control register 108. The output mask data command is used to load data into the ISL RAMs.

The data loaded into the ISL unit during an ISL configuration may be verified through the use of the I/O input commands.

Each ISL unit includes five timers, to be further described in connection with the description of FIGS. 14, for the purpose of detecting and clearing hangup conditions. The timers are reset by the before-described reset timer commands. If a second-half bus cycle from memory is not forthcoming within a predetermined period as indicated by a memory hangup timer, the ISL shall complete a read request by sending an invalid data word to the requestor. In the preferred embodiment described herein, a predetermined time period of approximately six microseconds is used.

If a second-half bus cycle from an I/O controller is not forthcoming within approximately 200 milliseconds, by way of example, an I/O hangup timer shall issue a signal to cause the ISL unit to complete an input request by sending a meaningless data word to the requestor with bad data parity and a RED indicator set. The I/O hangup timer is enabled by the reset timers command.

If a local bus cycle is not completed within seven microseconds, a dead man time-out issues a signal to cause the ISL unit to issue a NAK. This is a service to the bus rather than to the ISL unit, and is intended for those configurations where the bus does not contain a CPU. The NAK shall cause the same effects as a non-existent resource NAK, and may cause further actions to occur in the ISL if the ISL is a party to the cycle.

A watchdog timer is provided to facilitate the use of ISL units in redundant systems. Once the time is turned on by an I/O command, the timer shall issue a logic one signal if it is not reset more frequently than once per second at 60 Hz. When the timer issues a logic one signal, the local bus and the remote bus are interrupted. The watchdog timer interrupts may be blocked by a proper setting of the reset timers command.

The retry hangup timer is started when an ISL unit first issues a WAIT signal as a result of a retry, and is reset when an ACK or NAK is issued. If more than 100 milliseconds, by way of example, have elapsed and the retry cycle has not been completed, the ISL unit shall not respond to further bus cycle requests from an original master. The bus will time-out and the originator shall thereby be aware of a hangup. The timer is enabled under the control of the reset timer command.

Each of the timers control the logic levels of status bits as set forth in Table 11.

Each ISL unit has a status register in the timers and status logic unit 133. The local status register contains information relative to the local Isl unit, as well as a composite status bit representing certain conditions in the remote ISL unit. In the event the remote interrupt bit in the local status register is at a logic one level, detailed status would be obtained by reading the remote status register via the local ISL unit. Three mask bits are provided to block certain specific interrupt and status conditions. These mask bits are set/cleared as part of the reset timers/interrupt mask command (FC=27).

FIGS. 14A-14Z, 14AA-14AC

FIGS. 14 illustrates an ISL unit in detailed logic schematic form. It is to be understood that the logic systems comprising an ISL unit are distributed throughout the unit, and share common logic elements.

In attempting a description of connections of the logic elements to make an ISL unit, it is quickly found that the conducting lines to the inputs and outputs of the logic elements lead to other logic elements distributed throughout the twenty-nine figures comprising FIGS. 14. The result is not a meaningful instruction of how to make an ISL unit, but rather a massive display of connection verbage requiring an excessive amount of time to decipher and implement. In order to provide a meaningful description wherein the connections of any logic element on any Figure may be readily ascertained and implemented, two computer listings incorporated in this specification as Appendix A and Appendix B have been specially designed for the description of FIGS. 14.

In addition, the logic elements of the FIGS. 14 have been numbered in accordance with a numbering system that complements the information of Appendices A and B. For example, each component is identified by a three digit number. Each component receives one or more input signals and generates one or more output signals. Each signal is identified by a five digit number. The first three digits of each signal identify the component of which the signal is an output. The last two digits identify the pin number of the output of that component. Every signal has a nine character mnemonic naming the signal functionally, and a two digit number identifying different signals having the same mnemonic. Each signal also has a (+) or (−) designator identifying the state that makes the mnemonic true, and two decimal digits for differentiating between signals with the same six character mnemonic.

Referring to FIG. 14M by way of example, a 74LSO4 inverter is identified with the three digit number 641. The output signal is on pin number 04. The output signal is identified as 64104. The input signal connected to input pin number 03 is identified with the number 64013. It is generated by a 74SO2 integrated circuit NOR gate 640. The output signal is on pin number 13.

The mnemonic for the write interrupt function is WRTINT. Signal number 64013 has the mnemonic WRTINT-00. The minus sign indicates that the signal 64013 is at logical zero when the system performs the write interrupt function. Similarly, signal 64104 has the mnemonic WRTINT+10. The plus sign indicates that the signal 64104 is at a logical one when the system performs the write interrupt function. The 00 and 10 designations identify different signals with the same mnemonic.

Appendix A is sorted by a five digit signal number, and has six columns. The first column identifies the signal. The second column identifies the mnemonic. The third column lists the three digit reference number and the two digit pin number. The fourth column indicates whether the signal for the component listed in column five is a source (S) or a load (L) of a circuit component, an input (I) to or an output (O) from a connector, a terminal (T) or a wired OR gate (W).

TABLE 12

DIRECTORY TO FIGURES 14 A-Z and AA-AC

| Logic Sheet | Figure | Title |
|---|---|---|
| 01 | 14A | NML Bus Connector |
| 02 | 14B | NML Driver/Recv. (Conn. Z01) |
| 03 | 14C | NML Driver/Recv. (Conn. Z02) |
| 04 | 14D | NML Bus Control |
| 05 | 14E | Bus Address MUX |
| 06 | 14F | Address and Data Tri-State Connectors |
| 07 | 14G | Bus Data MUX |
| 08 | 14H | ACK, NAK, WAIT |
| 09 | 14I | DCNN and HIS Response |
| 10 | 14J | Channel Decode and ID |
| 11 | 14K | Function Decode |
| 12 | 14L | IOLD and MCLR |
| 13 | 14M | Interrupt Control |
| 15 | 14N | File Full Control |
| 16 | 14O | Address and Data Files |
| 17 | 14P | Bus Compare |
| 18 | 14Q | RAM Counter and Control |
| 19 | 14R | CHN. & MEM. Address MUX |
| 20 | 14S | Memory Address Translator and Hit Bit |
| 21 | 14T | Internal Data File & MUX |
| 22 | 14U | Transfer & Remote Cycle |
| 23 | 14V | Priority & Cycle Generator |
| 24 | 14W | CP Translator |
| 26 | 14X | WDT and ISL Interrupt |
| 27 | 14Y | Bus I/O Mem. Retry Timers |
| 28 | 14Z | Intra Bus ADDR DRV/RECV |
| 29 | 14AA | Intra Bus Data DRV/RECV |
| 30 | 14AB | Intra Bus Misc. DRV/RECV |
| 31 | 14AC | Twin Interface Conn. and Term. |

The fifth column identifies the circuit component by its manufacturer's catalog number. The first three characters of the sixth column are not used, and the last two characters are used in conjunction with the directory set forth in Table 12 to identify the FIGS. 14A-14AC on which the component is found.

For example, on line 64013 of column 1, 64013 is the signal number. WRTINT-00 in column 2 is the signal mnemonic. The signal number 64013 is repeated in column 3. The S in column 4 indicates a source (from gate 640, pin 13). The number 74SO2 in column 5 is the manufacturer's identification number of the component 640. The characters 06Z of column 6 are ignored. The characters 13 refer to a sheet number set forth in Table 12. Referring to Table 12, it is seen that sheet number 13 corresponds to FIG. 14M on which interrupt control logic is illustrated.

On the line following the signal number 64013, columns 1 and 2 are blank. The number 64103 in column 3 refers to pin 03 of component 641. Column 4 indicates with the character L that signal 64013 is connected to the 03 input pin of component 641. The number 74SO4 in column 5 is the manufacture's identification number of component 641, and the characters 07D of column 6 are ignored as before stated. The characters 13 of column 6, however, may be used with Table 12 to identify FIG. 14M.

The Appendix B is sorted by the mnemonics of column 2, and comprises six columns. The first column lists the signal number. The second column identifies the signal mnemonic. The third column lists the signal number. The fourth column indicates whether the component in column five is provided a source (S) or a load (L), or if a connector is provided an input (I) or an output (O). A terminal (T) and a wired OR gate (W) also may be indicated. Column five identifies the circuit component by its manufacturer's catalog number. The first three characters of the sixth column are not used. The last two characters are used in conjunction with Table 12 to identify the FIGS. 14A-14AC on which the component is found.

For example, in columns 1 and 3 of the line indicated by the signal mnemonic WRTINT-00, the signal number 64013 is given. In column 4, the character S indicates gate 640 is a source of signal 64013. In column 5, the number 74SO2 is the manufacturer's identification number of gate 640. In column 6, the characters 06Z are ignored. The characters 13 identify FIG. 14M in Table 12. On the line following WRTINT-00, columns 1 and 2 are blank. The number 64103 in column 3 is a signal number also identifying the component having the reference number 641 and a connecting pin 03 of the component. The character L in column 4 indicates that the signal 64013 is applied to an input pin of component 74SO4. The number 74SO4 of column 5 is the manufacturer's identification number for gate 641. In column 6, the characters 07D are ignored, and the characters 13 identify FIG. 14M in Table 12.

As a further example, referring to FIG. 14F, signal 16306 having the mnemonic AFIL10+00, signal 83509 having the mnemonic RMAD10+00 and signal 74105 having the mnemonic CNTL10+00 are applied to a wired OR gate 142. The output of the wired OR gate 142 is signal 14201 having the mnemonic ADDR10+00.

Referring to FIG. 14-O, the signal 16306 having the mnemonic AFIL10+00 is an output on pin 06 of a RAM 163. Referring to FIG. 14Z, the signal 88309 having the mnemonic RMAD10+00 is an output signal at pin 09 of a driver 883. Referring to FIG. 14Q, the signal 74105 having the mnemonic CNTL10+00 is an output signal on pin 05 of register 741.

Referring to Appendix A at line 16306, columns 1 and 3 identify the signal 16306 having the mnemonic AFIL10+00. The character W in column 4 indicates that the signal 16306 is connected to a wired OR gate. In column 5, it is indicated that the signal is generated by a 74LS670 circuit element. In column 6, the character 08A are ignored, and the characters 16 in conjunction with Table 12 identify FIG. 14-0. On the next following line, columns 1 and 2 are blank. Column 3 identifies the wired OR gate as gate 142. The number 02 identifies the wire as being the second wire wrap on the pin. In column 4, the character L identifies the signal 16306 as being an input to the wired OR gate 142. In column 5, the characters +W003 indicate that the wired OR gate is a three input wired OR gate comprising four wires wrapped around a pin. The wires are identified as 01, 02, 03 and 04. Column 6 indicates that the wired OR gate may be found in the Figure associated with sheet number 06 in Table 12. That Figure is FIG. 14F. The characters 11A of column 6 are ignored.

Referring to line 14201 ADDR10+00, column 1 identifies the component reference number 142. The characters 01 identify the wire as being the first wire wrap on the pin. Column 4 indicates that the signal is a source (S) signal. Column 5 identifies the component as a three input wired OR gate as before described. Column 6 indicates that the wired OR gate is found in the Figure associated with the sheet number 06 in Table 12. The characters 11A are ignored.

Referring to the line in Appendix B indicated by the mnemonic AFIL10+00, it is seen that columns 1 and 3 identify the signal number 16306. In column 4, the letter W identifies the signal as being an input to a wired OR gate. Column 5 identifies the signal as being the output of the 74LS670 circuit element. The characters 08A of column 6 are ignored. The characters 16 used in conjunction with Table 12 identify FIG. 14-0. On the next following line, columns 1 and 2 are blank. Column 3 identifies the wired OR gate 142. The characters 02 identify a wire as being the second wire wrapped on a pin. In column 4, the L identifies the signal as an input to the wired OR gate. Column 5 identifies the circuit component +W003 as being a three input wired OR gate. In column 6, characters 11A are ignored. The characters 06 used in conjunction with Table 12 identify FIG. 14F.

Referring to line ADDR10+00, columns 1 and 2 identify the signal number 14201. Column 3 identifies the signal as an output signal from component 142. The characters 01 indicate that the wire is the first wire wrap on the pin. In column 4, the S identifies the component as a source. In column 5, the component is identified as a three input wired OR gate as before described. Column 6 indicates that the wired OR gate is illustrated in FIG. 14F.

Signal 88309 having the mnemonic RMAD10+00 and, signal 74105 having the mnemonic CNTL10+00 may be found in Appendix A and Appendix B in accordance with the above described guidelines.

A functional description of the ISL unit illustrated in FIGS. 14 shall now be provided. Since the logic systems comprising the ISL unit are distributed throughout the unit, the functional descriptions also shall flow throughout the FIGS. 14.

Figure 14G:
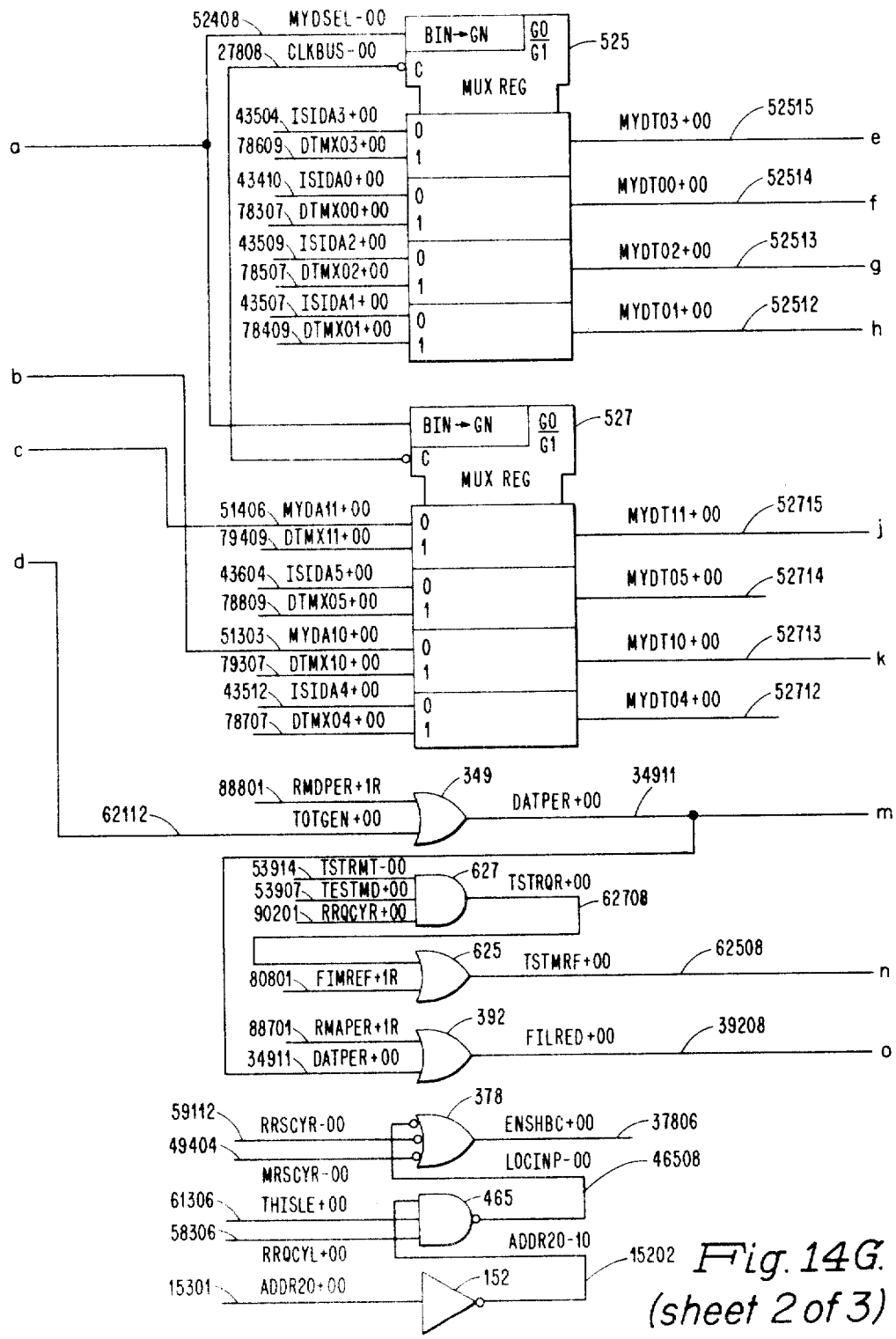
FIGS. 14A-14Z, 14AA-14AC are detailed logic schematic diagrams of the ISL unit illustrated in FIG. 8.
Figure 14G:
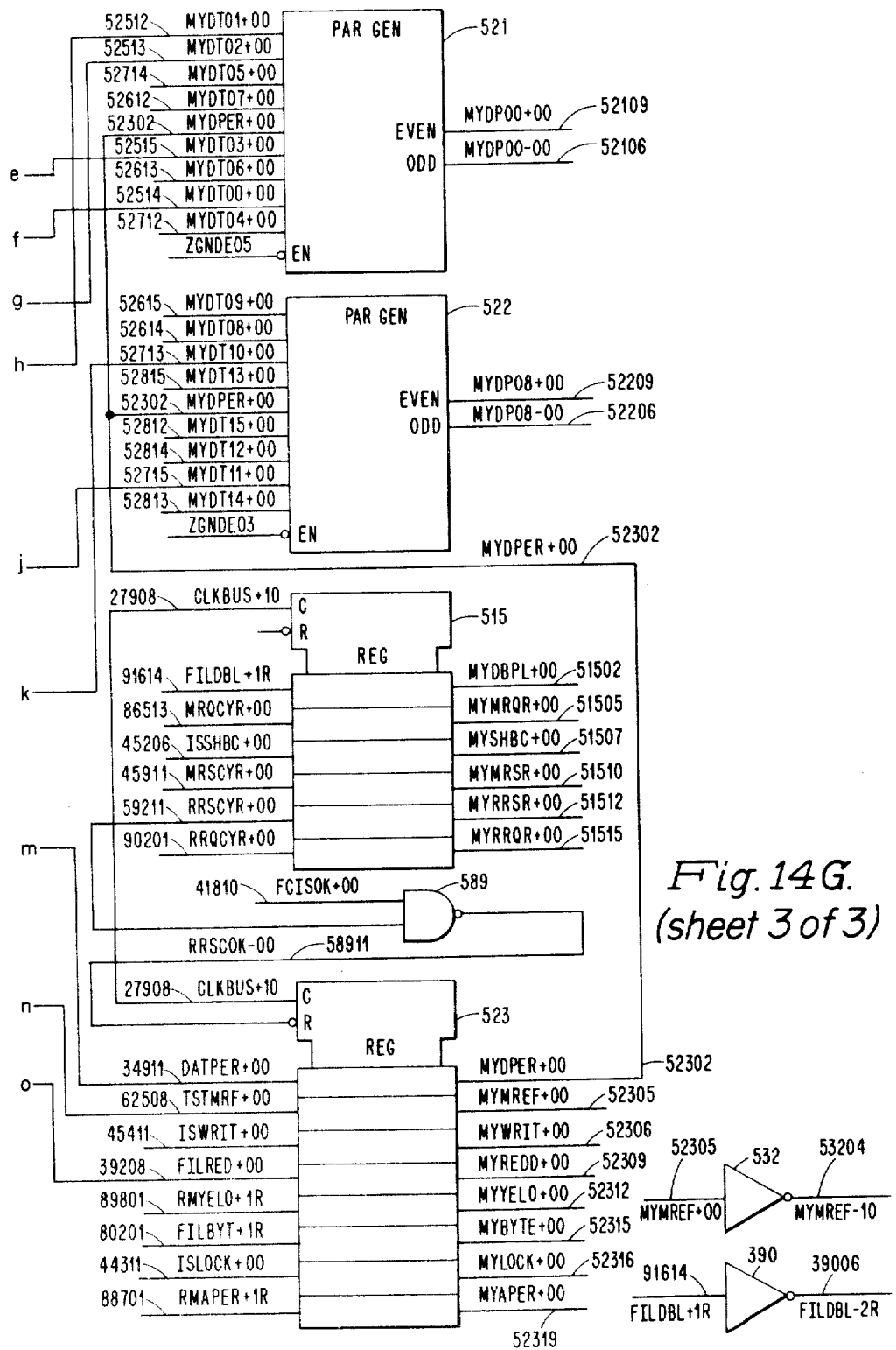

The initialization logic of the ISL consists of the power-up and master clear phases, and are described in connection with the logic diagram illustrated in FIG. 14L. FIG. 14A illustrates a connector 104 and a connector 105 which interconnect the communication bus signals to the ISL logic system. A bus power-on signal from the communication bus is applied to all devices. The ISL logic detects a leading edge of a bus power-on signal 10535, which is applied to the input of a delay line 250 in FIG. 14L. The output of the delay line 250 has two delayed outputs. A first output signal 25003 delays the bus power-on signal 10535 by 30 nanoseconds. A second output signal 25014 delays the bus power-on signal 10535 by 60 nanoseconds. The signals 25003 and 25014 are applied to the input of an OR gate 251. The output of OR gate 251 is a pulse signal 25103 whose leading edge rises 30 nanoseconds after the rise of the bus power-on signal 10535, and whose trailing edge falls 60 nanoseconds after the fall of the bus power-on signal 10535.

The 25103 output signal is applied to the input of a one-shot 370 which generates an assertion signal 37005 and a negation signal 37012. The negation signal 37012 is a negative going pulse of 1.5 milliseconds duration.

The negation signal 37012 is applied to the clock input of a D flip-flop 531. The flop 531 is responsive to the trailing edge of the negation signal 37012 which is applied approximately 1.5 milliseconds after the leading edge of the bus power-on signal 10535, FIG. 14A, is detected.

The flop 531 output signal 53109 is applied to an input of an EXCLUSIVE-OR gate 290. A local communication bus master clear signal 24305 is applied to another input of EXCLUSIVE-OR 290. Signal 24305 is the assertion output of a D-flop 243. A master clear button from the control panel applies a signal 10407 to a driver/receiver 242, FIG. 14B, from connector 104. The driver-receiver 242 output signal 24214 is applied to a clock input of a flop 243, FIG. 14L. A 93213 signal is applied to the CD input of flop 243 from the remote ISL. The 93212 signal assures that the flop 243 will be set out if there is no master clear happening in the remote ISL.

Either the bus power-on signal 53109 or the master clear switch 24305 will start a master clear sequence by forcing an output signal 29006 of EXCLUSIVE-OR gate 290 to logic one.

Output signal 29006 is applied to an inverting driver 468. An inverted output 46808 is applied to a 200 nanosecond delay line 467. The 200 nanosecond tap output signal 46707 is applied to the reset terminal of flop 243. This assures a 200 nanosecond pulse to the ISL logic to perform the reset function regardless of the length of time the bus clear signal 10407 is on the bus. A 100 ohm resistor 129 for the delay line 467 is used to electrically terminate the signal.

At the end of a 200 nanosecond pulse, signal 46707 clears flop 531. The negative output of the flop 531, signal 53108 is applied to the clock terminal of a D-flop 511 to force the flop into a set condition. The setting of flop 511 starts the internal clear process.

The master clear function for the ISL unit is generated by one of four signals. One signal 24306 is the negated output of flop 243 which is caused by the local control panel. The second signal 93212 is the master clear signal from a remote control panel. The third signal 91612 is caused by a software initialize instruction or a power-up condition on the remote communication bus. The fourth signal is the software initialize instruction or a power-up condition on the local communication bus. Three of the signals are applied to the inputs of an inverted OR gate 734. An output signal 73406 is applied to an input of an OR gate 831. The fourth signal, master clear signal 53109, is applied to the other input of the gate 831. An output signal 83111 of OR gate 831 is applied to the four inputs of NAND gate 830 which provides the output master clear for the flops and registers. Signal 83006 is inverted by an inverter 448, whose output 44806 is also used to clear flops and registers. Some flops and registers require assertion signals while other flops and registers require the negation signal.

Signal 83006 is applied to the clock terminal of a flop 470. The output signal 47005 of the flop starts the master clear sequence. Initially, when the master clear 200 nanosecond pulse 46707 was being generated, the 40 nanosecond pulse signal 46712 was applied to a NAND gate 512. The signal 53109 was applied to the other input of NAND gate 512. The output pulse signal 51208 is applied to an OR gate 469. Since the output signal 46908 of the gate 469 is normally at a logic one, the output signal 46908 shall transition to a logic zero to reset flop 470 when the signal 51208 transitions to a logic zero. The above sequence insures that the system will be in an initialized state after the 200 nanosecond pulse 46707 has returned to its normal logic one state.

Figure 14N:
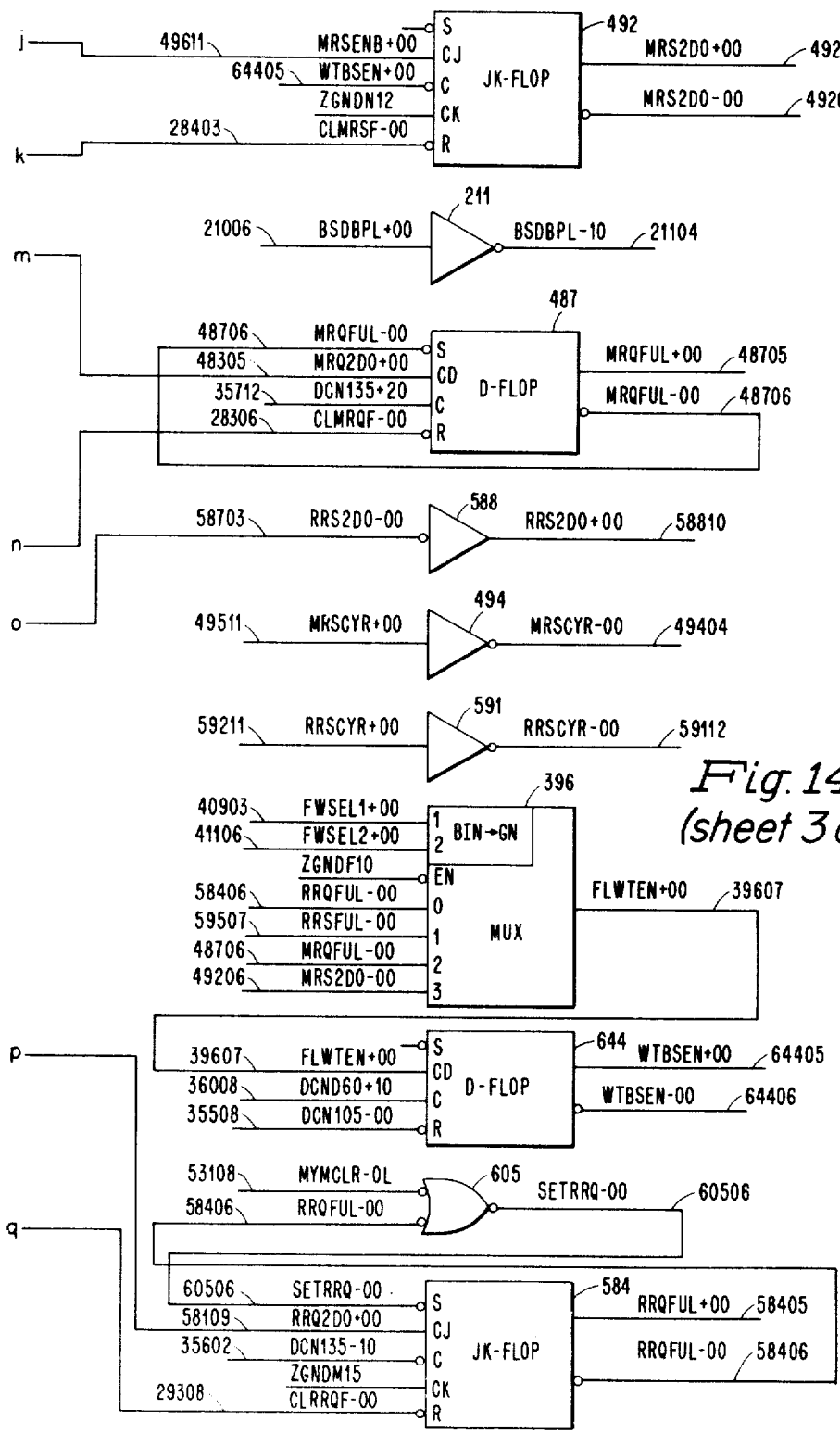

Signal 58109, the output of a JK flop 581, FIG. 14N, is also applied to the input of NOR gate 469, FIG. 14L. Signal 58109 is forced to logic zero to reset flop 470 when a retry request is processed.

Flop 470 is therefore reset 40 nanoseconds after the master clear signal 10407 is received over the bus. Flop 470 is again set by the trailing edge of the signal 83006 to start the master clear sequence.

The MY MASTER CLEAR signal 53109 is applied to an inverter 868 and the output, signal 86804, is applied to an input of a driver 870, FIG. 14AB. An output signal 87014 is sent out on the remote bus to indicate that the ISL logic unit is in a master clear operation. A signal 91612 is received over the remote bus by the ISL logic unit and is applied to an input of a NOR gate 734 to indicate that another unit is in a master clear mode. An output signal 73406 is applied to the other input of OR gate 831, thereby generating the master clear signal 83111 as described supra to alternatively set the 470 flop on the rise of signal 83006.

The master clear sequence flop 470 is therefore set in both the local and the remote units. The master clear sequence signal 47005 is applied to an AND/OR gate 388, FIG. 14V. The output signal 38808 is applied to a NOR gate 608. The output signal 60808 is applied to the CD input of a D-flop 464. A signal 60408 is applied to the clock input of flop 464 which is an output signal of an AND gate 604. A signal 17612 is applied to an input of AND gate 604. Signal 17612 is the output of a negative OR gate 176. The signal 38808, which is the output of AND/OR gate 388, is applied to the input of negative OR gate 176.

In addition to the local cycle flop 464, an ISL cycle D-flop 441 is set by the clock signal 60408. The ISL cycle flop 441 sets any time any ISL cycle takes place, and the local cycle flop 464 sets when the condition causing an ISL cycle was due to a request from a local communications bus. A remote cycle flop 572 is set when an ISL cycle is initiated from a remote communications bus. When the ISL cycle flop 441 sets, the output signal 44109 is applied to the input of a power driver 322. The output signal 32206 is applied to a 125 nanosecond delay line 374. The various output signals of delay line 374 are used to control the flops during the ISL cycle.

In particular, signal 37411, a 50 nanosecond delay signal, resets the ISL cycle flop 441. This syncs the output signal 44109 to a 50 nanosecond pulse. When the local cycle flop 464 is set, the output signal 46405 is applied to a 4-bit register 490 to clock input data into the register 490. The inputs to register 490 are the memory request signal 48305, the retry request signal 58109, the retry response signal 58810 and memory response signal 35106.

The logic in FIG. 14V also determines priority, and whether the local or remote operation will have access to the ISL cycle. The master clear and master clear sequences have the highest priority, although the cycle that performs the master clear sequence has the lowest priority. However, the high priority functions are controlled to allow the master clear operation.

As an example, the local retry request signal 58109 is generated as an output of a JK flop 581, FIG. 14N. The flop 581 is set during the initialization sequence. A signal 83006 is applied to the S input of a D-flop 632 which sets the flop if the signal 83006 is at a logic zero. This forces the output signal 63209 to a logic one. If there is no bus data signal 21510 at a logic one. The output of a NAND gate 559, signal 55906, thereupon transitions to a logic zero, Signal 55906 is applied to the S input of the flop 581 to set flop 581. The output signal 58109 is set to logic one and is applied to the CJ input of a JK flop 584. The flop 584 is also set during a master clear sequence by means of the 53108 input applied to an OR gate 605. The output signal 60506 is applied to the S input of flop 584, thereby setting the flop 584. Flop 584 is set at this time to block another reguest from coming in on the bus.

The output of flop 581, signal 58109, is applied as stated supra to the input of register 490, FIG. 14V, and is clocked into the register by signal 46405. The corresponding output of register 490, signal 49010, is applied to AND gate 5831 which is one of four AND gates defining the four basic ISL cycles.

These AND gates which will be described infra are, in addition to AND gate 583, AND gates 590, 486 and 493. In this case, output signal 58306 is selected from the local retry request operation.

Figure 14Q:
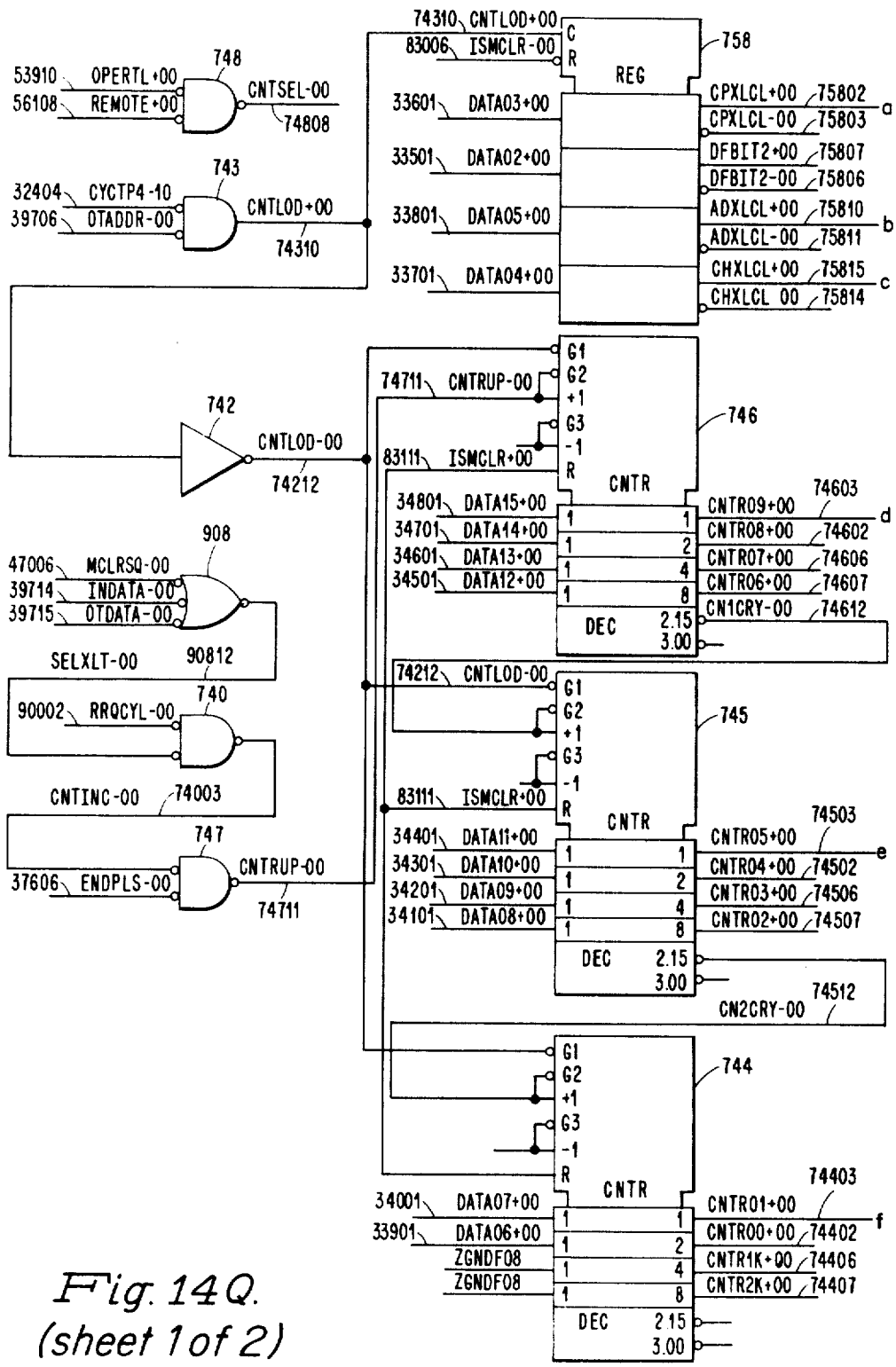

Referring to FIG. 14Q, during the master clear sequence a predetermined pattern is stored in all 1024 addresses of Random Access Memory. Counters 744, 745 and 746 are initially cleared to zero by the reset signal 83111, which was generated by OR gate 831, FIG. 14L, as was described supra. The counters 744, 745 and 745 are then incremented for 1024 counts after being reset to zero. The count signal is initiated by the 47006 signal output of flop 470, FIG. 14L, which is applied to an input of a NOR gate 908, FIG. 14Q. The output signal 90812 is applied to the input of an AND gate 740. The local retry request signal 90002 is applied ot another input of AND gate 740. The output, count increment signal 74003, is applied to an input of an AND gate 747. The output signal 74711 is applied to the +1 terminal of counter 746. The signal 90002 is generated when the output signal 58306 of the AND gate 583, FIG. 14V, is applied to an inverter 900, FIG. 14U. The output of the inverter is signal 90002. An end pulse signal 37606 is applied to an input of AND gate 747. The 125 nanosecond output signal 37407 from delay line 37415, FIG. 14V, is applied to the input of an inverter 377. The output signal 37712 is applied to the input of an inverter 376 which generates the end pulse signal 37606. This 125 nanosecond signal steps the counters 746, 745 and 744, of FIG. 14Q, by controlling the output of AND gate 74711. The carry output signal 74612 is applied to the +1 terminal of counter 745, and the carry output signal 74512 is applied to the +1 terminal of counter 744.

The 1, 2, 4 and 8 output signals, 74603, 74602, 74606 and 74607 of counter 746, are applied to their respective inputs of a register 741. The 1, 2, 4 and 8 output signals 74503, 74502, 74506 and 74507 of counter 745 are also applied to their respective inputs of register 741. The 1 and 2 output signals 74403 and 74402 of counter 744 are applied to inputs of a register 929. Registers 741 and 929 are tri-state registers.

Registers 929 and 741 are enabled by a count select signal 74808 which is applied to the enable terminals of the registers. The signal 74808 is generated by the output of an AND gate 748, and is operative when the ISL system is in a master clear mode. Both inputs 53910 and 56108 to AND gate 748 are at a logic zero at this time.

The output signals of registers 741 and 929 are signals 92915, 92912, 92916, 92909, 92905, 74105, 74106, 74119, 74102, 74109, 74115, 74112 and 74116. These signals are applied in FIG. 14F to the address bus bits 5-17 of wired OR gates 13701, 13801, 13901, 14001, 14101, 14201, 14301, 14401, 14501, 14601, 14701, 14801 and 14901, respectively.

Figure 14R:
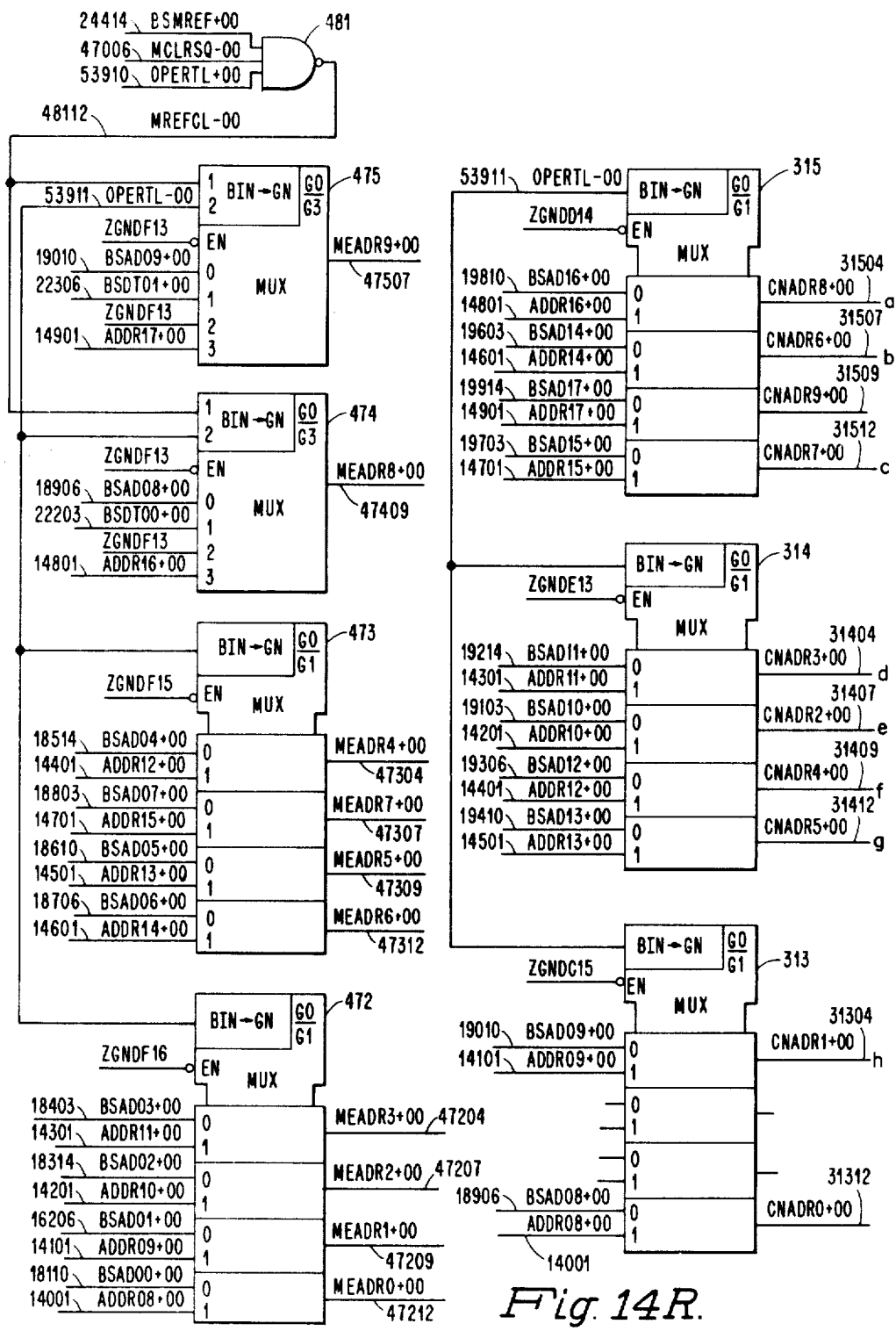
Figure 14T:
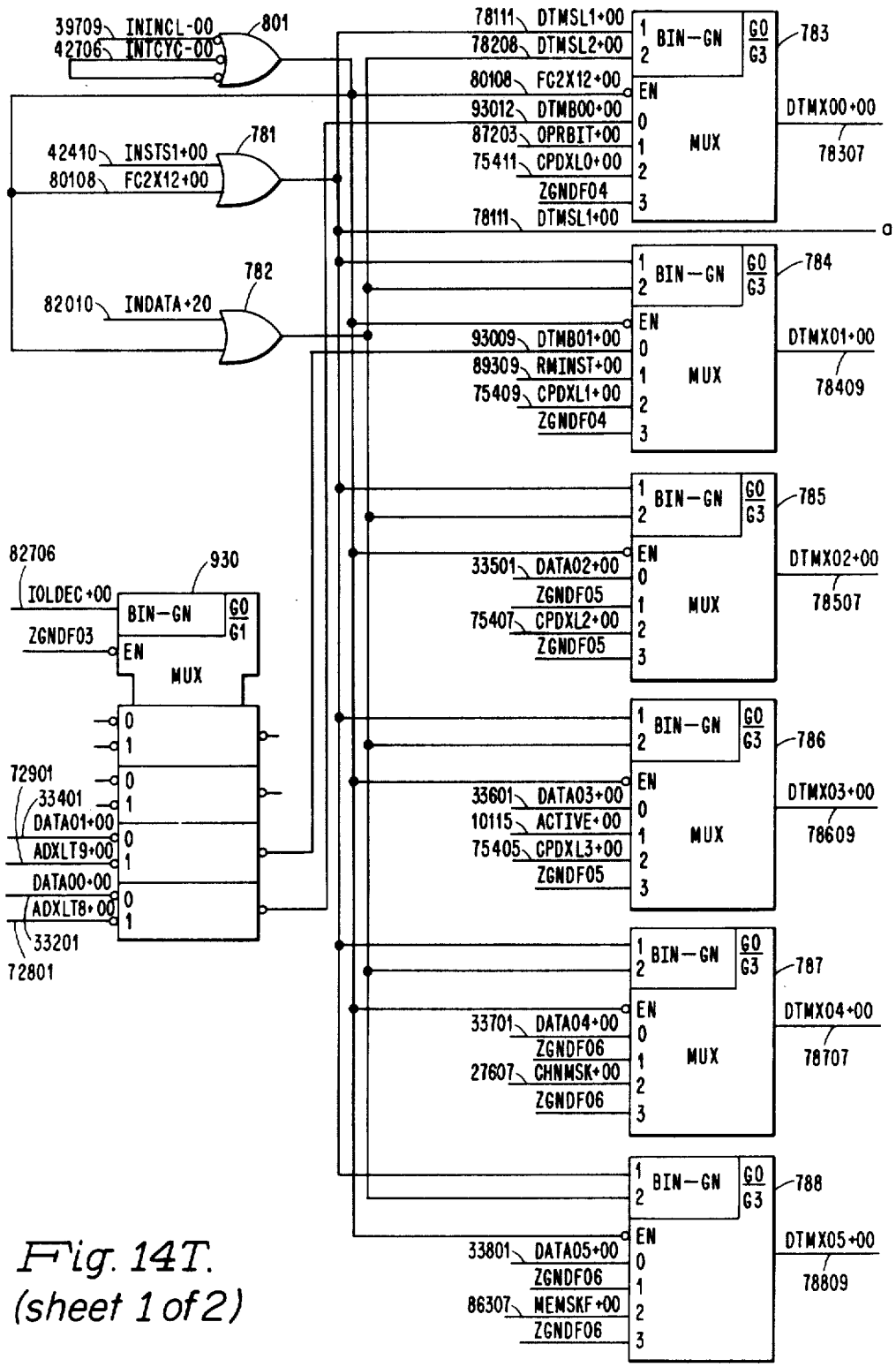
Figure 14T:
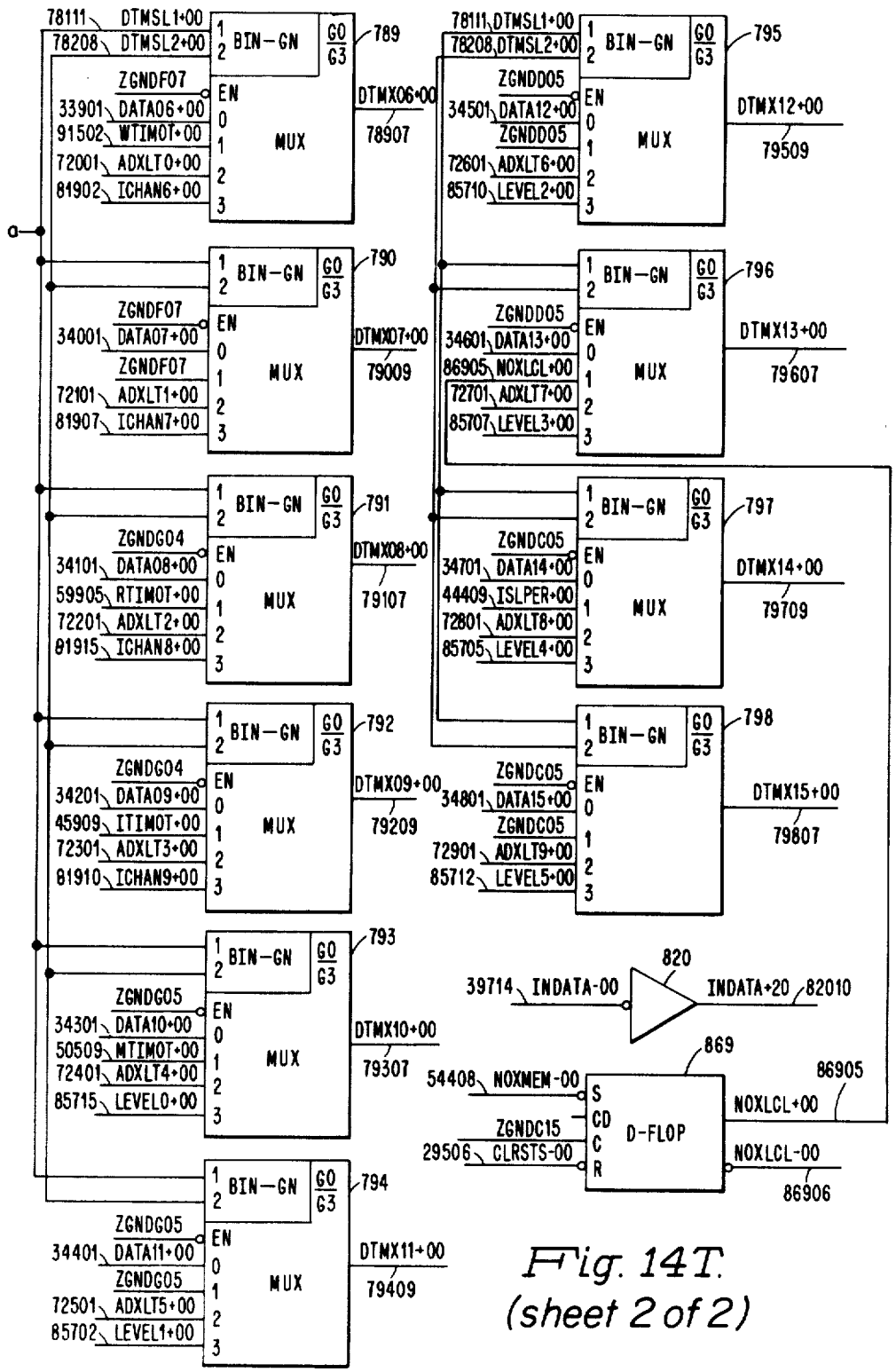
Figure 14U:
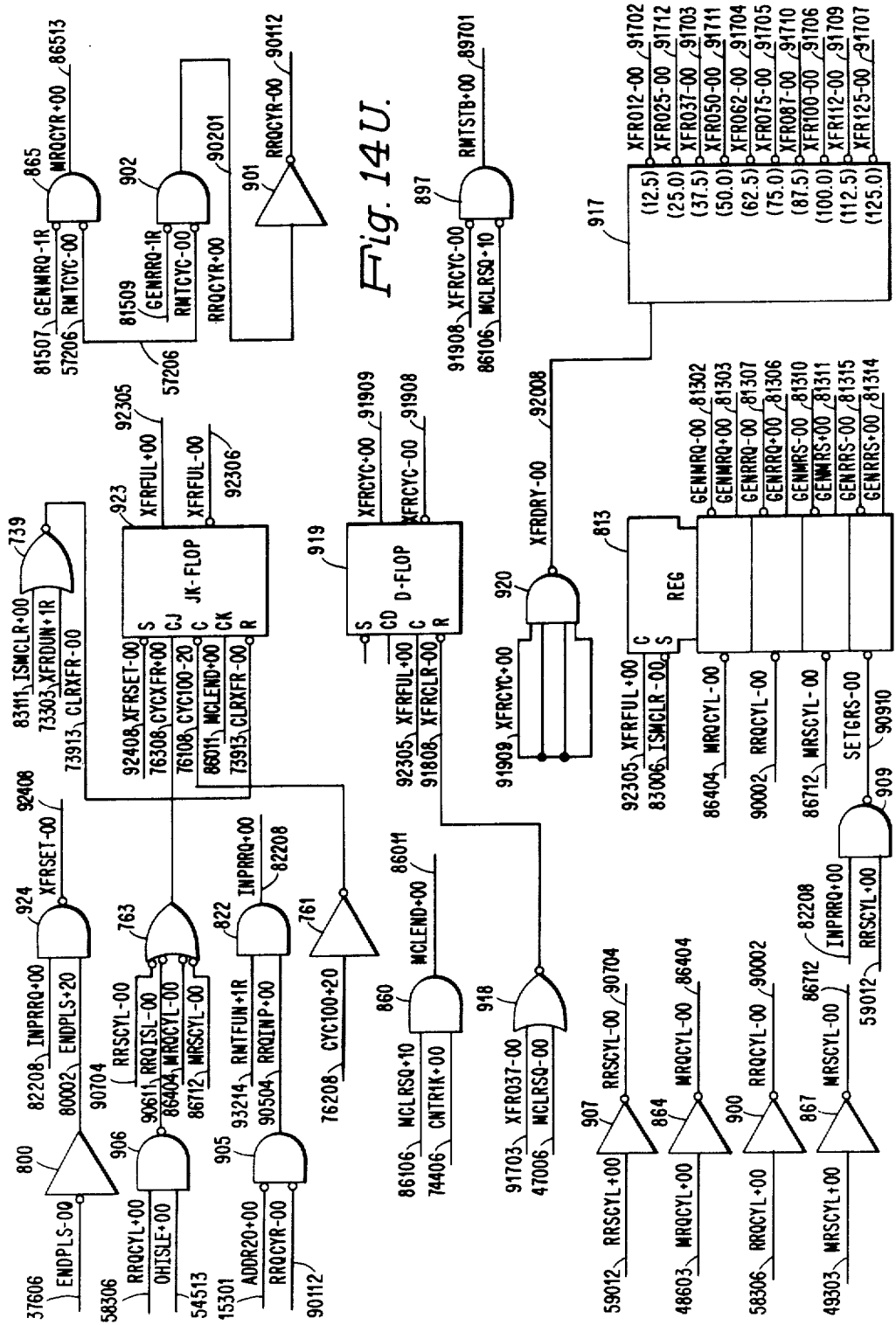

Referring to FIG. 14R, the address 8-17 signals 14001, 14101, 14201, 14301, 14401, 14501, 14601, 14701, 14801 and 14901 are applied to the "1" terminal of multiplexers 313, 314 and 315. The output of the multiplexers 313, 314 and 315, channel address 0-9 signals, are applied to the address terminals of a RAM 276. During the master clear sequence, therefore, all 1024 addresses of RAM 276 will be accessed because the "1" terminal is selected by signal 53910.

Similarly address 8-11 signals 14001, 14101, 14201, and 14301 are applied to the "1" input terminal of a multiplexer 472. Address 12-15 signals 14401, 14501, 14601 and 14701 are applied to the "1" input terminal of a multiplexer 473, and address 16 and 17 signals are applied to the "3" terminal of multiplexers 474 and 475, respectively. Multiplexers 474 and 475 having a signal 48112 applied to the select terminal "1" from NAND gate 481. Signal 48112 will be at logic one at this time because the input signals 24414, 47006 and 53910 are all at logic zero.

The outputs of the multiplexers 472, 473, 474 and 475, memory address 0-9 signals 47212, 47209, 47207, 47204, 47312, 47309, 47307, 47304, 47409, and 47507 are applied to the address terminals of the memory translation storage RAMS 706, 707, 708, 709, 710, 711, 712, 713, 714 and 714, and to the hit bit storage RAM 863.

Figure 14W:
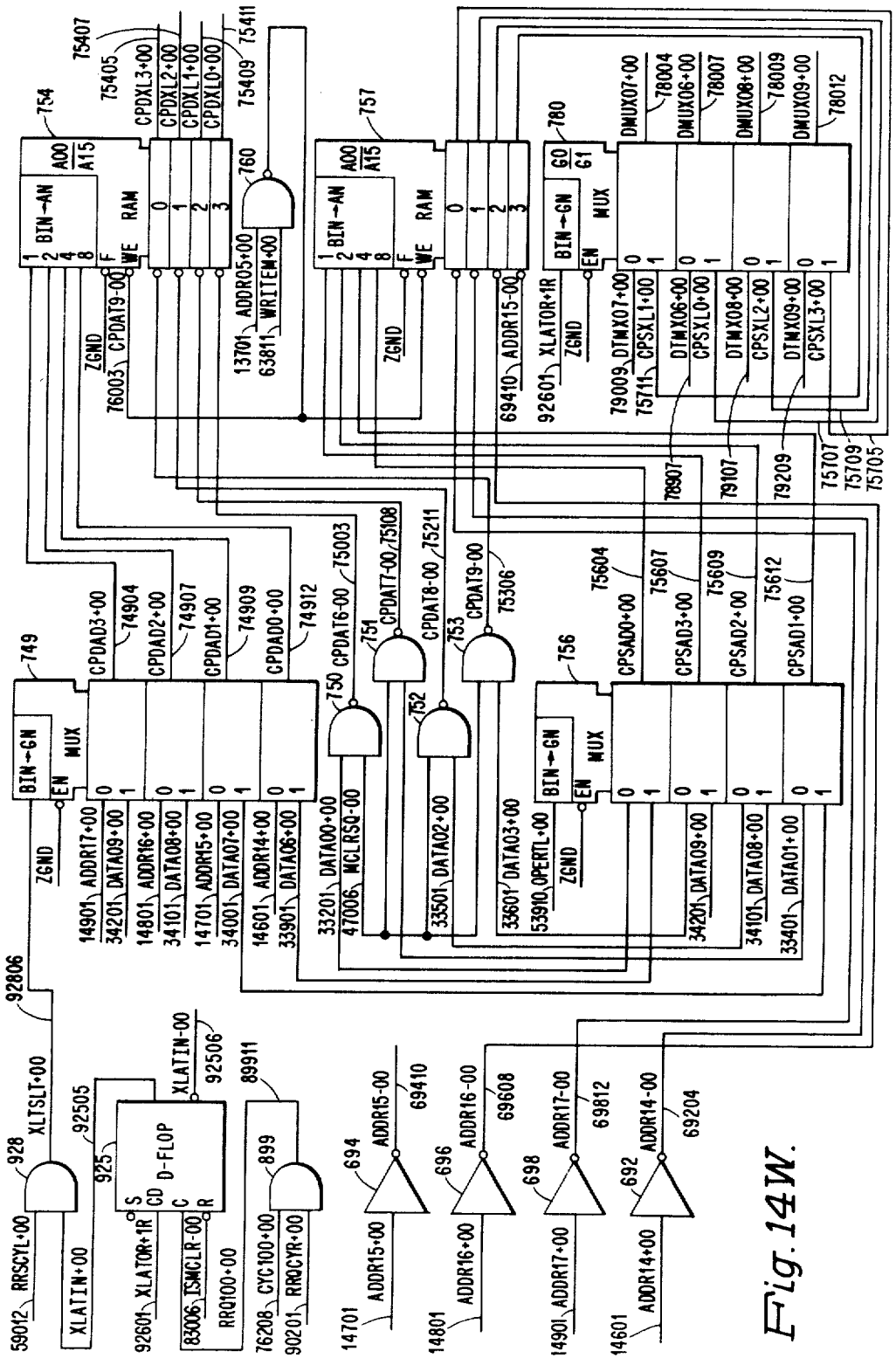
Figure 14A:
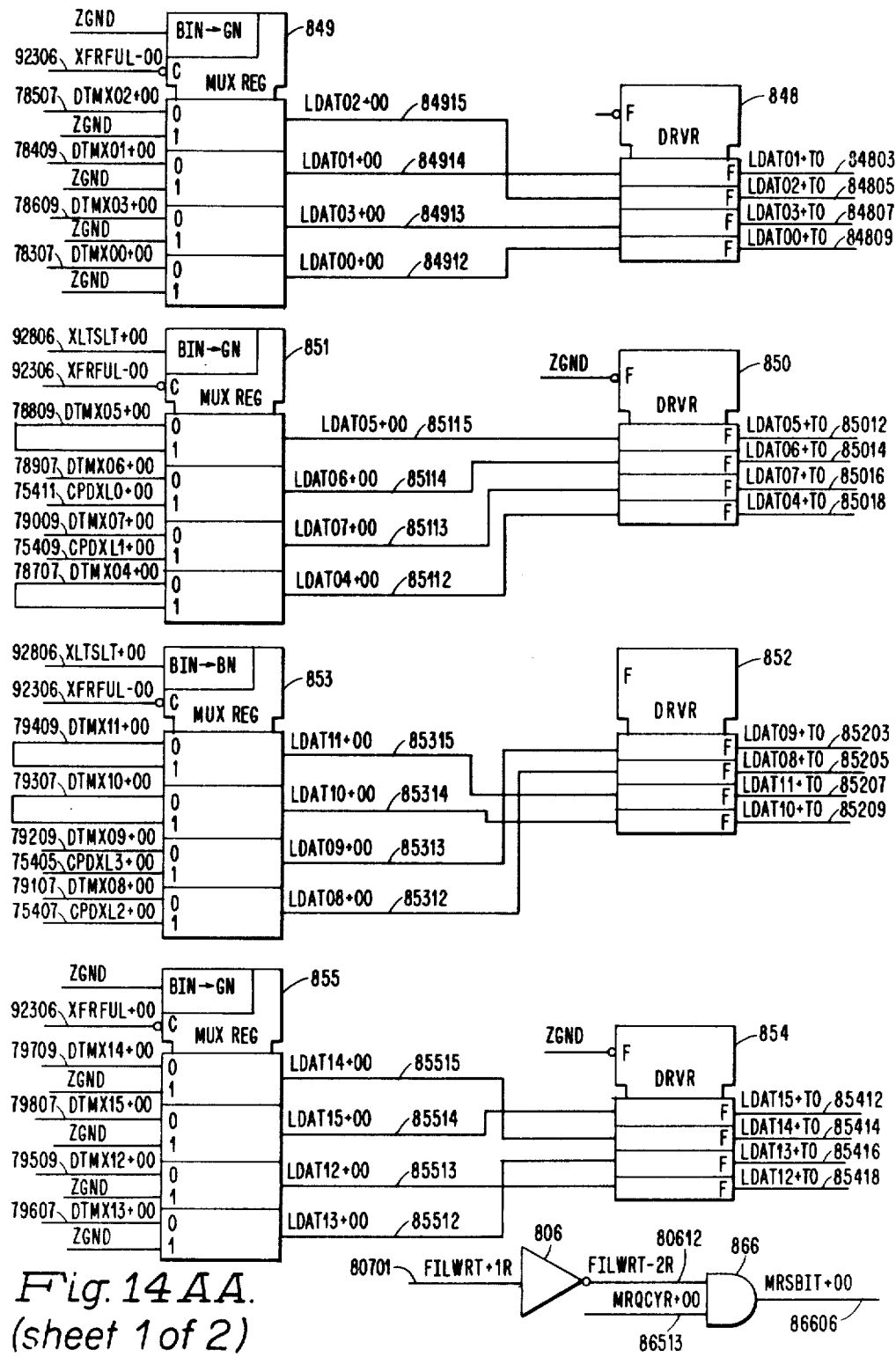
Figure 14A:
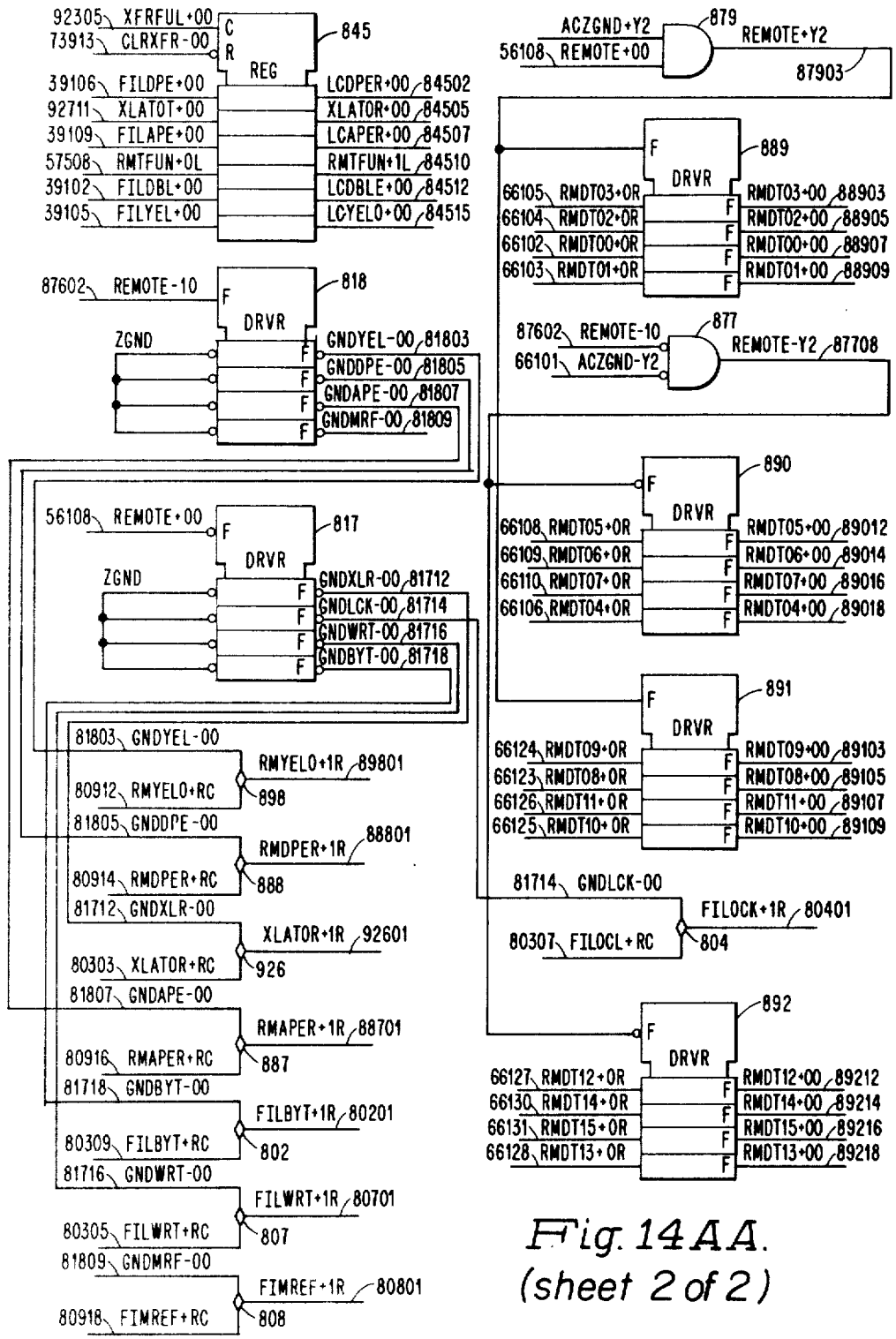
Figure 14A:
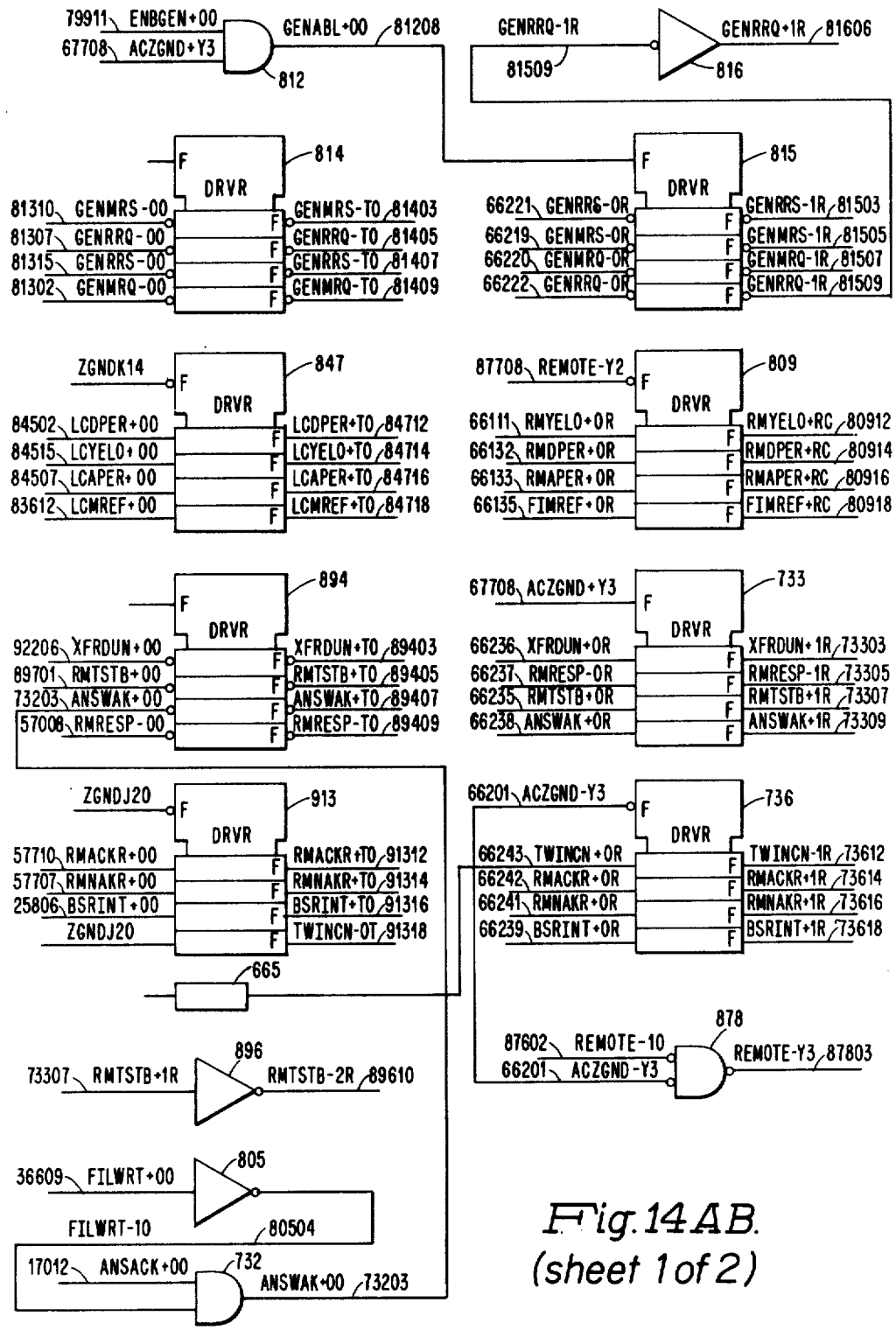
Figure 14A:
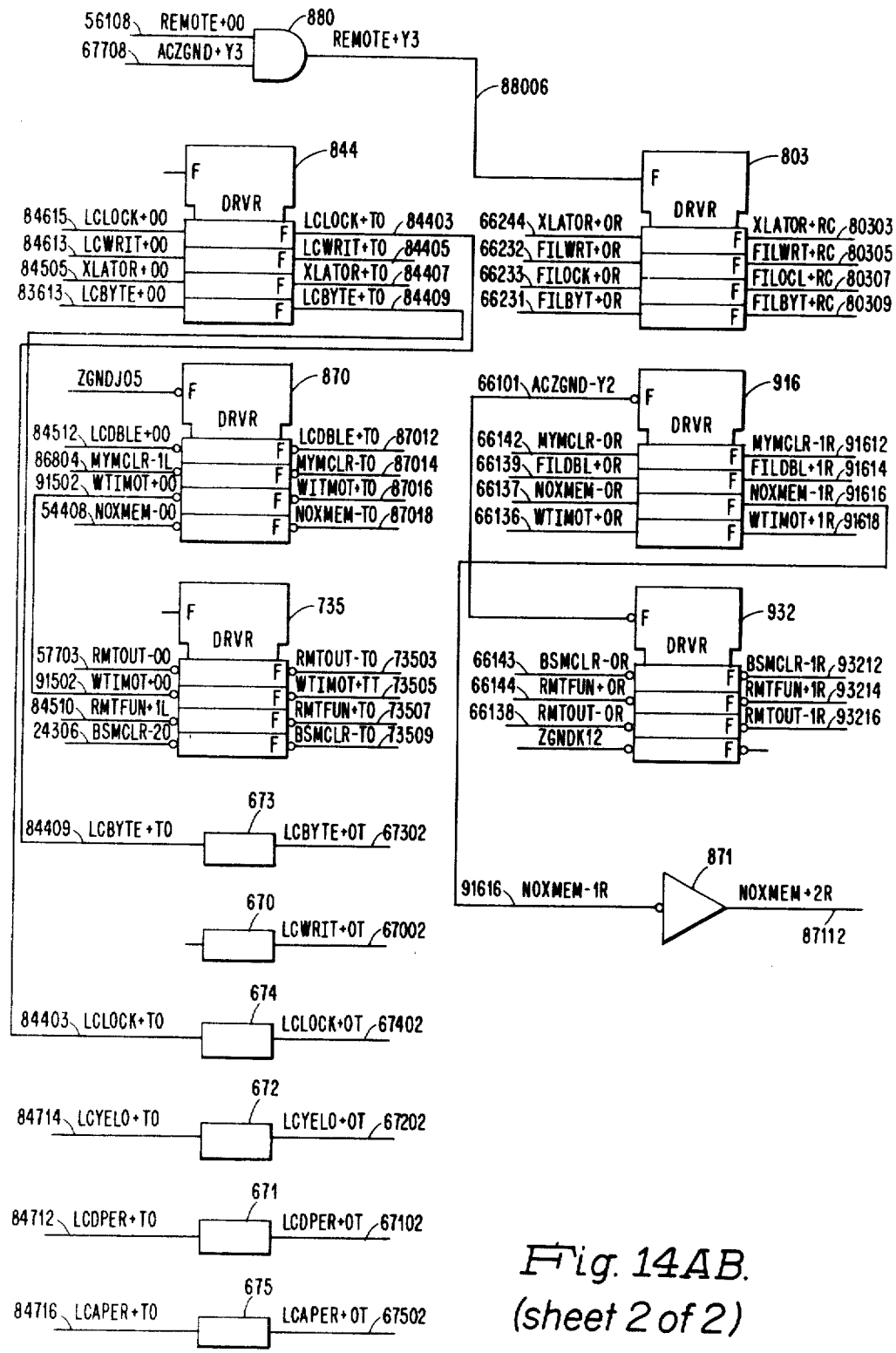
Figure 14A:
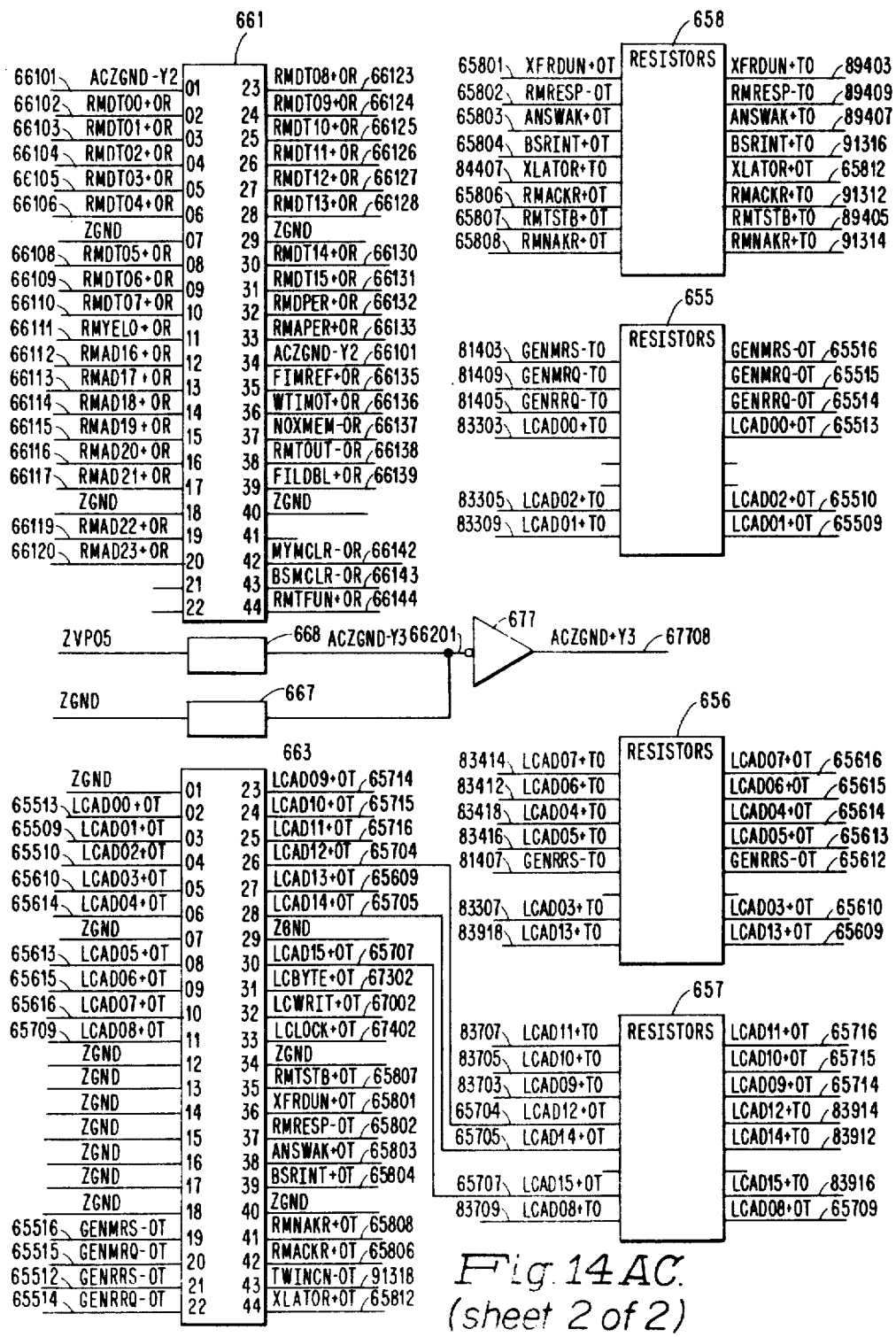

Referring to FIG. 14W, the address 14-17 signals 14601, 14701, 14801, and 14901 are applied to the "0" terminal of a multiplexer 749. The CPU translator address 0-3 signals 74912, 74909, 74907 and 74904 are applied to the address input terminals of RAMs 754 and 757. The "O" input of multiplexer 749 is selected since signal 92806 applies a logic zero to the select terminal of multiplexer 749, and the local retry response cycle signal 59012 input to an AND gate 928 is at logic zero.

The master clear sequence signal 47006 is applied to inputs of NAND gates 750, 751, 752 and 753. Since the ISL system is still in a master clear cycle, signal 47006 is at logic zero. The output signals 75003, 75108, 75211, and 75306 are at logic one. These signals are applied to the data input terminal of RAM 754. As the RAM 754 cycles through the 16 address locations, logic zeros shall be written into every address location since the signal is inverted at the RAM 754 input.

The write enable terminal of RAM 754 is activated by a signal 76003, the output of an AND gate 760. Signal 63811 which is the output of an AND gate 638, FIG. 14V, is applied to an input of NAND gate 760. One input to AND gate 638 is the 60 nanosecond delay pulse 32502. Referring to FIG. 14K, both the MYCLER signal 51105 and the master clear sequence signal 47005 are applied to inputs of a NAND gate 471. The MYCLER signal 51105 input to NAND gate 471 enables the clearing of the RAM 754 during a power-on master clear sequence. The clearing of the RAM 754, however, is prohibited when the master clear button is depressed on the control panel. Both of these signals are at logic one to indicate a RAM write operation. Output signal 47103 is applied to an input of a NOR gate 639. Output signal 63908, at logic one, is applied to the input of AND gate 638 of FIG. 14V. The output signal 63811 at logic one is applied to the input of NAND gate 760, FIG. 14W, if the address 5 signal 13701 is also at logic one. The output of NAND gate 760, signal 76003, then transitions to a logic zero to enable the RAM write operation.

Referring to FIG. 14R, the input channel mask write signal is applied to the write enable terminal of RAM 276. Signal 63811 is applied to an input of a NAND gate 312. Also, an address 6 signal 13801 is applied to the other input terminal of NAND gate 312. Signal 63811 is at logic one as described supra. If address bit 6 is at a logic one, then RAM 276 shall perform the write operation. Master clear sequence signal 47006 is applied to an input of an AND gate 275. Since signal 47006 is at a logic zero during the first master clear sequence, the output signal 27505 is at a logic zero. Logic zeros, therefore, are written into the RAM 276 addresses defined by address bit 6.

Referring to FIG. 14S, signal 68311 and address 7 signal 13901 are applied to a NAND gate 859. The output of enable signal 85906 is applied to the write enable inputs of RAMs 706, 707, 708, 709, 710, 711, 712, 713, 714, 715 and 863.

Master clear sequence signal 47006, which is at logic zero is applied to AND gate 862. The output signal 86208, which is at a logic zero is applied to the write input terminal of RAM 863. Logic zeros, therefore, shall be written into all address positions.

Data 6-15 signals 33901, 34001, 34101, 34201, 34301, 34401, 34501, 34601, 34701, and 34801 are applied to the data input terminals of RAMs 706 through 715. Since data 6-15 signals are normally at a logic one, logic ones shall be written into all 1024 addresses of RAMs 706 through 715.

Referring to FIG. 14M, resistor networks 648, 649, and 650 hold the data 01-15 signals 33401, 33501, 33601, 33701 and 33801 at a logic one level during the master clear cycle, no data is being received over the communication bus through receiver-drivers 232 through 238, FIG. 14B.

Referring to FIG. 14Q, signal 86108 is applied to OR gates 759, 737 and 730. The output signals 75906, 73706 and 73003 are applied to the input terminal of register 929. The output signals 92912, 92915 and 92916 are applied to wired OR terminals 137, 138 and 139 of FIG. 14F. The output signals 13701, 13801 and 13901 are at a logic one to enable the write operation. The RAMs are initialized during the master clear operation as described supra.

Referring to FIG. 14V, the 100 nanosecond delay signal 37406 is applied to the input of an inverter 327.

The output signal 32712 of the inverter is applied to the input of an inverter 326. Signal 32610, the output of inverter 326, is also applied to the input of an inverter 762. Signal 32712 is applied to a NAND gate 323. The other input is end pulse signal 37712.

The master clear sequence flop 470, FIG. 14L, remains set until address 1024 of the various RAMs have been cleared as described supra.

Referring to FIG. 14Q, when the count in counters 746, 745 and 744 reaches 1024, the signal 74406 output of counter 744 is at a logic one. The signal is applied to the input of an inverter 316, FIG. 14L. The output signal 31608 is applied to the reset terminal of flop 511 to reset the flop. Signal 31608 is also applied to the input of a NAND gate 540 of FIG. 14N. The output signal 54008, at a logic one, is applied to an input of a NAND gate 582. In the 1024th cycle when the end pulse signal 37712 and the local retry request signal 58306 are at a logic one, the two signals are applied to the input of NAND gate 582. The output signal of the gate transitions to a logic zero which is applied to the reset terminals of flop 581. Signal 58109 which is applied to the input terminal of OR gate 469 of FIG. 14L is at a logic zero. Since signal 46908 is applied to the reset terminal of flop 470, the flop is reset. The master clear sequence thereby is completed.

When the master clear sequence is completed, flop 584 of FIG. 14N is reset to allow remote requests to come into the ISL system over the communications busses. Signals 74406, 47005 and 76208 are applied to the inputs of an AND/OR gate 286. The output signal 28608 is applied to an input to an OR gate 293. The output signal 29308 is applied to the reset terminal of flop 584. Signal 76208 is the output of inverter 762, FIG. 14V, and is the inversion of signal 32610 which is applied to the input of inverter 762.

In describing the operation of the ISL unit in response to an output control command, reference shall be made to FIG. 14A. Instructions are received from the communication bus connector 105 as bus address signals 10503 through 10510, 10512 through 10519, 10521, 10523 through 10525, 10530 and 10532. The address O-23 signals are applied to driver-receivers 181 through 205 on FIG. 14C. Referring to FIG. 14J, address 8-16 signals 18900, 19010, 19103, 19214, 19306, 19410, 19603, 19703 and 19810 are applied to comparators 302 through 310, respectively. The comparators 302-310 comprise the address comparator 99 of FIG. 8. Also applied to comparators 302 through 310 are the signals 10307, 10306, 10314, 10315, 10207, 10206, 10214, 10215, 10107 and 10114, which are the outputs of switches 101, 102 and 103. The switches are manually set to a predetermined address. The output signals of comparators 302-310, signals 30208, 30303, 30411, 30506, 30611, 30703, 30806, 30911 and 31008, are applied to the input of a NAND gate 439. The output signal 43909 is applied to the CD input terminal of a flop 440.

Signal 24512 indicates that the information transfer is not a memory reference bus information transfer. The signal is applied to the input of AND gate 439. The signal 10444 is received on connector 104, FIG. 14A, and is applied to driver-receiver 244 of FIG. 14B. The output signal 24414 is applied to the input of an inverter 245, and the output signal 24512 is applied to the input of AND gate 429. A bus data signal 21401 is received on connector 105, and applied to wired OR gate 214. Signal 21815 is applied to driver-receiver 218, and the output signal 21814 is applied to the input of an inverter 215 of FIG. 14I. The output signal 21510 is applied to a driver 216. The output signal 21606 of driver 216 is applied to the input of a delay line 328. The 60 nanosecond output signal 35811 of the delay line is applied to AND gate buffer 360 to produce signal 36008, which is applied to the clock input terminal of flop 440 of FIG. 14J. This assures that the bus signals have reached a steady state and can be strobed. The ISL address signal 44006 transitions to a logic one, and the signal 44005 transitions to a logic zero.

The bus address 18-23 signals 20006, 20103, 20206, 20314, 20410 and 20510 are applied to the address selection terminals of a PROM 399, FIG. 14K. Active signal 10115 and operational signal 53910 are also applied to the address selection terminals of PROM 399. Active signal 10115 is the output of switch 101, FIG. 14J. Each ISL in the system can be set active or passive. The active state allows the ISL to perform certain additional functions. Operational signal 53910 defined as the data transfer mode if true and the ISL configuration mode if false, is controlled by a data bit one signal 33310, FIG. 14I. This is described infra.

Referring to FIG. 14L, bus address 18-20 signals 20006, 20103, 20206, 20314 and 20410 are applied to the input of a NAND gate 131. If the address 18-22 are all at a logic zero, an output signal 13106 is at a logic one and is applied to an input of an AND gate 405. Address 23 signal 20510 is applied to another input of AND gate 405. Active signal 10105 and ISL address signal 44006 are applied to the other inputs of AND gate 405. The output control signal is 40508.

Function code 01 signal 40508 is applied to an input of a NAND gate 394 which generates a function initialize signal 39408. The data bit 0 signal 22203 is applied to the other input of NAND gate 394 to indicate that the output control is doing the subcommand initialize instruction. Function initialize signal 39408 is applied to the S input terminal of flop 531, and sets the flop to initiate the master clear sequence as described supra. The only difference is that the master clear function is initiated from a local communication bus instead of a power-on sequence.

Referring to FIG. 14H, the MYCLER (my master clear) signal 53109 is applied to an input of OR gate 438. The output signal 43808 which is at a logic one is applied to an input of a register 631. The 135 nanosecond delay signal 35809 is applied to the clock terminal of register 631. This forces output signal 63116 to a logic one. Signal 63116 is applied to an input of a NOR gate 130. The output signal is applied to the S input of a flop 433, thereby generating an acknowledge signal 43305 which is applied to driver-receivers 178 and 179 of FIG. 14C. The signal is transferred to the communication bus to acknowledge the receiving of information from a sending source. The output control initializing command is always accepted and always acknowledged.

The subcommand stop puts the ISL in an ISL configuration mode, and the subcommand resume puts the ISL in an information transfer mode. Referring to FIG. 14L, if the data signal 22203 is not at logic one, the output signal 39404 will be at a logic zero and the sequence described supra will not be implemented. Instead, the output of PROM 399 of FIG. 14K will be used.

The output signals 39909 through 39912 of PROM 399 are applied to the input terminals of a register 400. A strobe signal 36204 is applied to the clock terminal of register 400. The PROM 399 is the PROM 102 of FIG. 8.

The 90 nanosecond signal 35805 of FIG. 14I is applied to an input of NAND gate 361. The ISL ready signal 44512, and the write bus enable signal 64405 are applied to the other inputs of NAND gate 361.

Referring to FIG. 14K, the ISL address signal 44006 is applied to an input of an AND gate 445. Also applied to the input of AND gate 445 is the BSSHBC (second-half bus cycle) signal 26012 indicating a data response to a read request. The second-half bus cycle signal 10412 is applied to driver-receiver 259 of FIG. 14B from connector 104 of FIG. 14A. The output signal is 25914. The test remote signal 53914 is at logic one since the command is not a test mode instruction.

Referring to FIG. 14N, a 60 nanosecond delay signal 36008 is applied to the clock input of a d-flop 644. The file write enable signal 39607 is applied to the CD input terminal of flop 644. A multiplexer 396 selects the indication that the register, address file 103 or data file 92 of FIG. 8, into which information is to be written is not full. In this case signal 58406, an input to multiplexer 396 indicates that the retry request full register is empty since flop 584 is not set. File select signals 40903 and 41106 are applied to the select terminals of multiplexer 396. At this time, both select signals are at a logic zero, and the zero input terminal of multiplexer 396 is selected.

Referring to FIG. 14-O, the second-half bus cycle signal 25914 is applied to an input of a NAND gate 565, to an AND gate 409, and to a NAND gate 478. Bus reset lock signal 24102 is applied to inputs of AND gate 409 and a NAND gate 476. Bus memory reference signals 24414 is applied to the inputs of NAND gates 476 and 565. Bus address 18 signal 20006 is applied to the input of NAND gate 478. Signal 47808, 56506 and 47603 are applied to inputs of a NOR gate 411 to generate file write signal 41106. File write one signal 40903 is the output of AND gate 409. Since this is not a second-half bus cycle or a bus memory cycle, signal 25914 is at logic zero. Both file write select signals 40903 and 41106 also are at a logic zero.

Referring to FIG. 14B, signal 10410 is applied to driver-receiver 240 from connector 104, FIG. 14A. The output signal 24006, FIG. 14B is applied to the input of an inverter 241 which generates output signal 24102. Memory reference signal 10444 is applied to driver-receiver 244 from comparator 104, FIG. 14A, and generates output signal 24414.

However, if the retry request full flop 584 of FIG. 14N is set, the ISL unit is busy. The ISL unit will not, therefore, accept a command. The write bus enable signal 64405 thus is applied to the clock terminal of a D-flop 404, FIG. 14H. The local retry request full signal 58406 applied to the CD terminal is at logic zero. The flop 404 will remain reset. The function acknowledge signal 40409 is at a logic zero, and is applied to the input terminals of an AND gate 401 and a NAND gate 421. The inhibit wait signal 42103 is applied to an input of an AND gate 447. Compare signal 31808 is applied to another input of AND gate 447. Since this is not a compare cycle, signal 31808 is at a logic one. Local retry request set signal 58506 is applied to an input of AND gate 447. Signal 58506 is an output signal of an AND gate 585, FIG. 14N. Input signals 40802 and 41008 are at a logic one. Signal 40903 is applied to the input of an inverter 410, FIG. 14-O. The output signal is 41008.

Signal 41108 is applied to the input of an inverter 410. The output signal is 41008.

A retry signal 56608 is applied to an input terminal of AND gate 585 on FIG. 14N. Referring to FIG. 14K, signals 40712, 33006 and 44512 are applied to the inputs of an AND gate 442. The ISL ready signal 44512 is at a logic one. The data parity error signal 33006 is at a logic one since there is not a data parity error. The retry signal 56608 is the output of a NOR gate 566 on FIG. 14N. Signal 31704 is applied to the input of NOR gate 566, and is at a logic zero since an ISL function OK signal 44208 input to a NOR gate 317 is at a logic one.

The function OK signal 40712, FIG. 14K, is a decode of PROM 399. The four output signals 39909 through 39912 are applied to a NOR gate 406. As long as one of the signals is at a logic one, the output signal 40606 is at a logic zero. The signal 40606 is applied to the input of an inverter 407. The output of the inverter is signal 40712 at a logic one level.

Referring to FIG. 14H, the ISL wait signal 44706 is applied to an input of an OR gate 629. The output signal 62906 is applied to an input of register 631. The output signal 63102 is applied to an inverter 630. The output signal 663006 is applied to the S terminal of a D-flop 453. The output signal 45309 is at a logic one level, and is applied to the driver side of a driver-receiver 263, FIG. 14B. The output signal 26302 is applied to a wired OR gate 262, which is applied to connector 104 and sent out on the bus as signal BSWAIT-00.

Referring to FIG. 14H, signal 58406 is applied to the CD terminals and the R terminals of flop 404. The write bus enable signal 84405 is applied to the clock terminal, and sets flop 404 on the leading edge of signal 84405. Flop 404 is in a set state, thereby signalling an acknowledge signal to the bus as described supra.

Referring to FIG. 14-O, RAMs 161 through 166 which comprise the address file register 103 on FIG. 8, store bus address 0-23 signals. RAMs 364, 177, 647, 365, 366 and 389 which comprise the data file register 92 on FIG. 8, store data 0-15 signals and controls bus signals.

The write select signals 40903 and 41106 select one of four locations in each RAM, and in the selected locations the signals that are at the input terminals of that RAM are stored. The write bus enable signal 64406 is applied to the clock terminal of each RAM to clock the input data into each RAM.

At the time information is being written into the RAMs, the flop 644 and the flop 584 of FIG. 14N are set. This occurs as a result of flop 581 being set at the rise of signal 64405 during the 60 nanosecond delay signal 36008 time period. Flop 584 thereupon is set by the DCN 135 nanosecond delay signal 35602 since the signal 58109 is at logic one.

Referring to FIG. 14V, signals 92306, 27108, 83006 and 58109 of the cycle generator 146 of FIG. 8 are applied to the inputs of AND/OR gate 388. Signal 92306 is at logic one since the ISL unit is not doing a transfer to the remote bus operation. Signal 63006 is at logic one since a master clear sequence is not occurring. In addition, signal 27108 is at a logic one since no bus register operation is occurring and signal 58109 is at a logic one level.

The output signal 38808 is applied to OR gate 608. Output signal 60808 is applied to the CD input of flop 464. The output signal 60408 is applied to the clock input of flop 464. Signals 37606, 17612, 57206 and 46406 are applied as before described to the inputs of AND gate 604. Signals 37606, 46406 and 57206 are at a logic one level if the ISL unit is idle. Since the input signal 38808 to OR gate 176 is at logic zero, the output signal 17612 applied to AND gate 604 is at a logic one level. The flops 464 and 441 thereby are set to start an ISL cycle as described supra.

Referring to FIG. 14-0, master clear sequence signal 47005 and local cycle signal 46406 are applied to the inputs of an AND gate 369, and are both at a logic zero level. When signal 46406 transitions to logic one the output signal 36903, in the data file transmitter register 121 of FIG. 8, transitions to a logic one level. The signal 36903 is applied to the enable terminal of registers 367 and 368, which comprise the data file transmitter register 121 of FIG. 8. As a result, the register outputs signals 36702, 36705, 36706, 36709, 36712, 36715, 36716, 36719, 36802, 36805, 36806, 36809, 36812, 36815, 36816 and 36819. In addition, the register outputs signals 39102, 39105, 39106 and 39109. These signals are applied to wired OR gates 332, 334 through 348 in FIG. 14F.

Referring to FIG. 14-0, the file read select signals 40211 and 40312 select the location in the RAM containing the information to appear at the output of the RAM. Signals 49104 and 90704 are applied to the inputs of a NOR gate 402, and are at logic one during the local retry request cycle. Signals 49404, 49014 and 48502 are applied to the inputs of a NOR gate 403. The inputs are at logic one level since the ISL unit is not in one of the cycles specified by the signals applied to NOR gate 403. The output signal 40312 is at logic zero level.

The two read select signals 40211 and 40312 which are at a logic zero level, select location zero of the RAM. Location zero is defined as the retry request (RRQ) register. When the file write select signals 40903 and 41106 were at logic zero levels during the communication bus transfer, information was written into location zero of the RAMs.

Referring to FIG. 14I, data signal 33401 is applied to an inverter 333. The output signal 33310 is applied to the input of a register 539. Timing signal 32610 and signal 39702 are applied to the input of a NAND gate 547. Referring to FIG. 14K, signals 41810 and 58306 are at a logic one level, and are applied to inputs of AND-/OR gate 363. The output signal 36308 is applied to the enable terminal of a decoder 397 which comprises function code decoder 106 of FIG. 8. Since signal 36308 is at a logic zero, decoder 397 is enabled. Address 20-23 signals 15301, 15401, 15501 and 15601 are applied to the input of decoder 397. In this case, the output control signal 39702 is selected since address 21 signal 15401 is at a logic one level and the address 20, 22 and 23 signals are at a logic one level. Referring to FIG. 14I, when timing signal 32610 transitions to a logic zero, the output signal 54713 applied to the clock terminal of register 539 causes the operational signal 53910 to transition to a logic zero if the data signal 33401 is at a logic one level. The ISL unit would therefore be in a stop logic state. If the operational signal 53910 was at a logic one level, the ISL unit would be in an on-line logic state.

Referring to FIG. 14F, signals 40006, 40003, 40004 and 40005 are applied to wired OR functions 153 through 156. Signals 40003 through 40006 are outputs of register 400, FIG. 14K. Register 400 is enabled by signals 41811 and 60306 which are applied to the enable terminals of register 400. Signals 41811 is generated as an output of register 418. The signal 44208 is applied to the input of register 418 as described supra.

Signals 64508 and 57205 are applied to inputs of an AND gate 603. Both input signals are at a logic zero level, and shall be described infra. Output signal 60305 is applied to a second enable terminal of register 400, thereby storing the PROM 399 output. The PROM 399 is coded for the selected operation with signal 40003 at a logic one level. Signal 40003 is applied to wired OR junction 154 of FIG. 14F, and the output signal 15401 is applied to decoder 397 as described supra.

Bus address 17 signal 19914 is applied to an input of register 418 if signal 19914 is at a logic one level. The remote address signal 41807 thereupon is selected as an output of register 418 to indicate that a remote ISL unit is addressed. If signal 19914 is at logic zero level, the local address signal 41806 is selected to indicate that a local ISL unit is addressed. The output control command is processed by both the local and remote ISL units regardless of the state of the bus address 17 signal 19914.

The control signal 41815 output of register 418 is at a logic one level for the function code 01. Signal 41814 is applied to an AND gate 387. When the signal is at logic zero level, the output signal 38706 applied to the input of a NAND gate 545 transitions to a logic zero level. Signal 41802 is also applied to the input of NAND gate 545. The signal which shall be further described infra is also at a logic zero level. The output signal 54513 is applied to an input of a NAND gate 906, FIG. 14U. The local retry request cycle signal 58306 is applied to another input of NAND gate 906. Both input signals 54513 and 58306 are at a logic one level. The output signals 90611 is applied to an input of an OR gate 763. The output signal of the gate transistions to a logic one level which is applied to the CJ input terminal of a JK flop 923. The CK input, signal 86011, is at logic zero level since the master clear cycle is not completed.

The cycle 100 signal 76208 is applied to an inverter 761. The output signal 76108 is applied to the clock input of flop 923. This clock signal is applied 100 nanoseconds into the ISL cycle. Flop 923 set indicates that a transfer operation is occurring from the local to the remote ISL. The flop remains set until the transfer is completed.

The transfer full signal 92305 is applied to the clock input of a D-flop 919 thereby setting the flop. The output signal 91909 is applied to the input of a NAND driver 920. The output signal 92008 is applied to the input of a 125 nanosecond delay line 917.

The 37.5 nanosecond signal 91703 is applied to the input of an OR gate 918. Output signal 91808 is applied to the reset input of flop 919 thereby resetting flop 919 after being set for 37.5 nanoseconds.

The transfer cycle signal 91908 is applied to an input of a NAND gate 897. Master clear sequence signal 86106 is applied to the other input of NAND gate 897 and is at logic zero for this operation. The remote strobe signal 89701 is used in the remote ISL to strobe the data sent from the local ISL.

Referring to FIG. 14Z, which illustrates the ISL interface drivers 115 and the remote address receivers 104 of FIG. 8, the transfer full signal 92306 is applied to the clock terminals of multiplexers registers 832, 835, 836, 838, 840, 842 and 846. Signals 82610, 86404 and 87311 are applied to the input terminals of an OR gate 911 and are at logic one. The output signal 91108 is applied to the select terminals of the multiplexer registers 832 and 835, and is at logic one. Therefore, the input signals applied to input terminal 1 are selected.

Signals 86404 and 87311 are applied to inputs of an OR gate 912. Output signal 91203 is applied to the select input of multiplexer register 836. Since in this case signals 86404 and 87311 are at logic one, the input terminal 1 of multiplexer register 836 is selected.

Signals 43009 and 58306 are applied to inputs of a NAND gate 910. The output signal 91003 is applied to the select terminal of multiplexer register 840. Since in this case both signals 43009 and 58306 are at logic zero, input terminal 1 of multiplexer register 840 are selected.

Multiplexer register 838, 840, and 842 are wired so as to select input terminal one under all conditions. Address 0-23 signals 13201, 13301, 13401, 13501, 13601, 13701, 13801, 13901, 14001, 14101, 14201, 14301, 14401, 14501, 14601, 14701, 14801, 14901, 15001, 15101, 15301, 15401, 15501 and 15601 are stored in the multiplexer registers 832, 835, 836, 838, 840, 842 and 846.

Referring to FIG. 14AA, which illustrates the ISL interface drivers 139 and the remote data receivers 116 of FIG. 8, signal 92306 is applied to the clock input of multiplexer registers 849, 851, 853 and 855. Signal 92806 is applied to the select inputs of multiplexer registers 851 and 853. The select inputs of multiplexer register 849 and 855 are wired to select input terminal ones. Select signals 92806 is the output of an AND gate 928. FIG. 14W. Signals 59012 and 92505 are applied to the inputs of AND gate 928. Since both input terminals are at logic zero for this operation the input terminal one of multiplexer/register 851 and 853 of FIG. 14AA are selected.

The data multiplex 0-15 signals 78307, 78409, 78507, 78609, 78707, 78809, 78907, 79009, 79107, 79209, 79307, 79409, 79509, 79607, 79709 and 79807 are applied to the input terminals of multiplexer registers 849, 851, 853 and 855.

Referring to FIG. 14T, signals 78111 and 78208 are applied to the select one and select two terminals of multiplexers 783 through 798, which comprise the internal data multiplexer 129 of FIG. 8. Signals 42410 and 80108 are applied to an OR gate 781 which generates output select signal 78111. Signals 82010 and 80108 are applied to the inputs of an OR gate 782 which generates output select signal 78208. Since the inputs to OR gates 781 and 782 are at logic zero, the 0 inputs of multiplexers 783 through 798 are selected. Data 2-15 signals 33501, 33601, 33701, 33801, 33901, 34001, 34101, 34201, 34301, 34401, 34501, 34601, 34701 and 34801 are applied to input terminal 0 of multiplexer 785 through 798 respectively. Signals 93012 and 93009 are applied to input terminal 0 of multiplexers 783 and 784 respectively. Signals 93012 and 93009 are outputs of a multiplexer 930. Data 0 and 1 signals 33201 and 33401 are applied to input terminal 0 of multiplexer 930. Signal 82706 is applied to the select terminal of multiplexer 930 and is at logic zero for this operation. Enable signal 80108 is applied to the enable terminal of multiplexers 783 through 788 and is at logic zero thereby enabling the multiplexers 783 through 788. Multiplexers 789 and 798 are always enabled.

At this point address and data information has been received by the local ISL over the communications bus and stored in registers. The address and data signals will be sent out over the intra communications bus to the remote ISL by means of the ISL interface drivers 115 and 139 of FIG. 8.

As an example, referring to FIG. 14AA, the output of MUX register 849, a signal 84912 through 84915 are applied to the input of a driver 848. The output signals 84803, 84805, 84807 and 84809 are applied to a bank of terminating resistors 651, FIG. 14AC. The output of resistor bank 651, signals 65111 through 65114, are applied to terminals of a connector 660 which is the ISL intra communications bus. Referring to FIG. 14AA, the output of multiplexers 851, 853 and 855, are connected to the ISL intra communications bus through drivers 850, 852 and 854, through resistor banks 651, 652 and 653, FIG. 14AC, to connector 660.

Connectors 660 and 663 signal lines transmit information to the remote ISL. Connector 661 and 662 signal lines receive information from the remote ISL.

Referring to FIG. 14U, signal 92305 is applied to the clock terminal of a register 813. The input signals 86404, 90002, 87612 and 90910 represent the four ISL cycles, memory request, retry request, memory response and retry response, as described supra. The ISL cycle being described is the local retry request RRQCYL cycle. In this case, signal 90002 is at logic zero. The output signal 81307 is at logic zero and is applied to the input of a driver 814, FIG. 14AB, for transmission to the remote ISL.

Referring to FIG. 14AB, AC ground signal 67708 is applied to the F terminal of a receiver-driver 733. This receiver-driver is always enabled if the ISL cables between the local and remote ISL are plugged in their respective ISL's. Signal 67708 is the output of an inverter 677, FIG. 14AC. A capacitor 667 and a resistor 668 are connected to the inverter 677 input. Plus 5 volts is applied to the other terminal of resistor 668. Ground is applied to the other terminal of capacitor 667.

In the remote ISL, an AC ground signal 66201 is connected to pin 1 of connector 662 and is wired through the cable to the local ISL connector 663 in pin 1 which is connected to ground. When the cables are connected the ground at pin 1 of cable 663 appears at the input of inverter 677 and causes the output AC ground, signal 67708 to go to logic 1 and therefore enables the receiver number 733 on FIG. 14AB, (in the remote ISL) if the cable is disconnected between the twins (two ISL's), then the AC ground signal on pin 1 of connector 662, which is signal 66201, will be pulled high by resistor 668 and causes the AC ground signal 67708 to go to logic 0. This signal at logic 0 inhibits the outputs of the remote receiver 733, FIG. 14AB. Therefore, if the cables are connected the remote strobe signal number 73307 is applied to the clock input of a JK flop 874, FIG. 14V, which is set by the trailing edge of the strobe signal.

In the remote, output signal 87409 is applied to the input of an AND gate 799. Signal 62088 is applied to the other input of AND gate 799. Since signal 62008 is at logic one, the output signal 79911 is at logic one. Signal 79911 is applied to an input of an AND gate 812, FIG. 14AB. Signal 67708 is at logic one since the cables are connected, therefore the generate enable signal 81208 is at logic one. Signal 81208 is applied to the enable terminal of receiver driver 815. The signal 66222 input was generated in the local ISL. The output signal 81509 is applied to the input of an inverter 816. The output signal 81606 is applied to an input of an AND/NOR gate 578, FIG. 14V.

Signals 93214 and 92306 are applied to the input of AND/NOR gate 578 and are at logic one.

The remote pending output signal 57808 is applied to an input of an AND gate 558. Signal 87407 is applied to the other input of AND gate 558 and is at logic zero. The output signal 58803 at logic zero is applied to an input of an AND gate 571. Compare signal 27909 is applied to the other input of AND gate 571 and is at logic zero since this is not a compare cycle. Signal 57106 is applied to the input of a NOR gate 176. Output signal 17612 at logic one is applied to an input of AND gate 604. This results in the ISL cycle as described supra.

In this case, however, remote cycle flop 572 sets instead of local cycle flop 464. Also, since flop 464 does not set, register 490 remains empty and cycle signals 58306, 59012, 48603 and 49303 remain at logical ZERO. Instead, on FIG. 14U, the remote cycle signal 90201 is generated.

Signals 81509 and 57206 are applied to the input of a NAND gate 902. The output signal 90201 is the RRQCYR signal defining the remote retry request cycle in the remote ISL.

If we are not in the information transfer mode, AND gate 573 of FIG. 14V, output signal 57304, at logic one, is applied to an input of an AND gate 880, FIG. 14AB. AC ground signal 67708 is applied to the other input. Output signal 88006 is applied to the enable terminal of receiver 803, on FIG. 14V. Signal 56108 is applied to the input of an inverter 876. Output signal 87602 is applied to an input of an AND gate 878 on FIG. 14AB. Ground signal 66201 is applied to the other input. Output signal 87803 is applied to the enable input of drivers 882 and 884, FIG. 14Z. The driver-receivers 889, 890, 891, 892, 818 817 on FIG. 14AA and driver-receiver 809 on FIG. 14AB, are enabled in a similar manner to driver-receiver 803. Also, in FIG. 14Z, driver-receiver 881-886 are enabled by the REMOTE signal to receiver the ISL intra communications bus information.

The address and data lines and some control lines have been transferred from the local ISL to the remote ISL, and an ISL cycle has been initiated in the remote ISL.

Referring to FIG. 14K, remote signal 56108 is applied to the input of an AND/NOR gate 363. Signal 93214 is applied to the other input of AND/NOR gate 363. As described supra, the decoder 397, function code decoder 106 of FIG. 8, is enabled.

Output control signal 39702 is selected as before since the address signals 15301, 15401, 15501 and 15601 were received over the intra communications bus from the other ISL.

Referring to FIG. 14V, delay line 374 generates the end cycle signal 37407 which is applied to inverter 377. The output signal 37712 is applied to the NAND gate 323. Signal 32712 is also applied to NAND gate 323. The output signal 32306 is applied to the input of an OR gate 463. The output signal 46306 is applied to an OR gate 291 which generates the clear remote signal 29111 which resets flop 572 thereby concluding the remote cycle portion of the output control instruction. The final termination of the instruction will take place in the local ISL. The transfer done signal 92206 as generated in the remote ISL by the CYC100 signal 76208 and the remote cycle signal 57205 at AND gate 922 will be received at the local ISL through the receivers previously mentioned.

Referring to FIG. 14U, in the local ISL, signal 73303 is applied to the input of a NOR gate 739. The output signal 73913 is applied to the reset terminal of flop 923 thereby resetting the flop.

The flop 923 was originally set when the information transfer between the local and remote ISL was started.

Referring to FIG. 14V, the signal 92306 is again applied to AND/NOR gate 388 and 578 to enable another ISL cycle to take place in the local ISL thereby enabling the local ISL to accept another command from the bus.

The output interrupt control instruction loads interrupt information into the ISL so that when an interrupt is initiated, the central processor can be interrupted at the level designated.

Referring to FIG. 14N, flop 581 is set as described supra. The signal 64405 which sets flop 581, also clocks the address, data and control information received over the bus into the address and data register files on FIG. 14Q, as described supra. Signal 58109 is applied to the input of register 490, FIG. 14V, as before.

Referring to FIG. 14K, signals 41810 and 58306 applied to AND/NOR gate 363 enable output signal 36308 thereby enabling decoder 397. As before PROM 399 is addressed and the information at the addressed location is stored in register 400. The output of register 400 is applied to the wired OR junctions of FIG. 14F and applied to the decoder 397 input terminals. In this case, output interrupt control signal 39710 is selected, signal 39710 is applied to an input of an AND gate 551. Signal 57508 is applied to the other input of AND gate 551 and is at logical ZERO. The output signal 55106 is applied on FIG. 14M to an input of a NAND gate 825. Timing signal 32610 is applied to the other input of NAND gate 285. Output signal 82504 is applied to the clock terminals of registers 819 and 857, the interrupt channel register 132 and interrupt level register 134 of FIG. 8.

Data 6-8 signals 33901, 34001 and 34101 are applied to the inputs of register 819 and data 10-15 signals 34301, 34401, 34501, 34601, 34701 and 34801 are applied to the inputs of register 857 thereby completing this cycle portion of the instruction. Local cycle flop 464, FIG. 14V, is reset as described supra.

If this instruction was initiated by the local ISL then in FIG. 14N, flog 584, RRQ full, will reset as described supra.

If the remote ISL is to process the output interrupt control instruction then in the local ISL he BSAD17 signal 19914 input to register 418, FIG. 14K, at logical ONE forces the remot address signal 41807 to logical ONE and the local address signal 41806 is at logical ZERO. The output of AND gate 387, signal 38706 is at logical ZERO forcing the output of NAND gate 545, signal 54513, to logical ONE. This forces the output of AND gate 575, signal 57508 to logical ONE. This forces the output of AND gate 551, signal 55106 to logical ONE.

Referring to FIG. 14M, signal 55106 at logical ONE forces the output of NAND gate 825, signal 82504, to logical ZERO preventing information from being loaded into registers 819 and 857.

In this case, the local ISL will transfer the information to the remote ISL. Referring to FIG. 14U, signal 54513 at logical ONE forces the output of NAND gate 906, signal 90611, to logical ZERO which forces signal 76308 to logical ONE. This sets flops 923 as described supra thereby generating the local ISL to remote ISL information transfer cycle.

The rest timer instruction enables a number of timers in the local ISL. The output timer signal 39717 is generated as logical ZERO by the decoder 397, FIG. 14K, and is applied to an input of an AND gate 553. Since this is a local operation, the remote function signal 57508 which is applied to the other input of AND te 553 is at logical ZERO. The output signal 55311 at logical zero is applied to the input of an inverter 554. The output signal 55404 at logical ONE is applied to the input of a NAND gate 280, FIG. 14X. The 50 nanosecond delay timing signal 32502 is applied to other input of NAND gate 280. The output signal 28008 is applied to the clock terminal of a register 914, part of the mode control register 135 of FIG. 8. The output signals of register 914 enable a number of timer conditions. When one of these timer conditions times out, the output timer instruction is used to reset the timer to inhibit further time out errors.

Output signal 91407 is the watchdog timer enable gate signal. The watchdog timer is a one second timer which is used in conjunction with software to determine whether a device is not responsive to communication from the ISL. Output signal 91402 resets the watchdog timer. Output signal 91410 is the timer enable signal. The time-out enable signal tests if a device may have a hardware fault. Output signal 91415 is the interrupt enable reset signal. The interrupt enable reset signal tests for non-existent resources. This interrupt would be sensed during a memory write operation or after a memory time-out.

During the master clear sequence as well as during one of the above timer operations the output clear signal 55208 is at logical ONE when either signals 28008 or 47006 which are applied to the input of a NOR gate 552 are at logical ZERO. This signal will enable the clearing of all timers in the ISL.

Referring to FIG. 14Y, the timer and status unit 133 of FIG. 8, data 3 signal 33601 and output clear signal 55203 are applied to the input of a NAND gate 600. All data 9-15 signals are at logic one during the master clear sequence.

The output clear signal 60006 is applied to the reset input of a D-flop 599, the retry time-out flop, thereby resetting the flop. The operation of flop 599 will be described infra.

Similarly, output clear signal 55203 and data 0 signal 33201 are applied to the inputs of a NAND gate 506. The output signal 50608 is applied to the reset terminal of a D-flop 505 thereby resetting the flop. Flop 505 set indicates that no response was received from memory. This operation is described infra.

Output clear signal 55203 and data 1 signal are applied to the inputs of a NAND gate 460. Output signal 46011 is applied to the reset terminal of a D-flop 459, thereby resetting the flop. FLop 459 set indicates and I/O device time-out.

Referring to FIG. 14X, output clear signal 55203 and data 2 signal 33501 are applied to the inputs of an AND gate 635. The output signal 63503 is applied to the reset terminal of counters 636 and 637 thereby resetting the counters. These counters 636 and 637 are a part of the watchdog timer control. The operation of the watchdog timer control is described supra.

The output address instruction unlike the previously described instructions does not affect the remote ISL. The output address instructions will not only be issued to the local ISL since all address is controlled by the local ISL which we will get into. The output instruction will load an address into the local ISL. This address information will include a channel address and/or a memory address. The output address instruction wll select one of the address locations.

Referring to FIG. 14K the output address instructions select the signal 39706 output of function code decoder 397. On FIG. 14Q, which illustrates the RAM counter 118 and RAM controller register 108 of FIG. 8, signals 39706 and 50 nanosecond delay timing signal 32404 are applied to the input of a NAND date 743. Output signal 74310 is applied to the clock terminal of register 758 and to the input of an inverter 742. The output signal 74212 is applied to the G1 terminal of RAM counters 744, 745 and 746, thereby enabling the data inputs of the counters.

The register 758 is loaded with data 3-5 signals 33601, 33701 and 33801 which is the write enable control for the three RAMs (CP translator, memory translator and channel bit).

Counter 744 is loaded by data 6, 7 signals 22901 and 34001. Counter 745 is loaded by data 8-11 signals 34101, 34201, 34301 and 34401 and counter 746 is loaded by data 12-15 signals 34501, 34601, 34701 and 34801.

The output address instruction is completed with RAM counters 744, 745 and 746, loaded with the address of the locations that will be read or modified and the register 258 storing the write enable bits for the RAM selection.

The output data instruction is used in conjunction with the output address instruction. Using the address locations and the RAMs that were specified in the output address instruction, the data received from the communications bus during this instruction will be stored in the RAMs at the specified address.

Referring to FIG. 14K, the output signal 39715 of decoder 397 is forced to logical ZERO. As described supra, signal 39715 and remote function signal 57508, both at logical ZERO are applied to the input of AND gate 643. The write RAM signal 64303 at logical ZERO is applied to the input of NOR gate 639.

The write enable signal 63908 is at logical ONE. On FIG. 14V, signal 63908 and 50 nanosecond delay timing signal are applied to the inputs of AND gate 638. This forces write memory signal 63811 to logical ZERO.

Referring t FIG. 14Q, signals 53910 and 56108 are applied to the input of AND gate 748. Output signal 74808 is applied to the enable terminal of registers 741 and 929 thereby enabling the address stored in RAM counters 744, 745 and 746 to the output of the registers. The output signals from RAM control register 108 of FIG. 8, signals 74102, 74105, 74106, 74109, 74112, 74115, 74116, 74119, 92905, 92906, 92909, 92912, 92915, and 92916 are applied in FIG. 14F to the wired OR terminals 137 through 149.

Referring to FIG. 14Q, the output of register 758 is applied to OR gates 730, 737 and 759. The outputs 73003, 73706 and 75906 determine the RAM into which the address stored in registers 741 and 929 is written. Signal 73003 is the memory translation write enable output. Signal 73706 is the channel write enable output and signal 75906 is the CP translation write signal. It is therefore possible to write into any combination of RAM's.

Signals 73003, 73706 and 75906 are also stored in register 929.

Signals 75906, 73706 and 73703 appear on the address bus in the ISL as address signals 13701, 13801 and 13901 respectively. Signal 13701 is applied to the input of NAND gate 760, FIG. 14W. Signal 63811 is the other input to NAND gate 760 and the output signal 76003 is applied to the write enable terminal of RAMs 757 and 754, the CP source and destination RAMs 131 and 113 of FIG. 8.

Referring to FIG. 14R, signals 13801 and 63811 are applied to the inputs of NAND gate 312. The output signal 31206 is applied to the write enable terminal of RAM 276, the channel hit bit RAM 142 of FIG. 8.

Referring to FIG. 14S, signals 13901 and 63811 are applied to the inputs of NAND gate 859. The output signal 85906 is applied to the write enable terminals of RAMs 706 through 715 and 883, the memory translation and hit bit RAM 125 of FIG. 8.

Referring to FIG. 14Q, at the end of the instruction RAM counters 744, 745 and 746 are incremented by signal 74711 which is applied to the +1 clock terminal of the counter 746. Signal 39715 input to NOR gate 908 is at logic zero therefore output signal 90812 is at logic zero. Since signal 90002 is also at logic zero, output signal 74003 is at logic zero. Since the end pulse signal 37606 is at logic zero, the output signal 74711 at logic zero increments counter 746 at the end of the ISL cycle when signal 97606 goes to logic one, counters 745 and 746 incremented by the ripple carry signals 74612 and 74512 respectively, described supra.

Referring to FIG. 14N, the RRQ full flop 584 is reset by the input signals 76208, 56803, 47006 and 57611, to AND/NOR gate 286 being at logic one.

For the remote operation of the output mask data instruction, the output mask address only is issued through the local bus so that if an output mask data instruction is to be issued to a remote bus the address will be sent over to the remote bus in the same manner as described supra via the address bus and the data and other functions will be coming from the data file as described supra.

For writing in the remote ISL RAMs the address and data information from the local ISL is sent to the remote ISL, the counter in the remote ISL is not used to control the address of the RAMs, the information for the addessing always comes from the local ISL.

The input interrupt control is received from the inter communications bus exactly as the output instructions are received, however, referring to FIG. 14K, the PROM 399 output signal 39909, is at logical ONE. The signal 39910 is applied to the input of register 400. The output signal 40005 is applied to wired OR terminal 156 in FIG. 14F. Signal 15601 at logical ONE is applied to the input of decoder 397, FIG. 14K. Output signal 39709 is at logical ZERO.

Also, signals 19914, 44208 and 44508 are applied to the inputs of register 418. Output signals 41806, 41810 and 41814 are at logical ONE. These signals are applied to the input of AND gate 387. The output signal 38706, at logical ONE, is applied to the input of NAND gate 545. Output signals 54513 at logical ZERO is applied to the input of a NOR gate 613. The output signal 61306 is forced to logical ONE.

Referring to FIG. 14N, flops 581 and 584 are again set and a local ISL cycle is initiated as described supra. The address and data information on the communications bus is stored in the register files of the local ISL.

The intent of this instruction is to read the two registers 819 and 857, FIG. 14M. The register 819 contains the CP channel address and register 857 contains a level at which the interrupt is controlled. The information from register 819, the interrupt channel register 132 of FIG. 8, and from register 857, the interrupt level register 134 of FIG. 8, is placed on the communications bus.

Signals 81902, 81907, 81910, 81915, 85715, 85702, 85710, 85707, 85705 and 85712 are applied to the terminal 3 inputs of internal data multiplexers 789 through 798, respectively, of FIG. 14T. Ground signals are applied to the terminal 3 inputs of terminal data multiplexer 783 through 788. Signals 38709 and 42708 are applied to inputs of a NOR gate 801. Signal 39709 is at logic zero. The output signal 80108 at logic one is applied to the inputs of OR gates 781 and 782. The output signals 78111 and 78208, at logic one are applied to the 1 and 2 select terminals respectively of multiplexers 783 through 798 thereby selecting the 3 terminal input to the multiplexers.

Signals 78907, 79009, 79107 and 79209 are applied to input terminal 0 of a multiplexer 780, FIG. 14W, data multiplexer 137 of FIG. 8. The output signals 78004, 78007, 78009 and 78012 are applied to the input terminal 1 of MUX 526, FIG. 14G, and is selected for this instruction. Output signal 78609, 78307, 78507, 78409, 78809, 78707, 79307, 79509, 79607, 79709 and 79807 are applied to input terminal 1 of MUX registers 525, 527 and 528, FIG. 14G, which comprise the data multiplexer register 138 of FIG. 8. AND/NOR gate 524 output signal 52408, at logic one is applied to the select terminal of MUX registers 525, 526 and 527 thereby selecting the input terminal 1. Signals 52408 and 42709 are at a logic one level, and are applied to the inputs of an AND gate 372. The output of the gate transitions to a logic one which is applied to the select terminal of MUX register 528.

Referring to FIG. 14G, signals 15202, 61306 and 58306 are applied to the input of a NAND gate 465. The address 20 signal 15202 indicates an input instruction being performed.

Output signal 46508 at logical ZERO is applied to the input of a NOR gate 378. The output signal 37806 is at logical ONE.

Referring to FIG. 14D, signals 76208 and 37806, at logical ONE, are applied to the inputs of an AND/NOR gate 278. The output signal 27808 is applied to the clock terminals of MUX registers 525 through 528, FIG. 14G.

The output signals 52514, 52512, 52513, 52515, 52613, 52612, 52614, 52615, 52712, 52714, 52713, 52715, 52814, 52815, 52813 and 52812 are applied to parity generators 521 and 522 which generate parity signals 52109 and 52209.

Referring to FIG. 14D, signals 27808 and 56406 are applied to inputs of an OR gate 562. The output signal 56211 is applied to the input of an inverter 563. The output signal 56308 is applied to the clock terminal of an ISL request flop 450. Signal 45009 and bus busy signal 20804 are applied to the inputs of a NAND gate 533. If the bus is not busy, output signal 53303 which is applied to the set input terminals of a my request flop 534, sets the flop.

Signal 56211 is also applied to the clock terminal of the ISLUOK flop 446 thereby setting the flop, thereby enabling the bus priority network by signal 44609 at logical ONE being applied to a NAND gate 520. If all of the input conditions of NAND gate 520 are met, then the output signal 52009 is applied to the set terminal of a my data cycle now flop 517, indicating that the ISL is putting information out on the communication bus.

The output signals of MUX registers 525 through 528, FIG. 14G, and the parity generators 521 and 522 are applied in FIG. 14B to the inputs of DRVR-RCV's 219, 220, 222 through 238. The my data channel now signal is applied to the other inputs of the DRVR-RCV's and gates the information onto the bus.

Referring to FIG. 14N, the ISL cycle is terminated as described by resetting the RRQ full flop 584, when the signals 76208, 56803, 47006 and 57611 inputs to AND/-NOR gate 286 are at logic one and resetting flop 581 when signals 37712, 58306 and 54008 which input NAND gate 582 are at logic one.

The remote interrupt control instruction is similar to the local interrupt control instruction except that the BSAD17 signal 19914 input to register 418, FIG. 14K, is at logical ONE. Output signal 41806 at logical ZERO is applied to the input of AND 387. Output signal 38706 is a logical ZERO forcing output 45413 to logical ONE, forcing output signal 61306 to logical ZERO.

Referring to FIG. 14G, the signal 61306 input to NAND gate 465 forces output signal 46508 to logical ONE forcing the enable signal 37806 to logical ZERO. Signals 37806 and 76208 are applied to the input of AND/NOR gate 278, FIG. 14D. Signal 37806 at logical ZERO forces the output signal 27808 to logical ONE thereby disabling the clock input to MUX register 525, 526, 527 and 528.

The remote ISL will generate an ISL cycle and will send the data back to the local ISL as specified by the instructions.

As in previous remote ISL cycles, decoder 397, FIG. 14K will generate the signal 39709 which in turn will generate the remote request cycle in the remote ISL. However, the remote ISL sends the data back to the local ISL in the following manner.

Referring to FIG. 14U, signals 15301 and 90112 are applied to the inputs of a NAND gate 905. Output signal 90504 at logical ONE is applied to the input of an AND gate 822. Signal 93214 is applied to the other input of an AND gate 822. Since this is the remote ISL, signal 93214 at logical ONE, was generated by the local ISL and sent to the remote ISL indicating that it was a remote function code.

Output signal 82208 is applied to the input of a NAND gate 924. End pulse signal 37606 is applied to the input of an inverter 800. The output signal 80002 is applied to the other input of AND gate 924. Output signal 92408 goes low at the end of the remote cycle thereby setting flop 923. This flop being set initiates the transfer cycle from the remote ISL to the local ISL as described supra.

Signal 82208 is applied to an input of a NOR gate 909. Signal 59012 is applied to the other input of NOR gate 909. Output signal 90910 is applied to an input of register 813. Signal 92305 is applied to the clock input of register 813.

In FIG. 14U, the signal 81314 is sent back to the local ISL. In FIG. 14V, signal 81503 is generated and applied to a NOR gate 269. The output signal 26912 is applied to the input of AND/NOR gate 578. Signal 27108 is applied to the other input of AND/NOR gate 578. This initiates the remote cycle back to the local ISL as described supra.

The initial cycle in the local ISL was a remote input cycle. The cycle originating from the local ISL was sent to the remote ISL to initiate an RRQCYR within the remote ISL. The RRQCYR cycle in the remote generates an RRSCYR (response) cycle in the local ISL. The local ISL initiates an RRSCYL to send out on the bus the data received from the remote during the RRSCYR cycle in the local ISL.

Referring to FIG. 14N, in the local ISL, signal 81503 received from the remote ISL and signal 57206 are applied to inputs of NAND gate 597, the remote response output signal 59710 is applied to an input of an OR gate 592. Signal 46108 is applied to the other input of OR gate 592 and is at logical ZERO. The output signal 59211 at logical ONE indicates the remote response cycle (RRSCYR).

As described supra, the data bus and address bus in the local ISL will reflect the remote address and data receivers from the other half ISL. So in this case, the data that is going to be present on the data bus will be the interrupt channel and level data that was put on the transmitters and fed to these receivers from the remote ISL.

The data bus has the proper data during this remote cycle in the local ISL. This data is fed through the data multiplexers 783 through 798 of FIG. 14T, which comprise data multiplexer 129 of FIG. 8. Unlike the local input interrupt control, at this point in time, the function code decoder output is invalid since this is a response cycle.

Referring to FIG. 14T, signals 29709 and 42708 are now at logical ONE and input NOR gate 801. Therefore, the select signals 78111 and 78208 are at logical ZERO thereby selecting input terminal 0 of MUXs 789 through 798. This selects the data 6-15 signals 33901, 34001, 34101, 34201, 34301, 34401, 34501, 34601, 34701 and 34801 reflecting the interrupt channel and level data sent from the remote ISL to the local ISL.

At this point, all the cycles described have been ISL cycles which enable function code decoders. Now the RRSCYR cycle or the retry response remote cycle will not initiate any function code decode. Referring to FIG. 14K, the signal 36308 enable input to decoder 397 is at logical ONE. Therefore, a remote function code is not generated for an RRSCYR cycle back to the local ISL. The data and address information will be sent out on the bus as described supra.

Referring to FIG. 14N, the RRQ flop 584 was reset an the RRQ TO DO flop 581 was reset in the original RRQCYL cycle as in an output command or the initial input command via gate 582. During the RRQCYL cycle at end pulse time, we would reset the RRQ TO DO flop 581. The RRQ FULL flop 584 is the function that keeps this path busy, therefore flop 581 resetting at this time will not affect the operation since it cannot set again until the RRQ FULL signals 58405 and 58406 are returned to their normal state with flop 584 not set.

Referring to FIG. 14K, register 418 is reset by the signal 56011 output of an OR gate 560. The register 418 is therefore reset at the same time flop 584, FIG. 14N, is reset thereby clearing out all the control functions which were set into register 418 at the initiation of this instruction.

The input mask data instruction basically is going to read the hit bit information of RAM 142 of FIG. 8. It will read the memory address translation and hit bit of RAM 125 of FIG. 8. It will be reading the CPU destination translation RAM 131 of FIG. 8. The input data command is always preceded by an output address instruction or command except where contiguous locations are read. One input data instruction is followed by another input data instruction. But somewhere there had to be an output address instruction which would load the address of the starting location to be read into RAM counter 118, of FIG. 8. This is the RAM counter which feeds the RAM counter control register 108, the output of which is used to address the RAMs indicated in the RAMs 142, 125 and 131 as just described. The address information is used to address the RAMs and the data from these RAMs are transferred to the data bus for the local or remote ISL to which the instruction is issued. Now to briefly cover the cycling of a local ISL input data instruction it will consist of a communication bus cycle to present the instruction and then it will take an internal ISL cycle which in this case would be an RRQCYL cycle, and then followed by another communication bus cycle. So there is only one internal ISL cycle for a local input data instruction. The remote input data instruction will require three internal ISL cycles. The first cycle is an RRQCYL cycle which will sent to the remote ISL the address of the RAM location to be read. During this cycle, the RAM address will be sent to the remote ISL along with the function code which has been described supra, to generate the second cycle, an RRQCYR cycle in the remote ISL. This data in turn will be collected from the remote ISL RAMs, analogous to RAMs 142, 125 and 131 as described supra in FIG. 8. The data will be sent back to the local ISL where a third cycle, the RRQCYR cycle will be generated. Following the RRSCYR cycle, the data is placed on the communications bus for transfer to the CPU that requested the data. Most of the logic of the instruction has been covered when describing the input interrupt control instruction. The main difference is in the function code decoder output which selects the proper multiplex inputs to steer the data to the data bus to send the data to the selected communication bus whether from the local or remote ISL.

Referring to FIG. 14N, flops 584 and 581 are set as described supra. Signal 58506 at logical ONE is applied to the CJ input of flop 581 and clock signal 66405 sets flop 581. Signal 58109 applied to the CJ input of flop 584 causes RRQ full flop 584 to set on the fall of clock signal 35602. This prevents other commands from being accepted by the ISL using the retry path.

As described supra, the ISL will upon detection of a retry request to do, generate an ISL cycle. And the ISL cycle starts the timing chain through delay line 374, FIG. 14V, and sets a local ISL cycle regardless of whether it is a local or remote instruction at this time. The local cycle will generate, if the instruction is addressed to the local ISL, the timing and data paths to send the data to the communication bus drivers. Referring to FIG. 14K, the function code output decoder 397 generates an output signal 39714 for an input data instruction. The input data function code on the communication bus when issued will be a function code 10. This function code 10 along with the proper control bit configuration is applied to the PROM 399. The output of this PROM 399 is an encoded internal function code and this is stored into register 400. The output of register 400 as previously described will be presented on the address bus during the RRQCYL cycle that we are generating, and the function code on the input to the decoder 397 will enable the input data function 39714. This function, if being issued to the local ISL will attempt to read the data from the specified registers.

During the input data, the data MUX's in FIG. 14T will gather all the appropriate data through the various registers. Input data signal 39714 is applied to the input of an inverter 820. The output signal 82010 is applied to the input of OR gate 782. Output signal 78208, the MUX selector 2 signal is at logical ONE. MUX selector 1 signal 78111 is at logical ZERO since both inputs to OR gate 781 signals 42410 and 80108 are at logical ZERO since this is not input interrupt control or interrupt cycle.

Therefore, input terminal 2 of MUX's 783, 784, 785 and 786 are selected. The input data are the CP destination translator RAM function signals 75411, 75409, 75407 and 75405. These are the outputs of RAM 754, FIG. 14W.

Referring to FIG. 14W, MUX 749 output signals 74904, 74907, 74909 and 74912 are applied to the address selection terminals of CP destination RAM 754. Signals 59012 and 92505 are applied to AND gate 928. Since this is not an RRSCYL cycle, the output signal 62806, at logical ZERO is applied to the select terminal of MUX 749. Therefore the address 14-17 signals 14601, 14701, 14801 and 14901 are selected.

Referring to FIG. 14Q, the output of the RAM counters 744, 745 and 746 are applied to the inputs of registers 741 and 929 which comprise the RAM control register 108 of FIG. 8. Since this is an ISL configuration mode and non-remote operation, the signals 53910 and 56108 which are applied to the input of AND gate 748 are at logical ZERO. The output signal 74808 at logical ZERO enables registers 741 and 929. The selected outputs of these registers are reflected at the input address selection terminals of RAM 754, FIG. 14W as described supra.

The counters 744, 745 and 746, FIG. 14Q, were previously loaded from an output address instruction.

Referring to FIG. 14R, channel mask RAM 276, which stores the channel hit bit has its address selection input terminals selected by MUX's 313, 314 and 315. Signal 53911 is applied to the select terminal of MUX's 313, 314 and 315. Since this is a configuration mode cycle, the signal 53911 is at logical ONE thereby selecting input terminal 1. These are address bits 8-17 signals 31509, 31504, 31512, 31507, 31412, 31409, 31404, 31407, 31304 and 31312.

The channel hit bit 27607 output of RAM 276 is applied to input terminal 2 of MUX 787, FIG. 14T. Memory hit bit 86307 is applied to input terminal 2 of MUX 788. It is the output of RAM 863, FIG. 14S. The input address 0-9 selection signals 47507, 47409, 47307, 47312, 47309, 47304, 47204, 47209, 47212 are generated as the outputs of MUX's 472-475, FIG. 14R. Input select 1 and 2 signals 48112 and 53911 are at logical ONE. Since this is not a memory reference nor is the ISL in the data transfer mode, therefore input signals 24414 and 53910 of gate 481 are at logical ZERO. The output of the NAND gate 481 is at a logical ONE.

Therefore, address 8-17 signals 14001, 14101, 14201, 14301, 14401, 14501, 14601, 14701, 14801 and 14901 are selected. Therefore, output signal 86307 of RAM 863, FIG. 14S, the memory hit bit is selected.

The memory translation RAMs 706 through 715 output signals 70607, 70707, 70807, 70907, 71007, 71107, 71207, 71307, 71407 and 71507 are applied to the terminal 2 inputs of internal data MUX's 789 through 798 respectively, FIG. 14T. RAMs 706 through 715 are addressed by the signals addressing memory mask hit bit RAM 863, FIG. 14S.

For a local input data instruction, the data from the MUXs 783 through 798, FIG. 14T, is transferred to the terminal 1 input of MUX registers 525 through 528, FIG. 14G, which are the bus interface multiplexer registers 138 of FIG. 8.

As described supra, select signal 52408 selects the signals at the input terminal 1 of MUX registers 525 through 527 and select signal 37208 selects the signals at the input terminal 1 of MUX register 528.

The remainder of the operation for a local input data instruction is as described supra for transferring the information out on the communication bus at the conclusion of the RRQCYL cycle.

The remote input data instruction is identical to the operation as described supra for the input interrupt control. That is, during the RRQCYL cycle a transfer cycle is generated which generates a remote strobe to the remote ISL. The remote ISL will use this signal to generate a remote cycle. This remote cycle will be an RRQCYR cycle as previously described and the main differences are that rather than the data MUX, the channel address and memory translation RAMs getting their addresses from the RAM counter control as described supra, the remote ISL will be getting its address from the remote address receivers, which is box 104 on FIG. 8. So therefore the address inputs to the channel hit bit RAM on FIG. 14R, and memory translation RAMs on FIG. 14S and the CP translation RAMs on FIG. 14W, will still come from the address bits as described supra, and the output of these RAMs will be fed to the data MUX as for the local, and the output of the data MUX rather than going to the communication bus data MUX registers on FIG. 14G, will go to the local data drivers of FIG. 14AA. The multiplex registers 849, 851, 853 and 855 will receive the data MUX outputs and get stored in this register at the transfer full time, which was previously described. This signal, 92408 gate 924 output, FIG. 14U, is the signal that happens at the 100 nanosecond delay signal of the remote cycle if the data is to go to the local ISL. The data must be sent back to the local ISL therefore these four MUXs will receive the data which is sent back to the local ISL twin. Now the local ISL as described supra will receive a signal to generate an RRSCYR cycle. This RRSCYR cycle as described supra will take the data from the remote ISL send it to the communication bus register and in turn generate a communication bus cycle and send this data back to the CP that requested the data initially.

The input status intruction of the ISL unit is described. The ISL input status command will be identical as far as the cycle logic and the timing is concerned, to the other input commands to the ISL. Only the RRQCYL cycle will take place if the instruction is for the local ISL. If the instruction is for the remote ISL, three cycles will be performed, the RRQCYL local ISL cycle, the RRQCYR remote ISL cycle following by the RRSCYR local ISL cycle. The only differences are as follows.

Referring to FIG. 14K. signal 39711 is selected as the output of deocder 397. Signal 39711 is applied to the input of an inverter 424. Output signal 42410 at logical ONE is applied to the input of OR gate 781, FIG. 14T. The select 1 input signal 78111 at logical ONE selects the input terminal 1 of MUXs 783 through 798. Select 2 signal 78208 is at logical ZERO. Therefore, the the signals at input terminal 1 are selected for transfer to the communication bus and then to the requesting central processor.

These input data signals (ISL status bits) to MUXs 783 through 798 are referenced in Table 11. Data bit 0 (input signal 87203, MUX 783) is the operational bit, this is the bit 0 which indicates whether the ISL is in a data transfer or configuration mode. Data bit 1 (input signal 89309, MUX 784) indicates if there was an interrupt requested from a remote ISL twin. It indicates both watchdog timeout or a rather non-existent resource error.

Rather than explaining all the individual status bit inputs at this time, we will just complete the data flow of the instruction and upon completion we will show what each of the individual status bits pertains to of FIG. 14T.

As described supra, the data outputs of MUXs 783 through 798, FIG. 14T, is applied to the bus MUX registers 848, 851, 853 and 855, FIG. 14AA, for the local ISL input status instruction. A communication bus cycle will be generated and the status information sent to the requesting central processor.

The remote input status instruction is identical to the remote input data and input interrupt control instructions. The information will be sent out on the bus from the remote ISL to the local ISL from where it is sent out on the communication bus to the requesting central processor.

Following are the functions the status bits perform in the ISL timer and status unit 133 of FIG. 8. The first status bit to data MUX 0 on FIG. 14T, is the operational bit signal 87203. Referring to FIG. 14I, signals 62806 and 53910 are applied to the inputs of an AND gate 872. Signal 62806 at logical ONE indicates that the other ISL, remote or local, is linked into the system and power applied.

Signal 66243 is connected to the ISL interface bus by connector 662 FIG. 14AC and is applied to an input of driver 736, FIG. 14AB and to a pull-up resistor 665 to +5 volts. Therefore if either ISL is disconnected or powered down, the signal 66243 is at logical ONE.

Output signal 73612 is applied to the input of an inverter 628, FIG. 14J. The output signal 62806 is applied to the input of AND gate 872. Signal 53910 is at logical ONE and the output signal 87203 at logical ONE is applied to the input terminal 1 of MUX 783, FIG. 14T.

Driver 913, FIG. 14AB, has a ground signal applied to the input. The output signal 91318 is applied to connector 663 terminal and then to the other ISL thereby supplying the ground signal for the interconnected ISL's.

Referring to FIG. 14T, the remote interrupt stored signal 89309 is applied to input terminal 1 of MUX 784. The data MUX bit 1 signal 78409 is generated as an output.

Referring to FIG. 14X, non-existent memory signal 87112, watchdog time signal 91616, time-out signal 91402 and remote interrupt enable signal 91415 are applied to the inputs of an AND/NOR gate 895. Output signal 89508 at logical ZERO indicates that there was a remote interrupt or time-out and is applied to the set terminal of a D-flop 893 which sets the flop.

Referring to FIG. 14Y, the end pulse signal 37712 and the status signal 42410 at logical ONE are applied to inputs of a NAND gate 609. The output signal 60906 is applied to the input of an OR gate 295. A master clear signal 83006 is applied to the other input. The output signal 29506 at logical ZERO is applied to the reset terminal of flop 893, FIG. 14X, thereby resetting the flop after the status is read.

Referring to FIG. 14T, the input terminal 1 of MUX 785 is tied to ground or logical ZERO, the status signal for Data MUX bit 2, signal 78507 is therefore at logical ZERO. Data MUX 3 signal 78609 is generated by the active signal 10115 applied to MUX 786. This signal 10115 is the output state of the hexadecimal rotary switch 101, FIG. 14J, indicating this local ISL unit is active when at logical ONE or passive when at logical ZERO.

Data MUX bit 4 signal 78707 output of MUX 787 and data MUX bit 5, signal 78809, are at logical ZERO since the respective terminal 1 inputs of MUX's 787 and 788 are at logical ZERO.

The watchdog time-out function, data MUX bit 6, signal 78907 is the output of MUX 789. Signal 91502 is applied to the terminal 1 input of MUX 789. Referring to FIG. 14X, 50 cycle AC or 60 cycle AC signal 10435 from connector 104, FIG. 14A, is applied to the input of an RC filter resistor 112, FIG. 14X. The other terminal of the resistor signal 11202 is wired to a 0.01 microfarad capacitor 113 and is applied to the input of a Schmitt Trigger inverter 261. The other terminal of capacitor 113 is wired to ground. The output of Schmitt Trigger inverter 261, signal 26102, is applied to the input of an AND gate 634. The watchdog timer enable signal 91407 and the watchdog time-out signal 63712 are applied to the other inputs of AND gate 634. The watchdog timer enable signal 91407 is set during the output timer instruction described supra. The watchdog time-out signal 63712 prevents a time-out cycle if the previous cycle had timed out. The output signal 63406 is applied to the G2 enable terminal and the clock terminal of counter 636. Output signal 63602 is applied to the G2 enable and clock terminals of a counter 637. The output signal 63712 is applied to the input of AND gate 634 as described supra and to the input of an inverter 915. Output signal 91502 is applied to the terminal 1 input of MUX 789. The watchdog timer is reset by signal 63503 being at logical ONE within approximately one second of the start of the operation of the counters 736 and 737, then the time-out signal 91502 is generated. The resetting of counters 736 and 737 was described supra.

Referring to FIG. 14T, data MUX bit 7, signal 79009 is the output of MUX 790, the terminal 1 input of MUX 789 is at ground or logical ZERO.

The data MUX bit 8 signal 79107 is the output of MUX 791. The retry time-out signal 59905 is applied to the terminal 1 input of MUX 791. The retry time-out signal 59905 is forced to logical ONE if during an I/O command to a controller on the remote ISL bus, an ACK signal 16001 or a NAK signal 24901 is not received within 120 milliseconds of the initiation of the command thereby indicating a device fault to the central processor initiating the command. The generation of signal 59905 was described supra.

Data MUX bit 9 signal 79209 is the output of MUX 792. The I/O time-out signal 45909 is applied to the terminal 1 input of Mux 792. The I/O time-out signal 45909 is at logical ONE when an I/O command issued to a controller on a remote bus, has acknowledged the fact that it received the command, and that a second-half bus cycle from this device should be forthcoming and the second-half bus cycle is not forthcoming within 250 milliseconds. That is, providing the enable for the timers via the output time instruction had been set to the true state as described supra.

Data MUX bit 10 signal 79307 is the output of MUX 793. The memory time-out signal 50509 is applied to the terminal 1 input of MUX 793. The memory time-out signal 50509 is at logical ONE if a second-half bus cycle is not forthcoming within approximately 6 microseconds providing the first-half bus cycle was acknowledged. The operation of the flop 505, FIG. 14Y was described supra.

Data MUX bit 11 signal 79409 and data MUX bit 12, signal 79509, the respective outputs of MUXs 794 and 795, FIG. 14T are at logical ZERO since the terminal 1 inputs to the MUXs 794 and 795 are at ground. Data MUX 13 signal 79607 is the output of MUX 796. The non-existent resource signal 86905 is applied to the terminal 1 input of MUX 796. This signal 86905 is at logical ONE if during a memory write operation the memory location addressed did not exist in the system.

Referring to FIG. 14I, the bus NAK signal 24814 is applied to the input of a register 413. The output signal 41307 is applied to the input of a NAND gate 544. The memory write signal 52306 and the memory request signal 51505 are also applied to the inputs of NAND gate 544. The output signal 54408 at logical ZERO is applied to the set input of a D-flop 869, FIG. 14T, thereby setting the flop indicating that the memory location addressed by the remote ISL does not exist.

Data MUX bit 14 signal 79709 is the output of MUX 797. The ISL parity error signal 44409 is applied to the terminal 1 input of MUX 797. This signal is at logical ONE any time a command issued to the ISL contains bad parity. Referring to FIG. 14B, the bus data 0-15 signals are applied to the inputs of parity generators 232 and 239. The odd parity output signals 23206 and 23906 are applied to the inputs of a NOR gate 221. The output signal 22108 is applied to the other input of OR gate 331. BSREDD signal 25403 indicates that the source detected bad parity before sending the data out on the bus. Signal 33108 is applied to the CD input of a D-flop 444 FIG. 14Y which sets on the clock timing signal 36204 if bad parity was detected.

Data Mux bit 15 signal 39807 is the output of MUX 798, FIG. 14T, and is at logical ZERO since the terminal 1 input to MUX 298 is at ground.

The input ID command instruction is different in initiation than the other input commands in that it makes no difference whether it is issued to the local or remote ISL. The cycle is the same. That is, only one cycle is involved, and that will be a local RRQCYL cycle. The ID that is returned for an ISL is either going to be a hexadecimal 2402 in the case where the local and remote ISL are both connected and powered up, and if the remote ISL is not electrically connected, then the ID returned will be a hexadecimal 2400.

Referring to FIG. 14K, the output of PROM 399 is applied to the input of AND gate 419. The output signal 41906 is applied to the input of register 418. The output signal 41802 is applied to the input of NAND gate 545. This signal 41802 at logical ONE inhibits the output signal 54513 from generating a remote cycle. Also the decoder 397 generates the output signal 39716. Signal 39716 is applied to the select inputs of MUXs 435 and 436, FIG. 14J, which select the ID function code of hexadecimal 24.

Signals 42304 and 62806 are applied to the inputs of an AND gate 417. Signal 42304 is the ID code/decode function and is at logical ONE. Signal 62806 was described supra as being at logical ONE when the remote ISL is connected and powered up. The output signal 41711, the ID bit 14, at logical ONE gives a hexadecimal 2 for the last hexadecimal digit. Therefore, the ID code is hexadecimal 2400 for a local ISL being operative and hexadecimal 2402 for the local and remote ISL being operative.

Referring to 14G, signal 42304 at logical ONE is applied to the input of AND/NOR 524. The output signal 52408 at logical ZERO, is applied to the select terminal of MUX registers 525, 526 and 527, thereby selecting the terminal 0 inputs of MUX registers 525, 526 and 527. Select 52408 is applied to the input of AND gate 372, data multiplexer-register 138 of FIG. 8. Output signal 37208 at logical ZERO is applied to the select terminal of MUX register 528 thereby selecting the terminal output.

The input signals 43504, 43410 and 43507 to MUX register 525 are at logical ZERO and input signal 43509 is at logical ONE. The input signal 43512 of MUX register 527 is at logical ZERO and input signal 43604 is at logical ONE. Input signals 43609, 43612 and 43607 of MUX register 526 are at logical ZERO. The output signal 52615 is at logical ZERO since the terminal 0 input is grounded. Signals 52908 and 86606 are applied to the input of an OR gate 513. Both signals are at logical ZERO since they are associated with a non-ID function transfer. Output signal 51303 which is applied to the input of MUX register 527 is at logical ZERO.

The output of an OR gate 514, signal 51406, at logical ZERO, is applied to the input of MUX register 527. The input to OR gate 514, signal 53006, is associated with a memory transfer and an interrupt as is at logical ZERO. Output signals 52814 and 52815 are at logical ZERO since their respective input terminals to MUX register 528 are at ground. Signal 41711 describes either a local ISL operation of a local and a remote ISL operation as described supra.

Output signal 52812 is at logical ZERO since the input terminal to MUX register 528 is at ground during the RRQ cycle. The clock bus signal 27808 is generated as described supra which loads the ID into registers 735-738 thereby generating communication bus cycle and sending that ID to the central processor requesting the data. This is shown in FIG. 8 whereby the information in hex rotary switch 140 is sent directly to the data multiplexer register 138. That essentially completes the ISL configuration mode.

Referring to FIG. 14K, the output signals 40003 through 40006 are applied to the wired ORs 153-156, FIG. 14F, to connect address 20-23 signals 15301, 15401, 15501 and 15601. The register 400, FIG. 14K, is enabled by signals 41811 and 60306 at logical ZERO. Signal 41811 was described supra.

Signals 64508 and 57205 are applied to an AND gate 603. Signals 64508 and 57205 are at logical zero since this is not a remote cycle nor a transfer to do cycle. Output signal 60306 is applied to the enable input of register 400 and it is at logical ZERO.

In the information transfer mode the ISL will use all the configurational data that was loaded in the ISL configuration mode. The first cycle covered is the memory request path which takes four cycles. The MRQCYL cycle is the initial cycle following the detection of the memory cycle by the ISL, next is the MRQCYR cycle, which happens in the remote ISL, now if this were a memory write instruction the cycle flow would discontinue at this point. It would just be the MRQCYL followed by the MRQCYR where the data would be written into a memory on the remote bus. But if it were a memory read then the ISL would remain in the busy state for the memory request path and await a memory response cycle. Then there would be a memory response cycle local MRSCYL which would be on the remote side from the original MRQCYL followed by a MRSCYR which would be back on the original local side where the original command was issued. The memory request makes the initial request and then we wait for a response from the memory. This would come through the remote via an MRSCYL to an MRSCYR back to the local. That's the basic flow, two cycles for a write and four cycles for a read. During the BSDCNN cycle the ISL responds as an agent to the memory request that is presented to the communication bus from a local device. This is done during DCN time, and referring to FIG. 14-O the select logic for writing into a register file location is done via a NAND gate 476. The gate 476 has as its inputs BSMREF, signal 24414, which is communication bus generated signal, and function BSLOCK signal 24102, which is another communication bus generated signal. The BSLOCK signal indicates that it is not a test and set instruction to a memory, the BSMREF signal indicates that this is a memory instruction. Non-test and set locks are described infra.

BSMREF signal 24414 and BSLOCK signal 24102, both at logical ONE, are applied to the input of NAND gate 476. The output signal 47603 is applied to the input of NOR gate 411. The output select 2 signal 41106 is at logical ONE. Signal 41106 is applied to the input of inverter 410. Output signal 41008 is at logical ZERO. Signal 25914 at logical ZERO is applied to the input of AND gate 509. The output select 1 signal at logical ZERO is applied to the input of inverter 408, output signal 40802 is at logical ONE. Therefore, for a memory request, location 2 of the RAMs on FIG. 14-O are selected. Previously, location 0 was selected for the ISL configuration mode inputs.

Referring to FIG. 14N, signal 48706 is applied to the input of MUX 396. Select signals 40903 and 41106 are applied to the select terminals of MUX 396 and select the terminal 2 input. Output signal 39607 is applied to the CD terminal of flop 644 and when clock signal 36008 is applied, 60 nanoseconds into the DCN cycle, flop 644 sets and output signal 64405 is applied to the clock input of a JK flop 483. Signals 54808, 40802 and 41106 at logical ONE are applied to the input of an AND gate 489. Signal 54808 is the output of an AND gate 548, FIG. 14I. Signal 86307, the output of memory hit RAM 863, FIG. 14S, and signal 62606 is at logical ONE since this is an information transfer mode and not a test operation.

Output signal 48912 is applied to the CJ terminal of flop 483. Output signal 48305 is applied to the CD input of a D-flop 487. At 135 nanoseconds into the cycle, flop signal 35712 which is applied to the clock terminal, sets flop 487, signal 48705, which inhibits any further traffic through this location in the D file.

Output signal 48706 is applied to the set input of flop 487 to keep the flop set in case other DCN signals 35712 are applied to the clock terminal.

Referring to FIG. 14S, the output of the memory translation RAMs 706 through 715, signals 70607 through 71507 are applied to the inputs of register 716 and 717. Signal 48305 is applied to the clock terminals of register 716 and 717 and when signal 48305 goes to logical ONE, the RAM signals are stored in the registers.

Referring to FIG. 14H, signals 86307, 24414 and 41106 at logical ONE are applied to the inputs of an AND gate 477. The output signal 47706 and signal 46209 are applied to the inputs of an AND gate 484. Signal 64406 is applied to the clock terminal of a JK flop 462. Output signal 46209 is at logical ONE. Output signal 48408 is applied to the input of register 631 which is clocked by signal 35809 at 135 nanoseconds into the cycle. The output signal 63115 is applied to the input of NOR gate 130. The output signal 13005 at logical ZERO is applied to the set terminal of D-flop 433, thereby setting the flop. The flop setting causes an acknowledge signal to be sent out on the communication bus thereby completing the DCN cycle.

At the start of the memory read memory request operation, the time-out for a memory cycle is started. Referring to FIG. 14Y, signal 48305 is applied to clock terminal of a D-flop 617. Since this is a memory write operation, signal 26610 is at logical ZERO and flop 617 will not set. For a read operation, flop 617 sets and signal 61706 is applied to a negated input of a 6 microsecond one-shot. Signal 48603 at logical ONE is applied to the assertive input of one-shot 611.

The memory request cycle is started as follows. Referring to FIG. 14V, signal 48306 is applied to an input of a NOR gate 645. Output signal 64508 at logical ONE is applied to an input of AND/NOR gate 388. Since signal 92306 is at logical ONE, output signal 38808 at logical ZERO will set the local cycle flop 464 and the ISL cycle flop 411 as described supra. Signal 46405 clocks signal 48305 into register 490. The memory request store signal 49002 goes to logical ONE and signal 49003 goes to logical ZERO. Signal 49002 is applied to the input of AND gate 486 and if this is not a memory response cycle, signal 49014 at logical ONE, then the memory request cycle signal 48603 at logical ONE and signal 48502 at logical ZERO, is initiated. The memory request cycle as in all the cycles shown in the ISL configuration mode activates delay line 374 and the cycle continues as described supra.

Referring to FIG. 14N, the logic for terminating the memory request cycle for the various states on the local side follow.

In order to reset the memory request full flop 487, signal 48502 at logical ZERO and timing signal 32610 are applied to inputs of a NAND gate 482. The output signal 48201 at logical ONE, is applied to the input of an AND/NOR gate 488. File write signal 36609 at logical ONE is applied to the other input of AND/NOR gate 488. The output signal 48808 at logical ZERO is applied to the input of an OR gate 283. The output signal 28306 at logical ZERO resets flop 487. The other input to OR gate 283 is the master clear signal 83006 at logical ONE. Flop 487 is reset if the ISL is doing a memory write operation. The flop 487 would not reset if the ISL were doing a memory read operation.

Signal 48201 is applied to the input of NOR gate 282. Output signal 28204 is applied to the reset terminal of flop 483 thereby resetting flop 483. This would terminate in either case the MRQ TO DO will go off at time 100 of a memory request cycle but only if it were a memory write operation will the MRQ full go off. If this were a read operation the MRQ full flop would still be set. In order to transmit the information for the MRQ cycle to the remote ISL, a transfer full JK flop is set. As described supra, referring to FIG. 14U, the memory request cycle signal 86404 at logical ZERO is applied to the input of NOR gate 763. The output signal 76308 is applied to the CJ terminal of flop 923 which sets on the fall of clock signal 76108, loads all the data and address lines into the local address and data drivers to drive the data to the remote ISL. The data path is as follows.

Referring to FIG. 14-O, the signals which were written into location 2 of the register file at DCN time are selected by the read select signals 40312 and 40211.

The memory response cycle signal 49014 and the retry response signal 90704, both at logical ONE, are applied to the input of NOR gate 402. Read select 1 signal 40211 is applied to the read terminal 1 of the file. The memory request cycle signal 48502 at logical ZERO is applied to the input of NOR gate 403. Read select 2 signal 40312 at logical ONE is applied to read terminal 2 of the file Location 2 of the file which stores the address data and control signals pertaining to the memory request cycles.

Referring to FIG. 14T, the input select signals 78111 and 78208 are at logical ZERO thereby selecting the terminal 0 input of MUXs 783 through 798. Also, the select signal 82706 is applied to the select input of MUX 930. Since the select signal 83706 is at logical ZERO, the terminal 0 input of MUX 930 is selected.

Referring to FIG. 14-O the DFIL0-15 output signals files 364, 177, 647, 365, 366 and 389 are applied to the inputs of registers 367 and 368. The DFIX0-15 output signals of registers 367 and 368 are transferred onto the data bus.

Signal 16803 is applied to the enable input of files 161 and 162 and is generated as the output of an OR gate 168. The RRQCYL signal 58305 is applied to the input of a NAND gate 169. Since this is not an RRQ cycle, the signal 58305 is at logical ZERO therefore the output signal 16908 which is applied to the input of OR gate 168 is at logical ONE. The information transfer mode idle signal 54906 is applied to the other input of OR gate 168 is at logical ONE since this is not an idle cycle. The output signal 16803 at logical ONE prevents the files 161 and 162 output signals from being selected.

The MRQ cycle signal 48502 is applied to the input of an OR gate 167. Since this is the MRQ cycle, that signal 48502 is at logical ZERO, the output signal 16708 is at logical ZERO. Signal 16708 is applied to the enable terminals of files 163, 164, 165 and 166, thereby enabling the output AFIL08-23 signals. Output AFIL0-7 signals are not enabled.

Referring to FIG. 14S, the register 716 stores the memory translation address 0-7 signals which are the outputs of the memory translation RAMs 705 through 713. Also, register 717, the translation address 8, 9 signals which are the output of RAMs 714 and 715. Therefore, during the memory request cycle the address translation memory ADXLM0-9 signals are applied to the inputs of the terminal 0 inputs of MUX 832, 835 and 836, FIG. 14Z. The MUX registers 832, 835, 836, 838, 840, 842 and 846 are all clocked by the fall of the transfer full signal 92306. Select signal 91108 is at logical ZERO since the memory request cycle signal 86404, an input to OR gate 911 is at logical ZERO thereby selecting the terminal 0 input signals of MUXs 832 and 835. Similarly, signal 91203 selects the terminal 0 input of MUX 836 since the signal 86404 input to OR gate 912 is at logical ZERO. Signals 72001 through 72901 are selected by MUX registers 832, 835 and 836 and are applied to the inputs of drivers 833, 834 and 837 as address LCAD0-9 signals for transfer to the bus. Output signals 83612 and 83613 are applied to the inputs of drivers 847 and 844, FIG. 14AB, respectively, for transfer to the bus.

The select inputs to MUX registers 838, 842 and 846 are at logical ONE thereby selecting the terminal 1 inputs. The select input of MUX register 840 signal 91003 is also at logical ONE since this is not an RRQ cycle, therefore signal 58306, an input to NAND gate 910, is at logical ZERO.

Address signals 14201, 14301, 14401, 14501, 14601, 14701, 14801, 14901, 15001, 15101, 15301, 15401, 15501 and 15601 are applied to terminal 1 inputs of MUX registers 838, 840, 842 and 846. Also, the file lock signal 36407 and the file write signal 36609 are applied to terminal 1 inputs of MUX register 846. The output address LCAD 10-23 signals are applied to the inputs of drivers 837, 839, 841 and 843 for transfer to the remote ISL over the ISL interface bus. Signals 84613 and 84615 are applied to the inputs of driver 844 for transfer over the ISL interface bus.

Referring to FIG. 14U, the register 813 is set on the rise of the transfer full signal 92305. The memory request cycle signal 86404 at logical ZERO is applied to the input terminal of register 813. The output signals 81302 at logical ZERO is applied to the input of driver 814, FIG. 14AB. The output signal 81409 is applied to the input of resistor netowrk 655, FIG. 14AC. The output signal 65515 is applied to connector 663 for transfer of the signal to the remote ISL. The signal 66220 comes into the remote ISL to connector 662, FIG. 14AC and signal 66220 is applied to the input of RECV/Driver 815, FIG. 14AB. The output signal 81507 is applied to the input of OR gate 269, FIG. 14V. The output signal 26912 at logical ONE is applied to the input of AND/NOR gate 578. Assuming the bus full signal 27108 is at logical ONE at this time, then the output signal 57808 is at logical ZERO.

The signal 57808 is applied to the input of AND gate 558. The output signal 55803 is applied to the input of AND gate 571. The output signal 57106 is applied to the input of NOR gate 176. The output signal 17612 is applied to the input of AND gate 604. The output signal 60408 is applied to the clock terminals of flop 441 which sets the flop. Also, the remote cycle flop 572 sets.

Referring to FIG. 14V, signals 81507 and 57206 are applied to the inputs of a NAND gate 865. The MRQ cycle remote signal 86513 is at logical ONE.

Referring to FIG. 14V, signal 57205 at logical ONE is applied to OR gate 561. Remote signal 56108 is at logical ONE, the remote signal is aplied to the drivers 881 throgh 886, FIG. 14Z, drivers 803, 809, FIG. 14AB and drivers 889 through 892, FIG. 14AA. The information from the local ISL is received through these drivers into the remote ISL.

The address and data information has been received from the local ISL by the remote ISL. The address information includes the first 10 bits from the memory translator in the local ISL. The remaining address bits were received by the local ISL from the central processor and sent to the remote ISL. The data information, signals 33401 through 34801, is received from the local ISL by the remote ISL and is transferred to the terminal 0 inputs of MUXs 783 through 798, FIG. 14T. The outputs of OR gates 781 and 782, signals 78711 and 78206 are at logical ZERO for this cycle. Data 1 and data 2 bits are selected through the terminal 0 input of MUX 930.

The MUX 783 through 798 output DTMX0-15 signals reflect the data transferred from the local ISL. Referring to FIG. 14C, with respect to the address signals received from the local ISL, address 8-11 signals, 14001, 14101, 14201 and 14301 are applied to the terminal 0 inputs of MUX 157, address 12, 13, 18 and 19, signals 14401, 14501, 15001 and 15101 are applied to the terminal 0 inputs of MUX 158. Address 20-23, signals 15301, 15401, 15501 and 15601, are applied to the terminal 0 inputs of MUX 160. Address 14-17, signals 14601, 14701, 14801 and 14901 are applied to the terminal 1 input of a MUX 731, FIG. 14M. The output signals 73107, 73109, 73112 and 73104 are applied to the terminal 0 inputs of MUX 159. Referring to FIG. 14E, since this is not a interrupt cycle, a signal 42709 will be logical ZERO enabling the MUXs 157-160 outputs to reflect the inputs. The address inputs, terminal 0, will be selected as this is not a second half bus cycle and MUX select signal 37806 will be logical ZERO. The output of MUXs 157-160 are connected to the inputs of registers 508 and 509. Register 507 inputs address 0-7 are received directly from the address bus and since this is not an interrupt cycle, reset signal 42708 will be high.

The data multiplex signals DTMX 0-15 outputs of MUXs 783 through 798, FIG. 14T, are applied to the terminal 1 inputs of MUXs 525, 527 and 528, FIG. 14G and terminal $\phi$ MUX 780, FIG. 14W. On FIG. 14G, the MRQCYR signal 86513 and the file write remote signal 39310 is applied to the inputs of AND/NOR gate 524. The output signal 52408 at logical ONE selects the terminal 1 inputs of MUXs 525, 526 and 527. Signal 37208 selects the terminal 1 input of MUX register 528. File write signal 80701 at logical ONE Is applied to the input of an inverter 393. The output signal 39310 is at logical ZERO. The output signals of MUX 780, FIG. 14W, 78004, 78007, 78009 and 78012 are applied to the 1 terminal input of MUX register 526, FIG. 14G.

If the remote were doing a read operation and the file write signal 80701 is at logical zero, therefore signal 39310 is at logical ONE. The output signal 52408 is at logical ZERO thereby selecting the terminal 0 inputs of MUX registers 525, 526, 527 and 528. Select signal 37208 is at logical ZERO.

Therefore, referring to FIG. 14J, the output signals generated from the hexadecimal rotary signals 101, 102 and 103 are reflected at the terminal 0 inputs of MUX registers 525 through 528, FIG. 14G.

Bit 10, signal 51303, is generated by the output of OR gate 513. The MRSBIT 86606 is applied to the input of OR gate 513. Referring to FIG. 14AA, the FILWRT signal 80701 at logical ZERO is applied to the inpt of an inverter 806. The output signal 80612 is applied to the input of an AND gate 868. The MRQCYR signal 86573 at logical ONE is applied to the other input of AND gate 866. The output signal 86606 is at logical ONE for a read operation and is at logical ZERO for a write operation which is reflected in the signal 51303 input to MUX register 527. Therefore, for a read operation, the my data bit 9 signal 52615 is at logical ZERO. My data bit 10 signal 52713 is at logical ONE, my data bit 11 signal 52715 is at logical ZERO, my data bit 12 signal 52814 is at logical ZERO, my data bit 13 signal 52815 is at logical ZERO, my data bit 15 signal 52812 is at logical ZERO.

Referring to FIG. 14D, clock signal 76208 and MRQCYR at logical ONE are applied to inputs of AND/NOR gate 278. At the 100 nanosecond delay time output signal 27808 at logical ZERO is applied to the input of an inverter 279. Output signal 27908 at logical ONE is applied to the clock terminals of registers 507, 508, and 509, FIG. 14E and to the MUX registers 525 through 528, FIG. 14G. Clock bus signal 27908 also sets a D-flop 271. Referring to FIG. 14V, bus full signal 27108, the input of AND/NOR gate 578 prevents another remote ISL cycle from starting.

Previously we mentioned what would happen if everything was normal within the system and the memory request cycle was acknowledged on the remote bus but there are various things that can happen if it is not acknowledged, if there is a NAK response, the NAK can be caused by either a non-existant device, a parity error or a defective memory. The NAK could be generated by the memory itself or any one of a number of time outs on the communication bus. In the communication bus logic there is a bus time out function. If the cycle is assigned to a non-existent device, there will be no response. Within 5 microseconds the central processor on that bus will respond in lieu of the non-existent device with a NAK. This frees up the bus for other traffic. The CP on that bus would generate an internal trap to that cycle and perform a software subroutine. If there is no CP on the remote bus then the ISL will generate this NAK on behalf of the non-existant device. Now there are two methods of generating the NAK. The first method is if the ISL is generating or if the ISL sees a DCN on the bus that is not its own DCN. D-flop 268, FIG. 14Y is set. DCND 60 signal 36008 is applied to the input of a one shot 612. If the one shot 612 is not reset before 7 microseconds by the communication bus DCNB signal 21306 then a signal 61204 is generated and applied to flop 268 at set the flop. If the signal 36008 which is applied to the CD input of the flop 268 is still at logical one. Referring to FIG. 14H, the bus time out signal 26806 is applied to the input of an OR gate 274. The output signal 27411 at logical zero will set D-flop 449. On FIG. 14B, the output signal 44909 is applied to the input of a DRVR-RCV 247 thereby generating the BSNAKR signal 24901. Referring to FIG. 14Y, the second method of generating the NAK response is as follows. Sixty nanosecond delay DCN signal 36008 and the my data cycle now signal 51707 we applied to the inputs of a three microsecond one shot 100. The output signal 10012 is applied to the clock input of a D-flop 535. If signal 36008 which is applied to the CD terminal is at logical ONE at the end of 3 microseconds when the clock signal 10012 then the flop 535 sets. In FIG. 14H, the my time out signal 53508 at logical zero is applied to the other input of OR gate 274 and the NAK signal is generated as described supra. Referring to FIG. 14I as described supra, the NAK signal 24814 received from the remote ISL is applied to the input of register 413. The output signal 41307 is applied to the input of NAND gate 544. The my memory retry request remote signal 51505 is applied to another input of NAND 544 thereby generating the non-existent memory signal 54408. The signal 54408 at logical zero indicates that the remote ISL has timed out. Referring to FIG. 14T, signal 54408 sets the non-existent local flop 869. The output signal 86905 is the status signal indicating a nonexistent resource error. Referring to FIG. 14X, signal 54408 is applied to the input of a NOR gate 824. The output signal 82406 is applied to the clock input of an Interrupt to do D-flop 823. The inhibit interrupt signal 82106 is applied to the CD terminal of flop 823. The signal 82106 is generated in FIG. 14M as follows. The Data 10 signal 34301 is applied to the input of register 857 and is at logical one for an interrupt inhibit operation. The output signal 85715 is applied to the input of inverter 856. The output signal 85606 is applied to the input of a NAND gate 821. The level 1-5 signals 85702 ,85705, 85707, 85710 and 85712 are applied to inputs of a NAND gate 858. The output signal 85806 is applied to the input of NAND gate 821. The inhibit interrupt signal 82106 is controlled by the data 10-15 signals aplied to register 857. If signal 82106 is at logical ONE indicating that the interrupt is not inhibited then in FIG. 14X flop 823 sets. The output signal 82309 is applied to a NAND gate 607. The output signal 60708 is applied to the S input of an interrupt cycle D-flop 427 thereby generating an interrupt cycle in the ISL which interrupts the communication bus on which the non-existent resource was found. The local ISL also has the ability to interrupt the remote ISL. Referring to FIG. 14AB, the non-existent memory signal 54408 is applied to the input of driver 870. The output signal 87018 is sent out on the intra bus to the remote ISL where the signal 66137 is received by receiver 916. The output signal 91616 is applied to the input of an inverter 871. Referring to FIG. 14X, the output signal 87112 is applied to the input of AND/NOR gate 895. The interrupt enable signal 91415 is applied to the other input of AND/NOR gate 895. Signal 91415 is at logical ONE if the output timer instruction was issued with data bit 6 at logical ONE. Output signal 89508 at logical ZERO sets flop 893. Signal 89508 also causes OR gate 824 to produce signal 82406 at logical ONE causes the flop 823 to set as decribed supra. The above describes the operation whereby a write command was issued to a remote memory. This remote memory was either not present or not functioning so the ISL 3 microsecond internal timer expired. The non-existent memory function on the remote ISL was set and sent a non-existent memory indication to the remote ISL. The interrupt to do flop 823 on the remote ISL and the interrupt to do flop 823 on the local ISL were set. The data 10-15 signals were set by the central processor to allow the interrupt. It is possible for one ISL to inhibit the interrupt and the other ISL to allow the interrupt.

A normal second half read response is a result of a successful read request which was acknowledged on the remote ISL bus. First the DCN cycle which is generated by the memory in response to the memory read request is sent to the ISL containing the ISL address. The address is put on the intercommunication bus during the second half memory response cycle.

Referring to FIG. 14J, the bus addres 8-16 signals inputs to EXCLUSIVE OR gates 302 to 310 are compared with the ISL address 8-16 signals and if they are logically equal then the EXCLUSIVE OR 302 through 310 are at logical ONE and are applied to the inputs of AND gate 439. Since this is a memory read operation signal 24512 is at logical ONE and the output signal 43909 is applied to the CD input of flip 440. Timing signal 36008 is applied to the clock terminal and sets the ISL address flip 440.

Referring to FIG. 14-O, second half bus signal 25914 and address 18 signal 20006 at logical ONE are applied to the input of NAND gate 478. Signal 47808 at logical ONE indicates that this second half bus cycle is in response to a memory request. Output signal 47808 at logical ZERO is applied to the input of NOR gate 411 thereby enabling the file write select 2 signal 41106. The file write select 1 signal 40903 is at logical ONE since the lock signal 24102 is at logical ONE. Therefore, address location 3 of the data and address files is selected.

Referring to FIG. 14N, signals 40903, 41106 and 44006 at logical ONE are applied to the input of an AND gate 500. The output signal 50008 is applied to the input of an AND gate 496. Since this is not a double pull operation the signal 21104 which is applied to the other input of AND gate 496 is at logical ONE. The output signal 49611 is applied to the CJ input of a memory response to do JK flop 492. The write enable signal 64405 is applied to the clock terminal which sets flop 492 on the trailing edge.

Referring to FIG. 14V, output signal 49206 is applied to the input of NOR gate 351. The output signal 35106 is aplied to register 490. Output signal 49206 is also applied to the input of NOR gate 645. The output signal 64508 is applied to the input of AND/NOR gate 388. The transfer full signal 92306 at logical ONE is applied to the other input of AND/NOR gate 388. As described supra, this sets the local cycle flop 464 and the ISL cycle flop 441. Output signal 49015 is applied to the input of an AND gate 493. Since there is not a double cycle operation signal 35206, the other input to AND gate 493 is at logical ONE. Output signal 49303 is at logical ONE. The purpose of the memory response cycle is to take the data from the memory through the remote ISL back to the local ISL and present it back to the source that requested the data on the local communication bus. Therefore, referring to FIG. 14U, the transfer full flop 923 is set to load the ISL interface registers. Signal 49309 is applied to the input of an inverter 867. The output signal 86712 is applied to the input of NOR gate 763. The output signal 76308 is applied to the CJ input of flop 923 and at the fall of signal 76108 flop 923 sets. As described supra, the ISL interface registers are loaded and data is transferred across the intracommunication bus to the local ISL. One should note that the address information is unimportant at this time as it will be replaced by the local ISL with the address of the source.

Referring to FIG. 14T, the output signal 80101 is at logical ZERO since this is not an input interrupt control or interrupt cycle operation. The output signals 78111 and 78208 are at logical zero since this is not an input status or input data operation. Therefore, terminal "0" inputs of MUX's 783 through 798 are selected.

Referring to FIG. 14-O, the data bus information is stored in registers 367 and 368. Control information is stored in register 391 whose output signals are always enabled. The output of AND gate 369 is at logical ZERO since this is a local cycle operation and this is not a master clear operation. Signals 47005 and 46406 are at logical ZERO. The output signals of registers 367 and 368 therefore are applied to the wired OR gates 332 through 348, FIG. 14F.

The outputs of the wired OR gates now reflect the data stored in the D files 364-366, 177, 647, and 389, FIG. 14-O, from the memory response. Therefore the data through the data MUX 738-798 on FIG. 14T at transfer full time was stored into the intracommunication bus registers 849, 851, 853 and 855, FIG. 14AA. The output signals to the drivers 848, 850, 852 and will be reflected on the receivers back in the local ISL. The strobe from the remote ISL will in this case cause the local to generate a remote MRSCYR.

Referring to FIG. 14U, signal 86712 is applied to the input of register 813. When signal 92305 is at logical ONE the output signal 81310 is put on the intra bus and transmitted on FIG. 14AB to the local ISL as signal 81403. The signal is received at the local ISL as signal 66219 and is reflected on the output of DRVR 815 as signal 81505.

Referring to FIG. 14V, signal 81505 is applied to the input of NOR gate 269. The output signal 26912 initiates a remote cycle in the local ISL by setting flops 441 and the remote cycle flop 572.

Referring to FIG. 14N, signals 81505 and 57206 at logical ZERO, we applied to the inputs of a NAND gate 499. Output signal 49901 at logical ONE are applied to the input of an OR gate 495. The MRSCYR signal 49511 is applied to the input of an inverter 494. Output signal 49404 is at logical ZERO.

Referring to FIG. 14Y, MRSCYR signal 49404 resets memory timer 611, one of timers 133 of FIG. 8. Since the MRSCYR signal 49404 is applied to the CD terminal of a D-flop 502, the memory timeout signal 50509 remains at logical ZERO and signal 50508 remains at logical ONE.

Signal 49404 is applied to the input of NOR gate 378 on FIG. 14G. Output signal 37808 is applied to FIG. 14D to an input of AND/NOR gate 278. At cycle 100 time when signal 76208 is at logical ONE the clock bus signal 27808 is at logical ZERO and clock bus signal 27908 is at logical ONE.

As described supra during a remote ISL cycle, referring to FIG. 14T, the select signals 78111 and 78208 are both at logical ZERO thereby selecting the terminal 0 inputs of MUX's 783 through 798. The data outputs of these MUX's appear in FIG. 14G as the input signals of MUX registers 525 through 528. Clock signal 27808 is applied to MUX registers 525 through 528 thereby clocking the data into the MUX registers. Signal 27908 also sets the bus full flop 271 preventing any further traffic from the remote ISL from causing an ISL cycle in the local for gaining access to the local communication bus.

The address of the source which requested this data is stored in the data file RAM's 364-366, 177, 389 and 647, FIG. 14-O. In this case location 2 is read. Since this is an MRSCYR cycle, signals 49014 and 90704 at NAND gate 402 are at logical ONE, output read select signal 40211 is at logical ZERO. Signal 49404 is at logical ZERO at the input of NAND gate 403, output read select 2 signal 40312 is at logical ONE. The source address was originally written into location 2 during the first half memory request cycle. During this second half cycle the source address is read out from the RAM's 364-366, 389 and 647 through the registers 367, 368 and 391 and reflected on the communnication address bus through, in FIG. 14E, MUX's 157 through 160 and registers 507 through 509 as described supra during a remote cycle.

Referring to FIG. 14N, since the MRQ full flop 487 was set during the first half memory request cycle so as to inhibit further communication bus data from being written into the MRQ RAM location. Flop 487 is reset since signals 76208, 49511 and 39006, which are at logical ONE, are applied to the input of AND/NOR gate 488. The output signal 48808 at logical ZERO is applied to the input of OR gate 283 whose output signal 28306 resets flop 487. Signal 39006 is at logical ONE since this is not a double memory cycle command. A communication bus cycle is generated which sends the data back to the requesting source and terminates the read cycle operation. Resetting flip 487 allows further traffic into the memory request path.

If thère is a NAK response to a read first half request then in FIG. 14Y the local 6 microsecond one shot 611 will set the time out flop 502. Since the first half request has already been asked and the requestor is expecting a second half response, a second half cycle will be generated but with bad parity and uncorrectable memory read indicators set. This will cause the requestor to not use the data received in the second half cycle, and in some cases to try again.

When flop 502 sets a number of things happen. Signals 50209 and 43705 are applied to the input of an AND gate 501. Since this ISL is in an idle state the signal 43705 is at logical ONE. The output signal 50108 is applied to the clock terminal of a D-flop 505 thereby setting the flop.

The output signal 50509 as described supra is the status bit indicating a memory time out. Signals 50209 and 50509 at logical one are applied to the inputs of a NAND gate 503. The output signal 50306 is applied to the input of OR gate 620, causing the time out generator signal 62008 to be at logical ZERO.

Signal 50306 is inverted by device 504 and the output, referring to FIG. 14N, signal 50408 is applied to OR gate 495. The output signal 49511, the MRSCYR signal generates a local ISL cycle. This cycle is a remote memory second half response.

Referring to FIG. 14V, signal 62008 is applied to the input of an AND gate 799. This prevents the receiver full flop 874 from forcing the enable generator signal 79911 to logical ONE thereby preventing the enabling of receiver 815, FIG. 14AB. This prevents the initiation of remote ISL cycles.

Referring to FIG. 14V, signal 62008 at logical ZERO is applied to an OR gate 412. The output signal 41206 is applied to the input of NOR gate 176. Output signal 17612 initiates the sequence that sets the local cycle flop 464 and the ISL cycle flop 441. Signal 41206 applied to NOR gate 608 forces the output signal 60808 to logical ONE which forces the CP input to flop 464 to logical ONE. This assures that flop 464 sets preventing the remote cycle flop 572 from setting.

Signal 46405 is applied to the clock input of register 490. However signal 41206 at logic ZERO is applied to the input of OR gate 287. Output signal 28708 resets register 490 thereby over riding the clock signal 46405 which is applied to the register 490. Therefore none of the local cycle functions are valid.

Even though a NAK response was received from memory it is still necessary to respond to the source. However in order to indicate to the source that the data received by the source is invalid the ISL generates a "bad parity" situation.

Referring to FIG. 14G, signal 62008 is applied to the input of an inverter 621. The output signal 62112 at logical ONE is applied to the input of an OR gate 349. The data parity error signal 34911 at logical ONE is applied to the input of a register 523. When the clock signal 27908 goes to logical ONE the data parity output signal 52302 is applied to the inputs of parity generators 521 and 522 thereby generating even parity. Output signal 34911 is applied to the input of an OR gate 392. The output signal 39208 is applied to the input of register 523. The output signal 52309 is applied to the DRVR 254, FIG. 14B, and is transmitted onto the communication bus as BSREDD signal 10338 indicating an uncorrectable error. The signal 49404 applied to the input of NOR gate 378 generated the enable second half bus cycle signal 37806 which in FIG. 14D is applied to the input of AND/NOR gate 278. Cycle 100 signal 76208 applied to the input of AND/NOR gate 278 generates the clock bus signal 27808 which strobes the data and address into the communication bus registers as in the normal MRSCYR cycle and causes a communication bus request.

The retry request (RRQCYL) path is used for the input/output request memory read with test and lock, interrupt and a unique function, IOLD which is a special input/output load instruction.

The receipt of an Retry Request instruction from the local communication bus may cause the ISL to generate up to four cycles. The initial cycle is the RRQCYL which transfers the information from the local to the remote ISL. The RRQCYR cycle which generates a remote intercommunication bus cycle. In the case of an output command or an interrupt, this would be the completion of an interrupt, this would be the completion of an instruction. Since the retry path is used for those instructions which require an actual response from the remote communication bus, the local ISL will respond on behalf of the remote intercommunication bus with a bus wait signal 26201, FIG. 14B. Then the actual response is obtained from the remote bus and brought back to the local ISL where the information is sent back to the requesting source during a compare cycle. In the case of a read instruction, once the first half request is generated on the remote communication bus, the local ISL will wait for the remote second half response as in a memory read request.

Referring to FIG. 14S, as was described in the MRQ cycle, during the DCN time that is initiating the RRQCYL cycle, the RAM's are addressed. If this instruction is a memory read, test and set lock or an IOLD command, it will require translation data from the output of the RAM's 706 through 715 to be loaded into registers 718 and 719. These registers will be clocked with the clock memory signal 73806 which is the output of inverter 738. The input signal 28106 is generated in FIG. 14I as the output of AND/NOR gate 281. The inputs are signals 53910 and 58405. Therefore the clock pulse is generated during the data transfer mode when the retry request full flop, FIG. 14N, 584 is set. This strobes the data into registers 718 and 719. The data path is described infra.

Referring to FIG. 14R, the terminal "1" inputs of MUX's 474 and 475 are selected since the bus memory reference signal 24414 input to NAND gates 481 is at logical ZERO. Also since this is in data transfer mode signal 53911 is at logical ZERO therefore the terminal 0 input of MUX's 472 and 473 are selected. This selects the high order data bits 0 and 1 and the high order address bits 0 through 7. The MUX 472 through 475 output signals are applied to the input of address terminals at the RAM's 863 and 706 through 715 in FIG. 14S.

Referring to FIG. 14R, the channel mask address signals are selected by MUX's 313, 314 and 315. The terminal 0 input of the MUX's 313, 314 and 315 are selected. The bus address signals 8 through 17 are applied to terminal 0. RAM 276 is addressed with these outputs and the channel mask bit signal 27607 at logical ONE is applied to the input of an AND gate 546. Since this is not a test mode function signal 62203 is at logical ONE. Operational signal 53910 and memory reference clear signal 48112 are applied to the input of an AND gate 550. Since this is an operational function and not a memory reference clear function both signals 53910 and 48112 are at logical ONE and the output signal 55011 is at logical ONE. Output signal 54608 at logical ONE is applied in FIG. 14N to the input of OR gate 317. The output signal 31704 at logical ZERO is applied to NOR gate 566 forcing output signal 56608 to logical ONE.

As described supra file select signals 40802 and 41008 at logical ONE are applied to the input of AND gate 585. Signal 56608 at logical ONE is also applied to the input of AND gate 585. This conditions flop 581 to set on the rise of the write enable signal 64405.

Referring to FIG. 14-0, the file write select signals 41106 and 40903 are at logical ZERO since this is not a second half bus cycle and it is not a memory reference cycle, signals 25914 and 24414 are at logical ZERO. Signals 56505 and 47808 are also at logical ZERO. Therefore location 0 of the data and address files, 92 and 103 of FIG. 8, in FIG. 14-0 are selected and when the write enable signal 64408 is applied the information on the local communication bus is written into the RAM's.

Referring to FIG. 14N, flop 584 sets 135 nanoseconds into the communication bus cycle by DCN signal 35602. Signal 58405 is applied in FIG. 14Y to the clock input of a D-flop 615. Signal 41811 is applied to the CD terminal of flop 615 which sets at the rise of the clock signal 58405. Output signal 61505 is applied to an input of an AND gate 614. The timer enable signal 91410 is at logical ONE since it was set with a data bit 7 during the output timer instruction. Bus timer signal 26102 provides 60 cycle pulses.

The output signal 61412 is applied to the G2 enable and +1 terminals of a counter 619 which counts 60 cycle pulses. This was described supra.

This timer counter 619 is used to detect that a malfunction occurred in Remote ISL. If this detector was not used, the local communication bus would remain in a wait mode.

As described supra, the RRQ2DO signal 58109 will generate an RRQCYL cycle which will (FIG. 14N) take the contents of the data and address lines and at transfer full time as described in FIG. 14U the transfer full signal 92305 will clock the data and address lines into the local ISL drivers. The data will go to the data MUX's 783 through 798, FIG. 14T as described supra.

The basic flow of information is described first, then the differences to the basic flow will be described for the memory read with test set lock and interrupt and IOLD operations.

Referring to FIG. 14U, the RRQCYL signal 90002 is applied to register 813. The output signal GENRRQ 81307 is transmitted as described supra to the remote ISL.

Referring to FIG. 14V in the remote ISL, the GENRRQ signal 81606 is applied to the input of AND/NOR gate 578. Signal 57410 and 27108 are applied to AND/NOR gate 578 and are at logical ONE at this time. The output signal 57808 is at logical ZERO.

As described the delay line 374 is made operative and the output clocking signals generated.

Referring to FIG. 14D, the remote function signal 57410, cycle 100 signal 76208, operational signal 53910 and RRQCYR signal 90201 at logical ONE for the remote cycle are applied to AND/NOR gate 278 thereby generating clock bus signals 27808 and 27908. The clock bus signals 27808 and 27908 will start the timing for the remote communication bus cycle and as described supra during this cycle the remote ISL will address the device specified on the address bus.

Referring to FIG. 14H, inhibit wait signal 42103, RRQSET signal 58506 and compare signal 31808 all at logical ONE applied to the input of AND gate 447. Output signal 44706 is applied to the input of OR gate 629. The output signal 62906 is applied to the input of register 631. The output signal 63102 is applied to the input of an inverter 630. The output signal 63006 is applied to the set terminal of flop 452 thereby setting the flop. The output signal 45309 is applied to DRVR-RCV 263 and places the BSWAIT signal, signal 26201 out on the local communication bus. The local ISL will continue to generate a wait response in this manner until a compare cycle is generated.

Referring to FIG. 14I, the remote communication bus ACK response signal 17803, NAK signal 24814, or a wait signal 26303 is stored in register 413. Output signals 41303 and 41306 are applied to an OR gate 415. The output signal 41511 is applied to the input of an AND/NOR gate 570. During the MYRRQR cycle signal 51515 which was stored in register 515 when the request was placed on the remote communication bus is at logical ONE. Output signal 57008 is applied to the input of an OR gate 270 thereby generating a bus clear signal 27006 resetting the bus full flop 271, FIG. 14G.

Remote response signal 57008 is applied to the input of driver 894, FIG. 14AB. The output signal 89409 is applied to resistor bank 658, FIG. 14AC. The output signal 65802 is applied to connector 633 for transmission over the ISL intra bus. The signal 66237 is received at the local ISL on the input to driver 733, FIG. 14AB. The output signal 73305 is applied to the clock input of register 768 on FIG. 14P which stores in the local ISL the ACK/NAK response signals 73614/73616 which were generated on the remote communication bus.

Signals 73614 and 73616 are applied to the inputs of a NAND gate 579. The output signal 57913 is applied to the register 568. If neither a NACK or ACK response was received then the wait response is stored in register 568.

Referring to FIG. 14I, during the remote communication bus cycle, register 577 has applied to the input terminals ACK signal 17803 and NAK signal 24814. Register 413 also stores the ACK signal 17803 and the NAK signal 24814. The output of register 577, remote ACK 57710, and remote NAK 57707, are applied to the input of a driver 913, FIG. 14AB, and transmits the output signal 91312 and 91314 to the local ISL where they are applied to the inputs of a driver 736 as signals 66241 and 66242. The output signals 73614 and 73616 are applied in FIG. 14P to the inputs of NOR gate 579. If both of these signals are at logical ZERO, the output signal 57913 is at logical ONE which is the regenerated WAIT response. The three remote response signals 57913, 73614 and 73616 are stored in register 568 when the remote response signal 73305 is received and makes a rise to logical ONE on the C input of register 568. The response signal must be sent back to the requesting source on the local communication bus, therefore a compare cycle is generated, using bus comparator 93 on FIG. 8. Remote strobe signal 89610, QUE2DO signal 55604 and receiver full signal 87407 is applied to an AND gate 543. Since the 3 signals are at logic one at this time the output signal 54312 is at logic one indicating that there are no cycles operative in the local ISL.

The output signal 54312 is applied to the input of an OR gate 420. The enable idle output signal 42011 is applied to the CD terminal of a D-flop 437. During the next DCN cycle the leading edge of the clock signal 21510 sets the flop 437.

The ISL idle signal 43705 is applied to the input of an AND gate 311. Also applied to the input of AND gate 311 are no cycle signal 54312, test remote signal 53914 and compare enable signal 30108, all at logical ONE. Since the remote answer valid signal 56803 input to a NOR gate 301 is at logical ZERO, the output compare enable signal 30108 is at logical ONE.

The output signal 31106 is applied to the clock terminal of a compare to do D-flop 297 thereby setting the flop. The output signal 29709 is applied to the input of an AND gate 299. Signals 41008, 40802 and 43705 all at logical ONE also are applied to the inputs of AND gate 299. Signals 41008 and 40802 at logical ONE indicate that the RRQ location of the D file is selected. The output signal 29908 is applied to the CD terminal of a D flop 318 which is set at 60 nanoseconds after the start of DCN by signal 36008 and 60 nanoseconds after flop 437 sets.

During the compare cycle the local ISL reads the information stored in data and address files, FIG. 14O, and compares it against the information received from the inter communications bus, comparators 380 through 398 of FIG. 14P, which comprise bus comparator 93 of FIG. 8. The bus address signals BSAD0-23 are applied to the B input terminal, and address 0-23 signals 13201 through 15601 are applied to the A input terminal of comparators 384 through 386. The bus data signals BSDT0-15 are applied to the B terminals and the DFIL0-15 signals are applied to the A terminals.

The output signals 38009, 38109, 38209, 38309, 38409, 38509 and 38609 are applied to the input of wired OR gate 379 which is terminated in a 330 ohm resistor 115 to +5 volts. If the information received from the communications bus was the same as stored in the D file and A file RAMs of the ISL, then the output signal 37901 is at logical ZERO. If the 2 sets of information were not equal then output signal 37901 is at logical ZERO indicating that this information is not from the source that initiated the original cycle or is information for a different cycle from what was initially originated.

Signals 37901 and 31808 at logical ONE are applied to the inputs of an AND gate 273. The output signal 37208 is applied to an inverter 272. The output signal 27204 at logical ZERO is applied to the input of an AND gate 542. If the results of the comparison indicated an equal compare then the output signals 54212 is at logical ZERO.

Referring to FIG. 14H, the compare signal at logical ONE is applied to the input of an AND gate 170. Also applied to the output of AND gate 170 are signals 56807 and 59906 which are at logical ONE. The output signal 17012 is applied to register 631 and stored at the 135 nanosecond DCN signal 35809. The output signal 63112 is applied to the input of NOR gate 130. The output signal at logical ZERO sets the ISL ACK flop 433 which generates an ACK signal as described supra.

For the NAK case, signal 56815 is logical ONE at NAND gate 171 along with signals 17208 and 27308. The output signal 17112 at logical ZERO on OR gate 526 causes signal 53806 to be at logical ONE at register 631 input. The output signal 63105 is applied to the clock input of a D-flop 449 thereby setting the ISNAKR flop. The output signal ISNAKR 44909 is sent out over the communications bus as described supra. For the case of a bus equal condition where the ISL had a WAIT response stored, the signal 56810 is applied to the input of an AND/NOR gate 174. Also applied to AND/NOR gate 174 are signals 27308 and 59906 at logical ONE at this time. The output signal 17408 is applied to the input of an inverter 175. The output signal 17506 is applied to the input of register 631. The output signal 63109 is applied to the clock input of flop 453 thereby setting the flop. This puts a BSWAIT signal out on the communications bus.

If there has been a non-compare and signal 37901, FIG. 14P, was at logical ZERO, then signal 27308 would be at logical ZERO and signal 27204 would be at logical ONE forcing signal 54212 to logical ONE.

At AND/NOR gate 174 on FIG. 14H, the signals 54212, NAK RETRY signal 53903 and CP address signal 31910 are at logical ONE at this time. Therefore, output signal 17408 would be at logical ZERO. This would result in flop 453 setting as described supra and the BSWAIT signal being sent out on the communications bus.

If this is a NAK RETRY or CP address interrupt then signals 53902 and 32008 would be at logical ONE and applied to the input of an AND/NOR gate 541. Since signal 54212 at logical ONE is applied to the input of AND/NOR gate 541, the output signal 54106 at logical ONE is applied to the input of a NOR gate 538. The output signal 53806 is applied to the input of register 631. The output signal 63105 sets the ISL NAKR flop 449, which sends out a BSNAKR signal on the communications bus.

The termination of the local RRQ cycle for a write command is as follows: In the case of an ACK response from the remote, signal 56807, FIG. 14H, will be logical ONE. As described supra, this will set signal 17012 to logical ONE which causes the ACK to be returned to the requesting source on the inter communications bus. Signal 17012 is at a logic one, and the write signal 36609 is at a logic one on FIG. 14N. AND/OR gate 286 causes output signal 28608 to be at a logic zero at the input of OR gate 293, which in turn will cause output signal 29308 to logic zero. Signal 29308 at the R input of JK flop 584 resets the RRQ function, thus opening the RRQ path for another instruction.

Referring to FIG. 14AB, the ACK response case for a read, the ACK signal 17012 is applied to AND gate 732 along with the file write signal 80504 to produce output signal 73203. Signal 73203 is returned back to the remote ISL. The received signal 73309 in the remote on FIG. 14N, sets flop 593. Flop 593 allows the second half cycle to be sent to the local.

The order is also terminated during a read or write instruction with a NAK response. Referring to FIG. 14H, the output signal 17112 at logical ZERO is applied to the input of an OR gate 536. The output signal 53603 is applied to the input of OR gate 293, FIG. 14N, thereby resetting flop 584 as described supra.

Referring to FIG. 14H, during the compare cycle, the answer wait signal 17508 is applied to the input of register 631. The output signal 63109 on FIG. 14N, is applied to the clock terminal of a D-flop 632. The output signal 63209 is applied to the other input of NAND gate 559. The output signal 55906 sets flop 581 starting another retry request to do cycle as described supra.

The RRQ cycle is repeated until a response ACK or NAK is transmitted to the source.

The effect of the WAIT is to retry the instruction by keeping flop 584, FIG. 14N set at this time. Referring to FIG. 14Y, the reset input signal 58406 is at logic zero thereby enabling counter 619, which comprises part of timers and status logic unit 133 of FIG. 8. Signal 61412 is applying 60 hertz pulses to the +1 and G2 terminal. If the WAIT response continues for more than 120 milliseconds, then signal 61907 is forced to logical ONE. This sets flop 599, signal 61608 is at logical ONE since an ACK was not received. Referring to FIG. 14H, signal 59906 at logical ZERO is applied to AND gate 170. The output signal 17012 is at logical ZERO thereby inhibiting the ACK response.

Similarly, signal 59906 is applied to the input of an OR gate 172. Output signal 17208 at logical ZERO is applied to the input of NAND gate 171. Output signal 17112 at logical ONE inhibits the NAK signal. Signal 59906 at AND/OR gate 174 inhibits a wait response, therefore there will be no responses at all. This will result in a time-out on the local ISL bus and signal the local central processor that there is no resource available to that channel number. Even though the ISL is configured for this address, the time-out would happen and the software would have to investigate why the device is either inoperative at this time or whether they configured the ISL wrong initially to generate such an error having received a response for the RRQCYR cycle. Referring to FIG. 14G, gate 524, when the RRQCYR cycle was generated signal 39310 was a logical one as this was a read request. Output signal 52408 was a logical ZERO, thereby selecting the ISL address inputs to data MUX registers 525 through 528. Also data bit 10, signal 51303 was a logical ZERO since this was not an interrupt cycle or a memory read request cycle. Data bit 10 will be received as address bit 18 at a logical ZERO when the response cycle is received from the external device. This will force gate 478 output signal 47808, FIG. 14-0 to a logical ONE.

Referring to FIG. 14-0, when the second half bus cycle is received, signal 25914 is at logical ONE. The bus lock is not set therefore signal 24102 is at logical ONE and therefore the file write select 1 signal 40903 is at logical ONE. Signal 47603, 56506 and 47808 are at logical ONE therefore file write select 2 signal 41106 is at logical ZERO. Therefore, the information is written into location 1, which is the retry response location of the address and data files of FIG. 14-0, file registers 92 and 103 of FIG. 8.

Referring to FIG. 14N, signals 41008, 40903 and 44006 at logical ONE are applied to the input of an AND gate 598. Output signal 59808 at logical ONE is applied to the CJ terminal of a JK-flop 595, the write bus enable signal 64405 is applied to the clock input thereby setting the flop. When the local ISL returns an ACK to this remote ISL then the retry response enable flop 593 is set since the clock signal 73309 is forced to logical ONE as described supra. Signals 59509 and 59305 are applied to a NAND gate 487. The output signal 58703 is applied to an inverter 58810.

Referring to FIG. 14V, which illustrates cycle generator 146 of FIG. 8, signal 58703 is applied to the input of NOR gate 645. The output signal 64508 is applied to the input of AND/NOR gate 388. Signal 92306 at logical ONE is applied to the other input. The output signal 38808 at logical ZERO generates the local cycle and the ISL cycle by setting flops 464 and 441 as described supra. Signal 58810 is strobed into register 490. The output signal 49007 is applied to the input of an AND gate 590 thereby generating the RRSCYL cycle signal 59012.

Now the ISL cycle will generate the timing signals from delay line 374 as described supra. The data path will be identical to that for the memory response cycle. The data as in any remote cycle will be sent back to the local ISL when the transfer full flop 923 in FIG. 14U is set.

Signal 59012 is applied to the input of NOR gate 909. Output signal 90910 is applied to the input of register 813. The generate RRS signal 81315 is transmitted to the local ISL.

Signal 66221 is received by driver 815 on FIG. 14AB. Output signal 81503 initiates the remote cycle at the local ISL as described supra. The data path is identical to that of the MRS cycle remote as described supra.

At the local ISL, referring to FIG. 14N, the RRQ full flop 584 is reset as follows. Signals 59211 and 76208 are applied to the inputs of AND/OR gate 286. The output signal 28606 at logical ZERO is applied to the input of OR gate 293. The output signal 29308 resets flop 584.

In the remote ISL at the time the RRSCYL cycle is taking place, in FIG. 14N, the RRS full flop 595 and the RRS ENABLE flop 593 are reset. Signals 59012 and 32712 are applied to the inputs of a NAND gate 596. The output signal 59603 at logical zero is applied to the input of an OR gate 294. The output signal 29411 resets flops 593 and 595.

Referring to FIG. 14Y, for the read cases flop 616, in the local ISL, is set since an ACK is received thereby forcing signal 56807 to logical ONE. Signal 27308 is logical ONE after an equal compare cycle. Signal 61608 at logical ZERO is applied to the CD terminal of flop 599 thereby preventing the flop from setting. Timer counter 619 is reset when signal 58406 is a logical ONE.

During a read operation after the acknowledgement of the request for the read cycle has been received, the ISL waits approximately 240 milliseconds. The output signal 61912 of counter 619 is applied to an inverter 618. The input signal 61808 is applied to the clock terminal of a D-flop 456 thereby setting the flop. The output signal 45605 at logical ONE is applied to the input of an AND gate 455.

When the ISL becomes idle as described supra, signal 43705 at logical ONE is applied to the other input of AND gate 455. The output signal 45511 sets flop 459. Output signal 45909 is the I/O timer status bit.

Signals 45909 and 45606 are applied to the inputs of a NAND gate 457. The output signal 45711 is applied to an inverter 458. Output signal 45711 is applied to the input of an OR gate 620. The signal 62008 at logic zero is the time-out generator signal of timers and status logic unit 133 of FIG. 8. The function of the signal is to simulate a parity error as described supra.

Referring to FIG. 14N, signal 46108 is applied to the input of OR gate 592 which will generate a dummy RRSCYR cycle signal 59211.

The above sequence was generated through the time-out counter 619, FIG. 14Y. The normal termination of the order would have reset this counter when RRQ full flop was reset. Flop 615 is reset by signal 29308. Signal 61505 at the input of AND gate 614 at logical ZERO inhibits the 60 hertz timing pulses 26102.

The RRSCYR signal 59211 and the end pulse signal 37712 are applied to the inputs of an AND gate 594. The output signal 59406 is applied to the input of a NOR gate 432. The output signal 43201 resets flop 456. Flop 459 will not reset until an output clear instruction to reset the timer bit is issued.

The IOLD is an input/output command which requires two cycles. The first cycle (RRQCYL) is in local ISL and the second cycle (RRQCYR) is in the remote ISL. The IOLD command is unique in the way the memory address data is a part of both the address and data field. The IOLD command is in two parts. The first part of the IOLD command is the output register portion. The address 0-7 signals represent the memory address used by the controller during a DMA operation. The remaining address 8-23 signals are the data 0-15 signals. The second part of the IOLD command is identical to any other I/O command.

Referring to FIG. 14S, as was described supra, during a DCN cycle the memory translation RAMs 706 through 715, comprising memory address translation RAM 125 of FIG. 8, are loaded into memory reference registers 716 and 717 comprising memory reference register 126 of FIG. 8, during the loading of a standard I/O command into the data file, it is to be a retry path instruction. We will find that the memory translation bits would be loaded into IOLD registers 718 and 719, comprising IOLD register 127 of FIG. 8, rather than registers 716 and 717. Signal 73806 performs that selection. Referring to FIG. 14I, signals 53910 and 58405 at logical ONE are applied to the inputs of an OR gate with ANDed inputs 281. The output signal 28106 is applied to an inverter 738, FIG. 14S. The output signal 73806 is applied to the clock terminals of registers 718 and 719 thereby clocking the data from the memory translation RAMs 706 through 715 into the registers. During the RRQCYL cycle which follows the loading of the data and address RAMs of FIG. 14-0, the signal 48603 applied to the enable terminals of tergister 718 and 719 is at logical zero thereby enabling the outputs of registers 718 and 719.

Also, during the local RRQCYL cycle, referring to FIG. 14L, address 18, 19, 21 and 22 signals and signal 64706 are applied to the inputs of a NAND gate 829. When the inputs are all at logical ZERO the output signal 82906 at logical ONE is applied to the input of an AND gate 828, signal 58306 is at logical ONE. Output signal 82803 is applied to the input of an AND gate 827. Address 20 and 23 signals 15301 and 15601 are applied to the inputs of AND gate 827 and if they are at logical ONE then output signal 82706 at logical ONE is applied at the input of inverter 826. The output signal 82610 at logical ZERO indicates that a hexadecimal 9 is indicated by address 20 through 23 signals 15301, 15401, 15501 and 15601.

Referring to FIG. 14R which illustrates the memory address multiplexer 100 of FIG. 8, memory reference signal 24414, master clear signal 47006 and operational signal 53910 are applied to the inputs of a NAND gate 481. Since signal 24414 is at logical zero, the select input of MUX's 474 and 475 are at logical ONE.

The selector signal 53911 is at logical zero thereby selecting terminal 1 inputs of MUX's 474 and 475. Therefore, the BSDT 0 and 1 signals 18905 and 19010 are selected as address 8 and 9 signals 47507 and 47409. BSAD 0-7 are applied to the terminal 0 input of MUX's 472 and 473 and are selected as address 0-7 signals 47212, 47209, 47207, 47204, 42312, 47309, 47307 and 47304.

Referring to FIG. 14S, address 0-9 signals are applied to the address select terminals of memory translation RAM's 706 through 715. The data 6-15 signals 33901 through 34801 were applied to the input terminals and written into the RAM's 706 through 715 at the specified address during configuration. The output signals 70607 through 71507 are applied to the inputs of IOLD registers 718 and 719.

Referring to FIG. 14T, the signal 82706 is applied to the select terminal of MUX 930 thereby selecting the address translator 8 and 9 signals 72801 and 72901.

Referring to FIG. 14Z, IOLD signal 82610 at logical ZERO was applied to the input of OR gate 911. The output signal 91108 is applied to the select terminals of MUX registers 832 and 835 thereby selecting the terminal 0 inputs. Address translator 0-7 signals 72001 through 72701 are the remaining 8 bits of the address translating RAM's. The remainder of the cycle is identical to any other operational input/output command. The data is transferred to the remote ISL and the standard data and address paths are followed to present the information to the remote communications bus.

The next unique path in the RRQCYL or the retry path is the memory test and set lock instructions, the test and set lock is the one memory reference instruction that will go through the retry path. The reason for that is the memtest and set lock, tests a bit on the memory board on the communication bus. That bit must be tested before it is known whether or not the instruction can be executed. Even through the system is configured to read out each memory location, it is known whether or not the lock bit is set. The proper response is generated and sent back in a similar manner to an I/O output instruction. Since this is a memory instruction, it does require the memory translation path for the proper memory addressing and also the writing of the information into the proper file locations.

Referring to FIG. 14-0 for the file write select logic, the test and set will have a unique function set on the communication bus, the BSLOCK function. This is a memory reference and a BSLOCK instruction. Also, this is not a second half bus cycle. Signal 25914 is at logical ZERO, signal 24102 is at logical ZERO and signal 24414 is at logical ONE. This selects the FILE location 0 for the information path.

Referring to FIG. 14I, signals 62606 and 86307 are applied to the input of an AND gate 548. Signal 86307 is the memory hit bit read out of memory RAM 863, FIG. 14S, which comprises RAM 125 of FIG. 8. Signal 62606 is the test operation signal. Output signal 54808 is applied to the input of a NAND gate 480, FIG. 14N. Signal 24414, at logical ONE, is applied to the other input of NAND gate 480. Output signal 48011 is applied to the input of NOR gate 566. Output signal 56608 is applied to the input of AND gate 585. Signals 40802 and 41008 are at logical ONE. The output signal 58506 conditions flop 581 to set when clock signal 64405 goes to logic ZERO thereby initiating the RRQCYL cycle for the test and set instruction. As in previous RRQ cycles the memory translation data shared in the memory translation RAM's 125 of FIG. 8 must be loaded into registers 718 and 719 as described supra. The test and set instruction must transfer the data to the local multiplex registers on FIG. 14Z in the same way as in the IOLD instruction.

Referring to FIG. 14Z, signals 58306 and 64706 are at logical ONE since this is an RRQCYL cycle and this is a memory reference instruction. The signals are applied to the input of a NOR gate 873. The output signal 87311 at logical ZERO is applied to the OR gate 911. Output signal 91108 at logical ZERO is applied to the select terminals of ISL interface MUX register 832 and 835 thereby selecting the address translator signals 72001 through 72701. Signal 87311 is applied to the input of OR gate 912 thereby selecting address translator signals 72801 and 72901 and memory reference signal 64706 and file byte 38910. The data portion of this instruction passes through the normal data path to the transmitter registers and drivers. The remainder of the address bits will come from the standard address bus, internal address bus path. During the remote cycle that is to follow in the remote ISL there are a few special control lines that must be set on the remote ISL bus.

Referring to FIG. 14G, the file lock signal 80401 which was generated in the local ISL at logical ONE is applied to an input of an OR gate 466. The output signal 46603 is applied to the input of an AND gate 443. Since this is not a test mode, signal 53906 at logical ONE is applied to the input of AND gate 443. Output signal 44311 is applied to the input of register 523. The bus lock function is a key to read the test and set bit within the memory. The bit is tested with bus lock on. The bit is tested and if the bit had previously been set in memory and is unusable at this time a NAK response is given thereby terminating the instruction. The response is sent back to the local ISL for use by the software. If the bit was not set then it would be set as a result of this instruction and an ACK response would be returned back to the local ISL and the specific type of instruction would be executed.

There are various types of set and test instructions in which certain things which do not affect the operation of the ISL are done. There is one case in which if the test and set instruction receives a WAIT response due to memory being busy from some other traffic or the memory is in refresh cycle. The wait response signal 26303 obtained from any remote cycle would be loaded, in FIG. 14I into register 413 as described supra. The output signal 41310 is applied to the input of a NAND gate 328, FIG. 14D. Signals 52305 and 51515 at logical ONE are applied to the inputs of an AND gate 602. Output signal 60203 is applied to the input of an OR gate 633. Output signal 63303 is applied to the other input of NOR 328. Output signal 32806 is applied to the clock terminal, and sets Request Retry D-flop 564. Output signal 56406 is applied to the input of OR gate 562, thereby initiating a communication bus request cycle.

The interrupt which is initiated from a controller to a central processor on the remote bus controls the RRQCYL retry path as follows. The interrupt is a standard I/O output command. The interrupt is an instruction that passes through the ISL that requires special attention due to the fact that the interrupt can be initiated from a higher priority device than that which is already using the retry path within the ISL. Therefore, if the path is busy the information must be processed before the interrupt is processed. Therefore, the interrupt must be detected and responded to at response time which is 135 nanoseconds into the DCN cycle when the ACK, NAK or WAIT are sent out in the bus.

Referring to FIG. 14M, signals BSAD 8-12 are applied to the input of a NAND gate 277. Signal BSAD 13 is applied to an inverter 195. The output signal 19504 is applied to the input of an AND gate 321 as is output signal 27705. Since this is not a memory reference instruction, signal 24414 is at logical ONE. If the address bits BSAD 08-13 were logical ZEROs then the output of an AND gate 321 is at logical ONE. Signal 32106 is applied to the input of an AND gate 320. The operational channel mask signal 54608 is applied to the input of AND gate 320. Signal 54608 is the output of an AND gate 546, FIG. 14R. The output of RAM 276, signal 27607 at logical ONE is applied to the input of AND gate 546.

Referring to FIG. 14M, output signal 32008 is applied to the CD input of a D-flop 430 which is set on the rise of the RRQ full signal 58405 at DCN 135 time. The flop set indicates that the interrupt is accepted by the ISL. If at this time there had not been a compare on FIG. 14H, then signal 54212, at logical ONE is applied to the input of an AND gate 422. Signal 32008 is applied to the other input of AND gate 422. The output signal 42203 is applied to the input of register 631. Signals 54212 and 32008 are also applied to the inputs of AND/NOR gate 541. The output signal 54106 is applied to the input of NOR gate 538. The output signal 53806 is applied to the input of register 631 and is described supra, results in a NAK response being sent out on the communications bus. Also signal 63119, the NAK interrupt function, is applied to the input of an inverter 537. The output signal 53702 at logical ZERO is applied to the S terminal of a D-flop 429, FIG. 14X thereby setting flop 429. Output signal 42905 is applied to the input of an AND gate 395. The RRQ full signal 58406 is applied to the other input and when the path becomes unbusy signal 58406 is set to logical ONE. Output signal 39503 is applied to the input of a one-shot 451. The output signal 45113 is applied to the input of a DRVR-RCV 258, FIG. 14B which puts a 30 nanosecond BSRINT signal 10406 out on the communication bus indicating to the source that received the NAK response to resubmit the interrupt to that ISL again now that the path was not busy. If the path for the interrupt was not busy then the response back to the source would have been a BSWAIT response as described supra. The BSWAIT signal causes the source to continue issuing its command until it receives a non-wait response. Meanwhile the interrupt is processed in the remote ISL.

Referring to FIG. 14M, the CP interrupt signal 32106 or the bus write signal 26510 are applied to the inputs of a NOR gate 640. The output signal 64013 is applied to the input of an inverter 641. The output signal 64104 is applied to the input of RAM 366, FIG. 14-0 as the file write function.

Referring to FIG. 14W, the terminal 0 input of the CP destination address MUX 749 is selected. Therefore, address 14-17 signals 14601 through 14901 are selected. The CP channel address signals 74912, 74909, 74907 and 74904 are applied to the address select terminals of RAM 754. RAM 754 stores the translation address for the Central Processor Unit that was previously loaded by a configuration command when the ISL was in the ISL configuration mode.

Referring to FIG. 14Z, the output signals 75411, 75409, 75407 and 75405 are applied to terminal 0 of MUX register 840. Signals 43008 and 58306 at logical ONE are applied to the inputs of NAND gate 910. Output select signal 91003 at logical ZERO selects the terminal 0 input of MUX register 840. The output signals 84015, 84014, 84013 and 84012 are applied to the inputs of drivers 839 and 841, ISL interface drivers 115 of FIG. 8, from which they are sent to the remote ISL. These signals represent the address of the central processor unit that originally loaded the ISL.

Referring to FIG. 14M, signal 91003 is applied to the input of a NAND gate 904. Data 2 signal 33501 is applied to the other input of NAND gate 904. Also, data 0, 1, and 3-5 signals 33401 through 33801 are applied to the inputs of a NAND gate 903. Data bis 0-5, data bus 117 of FIG. 8, are at logical zero to indicate one central processor interrupting another central processor.

Output signals 90305 and 90413 at logical ONE are applied to the input of an AND gate 755. Signal 58306 is also applied to an input of AND gate 755. Output signal 75506 at a logic high is applied to the input of a OR gate 927. Output signal 92711 is applied to the input of register 845, FIG. 14AA. The output signal 84505 is applied to the input of driver 844, FIG. 14AB. The output signal 84407 is applied to the ISL interface bus as signal 84407 and is received at the input of driver 803 at the remote ISL as signal 66244. The output signal 80303 is applied to a wired OR gate 926, FIG. 14AA.

Referring to FIG. 14W, the output signal 92601 is applied to the CD terminal of a D-flop 925. During the RRQCYR cycle at the remote ISL signal 90201 at logical ONE is applied to the input of an AND gate 899. At cycle 100 time signal 76208 goes to logical one and is applied to the other input of AND gate 899. Output signal 89911 is applied to the clock terminal of a D-flop 925. The flop 925 is set until the next RRQCYR cycle. The function flop 925 is described supra.

Data 6-9 signals 33901 through 34201 are applied to the terminal 1 inputs of MUX 756, which comprises the CPU source address register 136 on FIG. 8. These inputs are selected since signal 53910 which is applied to the select terminal of MUX 756 is at logical one. The output signals 75604, 75607, 75609 and 75612 are applied to the address terminals of CPU source translation RAM 757, which stores the translation information for selecting the proper CPU source address, RAM 113 of FIG. 8.

Signal 92601 which is at logical one is applied to the select terminals of data MUX 780, data multiplexer 137 of FIG. 8, thereby selecting the CPU source translation signals 75705, 75707, 75709 and 75711.

Referring to FIG. 14G, signals 90201 and 39310 are applied to the input of AND/NOR gate 524. Since, as described supra, the file write signal 80701 was at logical one, therefore the inverter output signal 39310 is at logical zero. Output signal 52408 therefore selects the terminal 1 input of bus data MUX register 526, data multiplexer/register 138 of FIG. 8, thereby selecting the data 6-9 signals 78007, 78004, 78009 and 78012. The output signals of MUX 526 along with the outputs of the other MUXs as described supra in the RRQCYR cycle will be reflected on the communications bus thereby terminating the interrupt command.

Referring to FIG. 14E, address MUX registers 507 through 509, address multiplexer register 111 of FIG. 8, stores the address as it was sent from the local ISL. Referring to FIG. 14G, the data multiplex signals are applied to the terminal 1 inputs of MUX registers 525, 527 and 528. During a write operation as described supra, the data 6-9 signals are applied to the terminal 1 inputs of data multiplexer register 526.

During a read operation the terminal 0 inputs of data multiplexer registers 525, 526 and 527 select the ISL channel address of this ISL. These are the signals from the hexadecimal rotary switches 101 through 103, FIG. 14J. As described supra, the MYDAT10 signal 51303 is at logical one for a read operation and at logical zero for a write operation.

Referring to FIG. 14D, signals 57410, 76208, 53910 and 90201 at logical one are applied to the inputs of AND/NOR gate 278 thereby generating the clock signals 27808 and 27908. Signal 27908 clocks the address 0-31 signals into registers 507, 508 and 509, FIG. 14E, the data 0-15 signals into MUX registers 525 through 528, signal 27908 also sets the bus full flop 271 thereby inhibiting another remote ISL.

The output and input interrupt control instructions passing through the ISL are detected so that special translation of the CP address can take effect. The detection of an output/input interrupt control which is function code 03 and 02 respectively are found on FIG. 14M where an AND gate 811 detects Address 18-21 signals at logical ZERO during the interrupt control input/output instruction. Signal 64706 is at logical ZERO since this is not a memory reference cycle. The output signal 81105 at logical ONE is applied to the input of an AND gate 810. Signal 53910 is at logical ONE, and if Address 22 signal 15501 is at logical ONE. Output signal 81012 is at logical ONE for function code hexadecimal 02 and 03. Signal 81012 is an input of OR gate 927 which generates the translate signal 92711 which is sent to the remote ISL along with the data and address information during the RRQCYL cycle. This was described supra. For an output interrupt instruction the RRQCYL cycle is identical to any other output instruction, the address and data will take the same paths. The only difference will be the translate signal 92711 which is sent over to the remote ISL. In the remote ISL during execution of the RRQCYR cycle, data takes a little bit different path for data 6-9 signals 33901 through 34201.

Referring to FIG. 14W, the outputs of MUX 756, the CP source address 0-3 signals 75604, 75607, 75609 and 75612. These signals address RAM 757 which stores the CP translation data. As described supra, the output signals of the RAM 757 are selected by MUX 780 because of the logic ONE state of the signal 92601.

The output signals 78004, 78007, 78009 and 78012 are applied to the terminal "1" inputs of MUX 526, FIG. 14G. The output information will contain the translated CP address enabling the controller to know which central processor to interrupt. If that central processor is configured within the ISL, the ISL will act as an agent for that CP interrupt when issued. For an input interrupt control instruction, the RRQCYL cycle is selected in the local ISL followed by the RRQCYR cycle in the remote ISL.

Referring to FIG. 14W, as described supra during the RRQCYR cycle in the remote ISL flop 925 was set thereby generating the function translator signal 92505 which is applied to the input of AND gate 928. During the RRQCYR the first half request is transmitted on the remote communication bus as described supra. When the controller sends the second half response, this remote ISL unit will generate the RRSCYL cycle. The output signal 92806 will be at logical one thereby selecting the terminal "1" input to MUX 749. Flop 925 will remain set until the generation of an RRQCYR cycle without the translator signal 92601 set. But this cannot happen until there has been a response in the case of an input command. The output signals of MUX 749 address the RAM 754. The data contents of RAM 754 contain the reverse translation of RAM 757 so that the original data of the output interrupt control is returned to the central processor.

Referring to FIG. 14AA, output signal 92306 selects the terminal "1" inputs of MUX registers 851 and 853. MUX registers 851 selects the CP destination 0 and 1 signals, 75411 and 75409. These signals are applied to the data 6 output signal 85114 and the data 7 output signal 85113. The MUX register 853 selects CP destination 2, 3 signals 75407 and 75405 which are applied to the data 8 and 9 output signals, 85312 and 85313. Also the data multiplexor 4, 5, 10 and 11 signals 78707, 78809, 79307 and 79409 are applied to the inputs of MUX register 851 and 853. The output of MUX registers 851 and 853 are applied to the drivers and are sent back to the local ISL with the rest of the data that was sent from the source CP when the output interrupt control instruction was issued. Therefore, on the ISL, the resulting communication bus cycle will give the requester of the input interrupt control instruction the data.

The system memory may be configured to send two second half responses (2 data words) for a single memory request in order to increase the memory throughput. The first word is issued with the double pull signal 10404 at logical zero during a first second half communication bus cycle. Approximately 300 nanoseconds later a second second half cycle is issued with signal 10404 at logical one.

Referring to FIG. 14N, as described supra, signals 40903 and 41106 at logical ONE are applied to AND gate 500. Signal 44006 is also at logical ONE. The output signal 50008 is applied to the input of a NAND gate 373. The bus double pull signal 21006 is applied to another input of NAND gate 373. The write bus enable signal 64405 at logical ONE is applied to another input of NAND gate 373. The output signal 37308 at logic ZERO sets a D-flop 352.

Referring to FIG. 14V, the output signal 35206 at logical ZERO is applied to the input of NOR gate 351. The output signal 35106 is applied to the input of register 490. The output signals 49014 and 49015 define the memory response, MRSCYC cycle. Signals 35205 and 35308 are applied to the inputs of AND/NOR gate 388. Since signal 35308 is at logical ONE at this time, the output signal 38808 at logical ZERO results in flops 464 and 441 set as described supra thereby generating the ISL and the local cycles.

Referring to FIG. 14N, signals 32502 and 49015 at logical ONE are applied to the input of an AND gate 354. Output signal 35411 is applied to the clock terminal of a D-flop 353 which is set on the rise of signal 35411 since signal 35205 applied to the CD terminal is at logical ONE. Setting flop 353 causes flop 352 to reset if the transfer full signal 64602 is at logical ZERO which is the normal case.

Referring to FIG. 14-0, signal 35308 is applied to the clock terminals of registers 367, 368 and 391 thereby storing the data and control output signals of RAM's 364, 365, 366, 177, 647 and 389 as described supra. The data is latched into registers 367, 368 and 391 for the first memory response cycle, which allows the memory response location of RAM's 364-366, 177, 647 and 389 to be free for the second memory response cycle.

Referring to FIG. 14N, during the first MRSCYL cycle, signals 49303 and 37712 at logical ONE are applied to the inputs of a NAND gate 375. The output signal 37511 at logical ZERO is applied to the input of an OR gate 350. The output signal 35008 is applied to the reset terminal of flop 353 thereby resetting the flop at the end of the first MRSCYL cycle of this double response. During the second memory response cycle output signal 50008 is still at logical ONE and is applied to the input of AND gate 496. Signal 21104 at logical ONE is applied to the other terminal of AND gate 496. The output signal 49611 at logical ONE causes flop 492 to set on the fall of the write enable signal 64405.

Referring to FIG. 14V, signal 49206 at logical ZERO is applied to NOR gate 351 forcing another MRSCYL as described supra. Now in FIG. 14N, the output signal 35411 is forced to logical ONE again but due to the flop 352 being reset, the D input signal 35205 is at logical ZERO. Therefore, flop 353 is not set. The data flow and address flow within the ISL is identical to that of the first memory response cycle.

Referring to FIG. 14-0, during the first MRSCYL cycle the data was stored in registers 367, 368 and 391.

The clock input 35308 was forced to logical ZERO at the end of that MRSCYL cycle. During the second cycle the registers are loaded with the data from the second memory response cycle when flop 353 sets and signal 35308 is at logical ONE.

The ISL can generate interrupts on behave of itself in certain cases if the interrupt control level register is loaded with non-zero information and the proper CP address is loaded into the channel registers.

Referring to FIG. 14M, interrupt channel register 819 and level register 857 contains the data that is used by the ISL to generate interrupts. The interrupt cycles defined are generated by the ISL and are not interrupts that pass through the ISL.

Referring to FIG. 14X as described supra, if a non-existant memory error or if a watchdog time out were detected from the remote ISL and if the interrupt enable function was set for the non-existent memory or the watch-dog timer, then the output of AND/NOR gate 895 would go to logical ZERO. Also if there were a non-existant memory error or a watchdog time-out on the local ISL then the output of a NOR gate 824 signal 82406 is at logical ONE setting flop 823. The inhibit signal 82106 is at logical one as described supra. Flop 823 is set and the output signal 82309 is applied to the input of AND gate 607. When the ISL goes idle, signal 43705 is at logical ONE, output signal 60708 is at logical ZERO thereby setting flop 427. Signals 43108 and 42504 are at logical ONE.

Referring to FIG. 14V, signal 42708 at logical ZERO is applied to the input of OR gate 412. Output signal at logical ZERO is applied to gate 287. Output signal 28708 at logical ZERO holds register 490 in a reset condition. Signal 41206 is applied to NOR gate 608. The output signal 60808 is applied to the CD terminal of flop 464. Signal 41206 is also applied to NOR gate 176. The output signal 17612 is applied to the input of AND gate 604. The rise of the output signal 60408 sets flops 464 and 441 generating the local and ISL cycles and the delay line 374 output timing functions. Notice again no particular local cycle is generated due to register 490 being held reset.

Referring to FIG. 14D, signals 42709 and 76208 at logical ONE are applied to the inputs of AND/NOR gate 278. The output signal 27808 generates a communication bus cycle and transmits the data and address information out on the bus.

Referring to FIG. 14M, signal 42708 at logical ZERO is applied to the select terminal of MUX 731 selecting the terminal "0" inputs. The output signals 73107, 73109, 73112 and 73104 represent the CP channel number to be interrupted and are applied to the input of MUX 159, FIG. 14E. The terminal "0" inputs of MUX 159 are selected since this is not a second half bus cycle, signal 37806 is at logical ZERO. The MUX's 157, 158 and 160 are not enabled and their outputs are at logical ZERO since the enable signal 42709 is at logical ONE. Also signal 42708 at logical ZERO is applied to the reset terminal of register 507 thereby forcing the high order address bits 0-8 to logical ZERO. The rest of the address bus will be logical ZERO except for bits 14 thru 17 which are the only bits enabled on the inputs of registers 508 and 509.

Referring to FIG. 14T, signal 42708 at logical ZERO is applied to NOR gate 801. Output signal 80108 at logical ONE thereby selecting the terminal "3" inputs of MUX's 783 through 798. The data MUX 0-5 signals are at logical ZERO. Data MUX 6-9 indicate the interrupt channel 6-9 signals. Data MUX 10-15 signals indicate level 0-5 signals. The level 0-5 signals indicate the level at which the ISL is to interrupt the central processor.

Referring to FIG. 14G, the signal 42709 at logical ONE is applied to the input of AND/NOR gate 524. The output signal 52408 at logical ZERO selects the terminal "0" inputs of MUX registers 525, 526 and 527. However, the terminal "1" input of MUX register 528 is selected since signal 42709 input to AND gate 372 is at logical ONE. Therefore MUX register 528 will select data MUX 12-14 signals 79607, 79509, 97909 and 79809.

MUX register 527 selects my data 10 and 11 signals 51303 and 51406. Signals 42709 and 79307 are applied to the input of AND gate 529. Since signal 42709 is at logical ONE, and the signal 86606 applied to OR gate 513 is at logical ZERO, the signal 51406 reflects the state of the data MUX 10 signal 79307.

Similarly, signals 42709 and 79409 are applied to the input of an AND gate 530. The output signal is applied to the input of OR gate 514. The output signal 51406 reflects the state of data MUX 11 signal 79409.

Referring to FIG. 14J, signals 10307 and 39716 are applied to the input of a NAND gate 434. Signal 10307 reflects the state of the ISL channel address 8 signal since signal 39716 is at logical ZERO at this time.

The hexadecimal rotary switches 140 of FIG. 8, 101, 102 and 103 have their output signals ISLA9-16 applied to the terminal "1" inputs of MUX's 435 and 436. The output signals ISIDA 1-8 are applied to the terminal "0" inputs of data MUX registers 526, 525 and 527 of FIG. 14G.

Therefore the data presented on the bus, when the communication bus cycle is generated will be the address of the CP to be interrupted and the channel address of the ISL and the level at which it is to interrupt the CPU.

Referring to FIG. 14G, signals 42709 and 80701 are applied to the inputs of an OR gate 454. The ISL write signal 45411 is applied to the input of register 523. The output signal 52306 is sent out on the communication bus to indicate that the interrupt is a write cycle.

The ISL will receive either a NAK or an ACK response from the central processor unit. IF a NAK response is received, then the CPU will follow with a BSRINT signal 10406 over the bus. In this case the interrupt must be regenerated.

Referring to FIG. 14I, the NAK response signal 24814 is applied to the input of register 413 at the end of the my data cycle now signal 51608. The output signal 41307 is applied to the clock terminal of a D-flop 431, FIG. 14X, thereby setting the flop. Flop 431 set inhibits any further interrupt from the ISL from being generated until the BSRINT signal 10406 is received from the central processor on the local bus.

The signal 10406 is the resume interrupt function that the CP generates when it can accept an interrupt. When the signal 10406 is generated, all those devices having previously stored an interrupt (due to a NAK) will regenerate their interrupts. Signal 10406 is received by DRVR-RCV 258, FIG. 14B. The output signal 25806 is applied to the input of a NOR gate 428, FIG. 14X. The output signal 42801 at logical ZERO resets flop 431.

If an ACK response was received then signal 41302 is applied to the input of a NOR gate 426. The output signal 42610 resets flop 823. However, in the NAK response, flop 623 remains set.

Therefore, the input signals 43705, 43108, 42504 and 82309 at logical ONE are applied to the inputs of AND gate 607. Output signal 60708 sets flop 427 thereby initiating the interrupt cycle as described supra. The sequence will continue until an ACK response is received from the interrupt cycle generated by the ISL.

The master clear signal 44806 applied to the input of NOR gate 426 resets flop 823.

Miscellaneous logic functions are described herein. Referring to FIG. 14H, signals 44512, 33108 and 21710 at logical ONE are applied to the inputs of a NAND gate 555, indicate that during an ISL command, a data parity error was sensed. Output signal 55508 at a logical ZERO is applied to the input of OR gate 536. The output signal 53603 is applied to the input of an OR gate 293, FIG. 14N, thereby resetting flop 584 by means of signal 29308. Signal 55508 is also applied to the input of NOR gate 538, FIG. 14H, which results in the NAK response as described supra.

Signals 44006 and 25914 are applied to the input of an AND gate 606. Output signal 60606 generates an ACK response by indicating that during the second half bus cycle the ISL address was detected.

Referring to FIG. 14J, signals 93212 and 10114 are applied to the inputs of a NAND gate 610. The output signal 61010 at logical ONE enables a master clear function issued on the local bus to be delivered to the remote ISL.

Signal 61010 is applied to the input of DRVR-RCV 242, FIG. 14B, for transmission out on the bus.

Referring to FIG. 14Y, a retry clear D-flop 601 when set resets the RRQ full flop 584, FIG. 14N. Flop 601, FIG. 14Y, is set on a time-out error. Signal 17208 is applied to inverter 173. The output signal 17310 is applied to the CD terminal of flop 601 which sets on the rise of signal 27204.

Referring to FIG. 14P, signal 87407 is applied to inverter 557. Signal 87407 at logical ZERO indicates that a remote strobe was received and a remote cycle is to take place. Output signal 55712 is applied to the input of a NAND gate 285. Signal 21510 is applied to the other input of NAND gate 285 and when at logical ONE indicates that this is not a bus cycle. The output signal 28503 is applied to the input of an OR gate 296. Signal 29803 is applied to another input of OR gate 296 and when at logical ZERO indicates that the compare cycle is completed. Output signal 29608 at logical ZERO resets flop 297. Signals 35712 and 27308 are applied to the inputs of a NAND gate 300. At 135 nanoseconds into the compare equal cycle output signal 30011 is forced to logical ZERO is applied to the input of an OR gate 298. Signal 83006, the ISL master clear signal is applied to the other input of OR gate 298. Output signal 29803 at logical ZERO indicates the end of the compare cycle.

Referring to FIG. 14G, the MRQCYR signal 86513 and the ISLOCK signal 44311 are applied to the input of an AND gate 642. The output signal 64206 is applied to the input of an OR gate 452. Signal 37806 is applied to the other input of OR gate 452. Output signal 45206 is applied to the input of register 515. Output signal 51507 generates the second half bus cycle signal 10402 which is sent out on the communication bus. During the write and reset lock instruction, signal 51507 indicates the memory is to reset the test bit.

The test mode capabilities and the test mode cycling of the ISL are described herein. There are two test mode cases, the memory loop-back case and the Input- /Output loop-back case. The memory loop-back case uses the configuration of the ISL memory RAM's, the memory translation RAM's and the memory hit bit RAM's to cycle the ISL. The standard cycling of the ISL would be basically controlled by the configuration loaded into both the local and remote ISL. The ISL is configured such that it will respond to addresses on the bus. The remote ISL will receive the address information from the local ISL and return it to the local ISL. Therefore in the memory loop-back case, the memory cycles associated with a memory loop-back command are as was described supra in the information transfer mode of the ISL. The test mode bits, described supra, in the ISL configuration mode if set allows the memory cycle to take place in the ISL. The local ISL upon receiving a memory request generates a MRQCYL cycle that results in a MRQCYR cycle being generated in the remote ISL. Since the remote ISL is configured to accept the address that it sent to the communication bus it will in turn generate a MRQCYL cycle as if it were received from an external unit. This will generate a MRQCYR cycle back in the local ISL. Overall, the local bus cycle generates a cycle from the local ISL to the remote ISL and back to the local ISL. Either a write or a read command may be generated. If a write command is generated then data would be written into the system memory location that was addressed by the local ISL. This original address is only valid to the local ISL. This address is then translated by the local ISL to some address that is not valid on the remote communication bus. The remote ISL acts upon that address and retranslates it back as a usable address on the local bus. If the MRQ cycle involved in a request for data then the local memory sends this data to the local ISL. This response generates the MRSCYL cycle in the local ISL which is acknowledged as described supra and then generates the MRSCYR in the remote ISL which sends the ISL address out on the communication bus. The remote ISL receives the ISL address and generates the MRSCYL cycle which generates the MRSCYR cycle in the local ISL and sends the data back to the CP that requested the data originally. The data was requested from system memory, sent to the local ISL, then was sent from the local ISL to the remote ISL, returned to the local ISL thereby generating eight cycles and going through all the standard data and address paths. This completes the memory loop-back case.

The I/O loop-back case operates in a similar manner to the memory loop-back case except that it uses the retry path and also both test mode bits must be set. The test mode bit must be set in the local ISL; on the remote ISL the remote test mode bit must be set. Unlike the memory loop-back case, the remote test mode bit need not be set but it may be set to avoid other traffic from getting into the ISL from the remote communication bus. The remote test mode bit inhibits all responses except the ISL's own response from being answered. For a standard input/output command, the channel address and function code when in the input/output loop-back mode are used to address a memory location on the local ISL bus after passing that request through the local ISL and remote ISL and returning to the local ISL. The memory location address is used for either an I/O read or write operation. If a read, the requested data will be passed through the local ISL using the retry path through the remote, and back to the local as in memory loop-back test. However, retry request cycle is used. The first cycle is the local RRQCYL cycle which would be treated as a stand I/O command. This request is transferred to the remote ISL where the RRQCYR cycle is generated. This results in a communication bus cycle to a channel address which is not present on the remote bus, but is configured into the remote ISL channel hit bit RAM. A bus WAIT response and a RRQCYL cycle will be generated by the remote ISL. The remote WAIT response generates a remote ISL response back to the local ISL. The local ISL will again attempt to reissue the same command as described supra, the standard input/output commands. The RRQCYL cycle generated by the remote ISL results in a RRQCYR cycle in the local ISL. This RRQCYR cycle back on the local ISL bus changes the command from a channel command to a memory reference command. The memory reference signal is forced to a logical ONE so that the data accompanying this command is actually sent to a system memory, if a write command, and if it is a read request then the system memory will respond with data. If it was a write command we would have written into a system memory location which the CP could then read by generating a compare instruction within the CP to check if the data received is the same as was sent. Since this command is acknowledged by the system memory, the acknowledgement is sent back to the remote ISL via the remote response signal as described supra. When the ensuing retry request cycle from the local ISL is issued to the remote ISL, the command will receive an acknowledge response which is sent back to the local CP that requested the I/O read or write cycle. The acknowledge started from the local system memory to the local ISL, was sent to the remote ISL and back to the local ISL. The data started from the local ISL went through the remote ISL and back to the local ISL. It essentially acts as a memory request cycle word except it is using the retry path and using the channel address and function code as a memory location. The data uses all the channel data paths. During the input/output loop-back case data 10 bit the MRS bit, is logical ZERO therefore for an I/O read loop-back the address bit 18 is at logical ZERO on the response cycle from the memory. The response would be reflected to the retry response location data file rather than the memory response. Therefore, the response from the system memory would be loaded into the retry response location and will generate an RRSCYL cycle. This RRSCY1 cycle is acknowledged since it is a second-half bus cycle and generates an RRSCYR cycle in the remote ISL which in turn generates the RRSCYL in the same remote ISL as in the memory response. This again is acknowledged and the RRSCYL generates the RRSCYR back in the remote ISL. The RRSCYR cycle sends the data to the CPU that requested the data and will end the input/output loop-back instruction.

Now to show the gates that control the specific test mode controls, referring to FIG. 14G, signal 53906 at logical ZERO is applied to the input of AND gate 443. This inhibits the lock signal 44311 thereby disabling the function. As described supra, this signal controls certain functions when issuing memory commands.

Signal 53907 is applied to the input of an AND gate 627. The output signal 62708 is applied to the input of an OR gate 625. The output signal 62508 is applied to the input of register 523. The memory reference output signal 52305 is sent out on the bus thereby indicating that this is a bus memory cycle. Gate 627 has input signal 53914. In the local ISL this signal is logic ONE, in the remote ISL it will be logic ZERO, thus blocking memory reference on remote ISL.

This allows us to change an input/output command into a memory reference. The RRQCYR signal 90201 allows the memory reference during a retry remote cycle operation when signal 90201 is at logical ONE.

Referring to FIG. 14R, signal 53915, TSTRMT on the input to gate 622 will be logic ZERO in the local ISL and a logic ONE in the remote ISL. The other input to gate 622 is signal 51707 which will be at logic ONE when the remote ISL is not generating a communication bus cycle. When the remote ISL receives a retry path request from an external source, gate 622 output signal will be a logic ZERO. This is applied to the input of gate 546 which forces the output signal 54608 to logic ZERO thereby inhibiting the remote ISL from responding to anyone but itself.

Referring to FIG. 14I, test channel signal 62203 at logical ZERO is applied to the input of an AND gate 626. The output signal 62606 at logical ZERO inhibits the output of AND gate 548, signal 54808 thereby inhibiting the detection of a memory hit bit. This inhibits an external source from initiating an ISL memory request cycle.

Referring to FIG. 14P, during the input/output loopback mode, RRQCYR signal 90201 at logical ONE is applied to the input of a NAND gate 623, remote answer signal 56802 which is at logical ONE as a result of the remote response being detected from the remote ISL, is applied to another input of NAND gates 623. Test mode signal 53907 is applied to the other input of NAND gate 623. Output signal 62308 at logical ZERO sets flop 297. When the ISL becomes idle, the signal 29908 is forced to logical ONE thereby conditioning the setting of flop 318 on the rise of clock signal 36008. This initiates a compare cycle which sends the remote answer received by the local ISL back to the local bus.

Referring to FIG. 14K, signal 53914 at logical ZERO is applied to the input of AND gate 445. The output signal 44512 at logical ZERO inhibits the ISL on either bus from responding to an instruction.

For convenience in relating the functional blocks of FIG. 8 with the detailed logic schematics of FIGS. 14, Table 13 lists the functional blocks of FIG. 8 by title, reference number and logic sheet number. The logic sheet numbers in Table 13 can be used in conjunction with Table 12 to determine those of FIGS. 14 in which a functional block of FIG. 8 is illustrated in detailed logic schematic form.

TABLE 13

| Logic Sheet | Title | FIG. 8 & Ref. Nos. |
|---|---|---|
| 1 | Communication Bus Interface | |
| 2 | Comm. Bus Data & Control Tranceivers | 90/141 |
| 3 | Comm. Bus Address & Control Transceivers | 98/123 |
| 4 | Communication Bus Control | |
| 5 | Bus Address MUX and Register | 111 |
| 6 | Internal Data & Address Tri-State Bus | 105/117 |
| 7 | Bus Data MUX & Register | 138 |
| 8 | Comm. Bus Response Control Logic | |
| 9 | Mode Control Register (539) | 135 |
| 9 | Remote Response Logic | |
| 10 | Hex Rotary and ISL | 140/99 |

TABLE 13-continued

| Logic Sheet | Title | FIG. 8 & Ref. Nos. |
|---|---|---|
| | Address Compator | |
| 11 | Function Code PROM and Decoder | 102/106 |
| 12 | Master Clear Generator | 94 |
| 13 | Interrupt Channel and Level Registers | 132/134 |
| 13 | Address MUX for Bits 14–17 | 112 |
| 15 | File Full & Cycle Control | |
| 16 | Data & Address Files | 103/92 |
| 16 | Data File Transmitter Register (367–368) | 121 |
| 17 | Bus Compare | 93 |
| 18 | RAM Counter and Control | 108/118 |
| 19 | Channel & Memory Address | 100/101 |
| 19 | Channel Mask RAM (276) | 142 |
| 20 | Memory Address Translation RAMs | 125 |
| 20 | MEM REF & IOLD Register | 126/127 |
| 21 | Internal Data MUX | 129 |
| 22 | Transfer Cycle Logic | |
| 23 | Cycle Generator | 146 |
| 24 | CPU Destination Address Register and Translation RAM | 114/131 |
| 24 | CPU Source Address Register & Translation RAM | 136/113 |
| 24 | Data MUX (780) | 137 |
| 26 | Watchdog Timer & Interrupt Control | 133 |
| 27 | Memory & I/O Timers Status | 133 |
| 28 | Intra Bus Address Driver Receivers | 104/115 |
| 29 | Intra Bus Data Driver/Receivers | 116/139 |
| 30 | ISL Control Driver/Receivers | |
| 31 | ISL Intrabus Connectors and Terminators | |

Table 14 lists each of the logic component types illustrated in FIGS. 14 by generic name, and model or order number. Each of those logic components not having an adjacent asterick are manufactured and sold by Texas Instruments Incorporated of Dallas, Texas. The vendors for the remaining logic components are indicated at the base of Table 14.

The delay lines DLY125T, 150T, 200T and 6040 were specially designed by Honeywell for implementation into the ISL unit, and are fully disclosed in the following publications available to the public:
1. Document No. 11040109, Rev. A
2. Specification No. 60067122, Rev. A.
3. Specification No. 04550072, Rev. C
4. Specification No. 04550075, Rev. C
5. Specification No. 04550079, Rev. B
6. Specification No. 04550081, Rev. B

TABLE 14

| Generic Name | Model or Order No. | Drawing | Ref. No. |
|---|---|---|---|
| *₁Transceiver | 26S10 | 14B | 263 |
| *₂PROM | 5603A | 14K | 399 |
| Hex Schmitt-Trigger Inverter | 7414 | 14X | 261 |
| 4-line to 16-line decoders/demultiplexers | 74154 | 14K | 397 |
| 4-bit D-type | | | |

TABLE 14-continued

| Generic Name | Model or Order No. | Drawing | Ref. No. |
|---|---|---|---|
| registers | 74173 | 14K | 400 |
| Hex D-type flip-flops | 74174 | 14G | 515 |
| Dual Monostable multivibrators | 74221 | 14Y | 611 |
| Octal D-type flip-flops | 74273 | 14G | 523 |
| Dual 4-input positive NAND gate with open-collector outputs | 74H21 | 14V | 583 |
| Quadruple 2-input positive NAND gates | 74LS00 | 14R | 622 |
| Quadruple 2-input positive NOR gates | 74LS02 | 14N | 482 |
| Hex inverters | 74LS04 | 14O | 408 |
| Quadruple 2-input positive AND gate | 74LS08 | 14H | 606 |
| Triple 3-input positive NAND gate | 74LS10 | 14G | 465 |
| Quad D-type flip-flops | 74LS175 | 14P | 568 |
| Synchronous up/down counters (binary with clear) | 74LS193 | 14X | 636 |
| Dual 4-input positive NAND gates | 74LS20 | 14X | 607 |
| Dual 4-input positive AND gates | 74LS21 | 14X | 634 |
| Quad data selectors/multiplexers | 74LS258 | 14J | 436 |
| Quad 2-input multiplexers with storage | 74LS298 | 14G | 526 |
| AND-OR Invert Gates | 74LS51 | 14I | 570 |
| 4 by 4 register files | 74LS670 | 14O | 365 |
| Dual D-type positive edge triggered flip-flops with preset and clear | 74LS74 | 14N | 487 |
| Quadruple 2-input positive NAND gates | 74S00 | 14O | 476 |
| Quadruple 2-input positive NOR gates | 74S02 | 14D | 292 |
| Hex inverters | 74S04 | 14B | 241 |
| Quadruple 2-input positive AND gates | 74S08 | 14O | 409 |
| Triple 3-input positive NAND gates | 74S10 | 14O | 411 |
| Dual J-K negative edge triggered flip-flops with present and clear | 74S112 | 14D | 534 |
| Triple 3-input positive AND gates | 74S11 | 14D | 256 |
| 13 input positive NAND gates | 74S133 | 14D | 520 |
| Dual 4-input positive NAND 50-ohm line drivers | 74S140 | 14I | 216 |
| Dual 4-line to 1-line data selectors/multiplexers | 74S153 | 14N | 396 |
| Quad 2 to 1 line data selectors/multiplexers (non inverted data outputs) | 74S157 | 14E | 159 |
| Quad D-type flip-flops | 74S175 | 14K | 418 |
| Dual 4-input positive NAND gates | 74S20 | 14V | 645 |
| Dual 5-input positive NOR gates | 74S260 | 14H | 130 |
| Quadruple 2-input positive OR gates | 74S32 | 14G | 513 |
| Octal D-type latches | 74S373 | 14O | 367 |
| And-OR-Invert Gates | 74S51 | 14I | 281 |
| 4-2-3-2 input and-or invert gates | 74S64 | 14D | 278 |
| Dual D-type positive-edge-triggered flip-flops with preset and clear | 74S74 | 14H | 433 |
| Quadruple 2-input exclusive OR gates | 74S86 | 14L | 251 |
| *₃Parity generator | 86S62 | 14B | 232 |
| *₄1024 address random access memory | 93425A | 14R | 276 |
| *₅Comparator | 93S47 | 14P | 384 |
| *₆Delay line 125 ns | DLY125T | 14V | 374 |
| *₆Delay line 150 ns | DLY150T | 14I | 358 |
| *₆Delay line 200 ns | DLY200T | 14L | 467 |
| *₆Delay line 40 ns | DLY6040 | 14D | 255 |

Manufacturers:
*₁Advanced Micro Devices, Sunnyvale, California
*₂Intersil, Sunnyvale, California
*₃Signetics, Sunnyvale California
*₄Fairchild, Mountain View, California
*₅Fairchild, Mountain View, California The invention may be embodied in other specific forms without departing from the spirit or essential characteristics thereof. The present embodiments are therefore to be considered in all respects as illustrated and not restrictive, with the scope of the invention being indicated by the appended claims rather than by the foregoing description. All changes which come within the meaning and range of equivalency of the claims are therefore intended to be embraced therein.

What is claimed is:

1. An intersystem communication link for use in a data processing system having plural intersystem communication links for accommodating the transfer of information between plural communication busses each providing a common information path for data processing devices electrically interfacing therewith, which comprises:

(a) asynchronous information acquisition means for capturing at the bus rate binary information presented on a first one of said communication busses wherein each type of bus communication is stored in a separate one of plural dedicated file locations included in said acquisition means thereby accommodating plural bus communications of different types in parallel;

(b) information decoding means in electrical communication with said acquisition means for identifying substantially at said bus rate binary information to be further processed by said intersystem link;

(c) information translation means in electrical communication with said acquisition means for selectively converting substantially at said bus rate address information presented on said first bus to address information pertaining to a second, remote one of said communication busses, and address information pertaining to said second bus to address information pertaining to said first bus; and (d) logic control means in electrical communication with said decoding means, said translation means, and said acquisition means and responsive to detection of first control signals on said first bus by said acquisition means for effecting a selective reconfiguration of said intersystem link and further responsive to the detection of second control signals on said first bus by said acquisition means for controlling the transfer of information through said intersystem link to said remote second bus.

2. The intersystem communication link of claim 1 wherein said information acquisition means further includes:

(a) data register file means responsive to control signals on said first bus and to said logic control means for storing data in selected ones of said plural dedicated file locations; and
   (b) address register file means responsive to control signals on said first bus and to said logic control means for storing address information in selected ones of said plural dedicated file locations.

3. The intersystem communication link of claim 1 wherein said decoding means further includes:
   (a) intersystem link identification means responsive to address information on said first bus for identifying at the bus rate first half bus cycle requests and second half bus cycle responses from said first bus;
   (b) bus comparator means responsive to said acquisition means and to said logic control means for comparing information received from said first bus in a previous bus cycle with information received from said first bus in a current bus cycle, thereby indicating to said logic control means that a response received from said remote second bus may be applied to said first bus;
   (c) channel address decoding means responsive to address information for identifying substantially at the bus rate information to be transferred through said intersystem link to non-memory devices; and
   (d) memory address decoding means responsive to address information for identifying substantially at the bus rate information to be transferred through said intersystem link to memory devices.

4. The intersystem communication link of claim 1 wherein said information translation means further includes:
   (a) memory address translation means selectively converting local memory addresses to remote memory addresses for either directly addressing remote memory devices on said second bus or providing to a remote non-memory device on said second bus a memory address;
   (b) destination central processing unit (CPU) address translation means selectively converting local CPU address information to remote CPU address information for addressing remote CPUs, and selectively converting remote address information to local address information for identification by a local CPU; and
   (c) source CPU address translation means selectively converting local CPU address information to remote CPU address information for addressing local and remote CPUs.

5. The intersystem communication link of claim 1 wherein said logic control means further includes:
   (a) mode control means responsive to said acquisition means for placing said intersystem link in an on-line, clear or stop logic state;
   (b) cycle generator means responsive to said acquisition means and said mode control means for selectively generating internal intersystem link timing signals asynchronous to said bus rate to control information flow between said first and second busses;
   (c) timing and status logic means responsive to said acquisition means and said cycle generator means for detecting and circumventing information flow deadlocks, and indicating such occurrences;
   (d) interrupt means responsive to said timing and status logic means, and in electrical communication with said acquisition means for identifying to said first bus the occurrence of extraneous interrupts in said intersystem link;
   (e) function code decoder means responsive to said acquisition means and said cycle generator means for providing a selected one of plural intersystem link operation commands to said mode control means, said timing and status logic means, and said interrupt means; and
   (f) RAM counter and control means responsive to said acquisition means and said function code decoder means for selectively reconfiguring said intersystem link.

6. An intersystem communication link for use in a data processing system having plural intersystem communication links for accommodating the transfer of information between plural communication busses each providing a common information path for data processing devices electrically interfacing therewith, which comprises:
   acquisition means, including storage means, responsive to first control signals presented on a first one of said communication busses for storing transfer data, also presented on said first bus, in said storage means;
   decoder means responsive to said first control signals for generating an enabling signal indicating that said transfer data stored in said storage means is to be transferred to a remote second one of said communication busses;
   translation means for translating at least a portion of said transfer data to produce output data having a data format compatible with the data conventions of said remote second bus; and
   transfer control means actuated in response to said enabling signal for transferring said output data together with transfer data from said storage means to said remote second bus.

7. The intersystem communication link of claim 6 further comprising:
   logic control means coupled to said first bus and responsive to second control signals presented thereon for effecting a selective reconfiguration of said intersystem communication link to modify the data transfer functions thereof.

8. The intersystem communication link of claim 7 wherein said logic control means is constructed and arranged to modify the operation of said translation means after the data conventions of said remote second bus have been changed, whereby said translation means produces output data having a data format compatible with the changed data conventions of said remote second bus.

9. The intersystem communication link of claim 6 further comprising:
   means for receiving remote transfer data from said remote second bus;
   means included in said translation means for translating at least a portion of said remote transfer data to produce input data having a data format compatible with the data conventions of said first bus; and
   means for applying said input data to said first bus to effect a data transaction thereon.

10. The intersystem communication link of claim 6 wherein said storage means includes a plurality of dedicated storage locations and said acquisition means further comprises means for receiving said first control signals and being responsive to different types of said first control signals representing different types of data transactions for storing the transfer data on said first bus in a selected one of said dedicated storage locations depending on the type of first control signal received.

* * * * *